(12) United States Patent
Yakes et al.

(10) Patent No.: US 6,885,920 B2
(45) Date of Patent: Apr. 26, 2005

(54) CONTROL SYSTEM AND METHOD FOR ELECTRIC VEHICLE

(75) Inventors: Christopher K. Yakes, Oshkosh, WI (US); Jon J. Morrow, Neenah, WI (US); Duane R. Pillar, Oshkosh, WI (US); Bradley C. Squires, New London, WI (US)

(73) Assignee: Oshkosh Truck Corporation, Oshkosh, WI (US)

( * ) Notice: Subject to any disclaimer, the term of this patent is extended or adjusted under 35 U.S.C. 154(b) by 51 days.

(21) Appl. No.: 10/326,862

(22) Filed: Dec. 19, 2002

(65) Prior Publication Data

US 2003/0158638 A1 Aug. 21, 2003

Related U.S. Application Data

(63) Continuation-in-part of application No. 09/927,946, filed on Aug. 10, 2001, which is a continuation-in-part of application No. 09/384,393, filed on Aug. 27, 1999, now Pat. No. 6,421,593, which is a continuation-in-part of application No. 09/364,690, filed on Jul. 30, 1999, now abandoned, application No. 10/326,862, and a continuation-in-part of application No. 09/500,506, filed on Feb. 9, 2000, now Pat. No. 6,553,290, application No. 10/326,862, and a continuation-in-part of application No. 09/774,981, filed on Jan. 31, 2001.
(60) Provisional application No. 06/388,451, filed on Jun. 13, 2002, provisional application No. 60/360,479, filed on Feb. 28, 2002, and provisional application No. 60/342,292, filed on Dec. 21, 2001.

(51) Int. Cl.$^7$ ................................................. B60K 1/02
(52) U.S. Cl. ........................ 701/22; 180/65.1; 180/65.2; 180/65.3; 180/65.4; 180/65.6; 180/65.8
(58) Field of Search .................... 701/22; 180/65.1–65.8

(56) References Cited

U.S. PATENT DOCUMENTS 1,951,089 A   3/1934   Fielder

| 3,524,069 A | 8/1970 | Stepanov et al. |
|---|---|---|
| 3,690,559 A | 9/1972 | Rudloff |
| 3,799,284 A | 3/1974 | Hender |
| 3,865,209 A * | 2/1975 | Aihara et al. .............. 180/65.4 |
| 3,966,067 A | 6/1976 | Reese |

(Continued)

FOREIGN PATENT DOCUMENTS

| DE | 1816183 | 6/1970 |
|---|---|---|
| DE | 4108647 A1 | 9/1992 |
| DE | 4431929 C1 | 10/1995 |
| DE | 19749074 A1 | 5/1999 |
| EP | 266704 | 5/1988 |
| EP | 504913 | 9/1992 |
| EP | 564943 | 10/1993 |
| EP | 0 622 264 A2 | 11/1994 |

(Continued)

OTHER PUBLICATIONS

International Search Report for Application PCT/US 03/40103; mailed May 24, 2004 (10 pages).

(Continued)

*Primary Examiner*—Thomas G. Black
*Assistant Examiner*—Eric M. Gibson
(74) *Attorney, Agent, or Firm*—Foley & Lardner LLP

(57) ABSTRACT

An electric traction vehicle comprises a vehicle platform, a communication network, a power source mounted on the vehicle platform, a plurality of drive wheels rotatably mounted on the vehicle platform, a plurality of electric motors coupled to respective ones of the plurality of drive wheels, and a plurality of microprocessor-based interface modules coupled to the plurality of electric motors. The interface modules are configured to control the plurality of electric motors and are coupled to each other by way of the communication network.

54 Claims, 65 Drawing Sheets

U.S. PATENT DOCUMENTS

| | | |
|---|---|---|
| 4,041,470 A | 8/1977 | Slane et al. |
| 4,088,934 A | 5/1978 | D'Atre et al. |
| 4,113,045 A | 9/1978 | Downing, Jr. |
| 4,162,714 A | 7/1979 | Correll |
| 4,180,803 A | 12/1979 | Wesemeyer et al. |
| 4,292,531 A | 9/1981 | Williamson |
| 4,319,140 A | 3/1982 | Paschke |
| 4,336,418 A | 6/1982 | Hoag |
| 4,355,385 A | 10/1982 | Hampshire et al. |
| 4,423,362 A | 12/1983 | Konrad et al. |
| 4,423,794 A | 1/1984 | Beck |
| 4,461,988 A | 7/1984 | Plunkett |
| 4,516,121 A | 5/1985 | Moriyama et al. |
| 4,542,802 A | 9/1985 | Garvey et al. |
| 4,562,894 A | 1/1986 | Yang |
| RE32,140 E | 5/1986 | Tokuda et al. |
| 4,639,609 A | 1/1987 | Floyd et al. |
| 4,646,232 A | 2/1987 | Chang et al. |
| 4,760,275 A | 7/1988 | Sato et al. |
| 4,774,399 A | 9/1988 | Fujita et al. |
| 4,809,177 A | 2/1989 | Windle et al. |
| 4,809,803 A | 3/1989 | Ahern et al. |
| 4,843,557 A | 6/1989 | Ina et al. |
| 4,864,151 A | 9/1989 | Wyczalek et al. |
| 4,894,781 A | 1/1990 | Sato et al. |
| 4,941,546 A | 7/1990 | Nist et al. |
| 4,949,808 A | 8/1990 | Garnett |
| 4,953,646 A | 9/1990 | Kim |
| 4,966,242 A | 10/1990 | Baillargeon |
| 4,985,845 A | 1/1991 | Götz et al. |
| 5,025,253 A | 6/1991 | DiLullo et al. |
| 5,067,932 A | 11/1991 | Edwards |
| 5,081,832 A * | 1/1992 | Mowill ................... 60/792 |
| 5,091,856 A | 2/1992 | Hasegawa et al. |
| 5,120,282 A | 6/1992 | Fjallstrom |
| 5,168,946 A | 12/1992 | Dorgan |
| 5,189,617 A | 2/1993 | Shiraishi |
| 5,195,600 A | 3/1993 | Dorgan |
| 5,201,629 A | 4/1993 | Simpson et al. |
| 5,227,703 A | 7/1993 | Boothe et al. |
| 5,291,960 A * | 3/1994 | Brandenburg et al. ...... 180/65.2 |
| 5,343,971 A * | 9/1994 | Heidelberg et al. ........ 180/65.4 |
| 5,345,154 A | 9/1994 | King |
| 5,365,436 A | 11/1994 | Schaller et al. |
| 5,369,540 A | 11/1994 | Konrad et al. |
| 5,409,425 A | 4/1995 | Shibahata |
| 5,416,702 A | 5/1995 | Kitagawa et al. |
| 5,418,437 A | 5/1995 | Couture et al. |
| 5,448,561 A | 9/1995 | Kaiser et al. |
| 5,463,992 A | 11/1995 | Swenson et al. |
| 5,508,594 A | 4/1996 | Underwood et al. |
| 5,508,689 A | 4/1996 | Rado et al. |
| 5,538,274 A | 7/1996 | Schmitz et al. |
| 5,555,171 A | 9/1996 | Sonehara et al. |
| 5,557,257 A | 9/1996 | Gieffers |
| 5,558,588 A | 9/1996 | Schmidt |
| 5,558,589 A | 9/1996 | Schmidt |
| 5,558,595 A | 9/1996 | Schmidt et al. |
| 5,568,023 A | 10/1996 | Grayer et al. |
| 5,575,730 A | 11/1996 | Edwards et al. |
| 5,575,737 A | 11/1996 | Weiss |
| 5,586,613 A | 12/1996 | Ehsani |
| 5,589,743 A | 12/1996 | King |
| 5,623,169 A | 4/1997 | Sugimoto et al. |
| 5,629,567 A | 5/1997 | Kumar |
| 5,629,603 A | 5/1997 | Kinoshita |
| 5,637,933 A | 6/1997 | Rawlings et al. |
| 5,638,272 A | 6/1997 | Minowa et al. |
| 5,646,510 A | 7/1997 | Kumar |
| 5,657,224 A | 8/1997 | Lonn et al. |
| 5,669,470 A | 9/1997 | Ross |
| 5,670,845 A | 9/1997 | Grant et al. |
| 5,672,920 A | 9/1997 | Donegan et al. |
| 5,679,085 A * | 10/1997 | Fredriksen et al. ........... 475/76 |
| 5,736,925 A | 4/1998 | Knauff et al. |
| 5,739,592 A | 4/1998 | Rigsby et al. |
| 5,754,021 A | 5/1998 | Kojima |
| 5,767,584 A | 6/1998 | Gore et al. |
| 5,793,648 A | 8/1998 | Nagle et al. |
| 5,794,165 A | 8/1998 | Minowa et al. |
| 5,813,487 A | 9/1998 | Lee et al. |
| 5,819,188 A | 10/1998 | Vos |
| 5,820,150 A | 10/1998 | Archer et al. |
| 5,827,957 A | 10/1998 | Wehinger |
| 5,828,554 A | 10/1998 | Donegan et al. |
| 5,845,221 A | 12/1998 | Hosokawa et al. |
| 5,847,520 A * | 12/1998 | Theurillat et al. .......... 318/139 |
| 5,848,365 A | 12/1998 | Coverdill |
| 5,864,781 A | 1/1999 | White |
| 5,879,265 A | 3/1999 | Bek |
| 5,880,570 A | 3/1999 | Tamaki et al. |
| 5,884,206 A | 3/1999 | Kim |
| 5,890,080 A | 3/1999 | Coverdill et al. |
| 5,896,418 A | 4/1999 | Hamano et al. |
| 5,919,237 A | 7/1999 | Balliet |
| 5,924,879 A | 7/1999 | Kameyama |
| 5,925,993 A | 7/1999 | Lansberry |
| 5,939,794 A | 8/1999 | Sakai et al. |
| 5,947,855 A | 9/1999 | Weiss |
| 5,948,025 A | 9/1999 | Sonoda |
| 5,949,330 A | 9/1999 | Hoffman et al. |
| 5,957,985 A | 9/1999 | Wong et al. |
| 5,973,463 A * | 10/1999 | Okuda et al. ............... 318/430 |
| 5,986,416 A | 11/1999 | Dubois |
| 5,987,365 A | 11/1999 | Okamoto |
| 5,997,338 A | 12/1999 | Pohjola |
| 5,998,880 A | 12/1999 | Kumar |
| 5,999,104 A | 12/1999 | Symanow et al. |
| 6,005,358 A * | 12/1999 | Radev ....................... 318/139 |
| 6,012,004 A | 1/2000 | Sugano et al. |
| 6,038,500 A * | 3/2000 | Weiss ......................... 701/22 |
| 6,054,844 A | 4/2000 | Frank |
| 6,096,978 A | 8/2000 | Pohjola |
| 6,104,148 A * | 8/2000 | Kumar et al. .................. 318/52 |
| 6,105,984 A | 8/2000 | Schmitz et al. |
| 6,123,497 A | 9/2000 | Duell et al. |
| 6,135,806 A | 10/2000 | Pohjola |
| 6,141,610 A | 10/2000 | Rothert et al. |
| 6,154,122 A | 11/2000 | Menze |
| 6,223,104 B1 | 4/2001 | Kamen et al. |
| 6,338,010 B1 | 1/2002 | Sparks et al. |
| 6,356,826 B1 | 3/2002 | Pohjola |
| 6,387,007 B1 | 5/2002 | Fini, Jr. |
| 6,421,593 B1 | 7/2002 | Kempen et al. |
| 6,434,512 B1 | 8/2002 | Discenzo |
| 6,496,775 B1 | 12/2002 | McDonald, Jr. et al. |
| 6,501,386 B1 | 12/2002 | Lehrman et al. |
| 6,553,290 B1 | 4/2003 | Pillar |
| 6,580,593 B1 | 6/2003 | Balakrishnan |
| 6,611,755 B1 | 8/2003 | Coffee et al. |
| 6,757,597 B1 | 6/2004 | Yakes et al. |
| 2002/0065594 A1 | 5/2002 | Squires et al. |
| 2003/0130765 A1 | 7/2003 | Pillar et al. |
| 2003/0158635 A1 | 8/2003 | Pillar et al. |
| 2003/0158640 A1 | 8/2003 | Pillar et al. |
| 2003/0163228 A1 | 8/2003 | Pillar et al. |
| 2003/0163229 A1 | 8/2003 | Pillar et al. |
| 2003/0163230 A1 | 8/2003 | Pillar et al. |
| 2003/0171854 A1 | 9/2003 | Pillar et al. |
| 2003/0195680 A1 | 10/2003 | Pillar |
| 2003/0200015 A1 | 10/2003 | Pillar |

| | | |
|---|---|---|
| 2004/0002794 A1 | 1/2004 | Pillar et al. |
| 2004/0019414 A1 | 1/2004 | Pillar et al. |
| 2004/0024502 A1 | 2/2004 | Squires et al. |
| 2004/0039510 A1 | 2/2004 | Archer et al. |
| 2004/0055802 A1 | 3/2004 | Pillar et al. |
| 2004/0069865 A1 | 4/2004 | Rowe et al. |

FOREIGN PATENT DOCUMENTS

| | | |
|---|---|---|
| EP | 805059 B1 | 3/1997 |
| EP | 812720 B1 | 6/1997 |
| EP | 791506 | 8/1997 |
| EP | 0 898 213 A1 | 2/1999 |
| EP | 1 018 451 A1 | 7/2000 |
| EP | 1 092 406 A2 | 4/2001 |
| EP | 1 229 636 A2 | 8/2002 |
| FR | 2658259 A1 | 2/1990 |
| GB | 1308318 | 6/1969 |
| GB | 2302850 A | 6/1996 |
| SE | 507046 | 3/1998 |
| WO | WO 93/10951 | 6/1993 |
| WO | WO 95/15594 | 6/1995 |
| WO | WO 97/2965 | 1/1997 |
| WO | WO 98/19875 A1 | 5/1998 |
| WO | WO 98/30961 | 7/1998 |
| WO | WO 00/69662 | 11/2000 |
| WO | WO 01/54939 A2 | 8/2001 |

OTHER PUBLICATIONS

"The One to Count on Through Hell and High Water"; 4–page (as photocopied) brochure; Product of Oshkosh Truck Corporation; (9/00).

"Palletized Load System (PLS)—PLS Potable Water Distributor Module"; 2–page (as photocopied) brochure; Product of Oshkosh Truck Corporation.

"Palletized Load System (PLS)—Concrete Mobile Mixer Module"; 2–page (as photocopied) brochure; Product of Oshkosh Truck Corporation.

"Oshkosh Trucks—75 Years of Specialty Truck Production"; Wright et al.; (pp. 119–126); Motorbooks International Publishers & Wholesalers (1992).

"MTVR Wrecker Variant (MK36 Wrecker Recovery Vehicle)"; 2–page (as photocopied) brochure; Product of Oshkosh Truck Corporation; (9/01).

"MTVR Dump Body Variant (Medium Tactical Vehicle Replacement)"; 2–page (as photocopied) brochure; Product of Oshkosh Truck Corporation; (9/01).

"Medium Tactical Vehicle Replacement"; 6–page (as photocopied) brochure; Product of Oshkosh Truck Corporation; (8/00).

"M1977 CBT (Common Bridge Transporter)"; 2–page (as photocopied) brochure; Product of Oshkosh Truck Corporation.

"M1070F Heavy Equipment Transporter & Trailer"; 8–page (as photocopied) brochure; Product of Oshkosh Truch Corporation; (9/01).

"LVS—Logistic Vehicle System (MK48 Series)"; 6–page document; Product of Oshkosh Truck Corporation.

"LHS Decontamination Mission Module"; 2–page (as photocopied) brochure; Product of Oshkosh Truck Corporation.

*Aircraft Internal Time Division Multiplex Data Bus*, MIL–STD–1553(USAF); 29 pgs.; (Aug. 30, 1973).

"HEMTT—Heavy Expanded Mobility Tactical Truck M977 Series Truck"; 12–page (as photocopied) brochure; Product of Oshkosh Truck Corporation; (3/00).

"Oshkosh Demonstrates ProPulse, the First Electric Hybrid—Drive Heavy Defense Truck," Oshkosh Truck Corp., Feb. 27, 2000 (2 pages).

"Oshkosh Showcases ProPulse Hybrid Electric System at Major Defense Exhibition," Oshkosh Truck Corp., Oct. 21, 2002 (1 page).

"Oshkosh Truck Rolls Out Next Generation of Command Zone Advanced Electronics System to Military Market," Oshkosh Truck Corp., Oct. 21, 2002 (2 pages).

"Oshkosh Truck's Robotic Truck Qualifies for Pentagon's $1 Million Desert Race," Oshkosh Truck Corp., Mar. 12, 2004 (2 pages).

"Oshkosh Truck and Ohio State University Design Robotic Vehicle to Compete in Desert Race," Oshkosh Truck Corp., Feb. 11, 2004 (2 pages).

"Oshkosh Truck Awarded Contract for U.S. Army Future Tactical Truck Concepts and Technology Evaluations," Oshkosh Truck Corp., Dec. 2, 2003 (2 pages).

"Oshkosh Receives Federal Government Funding to Develop ProPulse Alternative Drive System for Military Trucks," Oshkosh Truck Corp., Aug., 31, 2001 (2 pages).

"International Search Report," International Application No. PCT/US03/13177 entitled "Hybrid Vehicle with Combustion Engine/Electric Motor Drive," Date of mailing—May 12, 2003 (7 pages). Electric Vehicle.

"European Search Report," European Patent Application No. 02001052.6 entitled "A/C Bus Assembly for Electronic Traction Vehicle," Aug. 21, 2003 (5 pages). Electric.

Dana Coporation, Kallamazoo, Michigan, "Dana® Spicer® Central Tire Inflation System Specifications," www.dana.com, May 2000 (2 pages).Command Zone.

Form PCT/ISA/210; International Search Report for Application PCT/US 02/41368; May 15, 2003.

Khan, I.A., "Automotive Electrical Systems: Architecture and Components"; Digital Avionics Systems Conference, 1999; IEEE pp. 8.C.5–1–8.C.5–10.

Namuduri, C.S. et al.; "High Power Density Electric Drive for an Hybrid Electric Vehicle"; Applied Power Electronics Conference and Exposition, 1998. APEC '98. Conference Proceedings 1998, $13^{th}$ Annual; Anaheim, CA, Feb. 15–19, 1998; New York, New York, IEEE; Feb. 15, 1998, pp. 34–40; ISBN: 0–7803–4340–9/98.

Bose, B.K. et al.; "High Frequency AC vs. DC Distribution System for Next Generation Hybrid Electric Vehicle"; Industrial Electronics, Control and Instrumentation, 1996; Proceedings of the 1996 IEEE IECON $22^{nd}$ International Conference on Taipei, Taiwan; Aug. 5–10, 1996, New York, NY; pp. 706–712.

Rajashekara, K.; "History of Electric Vehicles in General Motors"; Industry Applications Society Annual Meeting, 1993; Conference Record of the 1993 IEEE Toronto, Ontario, Canada; Oct. 2–8, 1993; ISBN: 0–7803–1462–X; pp. 447–454.

* cited by examiner

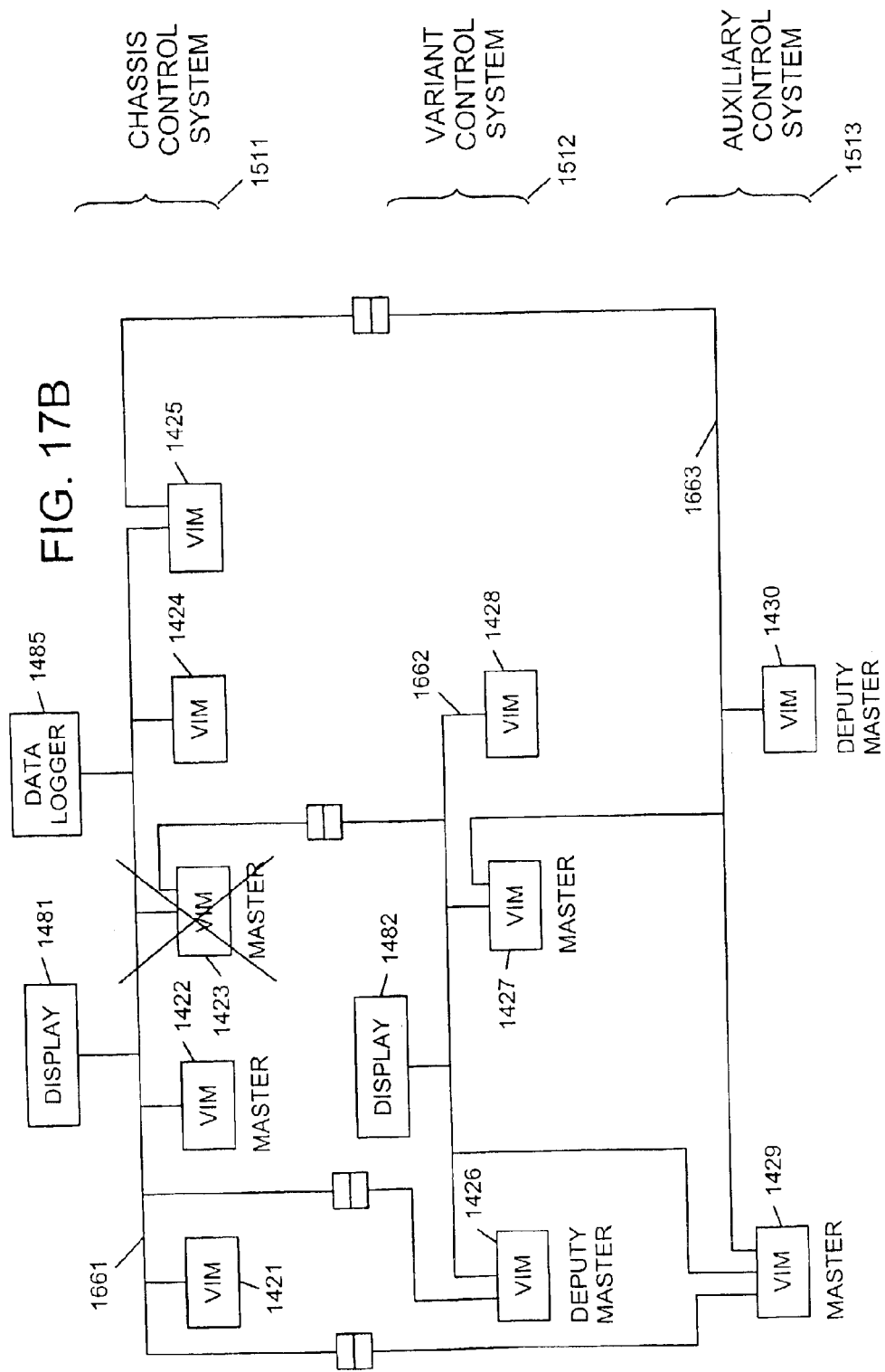

| STATE | INPUT #1 | INPUT #2 | OUTPUT #1 | OUTPUT #2 |
|---|---|---|---|---|
| 1 | OFF | OFF | OFF | OFF |
| 2 | OFF | ON | ON | ON |
| 3 | ON | OFF | OFF | OFF |
| 4 | ON | ON | OFF | OFF |
| 5 | OFF | ? | ON | OFF |
| 6 | ON | ? | OFF | OFF |
| 7 | ? | ON | OFF | OFF |
| 8 | ? | OFF | OFF | OFF |
| 9 | ? | ? | OFF | OFF |

FIG. 19

| 1520 | | | | | | | | |
|---|---|---|---|---|---|---|---|---|
| I-11 | I-12 | I-13 | I-14 | I-15 | IM-11 | O-11 | O-12 | O-13 |
| O-14 | O-15 | I-21 | I-22 | I-23 | I-24 | I-25 | IM-21 | IM-22 |
| O-21 | O-22 | O-23 | O-24 | O-25 | I-31 | I-32 | I-33 | I-34 |
| I-35 | O-31 | O-32 | O-33 | O34 | O-35 | I-41 | I-42 | I-43 |
| I-44 | I-45 | IM-41 | O41 | O-42 | O-43 | O-44 | O-45 | I-51 |
| I-52 | I-53 | I-54 | I-55 | O-51 | O-52 | O-53 | O-54 | O-55 |

FIG. 22

| RESOURCE MANAGER | | | | | |
|---|---|---|---|---|---|
| RESOURCE | TRUCK #1 | TRUCK #2 | TRUCK #3 | TRUCK #4 | FF #1 | FF #2 |
| FUEL | 1.2 HRS | 1.9 HRS | 1.8 HRS | 2.5 HRS | N/A | N/A |
| BATTERY | 1.6 HRS | 2.5 HRS | 2.6 HRS | 3.3 HRS | N/A | N/A |
| WATER | 0.9 HRS | 1.2 HRS | N/A | N/A | N/A | N/A |
| FOAM | 0.3 HRS | 0.2 HRS | 0.7 HR | 0.9 HRS | N/A | N/A |
| OXYGEN | 0.6 HRS | *0.2 HRS !!* | 0.8 HRS | 0.5 HRS | 0.5 | 0.4 |

FIG. 40

CONTROL SYSTEM AND METHOD FOR ELECTRIC VEHICLE

CROSS-REFERENCE TO RELATED APPLICATIONS

This application is a continuation-in-part of U.S. Ser. No. 09/927,946, filed Aug. 10, 2001, entitled "Military Vehicle Having Cooperative Control Network With Distributed I/O Interfacing," pending, which is a continuation-in-part of U.S. Ser. No. 09/384,393, filed Aug. 27, 1999, entitled "Military Vehicle Having Cooperative Control Network With Distributed I/O Interfacing," now U.S. Pat. No. 6,421,593, which is a continuation-in-part of U.S. Ser. No. 09/364,690, filed Jul. 30, 1999, entitled "Firefighting Vehicle Having Cooperative Control Network With Distributed I/O Interfacing," abandoned, each of which is hereby expressly incorporated by reference. This application is also a continuation-in-part of U.S. Ser. No. 09/500,506, filed Feb. 9, 2000, entitled "Equipment Service Vehicle Having On-Board Diagnostic System," allowed now U.S. Pat. No. 6,553,290, also expressly incorporated by reference. This application is also a continuation-in-part of U.S. Ser. No. 09/774,981, filed Jan. 31, 2001, entitled "A/C Bus Assembly For Electronic Traction Vehicle," pending, also expressly incorporated by reference. This application also claims priority to U.S. Prov. No. 60/342,292, filed Dec. 21, 2001, entitled "Vehicle Control and Monitoring System and Method," U.S. Prov. No. 60/360,479, filed Feb. 28, 2002, entitled "Turret Control System and Method for a Fire Fighting Vehicle," and U.S. Prov. No. 60/388,451, filed Jun. 13, 2002, entitled "Control System and Method for an Equipment Service Vehicle," each of which is also hereby expressly incorporated by reference.

BACKGROUND OF THE INVENTION

The present invention relates to electric vehicles. The present invention also relates to control systems and methods for electric vehicles.

An electronic traction vehicle is a vehicle that uses electricity in some form or another to provide all or part of the propulsion power of the vehicle. This electricity can come from a variety of sources, such as stored energy devices relying on chemical conversions (batteries), stored electrical charge devices (capacitors), stored energy devices relying on mechanical stored energy (e.g. flywheels, pressure accumulators), and energy conversion products. In a typical conventional electric traction vehicle, a prime mover, such as a diesel engine, is used to drive an electric generator or alternator which supplies electric current to one or more traction motors. The traction motors typically are coupled to wheel sets on the vehicle. A typical vehicle that utilizes this type of electric traction is a railroad locomotive. In some conventional electric traction vehicles, stored energy is used to provide the main power which provides the electrical current to one or a plurality of traction motors. A typical vehicle that utilizes this type of electric traction is a golf cart or battery powered electric car. In some conventional electric traction vehicles, having more than one sources of energy is desirable. By having more than one source of energy, some optimizations in the design can allow for more efficient power production, thus allowing power to be used from different sources to come up with a more efficient system for traction. These types of vehicles are commonly referred to as hybrid electric vehicles (HEV). Series and Parallel HEV system designs are what is usually encountered.

A master controller is often used to control the overall system and give command signals to the engine, generator/alternator, prime mover energy conversion (AC to DC) stored energy conversion, and/or traction level energy conversion (DC to AC). This controller architecture requires a highly integrated control strategy. It also provide a single point of failure for the traction system.

Thus, there is a need for an electric traction vehicle that is modular in design and control. There is also a need for electric traction vehicle that can be updated and upgraded as new technology and components become available without a required redesign of the overall vehicle system. There is also a need for improved control systems and methods for electric vehicles, and systems and methods for servicing, repairing and monitoring electric vehicles.

SUMMARY OF THE INVENTION

According to a first preferred embodiment, an electric traction vehicle comprises a vehicle platform, a communication network, a power source mounted on the vehicle platform, a plurality of drive wheels rotatably mounted on the vehicle platform, a plurality of electric motors coupled to respective ones of the plurality of drive wheels, and a plurality of microprocessor-based interface modules coupled to the plurality of electric motors. The interface modules are configured to control the plurality of electric motors and are coupled to each other by way of the communication network.

According to a second preferred embodiment, a vehicle comprises first and second drive wheels, a power source, a power transmission link, a plurality of input devices, a plurality of output devices, a communication network, and a plurality of microprocessor-based interface modules. The plurality of output devices include first and second motor drive systems which further include first and second electric motors. The first and second electric motors are respectively coupled to the first and second drive wheel and being capable of applying torque to the first and second drive wheels to drive motion of the vehicle. The plurality of interface modules are coupled to the power source by way of the power transmission link and are interconnected to each other by way of the communication network. Each of the plurality of interface modules is coupled to respective ones of the plurality of input devices and the plurality of output devices by way of respective dedicated communication links. The plurality of interface modules cooperate to control the plurality of output devices based on input status information from the plurality of input devices. At least one of the plurality of interface modules controls power distribution to the first and second motor drive systems to control a speed of the vehicle.

Other objects, features, and advantages of the present invention will become apparent to those skilled in the art from the following detailed description and accompanying drawings. It should be understood, however, that the detailed description and specific examples, while indicating preferred embodiments of the present invention, are given by way of illustration and not limitation. Many modifications and changes within the scope of the present invention may be made without departing from the spirit thereof, and the invention includes all such modifications.

BRIEF DESCRIPTION OF THE DRAWINGS

FIGS. 17A–17B are modified views of the block diagram of FIG. 16 showing the operation of the control system to reconfigure itself in a failure mode of operation;

FIG. 19 is truth table in which an output is controlled with an additional layer of failure management for inputs with undetermined states;

FIG. 22 is an I/O status table of FIG. 21 shown in greater detail;

FIG. 40 is a resource manager window generated using the system of FIG. 34;

DETAILED DESCRIPTION OF THE PREFERRED EMBODIMENTS patent application Ser. No. 09/384,393, filed Aug. 27, 1999, allowed, discloses various embodiments of a control system architecture in connection with fire trucks, military vehicles and other types of vehicles. A particularly advantageous use of the preferred control system architecture is in the context of electric traction vehicles and, as described below, the vehicles disclosed in these applications may be implemented as electric traction vehicles. For such uses, the control systems described in the above-mentioned applications may be used to control additional output devices associated with the electric traction vehicle such as electric motors used to drive motion of the vehicle, and to provide I/O status information which may be transmitted off-board the vehicle. For convenience, the contents of the above-mentioned application is repeated below, followed by a description of an electric traction vehicle embodiment and remote monitoring applications which in a preferred embodiment use a control system of a type disclosed in the above-mentioned applications.

A. Fire Truck Control System

1. Architecture of Preferred Fire Truck Control System

Figure 1:
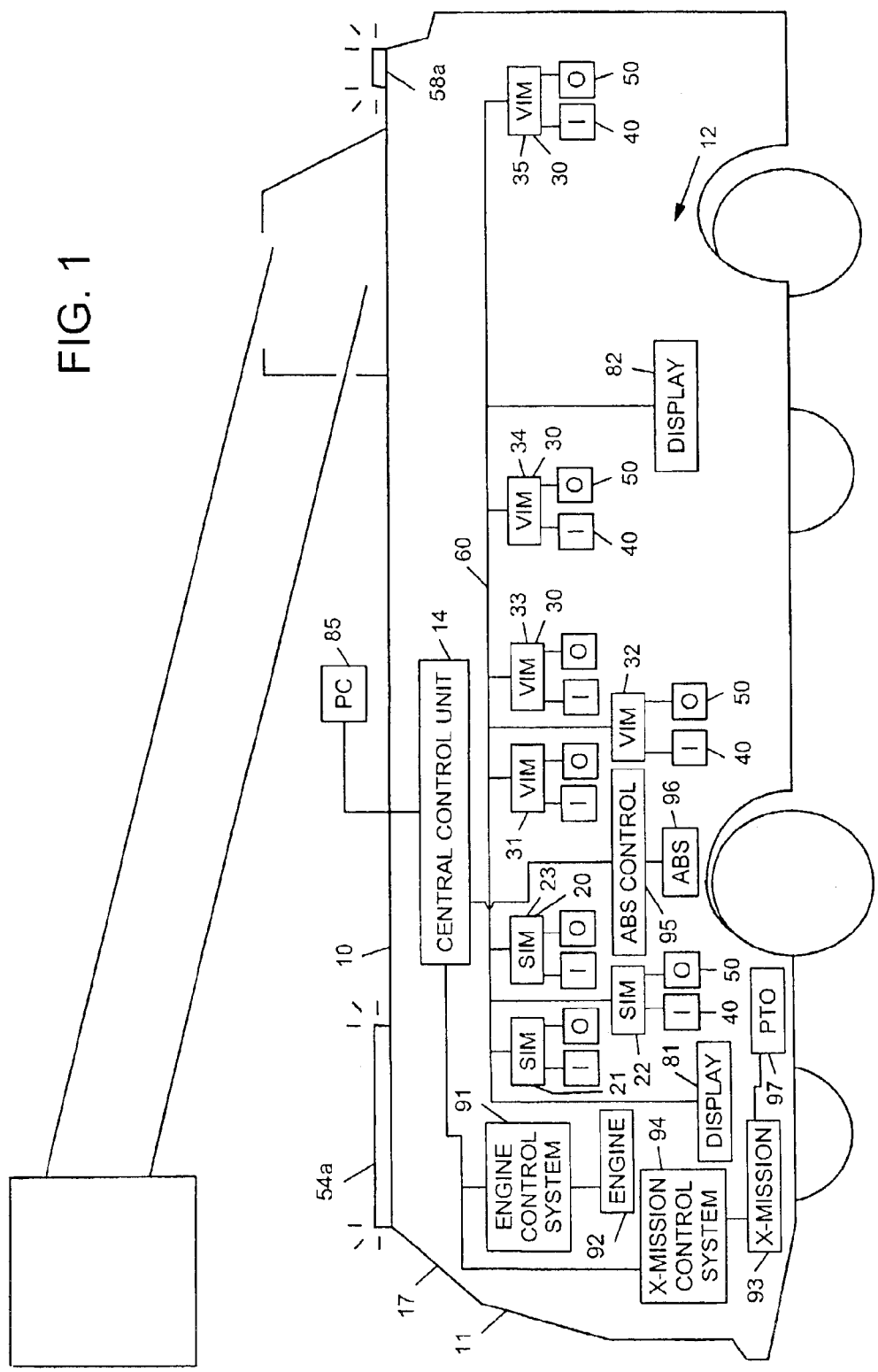
FIG. 1 is a schematic view of a fire truck having a control system according to one embodiment of the present invention.

Referring now to FIG. 1, a preferred embodiment of a fire truck 10 having a control system 12 is illustrated. By way of overview, the control system 12 comprises a central control unit 14, a plurality of microprocessor-based interface modules 20 and 30, a plurality of input devices 40 and a plurality of output devices 50. The central control unit 14 and the interface modules 20 and 30 are connected to each other by a communication network 60.

More specifically, the central control unit 14 is a microprocessor-based device and includes a microprocessor 15 that executes a control program 16 (see FIG. 2) stored in memory of the central control unit 14. The control program is shown and described in greater detail below in conjunction with the flowcharts of FIGS. 4, 5, 7, 8 and 10. In general, the control unit 14 executes the program to collect and store input status information from the input devices 40, and to control the output devices 50 based on the collected status information. The control program preferably implements an interlock system (e.g., FIG. 5), a load manager (e.g., FIGS. 7–8), and a load sequencer (e.g., FIGS. 10A–10B). As described below, the central control unit 14 is preferably not connected to the I/O devices 40 and 50 directly but rather only indirectly by way of the interface modules 20 and 30, thereby enabling distributed data collection and power distribution. The I/O devices 40 and 50 are located on a chassis 11 of the fire truck 10, which includes both the body and the underbody of the fire truck 10.

In the illustrated embodiment, two different types of interface modules are used. The interface modules 20 interface mainly with switches and low power indicators, such as LEDs that are integrally fabricated with a particular switch and that are used to provide visual feedback to an operator regarding the state of the particular switch. For this reason, the interface modules 20 are sometimes referred to herein as "SIMs" ("switch interface modules"). Herein, the reference numeral "20" is used to refer to the interface modules 20 collectively, whereas the reference numerals 21, 22 and 23 are used to refer to specific ones of the interface modules 20.

The interface modules 30 interface with the remaining I/O devices 40 and 50 on the vehicle that do not interface to the interface modules 20, and therefore are sometimes referred to herein as "VIMs" ("vehicle interface modules"). The interface modules 30 are distinguishable from the interface modules 20 mainly in that the interface modules 30 are capable of handling both analog and digital inputs and outputs, and in that they are capable of providing more output power to drive devices such as gauges, valves, solenoids, vehicle lighting and so on. The analog outputs may be true analog outputs or they may be pulse width modulation outputs that are used to emulate analog outputs. Herein, the reference numeral "30" is used to refer to the interface modules 30 collectively, whereas the reference numerals 31, 32, 33, 34 and 35 are used to refer to specific ones of the interface modules 30.

Although two different types of interface modules are used in the illustrated embodiment, depending on the application, it may be desirable to use only a single type of interface module in order to reduce inventory requirements. Additionally, while in FIG. 1 three of the interface modules 20 and five of the interface modules 30 are shown, this arrangement is again simply one example. It may be desirable to provide each interface module with more I/O points in order to reduce the number of interface modules that are required, or to use more interface modules with a smaller number of I/O points in order to make the control system 12 more highly distributed. Of course, the number of interface modules will also be affected by the total number of I/O points in the control system.

FIG. 1 shows an approximate distribution of the interface modules 20 and 30 throughout the fire truck 10. In general, in order to minimize wiring, the interface modules 20 and 30 are placed so as to be located as closely as possible to the input devices 40 from which input status information is received and the output devices 50 that are controlled. As shown in FIG. 1, there is a large concentration of interface modules 20 and 30 near the front of the fire truck 10, with an additional interface module 34 at mid-length of the fire truck 10 and another interface module 35 at the rear of the fire truck 10. The large concentration of interface modules 20 and 30 at the front of the fire truck 10 is caused by the large number of switches (including those with integral LED feedback output devices) located in a cab of the fire truck 10, as well as the large number of other output devices (gauges, lighting) which tend to be located in the cab or otherwise near the front of the fire truck 10. The interface module 34 that is located in the middle of the truck is used in connection with I/O devices 40 and 50 that are located at the fire truck pump panel (i.e., the operator panel that has I/O devices for operator control of the fire truck's pump system). The interface module 35 that is located at the rear of the fire truck 10 is used in connection with lighting and other equipment at the rear of the fire truck 10.

Figure 2:
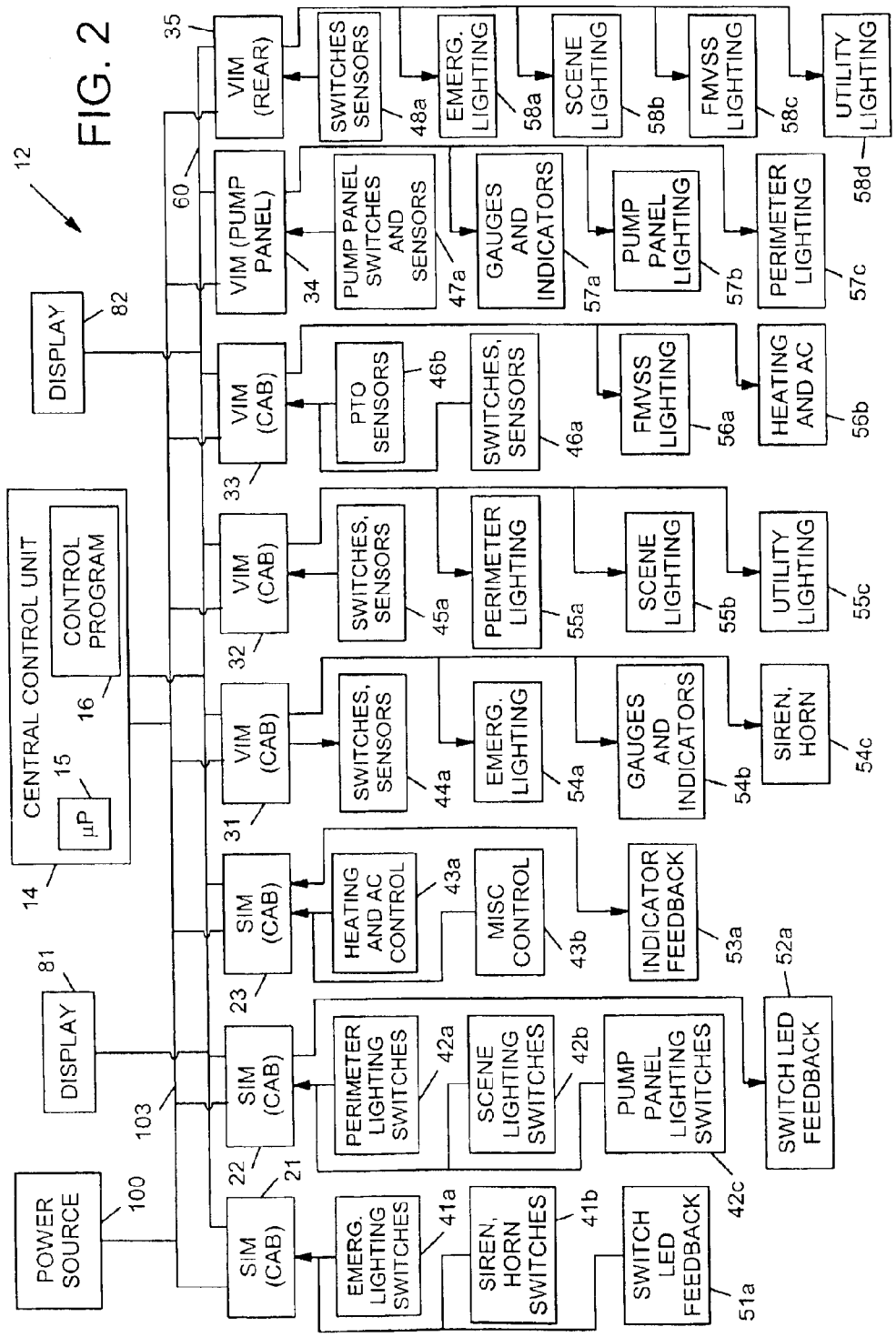
FIG. 2 is a block diagram of the control system of FIG. 1 showing selected aspects of the control system in greater detail.

The advantage of distributing the interface modules 20 and 30 in this manner can be more fully appreciated with reference to FIG. 2, which shows the interconnection of the interface modules 20 and 30. As shown in FIG. 2, the interface modules 20 and 30 receive power from a power source 100 by way of a power transmission link 103. The power transmission link 103 may comprise for example a single power line that is routed throughout the fire truck 10 to each of the interface modules 20 and 30. The interface modules then distribute the power to the output devices 50, which are more specifically designated with the reference numbers 51a, 52a, 53a, 54a–c, 55a–c, 56a–b, 57a–c and 58a–d in FIG. 2.

It is therefore seen from FIGS. 1 and 2 that the relative distribution of the interface modules 20 and 30 throughout the fire truck 10 in combination with the arrangement of the power transmission link 103 allows the amount of wiring on the fire truck 10 to be dramatically reduced. The power source 100 delivers power to the interface modules 20 and 30, which act among other things as power distribution centers, and not directly to the output devices 50. Because the interface modules 20 and 30 are located so closely to the I/O devices 40 and 50, most of the I/O devices can be connected to the interface modules 20 and 30 using only a few feet of wire or less. This eliminates the need for a wire harness that extends the length of the fire truck (about forty feet) to establish connections for each I/O devices 40 and 50 individually.

Continuing to refer to FIG. 2, the switch interface modules 20 and the interconnection of the interface modules 20 with various I/O devices will now be described in greater detail. The interface modules 20 are microprocessor-based, as previously noted, and include a microprocessor that executes a program to enable communication over the communication network 60, as detailed below.

The same or a different microprocessor of the interface modules 20 may also be used to process input signals received from the input devices 40. In particular, the interface modules 20 preferably perform debounce filtering of the switch inputs, so as to require that the position of the switch become mechanically stable before a switch transition is reported to the central control unit 14. For example, a delay of fifty milliseconds may be required before a switch transition is reported. Performing this filtering at the interface modules 20 reduces the amount of processing that is required by the central control unit 14 to interpret switch inputs, and also reduces the amount of communication that is required over the communication network 60 because each switch transition need not be reported.

Physically, the interface modules 20 may be placed near the headliner of a cab 17 of the fire truck 10. Traditionally, it is common practice to locate panels of switches along the headliner of the cab for easy access by an operator of the fire truck. Additionally, as detailed below, in the preferred embodiment, the interface modules 20 are connected to switches that have integrally fabricated LEDs for indicating the state of the output device controlled by the switch to provide maximum operator feedback. These LEDs are output devices which are connected to the interface modules 20. Therefore, by locating the interface modules near the headliner of the cab, the amount of wiring required to connect the interface modules 20 not only to the switches and but also to the LED indicators is reduced.

In the preferred embodiment, the interface modules 20 have between ten and twenty-five each of inputs and outputs and, more preferably, have sixteen digital (on/off switch) inputs and sixteen LED outputs. Most of these inputs and outputs are utilized in connection with switches having integrally fabricated LEDs. However, it should be noted that there need not be a one-to-one correspondence between the switches and the LEDs, and that the inputs and the outputs of the interface modules 20 need not be in matched pairs. For example, some inputs may be digital sensors (without a corresponding output device) and some of the outputs may be ordinary digital indicators (without a corresponding input device). Additionally, the LED indicators associated with the switch inputs for the interface module 21 could just as easily be driven by the interface module 23 as by the interface module 21, although this arrangement is not preferred. Of course, it is not necessary that all of the inputs and outputs on a given interface module 20 be utilized and, in fact, it is likely that some will remain unutilized.

One way of establishing a dedicated link between the I/O devices 40 and 50 and the interface modules 20 is through the use of a simple hardwired link. Considering for example an input device which is a switch, one terminal of the switch may be connected (e.g., by way of a harness connector) to an input terminal of the interface module 20 and the other terminal of the switch may be tied high (bus voltage) or low (ground). Likewise, for an output device which is an LED, one terminal of the LED may be connected to an output terminal of the interface module 20 and the other terminal of the LED may again be tied high or low. Other dedicated links, such as RF links, could also be used.

To provide maximum operator feedback, the LEDs that are located with the switches have three states, namely, off, on, and blinking. The off state indicates that the switch is off and therefore that the device controlled by the switch is off. Conversely, the on state indicates that the switch is on and that the device controlled by the switch is on. The blinking state indicates that the control system 12 recognizes that a switch is on, but that the device which the switch controls is nevertheless off for some other reason (e.g., due to the failure of an interlock condition, or due to the operation of the load manager or load sequencer). Notably, the blinking LED feedback is made possible by the fact that the LEDs are controlled by the control unit 14 and not directly by the switches themselves, since the switches themselves do not necessarily know the output state of the devices they control.

A specific example will now be given of a preferred interconnection of the interface modules 21, 22, and 23 with a plurality of I/O devices 40 and 50. Many or all of the I/O devices 40 and 50 could be the same as those that have previously been used on fire trucks. Additionally, it should be noted that the example given below is just one example, and that a virtually unlimited number of configurations are possible. This is especially true since fire trucks tend to be sold one or two at a time and therefore each fire truck that is sold tends to be unique at least in some respects.

In FIG. 2, the interface module 21 receives inputs from switches 41a that control the emergency lighting system of the fire truck. As previously noted, the emergency lighting system includes the flashing emergency lights (usually red and white) that are commonly associated with fire trucks and that are used to alert other motorists to the presence of the fire truck on the roadway or at the scene of a fire. One of the switches 41a may be an emergency master on/off (E-master) switch used to initiate load sequencing, as described in greater detail below. The interface module 21 may also be connected, for example, to switches 41b that control the emergency siren and horn. The interface module 21 is also connected to LEDs 51a that are integrally located in the switches 41a and 41b and that provide operator feedback regarding the positions of the switches 41a and 41b, as previously described.

The interface module 22 receives inputs from switches 42a that control lighting around the perimeter of the fire truck 10, switches 42b that control scene lighting, and switches 42c that control lighting which aids the operators in viewing gauges and other settings at the pump panel. The interface module 22 is also connected to LEDs 52a that are integrally located in the switches 42a, 42b and 42c and that provide operator feedback regarding the positions of the switches 42a, 42b and 42c.

The interface module 23 receives inputs from switches 43a that control heating and air conditioning, and switches 43b that controls miscellaneous other electrical devices. The interface module 23 is connected to LED indicators, some of which may be integrally located with the switches 43a and 43b and others of which may simply be an LED indicator that is mounted on the dashboard or elsewhere in the cab of the fire truck 10.

Continuing to refer to FIG. 2, the vehicle interface modules 30 and the interconnection of the interface modules 20 with various I/O devices will now be described in greater detail. As previously mentioned, the interface modules 30 are distinguishable from the interface modules 20 mainly in that the interface modules 30 are capable of handling both analog and digital inputs and outputs, and in that they are capable of providing more output power to drive output devices such as digitally-driven gauges, solenoids, and so on. The interface modules 30 preferably have between fifteen and twenty-five each inputs and outputs and, more preferably, have twenty inputs (including six digital inputs, two frequency counter inputs, and six analog inputs) and twenty outputs (including six outputs that are configurable as analog outputs).

Like the interface modules 20, the interface modules 30 are microprocessor-based and include a microprocessor that executes a program to enable communication over the communication network 60. The same or a different microprocessor of the interface modules 30 may also be used to process input signals received from the input devices 40 and to process output signals transmitted to the output devices 50.

For the interface modules 30, this processing includes not only debounce filtering, in the case of switch inputs, but also a variety of other types of processing. For example, for analog inputs, this processing includes any processing that is required to interpret the inputs from analog-to-digital (A/D) converters, including converting units. For frequency inputs, this processing includes any processing that is required to interpret inputs from frequency-to-digital converters, including converting units. This processing also includes other simple filtering operations. For example, in connection with one analog input, this processing may include notifying the central control unit 14 of the status of an input device only every second or so. In connection with another analog input, this processing may include advising the central control unit 14 only when the status of the input device changes by a predetermined amount. For analog output devices, this processing includes any processing that is required to interpret the outputs for digital-to-analog (D/A) converters, including converting units. For digital output devices that blink or flash, this processing includes implementing the blinking or flashing (i.e., turning the output device on and off at a predetermined frequency) based on an instruction from the central control unit 14 that the output device should blink or flash. In general, the processing by the interface modules 30 reduces the amount of information which must be communicated over the communication link, and also reduces the amount of time that the central control unit 14 must spend processing minor changes in analog input status.

Preferably, the configuration information required to implement the I/O processing that has just been described is downloaded from the central control unit 14 to each interface module 30 (and each interface module 20) at power-up. Additionally, the harness connector that connects to each of the interface modules 20 and 30 are preferably electronically keyed, such that being connected to a particular harness connector provides the interface modules 20 and 30 with a unique identification code (for example, by tying various connector pins high and low to implement a binary code). The advantage of this approach is that the interface modules 20 and 30 become interchangeable devices that are customized only at power-up. As a result, if one of the interface modules 30 malfunctions, for example, a new interface module 30 can be plugged into the control system 12, customized automatically at power-up (without user involvement), and the control system 12 then becomes fully operational. This enhances the maintainability of the control system 12.

A specific example will now be given of a preferred interconnection of the interface modules 31, 32, and 33 with a plurality of I/O devices 40 and 50. This example continues the example that was started in connection with the interface modules 21, 22, and 23. Again, it should be noted that the configuration described herein is just one example.

The interface modules 31, 32, 33, 34 and 35 all receive inputs from additional switches and sensors 44a, 45a, 46a, 47a and 48a. The switches may be additional switches that are located in the cab of the fire truck or elsewhere throughout the vehicle, depending on the location of the interface module. The sensors may be selected ones of a variety of sensors that are located throughout the fire truck. The sensors may be used to sense the mechanical status of devices on the fire truck, for example, whether particular devices are engaged or disengaged, whether particular devices are deployed, whether particular doors on the fire truck are open or closed, and so on. The sensors may also be used to sense fluid levels such as fuel level, transmission fluid level, coolant level, foam pressure, oil level, and so on.

In addition to the switches and sensors 44a, the interface module 31 is also connected to a portion 54a of the emergency lighting system. The emergency lighting system includes emergency lights (usually red and white) at the front, side and rear of the fire truck 10. The emergency lights may, for example, be in accordance with the guidelines provided by the National Fire Protection Association. Because the interface module 31 is located at the front of the fire truck, the interface module 31 is connected to the red and white emergency lights at the front of the fire truck.

The interface module 31 is also connected to gauges and indicators 54b which are located on the dashboard of the fire truck 10. The gauges may indicate fluid levels such as fuel level, transmission fluid level, coolant level, foam pressure, oil level and so on. The indicators may include, for example, indicators that are used to display danger, warning and caution messages, warning lights, and indicators that indicate the status of various mechanical and electrical systems on the fire truck. The interface module 31 may also be connected, for example, to an emergency sound system including an emergency siren and emergency air horns 54c, which are used in combination with the emergency lights 54a.

In addition to the switches and sensors 45a, the interface module 32 is also connected to perimeter lighting 55a, scene lighting 55b and utility lighting 55c. The perimeter lighting 55a illuminates the perimeter of the fire truck 10. The scene lighting 55b includes bright flood lights and/or spot lights to illuminate the work area at a fire. The utility lighting 55c includes lighting used to light operator panels, compartments and so on of the fire truck 10.

In addition to the switches and sensors 46a, the interface module 33 is also connected to PTO sensors 46b. The PTO sensors 46b monitor the status of a power take-off mechanism 97 (see FIG. 1), which diverts mechanical power from the engine/transmission from the wheels to other mechanical subsystems, such as the pump system, an aerial system and so on. The interface module 33 is also connected to a portion 56a of the FMVSS (Federal Motor Vehicle Safety Standard) lighting. The FMVSS lighting system includes the usual types of lighting systems that are commonly found on most types of vehicles, for example, head lights, tail lights, brake lights, directional lights (including left and right directionals), hazard lights, and so on. The interface module 33 is also connected to the heating and air conditioning 56b.

In addition to the switches and sensors 47a, the interface module 34, which is disposed near the pump panel, is connected to pump panel switches and sensors 47a, pump panel gauges and indicators 57a, pump panel lighting 57b, and perimeter lighting 57c. The pump system may be manually controlled or may be automatically controlled through the use of electronically controlled valves. In either case, the various fluid pressures are measured by sensors and displayed on the gauges and indicators 57a.

Finally, in addition to the switches and sensors 48a, the interface module 35 is also connected to emergency lighting 58a, scene lighting 58b, FMVSS lighting 58c, and the utility lighting 58d. These lighting systems have been described above.

The interface modules 20 and the interface modules 30 are connected to the central control unit 14 by the communication network 60. The communication network may be implemented using a network protocol, for example, which is in compliance with the Society of Automotive Engineers (SAE) J1708/1587 and/or J1939 standards. The particular network protocol that is utilized is not critical, although all of the devices on the network should be able to communicate effectively and reliably.

The transmission medium may be implemented using copper or fiber optic cable. Fiber optic cable is particularly advantageous in connection with fire trucks because fiber optic cable is substantially immune to electromagnetic interference, for example, from communication antennae on mobile news vehicles, which are common at the scenes of fires. Additionally, fiber optic cable is advantageous because it reduces RF emissions and the possibility of short circuits as compared to copper-based networks. Finally, fiber optic cable is advantageous because it reduces the possibility of electrocution as compared to copper in the event that the cable accidentally comes into contact with power lines at the scene of a fire.

Also connected to the communication network 60 are a plurality of displays 81 and 82. The displays 81 and 82 permit any of the data collected by the central control unit 14 to be displayed to the firefighters in real time. In practice, the data displayed by the displays 81 and 82 may be displayed in the form of text messages and may be organized into screens of data (given that there is too much data to display at one time) and the displays 81 and 82 may include membrane pushbuttons that allow the firefighters to scroll through, page through, or otherwise view the screens of data that are available. Additionally, although the displays 81 and 82 are both capable of displaying any of the information collected by the central control unit 14, in practice, the displays 81 and 82 are likely to be used only to display selected categories of information. For example, assuming the display 81 is located in the cab and the display 82 is located at the pump panel, the display 81 is likely to be used to display information that pertains to devices which are controlled from within the cab, whereas the display 82 is likely to be used to display information pertaining to the operation of the pump panel. Advantageously, the displays 81 and 82 give firefighters instant access to fire truck information at a single location, which facilitates both normal operations of the fire truck as well as troubleshooting if problems arise.

Also shown in FIG. 2 is a personal computer 85 which is connected to the control unit 14 by way of a communication link 86, which may be a modem link, an RS-232 link, an Internet link, and so on. The personal computer 85 allows diagnostic software to be utilized for remote or local troubleshooting of the control system 12, for example, through direct examination of inputs, direct control of outputs, and viewing and controlling internal states, including interlock states. Because all I/O status information is stored in the central control unit 14, this information can be easily accessed and manipulated by the personal computer 85. If a problem is encountered, the personal computer can be used to determine whether the central control unit 14 considers all of the interface modules 20 and 30 to be "on-line" and, if not, the operator can check for bad connections and so on. If a particular output device is not working properly, the personal computer 85 can be used to trace the I/O status information from the switch or other input device through to the malfunctioning output device. For example, the personal computer 85 can be used to determine whether the switch state is being read properly, whether all interlock conditions are met, and so on.

The personal computer 85 also allows new firmware to be downloaded to the control unit 14 remotely (e.g., from a different city or state or other remote location by way of the Internet or a telephone link) by way of the communication link 86. The firmware can be firmware for the control unit 14, or it can be firmware for the interface modules 20 and 30 that is downloaded to the control unit 14 and then transmitted to the interface modules 20 and 30 by way of the communication network 60.

Finally, referring back to FIG. 1, several additional systems are shown which will now be briefly described before proceeding to a discussion of the operation of the control system 12. In particular, FIG. 1 shows an engine system including an engine 92 and an engine control system 91, a transmission system including a transmission 93 and a transmission control system 94, and an anti-lock brake system including an anti-lock brake control system 95 and anti-lock brakes 96. The transmission 93 is mechanically coupled to the engine 92, and is itself further mechanically coupled to a PTO system 97. The PTO system 97 allows mechanical power from the engine to be diverted to water pumps, aerial drive mechanisms, stabilizer drive mechanisms, and so on. In combination, the engine system, the transmission system and the PTO system form the power train of the fire truck 10.

The control systems 92, 94 and 95 may be connected to the central control unit 14 using the same or a different communication network than is used by the interface modules 30 and 40. In practice, the control systems 92, 94 and 95 are likely to be purchased as off-the-shelf systems, since most fire truck manufacturers purchase rather than manufacture engine systems, transmission systems and anti-lock brake systems. As a result, it is likely that the control systems 92, 94 and 95 will use a variety of different communication protocols and therefore that at least one additional communication network will be required.

By connecting the systems 92, 94 and 95 to the central control unit 14, an array of additional input status information becomes available to the control system 12. For example, for the engine, this allows the central control unit 14 to obtain I/O status information pertaining to engine speed, engine hours, oil temperature, oil pressure, oil level, coolant level, fuel level, and so on. For the transmission, this allows the central control unit 14 to obtain, for example, information pertaining transmission temperature, transmission fluid level and/or transmission state (1st gear, 2nd gear, and so on). Assuming that an off-the-shelf engine or transmission system is used, the information that is available depends on the manufacturer of the system and the information that they have chosen to make available.

Connecting the systems 92, 94 and 95 to the central control unit 14 is advantageous because it allows information from these subsystems to be displayed to firefighters using the displays 81 and 82. This also allows the central control unit 14 to implement various interlock conditions as a function of the state of the transmission, engine or brake systems. For example, in order to turn on the pump system (which is mechanically driven by the engine and the transmission), an interlock condition may be implemented that requires that the transmission be in neutral or 4th lockup (i.e., fourth gear with the torque converter locked up), so that the pump can only be engaged when the wheels are disengaged from the power train. The status information from these systems can therefore be treated in the same manner as I/O status information from any other discrete I/O device on the fire truck 10. It may also be desirable to provide the central control unit 14 with a limited degree of control over the engine and transmission systems, for example, enabling the central control unit 14 to issue throttle command requests to the engine control system 91. This allows the central control unit to control the speed of the engine and therefore the voltage developed across the alternator that forms part of the power source 100.

2. Manner of Operation of Preferred Fire Truck Control System

The operation of the control system 12 will now be described in greater detail, including the manner in which interlock control, load management, and load sequencing are implemented by the control system 12.

a. Operation Overview and Interlock Control

Figure 3:
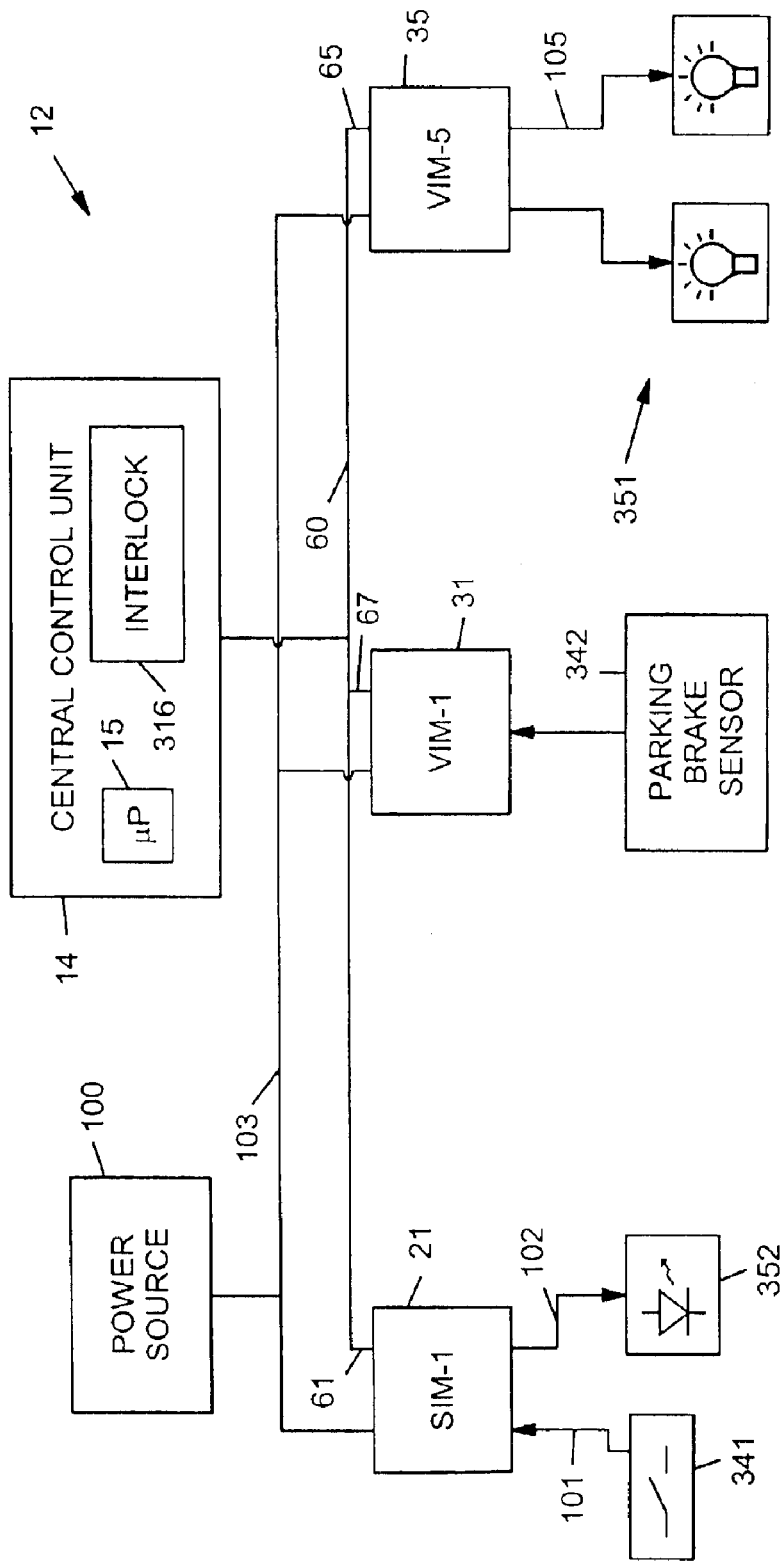
FIG. 3 is a simplified block diagram of the control system of FIGS. 1–2.
Figure 4:
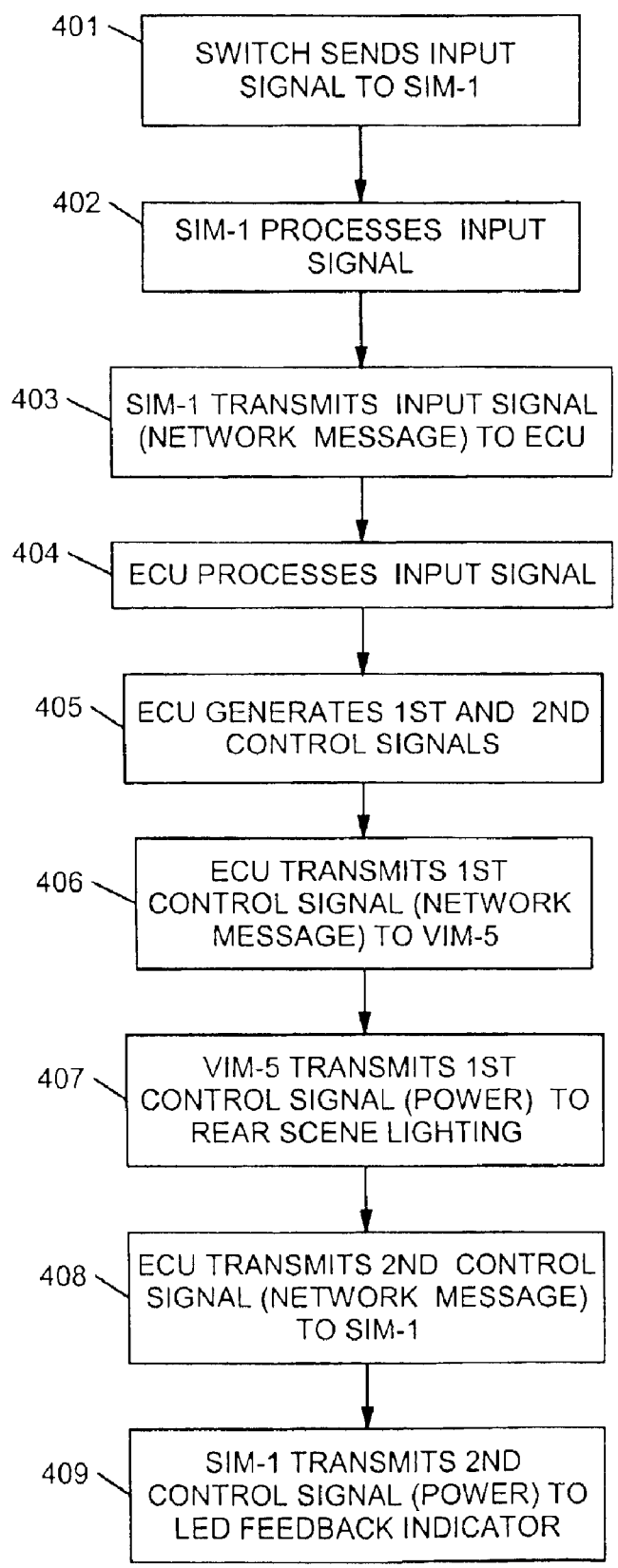
FIG. 4 is a flowchart showing the operation of the control system of FIG. 3 to turn on an output device in response to an operator input.
Figure 5:
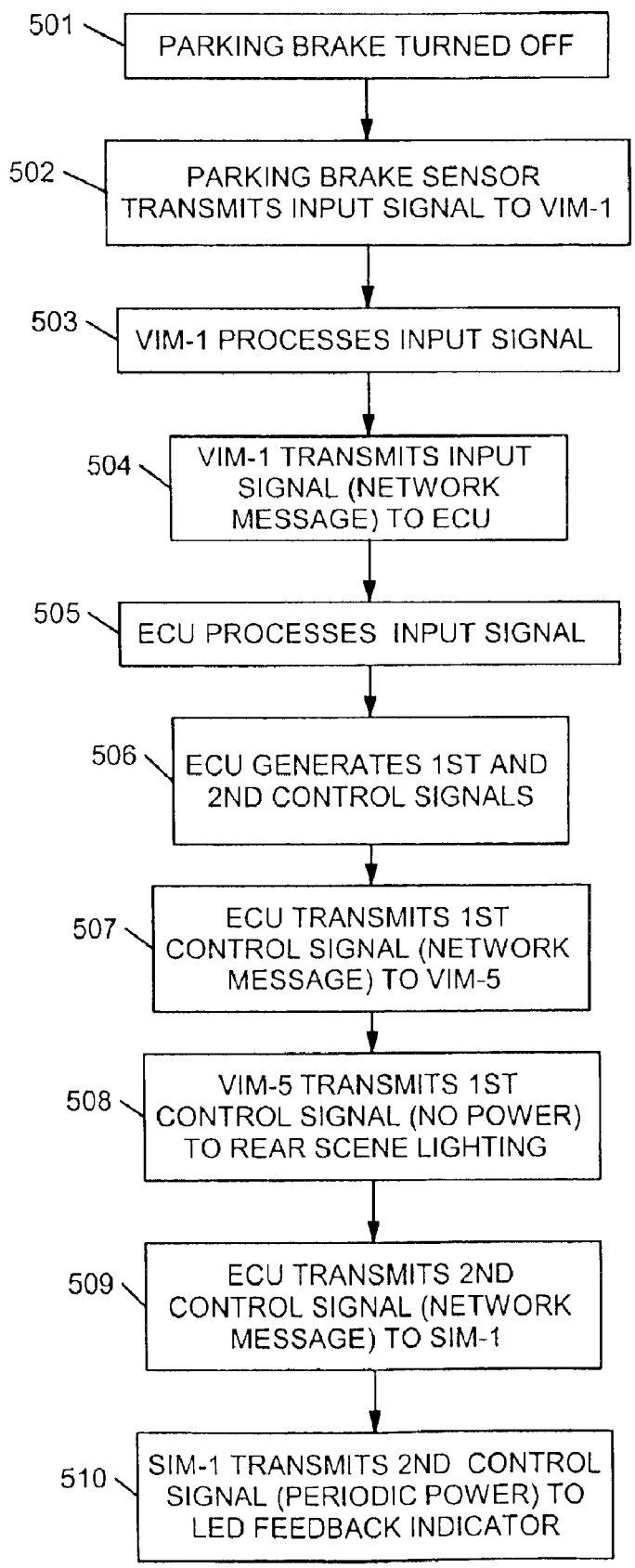
FIG. 5 is a flowchart showing the operation of the control system of FIG. 3 to turn off an output device in response to the failure of an interlock condition.

Referring now to FIGS. 3–5, a first example of the operation of the control system 12 is given. FIG. 3 is a block diagram of the control system 12, which has been simplified to the extent that some of the structure shown in FIGS. 1–2 is not shown in FIG. 3. Additionally, FIG. 3 shows in greater detail a switch 341 (which is one of the switches 41a in FIG. 2), rear scene lights 351 (which are part of the rear scene lighting 58b in FIG. 2), and an LED indicator 352 (which is one of the switch LED feedback indicators 51a in FIG. 2). The rear scene lights 351 are considered a single output device since they are both connected to one output of the interface module 35, even though there are in fact two lights. Finally, the central control unit 14 is also shown to include an interlock system 316, which is implemented in the control program 16 executed by the microprocessor 15.

FIG. 4 is a flowchart showing the operation of the control system 12 to activate the rear scene lights 351 in response to an input signal received from the switch 341. One of the advantages of the control system 12 is that input signals from the input devices 40 are processed by the control unit 14 and do not directly control the output devices 50. Switches represent user input commands but do not close the electrical circuit between the power source 100 and the output device controlled by the switch. As will be described below, this simplifies control system wiring and makes possible more flexible control of output devices.

In order to highlight this aspect of the control system 12, it will be assumed that the switch 341 is a soft toggle switch. Thus, the switch 341 is physically a momentary switch, i.e., a switch that closes when pressed but, when pressure is removed, automatically returns to an open position. The control system 12 makes the switch 341 emulate a latched switch, i.e., a switch that remains closed when pressed and returns to an open position only when pressed again.

First, in step 401, the switch 341 transmits an input signal to the interface module 21. The input signal is transmitted to the interface module 21 as a result of a change in the status of the switch, for example, when an operator presses the switch. The input signal from the switch 341 is transmitted to the interface module 21 by way of a hardwired communication link 101 which may, for example, comprise a wire that connects a terminal of the switch 341 to an input terminal of the interface module 21 (with the other terminal of the switch 341 being tied high or low). Other types of dedicated links may also be used.

At step 402, the interface module 21 processes the input signal. For the switch 341, the interface module performs debounce filtering, for example, by waiting until the mechanical position of the switch stabilizes (e.g., fifty milliseconds) before the transmitting the input signal to the control unit 14.

At step 403, the interface module 21 transmits the input signal in the form of a network message to the control unit 14 ("ECU" in FIG. 4). The network message is sent by way of the communication network 60 and, in particular, by way of a network communication link 61 that links the interface module 21 to the control unit 14.

At step 404, the control unit 14 processes the input signal. As previously noted, the switch 341 is physically a momentary switch (i.e., a switch that closes when pressed but, when pressure is removed, automatically returns to an open position) but is made to emulate a latched switch (i.e., a switch that remains closed when pressed and returns to an open position only when pressed again). Accordingly, to process the input signal, the control unit 14 first determines that the switch 341 has experienced an off→on transition (i.e., because the switch 341 was previously off but is now on), and then determines that the present state of the rear scene lights 351 are off. Accordingly, at step 405, the control unit 14 generates a first control signal to turn on the rear scene lights 351, as well as a second control signal to turn on LED indicator 352.

At step 406, the control unit 14 transmits the first control signal in the form of a second network message to the interface module 35. The network message is sent by way of the communication network 60 and, in particular, by way of a network communication link 65 that links the central control unit 14 to the interface module 35. In practice, the network communication link 65 may utilize some or all of the same physical media utilized by the network communication link 61, depending on the network architecture that is utilized. In the illustrated embodiment a bus architecture is utilized, but it should be understood of course that other types of network architectures (such as ring or star architectures) may also be utilized.

At step 407, the interface module 35 transmits the first control signal to the rear scene lights 351. The control signal is transmitted in the form of a power control signal on a hardwired communication link 105. The hardwired communication link 105 may, for example, comprise a wire that connects a terminal of the switch 341 to an input terminal of the interface module 21. The power control signal from the interface module 35 has two states, namely, an "on" state in which power is provided to the lighting system 351 and an "off" in which power is not provided to the lighting system 351.

At step 408, the control unit 14 transmits the second control signal to the interface module 21 by way of the network communication link 61 in the form of a third network message. At step 409, the interface module 21 transmits the second control signal to the LED indicator 352 in the form of a power control signal on a hardwired communication link 102. As previously noted, the LED indicator 352 is located integrally with the switch 341 (e.g., at the tip of the lever of the switch 341, in a manner such that the LED is clearly associated with the switch 341). Therefore, when the second control signal is transmitted to the LED indicator 352, thereby turning on the LED indicator 352, the LED indicator provides feedback to the operator regarding the status of the rear scene lights 351. In the present situation, the on state of the LED indicator 352 indicates that the rear scene lights 351 are on.

When the switch 341 is released, another input signal (not shown) is sent to the interface module 21 which indicates that the input state of the switch has changed from on to off. The control unit 14 recognizes the on→off transition, but ignores the transition pursuant to making the switch 341 emulate a latched switch.

It may be noted therefore that the switch 341 does not complete the electrical power circuit for the rear scene lights 351. When the switch 341 is released, the switch 341 opens but this change does not cause any change in the output status of the scene lights 351. The opportunity for the central control unit 14 to process the input signal from the switch 341 (as well as other input devices) makes the control system 12 more flexible and robust while at the same time reducing wiring and therefore reducing the number of failure points.

For example, a feature that is easily implemented in the control system 12 is two-way or, more generally, N-way switching. To implement N-way switching, it is only necessary to define N switches as inputs that control a given lighting system, and to program the control unit 14 to toggle the state of the lighting system every time the latched state of one of the N switches changes. A complicated and wiring-intensive N-way switching circuit is not required because the control logic required to implement N-way switching is not hardwired but rather is programmed into the control unit 14. Another feature that is easily implemented is progressive switching, in which the control unit 14 responds differently each time a given switch is pressed.

In addition to the advantages that are achieved due to the processing of the inputs, additional advantages are achieved in connection with processing the outputs. Thus, another advantage of the control system 12 is that the outputs are capable of multiple modes of operation, without any additional hardware, depending on the mode of operation of the vehicle. Thus, the same output device can have a digital mode of operation, an analog mode of operation, and a flashing mode of operation. For example, the same set of lights can be made to operate as high beam headlights at night (digital), as day-time running lights during the day (analog), and as flashing white lights in an emergency situation. (This is especially true if analog outputs are implemented using pulse width modulation to emulate a true analog-type output.) Because specialized hardware for each mode of operation is not required, it is much easier to provide any given output device with the ability to operate in different modes.

Another advantage with respect to the processing of outputs is that the central control unit 14 has the ability to synchronize or desynchronize different output devices. For example, in connection with the flashing emergency lights, it is possible to more precisely control the emergency lights and to have different lights flashing with exactly the same frequency but at a different phase. This prevents multiple sets of lights from undesirably turning on at the same time. For fire trucks with circuit breakers, this situation is undesirable because it can cause the current draw of the multiple sets of lights to trip a circuit breaker, thereby rendering the flashing emergency lights inoperative altogether.

Referring now to FIG. 5, the operation of the control system 12 to disengage the rear scene lights 351 in response to a changed interlock condition is illustrated. Federal Motor Vehicle Safety Standard (FMVSS) regulations prohibit the use of white lights on the back of a vehicle when the vehicle is moving forward. This regulation prevents other drivers from confusing the vehicle with oncoming traffic. Therefore, if a fire truck at the scene of a fire has white rear scene lights turned on and a firefighter decides to move the fire truck, the firefighter must first remember to turn off the white rear scene lights. FIG. 5 illustrates the operation of the control system to implement an interlock system 316 that eliminates the need for the firefighter to have to remember to turn off the rear scene lights in this situation.

To implement this type of control, a sensor 342 that monitors the status of the parking brake is utilized. The control rules governing the interlock condition for this example are then as follows. The rear scene lights 351 should disengage when the parking brake is disengaged. However, the rear scene lights are allowed to be on when the parking brake is off. Therefore, the rear scene lights are turned off only when there is an on→off transition of the parking brake and, otherwise, the rear scene lights are allowed to be on.

Accordingly, by way of example, the parking brake is turned off at step 501. At step 502, the parking brake sensor 342 transmits an input signal to the interface module 31. At step 503, the interface module 31 processes the input signal. For example, the interface module 31 performs debounce filtering to require stabilization of the mechanical state of the sensor before a state change is recognized.

At step 504, the interface module 31 transmits the input signal in the form of a network to the control unit 14 by way of a network communication link 67. At step 505, the control unit 14 processes the input signal. For example, the control unit 14 determines that the rear scene lights 351 are on, and that there has been an on→off transition in the state of the parking brake sensor 342. Accordingly, at step 506, the control unit 14 generates a first control signal to turn off the rear scene lights 351 and a second control signal to cause the LED indicator 352 to blink.

At step 507, the control unit 14 transmits the first control signal in the form of a network message to the interface module 35. In turn, at step 508, the interface module 35 transmits the control signal to the rear scene light lights 351, thereby causing the rear scene lights to turn off.

At step 509, the control unit 14 transmits the second control signal in the form of a network message to the interface module 21. In turn, at step 510, the interface module 35 transmits the control signal to the LED indicator 352, thereby causing the LED indicator 352 to blink. The blinking state of the LED indicator 352 indicates to the operator that the control unit 14 considers the switch 341 to be on, but that the rear scene lights 351 are nevertheless off because some other condition on the fire truck is not met. In this case, the rear scene lights 351 are off due to the on→off transition in the state of the parking brake. In this way, operator feedback is maximized.

The flowchart of FIG. 4, at step 510, shows the use of a single control signal to cause the LED indicator 352 to blink. In practice, the blinking of the LED indicator 352 may be achieved in a variety of ways. For example, if a simple hardwired connection between the interface module 21 and the LED indicator 352 is utilized, the interface module 21 may periodically provide periodic on and off control signals to the LED indicator 352 by periodically applying power to the output terminal that is connected to the LED indicator 352. Alternatively, if a blinker module is utilized, the interface module may provide a single control signal to the blinker module, which then controls blinking of the LED indicator 352.

If the operator then pushes and releases the switch 341 a second time while the parking brake is off, the process in FIG. 4 is repeated and the rear scene lights 351 turn on. In this case, the rear scene lights 351 turn on even though the parking brake is off, because the control system 12 only prevents the rear scene lights from being on when the parking brake is first released. If the operator pushes and releases the switch 341 a third time, the control system 12 turns off the rear scene lights 351.

b. Load Management

Figure 6:
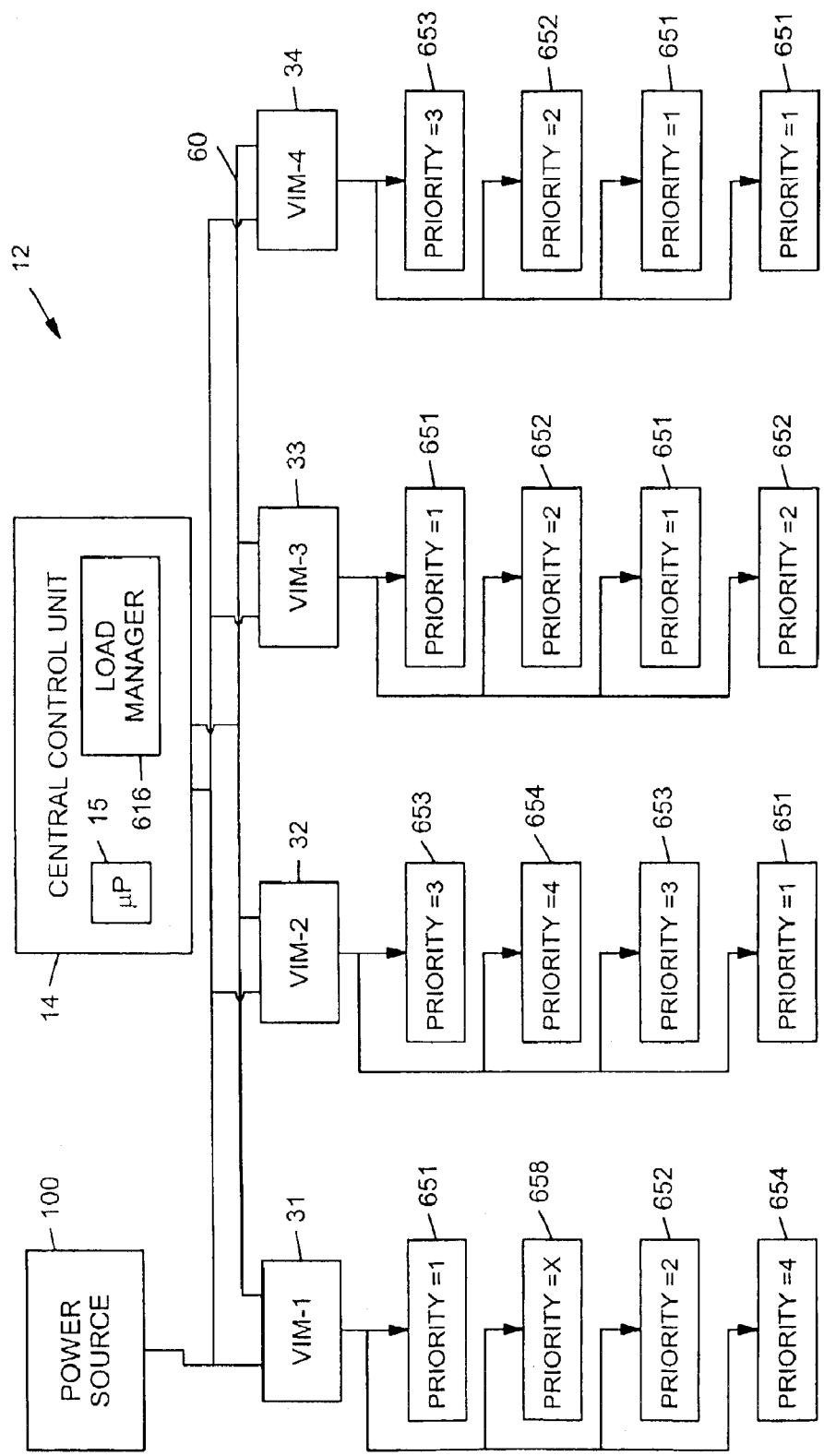
FIG. 6 is another simplified block diagram of the control system of FIGS. 1–2.
Figure 7:
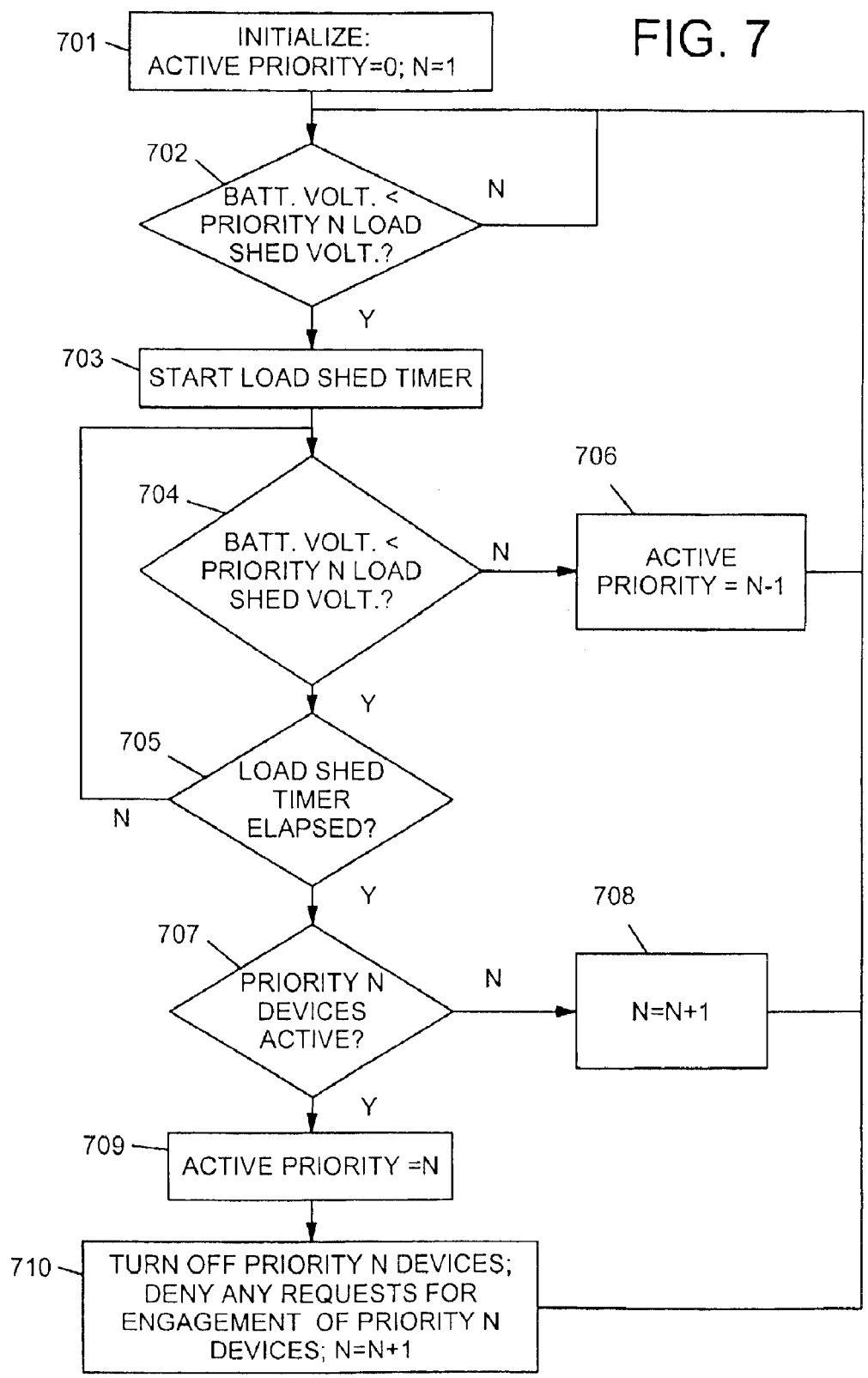
FIG. 7 is a flowchart showing the operation of the control system of FIG. 6 to implement load management when battery voltage decreases.
Figure 8:
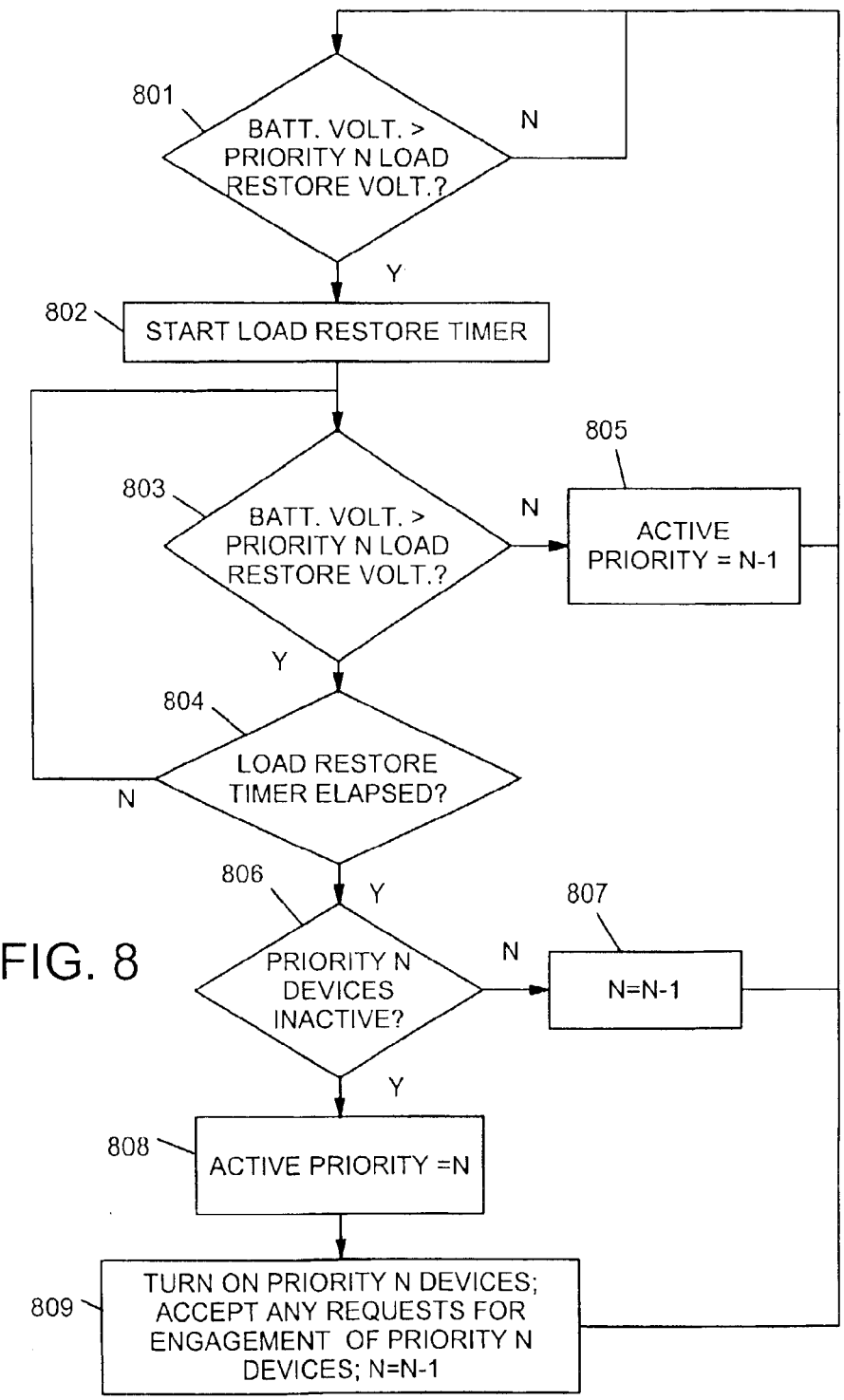
FIG. 8 is a flowchart showing the operation of the control system of FIG. 6 to restore power to output devices that have been shed during the load management illustrated in FIG. 7.

Referring now to FIGS. 6–8, a second example of the operation of the control system 12 is given. FIG. 6 is another block diagram of the control system 12, which has been simplified to the extent that some of the structure shown in FIGS. 1–2 is not shown in FIG. 6. Additionally, FIG. 6 shows a plurality of output devices 651, 652, 653 and 654 that have load management priority levels equal to one, two, three and four, respectively. The output devices 651, 652, 653 and 654 are exemplary ones of the output devices 50 of FIGS. 1–2. Finally, the central control unit 14 is shown to include a load manager 616, which is implemented in the control program 16 executed by the microprocessor 15.

Because the output devices 651, 652, 653 and 654 are assigned four different load management priority levels, the load manager 616 is referred to as a four level load manager. As will become apparent, implementing a load manager with additional priority levels can be achieved simply by defining additional priority levels. Indeed, it is even possible for the load manager 616 to have the same number of levels as there are output devices, by assigning every output device a different priority level and by shedding the output devices one by one as the battery voltage drops.

FIG. 7 is a flowchart showing the operation of the load manager 616. In particular, the flowchart of FIG. 7 describes the operation of the load manager 616 to turn off output devices in layers when the system voltage decreases. It may be noted that a similar approach may be used when the system voltage increases, in which case devices that are sensitive to over voltage conditions may be turned off in layers as the system voltage increases.

At step 701, the load manager initializes tracking variables and sets the active priority equal to zero. The active priority is the priority level that is currently shed. (In the described embodiment, the parameter N is typically equal to the active priority minus one. However, the parameter N could also simply be equal to the active priority.) Therefore, assuming that none of the output devices 651, 652, 653, 654 are shed, then the active priority level is equal to zero. The active priority increases as shedding occurs.

At step 702, the control unit 14 determines whether the battery voltage has decreased to the priority N load shed voltage. Initially, the tracking variable N is equal to one and so, initially, the control unit 14 is determining in step 702 whether the battery voltage has decreased enough for the first layer of shedding to occur. If the battery voltage has not decreased, then the control unit 14 continues to monitor the battery voltage until the priority 1 load shed voltage is reached.

At step 703, when the battery voltage has decreased to the priority 1 load shed voltage, then the control unit 14 starts a load shed timer. The purpose of the load shed timer is to ensure that a temporary reduction in the battery voltage (for example, caused by engagement of an output device that draws a significant amount of current) is not misinterpreted as the battery running out of power, so that the control unit 14 does not unnecessarily start shedding output devices.

The control unit 14 continues to monitor the battery voltage at step 704 until the load shed timer elapses at step 705. During this time, the control unit 14 continues to monitor whether the battery voltage is equal to or less than the priority 1 load shed voltage. If the battery returns above the load shed voltage, then that indicates only a temporary voltage reduction has occurred and therefore the process returns to step 702 after the active priority is set equal to N−1 at step 706. In this case, since N is equal to one, the active priority remains equal to zero, in other words, no output devices are shed.

If the battery voltage is still equal to or less than the priority 1 load shed voltage when the load shed timer elapses at step 705, then the process proceeds to step 707. At step 707, the control unit 14 determines whether any of the priority 1 output devices are active. If none of the priority 1 output devices 651 are active, then N is incremented by one, and the process proceeds to step 702. At step 702, the control unit 14 determines whether the battery voltage has decreased to the priority 2 load shed voltage. Thus, because the battery voltage is low, but there were no priority 1 output devices 651 to shed at step 707, the control unit determines whether it is appropriate to start shedding priority 2 output devices 652. The control unit 14 repeats the process and continues to search for a level of devices to shed until either the battery voltage is not low enough to justify shedding the next layer of devices (in which case the process proceeds to step 706, where the active priority is set equal to the highest level at which the battery voltage is low enough to cause shedding, if there were output devices to shed, and then the process returns to step 702) or until step 707 is answered affirmatively (in which case the process proceeds to step 709, where the active priority is set equal to the priority level at which output devices are available for shedding, and then the process proceeds to step 710).

At step 710, these output devices are shed, the variable N is incremented, and the process proceeds to step 702 where the control unit 14 determines whether the battery voltage is less than the load shed voltage of the next priority level. The process then repeats until the battery voltage is greater than the load shed voltage of the next priority level.

When the active priority level becomes non-zero, the control unit 14 denies all requests for engagement of devices that have a priority level which is equal to or less than the active priority level. Thus, all devices that have a priority level which is equal to or less than the active priority level remain off, at least until the battery voltage increases and it becomes appropriate to restore some output devices, as described below in connection with FIG. 8.

As previously described, some output devices are controlled by switches that are integrally fabricated with an LED indicator. For such output devices, the control unit 14 causes the appropriate LED indicator to start blinking, thereby advising the operator that the switch is recognized by the control unit 14 as being turned on, but that the associated output device is nevertheless disengaged because it is being load managed. The process of making indicator LEDs blink was described previously in connection with FIG. 4.

Referring now to FIG. 8, a process for restoring power to output devices is illustrated. The battery is connected to the alternator and, if loading is reduced enough, the battery will begin to regain voltage. Therefore, it may become appropriate to restore power to at least some output devices. The process shown in FIG. 8 for restoring power is essentially the opposite of the process shown in FIG. 7. The process of FIG. 8 may be performed in time alternating fashion with respect to the process of FIG. 7.

In particular, at step 801, it is determined whether the battery voltage has increased to the priority N load restore voltage. For example, if the active priority is currently set equal to three, then step 801 determines whether the battery voltage is greater than or equal to the priority 3 load restore voltage. The priority 3 load restore voltage is preferably larger than the priority 3 load shed voltage in order to implement a hysteresis effect that avoids output devices from flickering on and off.

At step 802, when the battery voltage has increased to the priority 3 load restore voltage, then the control unit 14 starts a load restore timer. The purpose of the load restore timer is to ensure that a temporary voltage surge is not misinterpreted as the battery regaining power, so that the control unit 14 does not inappropriately start restoring output devices.

The control unit continues to monitor the battery voltage at step 803 until the load restore timer elapses at step 804. During this time, the control unit 14 continues to monitor whether the battery voltage is still equal to or greater than the priority 3 load shed voltage. If the battery returns below the load restore voltage, then that indicates only a temporary voltage surge and therefore the process returns to step 801 after the active priority is set equal to N−1 at step 805. In this case, since N is equal to four (N is always one greater than the active priority in the described embodiment), the active priority remains equal to three, in other words, no output devices are restored.

If the battery voltage is still equal to or greater than the priority 3 load restore voltage at step 804, then the process proceeds to step 806. At step 806, the control unit 14 determines whether any of the priority 3 output devices 653 are inactive. If none of the priority 3 output devices are inactive, then N is decremented by one, and the process proceeds to step 801. At step 801, the control unit 14 determines whether the battery voltage has increased to the priority 2 load restore voltage. Thus, because the battery voltage has increased, but there were no priority 3 output devices 653 to restore at step 806, the control unit determines whether it is appropriate to start restoring priority 2 output devices 652. The control unit 14 continues to search for a level of devices to restore until either the battery voltage is not high enough to justify restoring the next layer of devices (in which case the process proceeds to step 805, where the active priority is set equal to the highest level at which the battery voltage is high enough to permit restoring, if there were output devices to restore, and then the process returns to step 801) or until step 806 is answered affirmatively (in which case process proceeds to step 808, where the active priority is set equal to the priority level at which output devices are available for restoring, and then the process proceeds to step 809).

At step 809, these output devices are restored, the variable N is decremented, and the process proceeds to step 702 where the control unit 14 determines whether the battery voltage is greater than the load restore voltage of the next priority level. The process then continues until the battery voltage is less than the load restore voltage of the next priority level, or until all devices have been restored. Once a level of output devices has been restored, the control unit 14 starts accepting requests to turn on output devices having the restored priority level.

The implementation of the load manager 616 in the control unit 14 permits a high degree of flexibility to be obtained. For example, the priority level of output devices can be changed without requiring any hardware changes. For example, air conditioning might be given a higher priority in summer, when air conditioning is more critical for cooling off firefighters that have been inside a burning building, and less of a priority in winter when the outside temperature may be below freezing.

Further, the priority of the output devices can change dynamically as a function of the operating mode of the fire truck. Thus, in FIG. 6, the output device 658 is illustrated as having a priority X. The variable X may be set equal to one value for most operating conditions. However, upon receiving a request for the output device 658, the central control unit can review the I/O state of the fire truck and, if predetermined I/O conditions are met, give the output device 658 a higher load management priority level, thereby allowing the output device 658 to turn on. Because the load management priority level is a software-assigned value, and is not hardwired by relay logic, it is possible to change the load management priority level of output devices dynamically while the fire truck is operating at the scene of a fire.

An additional advantage of the control system 12 is that it is more flexible and allows a higher level of load management granularity to be achieved. With the control system 12, it is possible to shed individual output devices instead of just groups of devices. For example, it is possible to shed individual lights within a lighting system without turning off the whole lighting system.

Another advantage of the control system 12 is that it can be given the ability to predict operational requirements of the fire truck, such that potential operational difficulties can be avoided. For example, with the load manager 616, the battery current draw may be monitored and very low priority loads may be preemptively shed in order to slow down or prevent the loss of battery power.

Another advantage of the control system 12 is that can be given the ability to perform prognoses of various system conditions and use the information obtained to alleviate or prevent operational difficulties. For example, the load manager 616 can predict, based on a knowledge of how much battery current is being drawn, how long the battery will last until it is necessary to start shedding output devices. Other examples also exist. For example, water flow from an on-board water supply can be monitored and the amount of time remaining until water is depleted can be displayed to an operator of the fire truck 10. This allows firefighters to know with greater accuracy how quickly they need to get the fire truck connected to a fire hydrant before the water supply is depleted. Similarly, for oxygen masks used in the basket of an aerial, oxygen flow can be monitored and the amount of time remaining until oxygen is depleted can be displayed to an operator of the fire truck. Again, this allows firefighters to know with greater accuracy how quickly the oxygen supply should be replenished. Although conventionally, fire trucks have level indicators that indicate the amount of water or oxygen remaining, firefighters are generally more concerned about the amount of time remaining rather than the absolute quantity of water/oxygen remaining. This is especially true since the water and oxygen flow rates can vary significantly during the operation of the fire truck.

c. Load Sequencing

Figure 9:
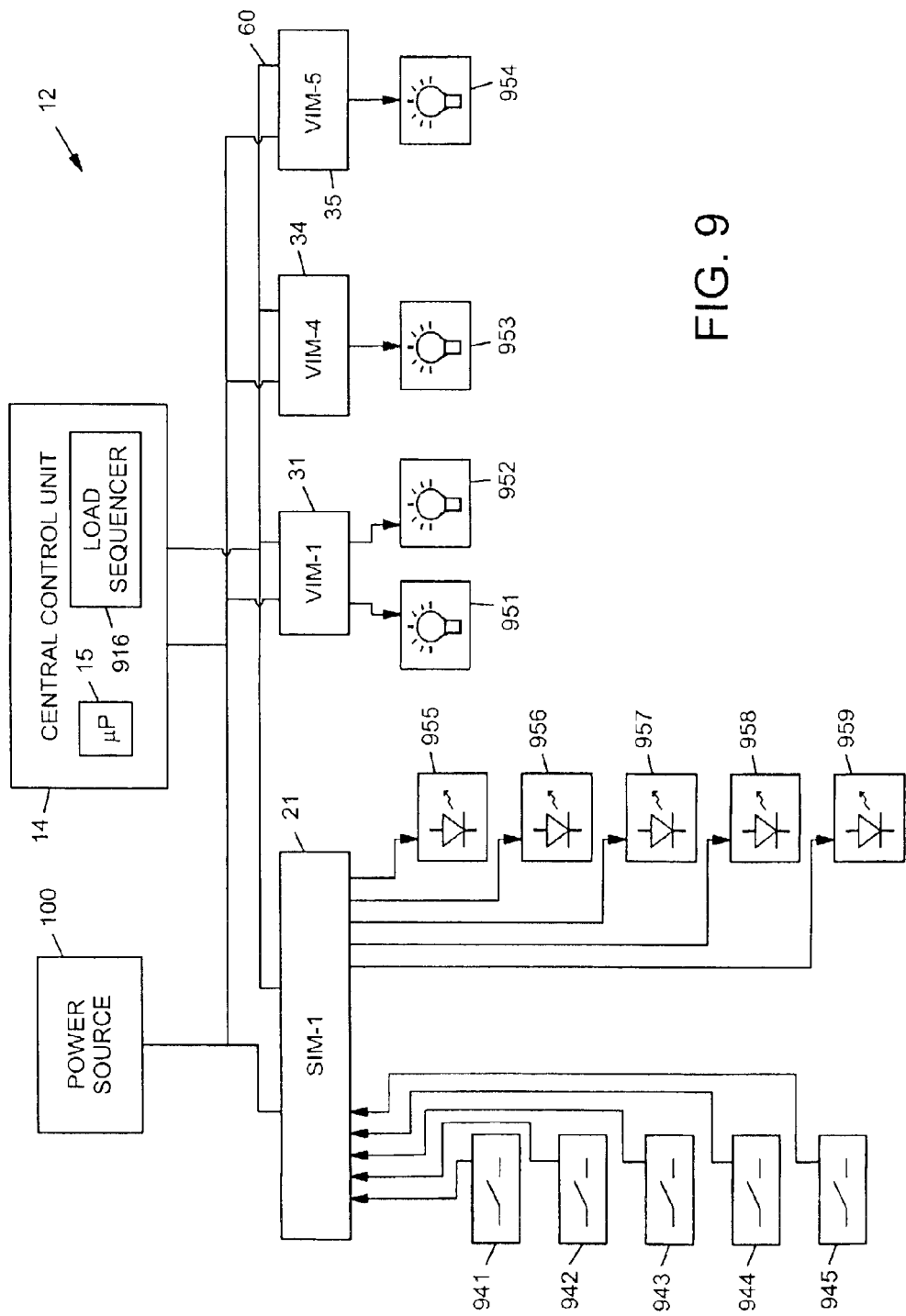
FIG. 9 is another simplified block diagram of the control system of FIGS. 1–2.
Figure 10A:
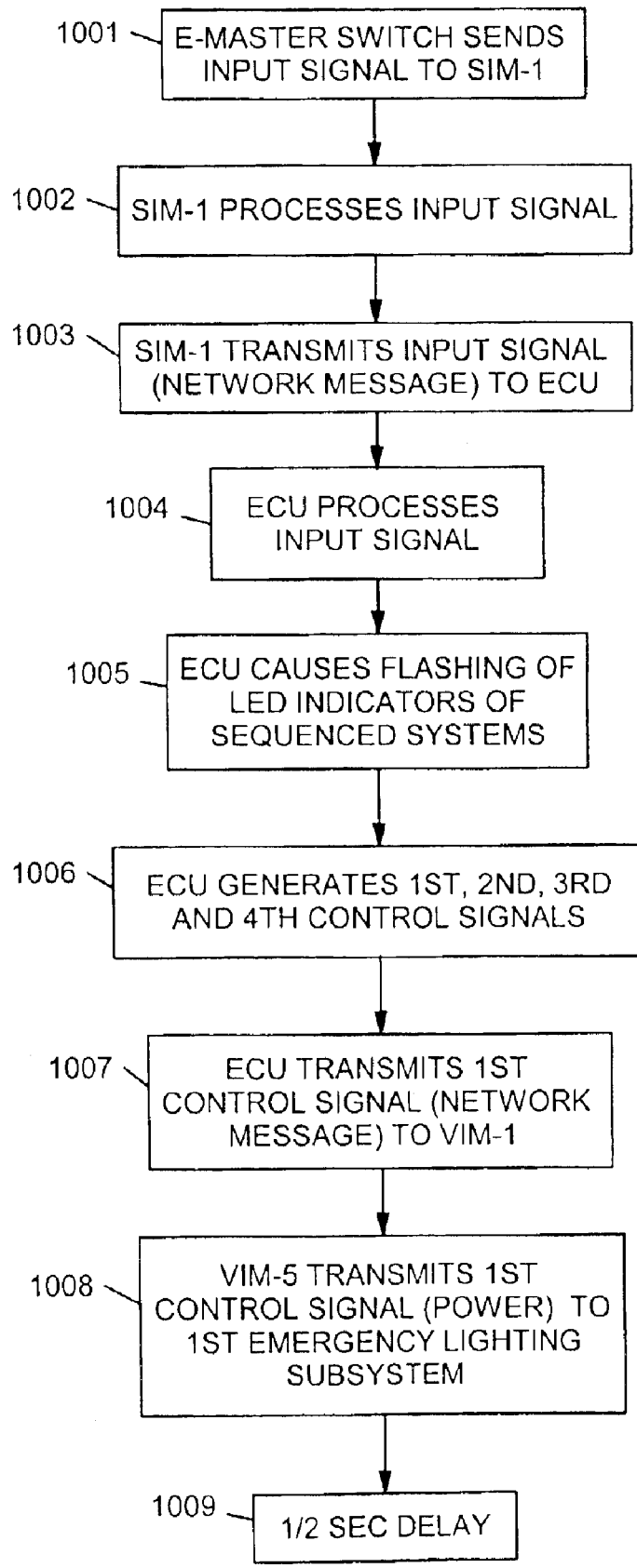
FIGS. 10A–10B are flowcharts showing the operation of the control system of FIG. 9 to implement load sequencing in response to an operator input.
Figure 10B:
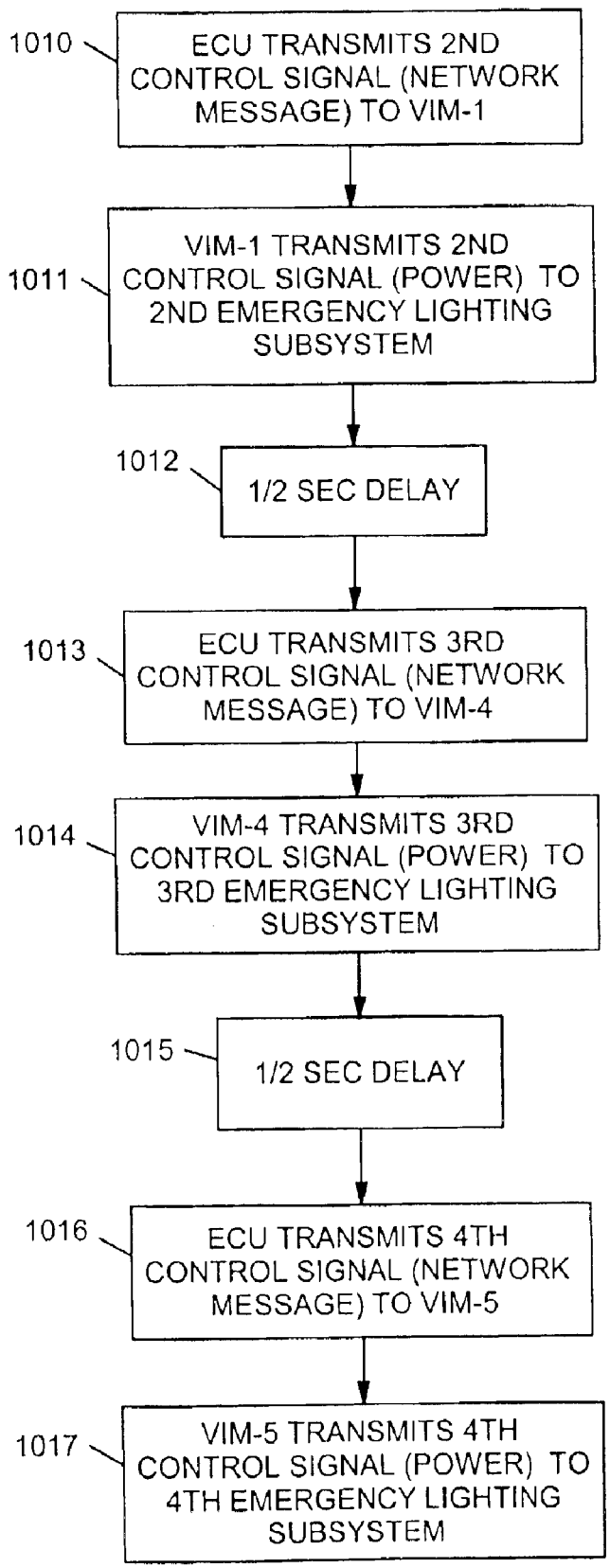

Referring now to FIGS. 9, 10A, and 10B, a second example of the operation of the control system 12 is given. FIG. 9 is another block diagram of the control system 12, which has been simplified to the extent that some of the structure shown in FIGS. 1–2 is not shown in FIG. 9. Additionally, FIG. 6 shows a plurality of switches 941–945, a plurality of emergency lighting subsystems 951–954, and a plurality of LED indicators 955–959. The central control unit 14 includes a load sequencer 916, which is implemented in the control program 16 executed by the microprocessor 15.

In FIGS. 9, 10A and 10B, the operation of the load sequencer is described with respect to four emergency lighting subsystems 951–959. It may be noted that the load sequencer may be used in other situations to control other output devices. For example, another load sequencer may be used when battery power is first applied, and another when the ignition is first turned on.

The lighting subsystems 951–59 may each, for example, comprise one emergency light or a set of emergency lights that are coupled to an output of one of the interface modules 30. Additionally, while only four subsystems are shown, in practice the load sequencer may be used to control additional emergency lighting subsystems.

The switches 941, 942, 943 and 944 respectively control the emergency lights 951, 952, 953 and 954. The remaining switch 945 is the E-master switch. For any given set of emergency lights, both the E-master switch and the respective switch 941–944 must be turned on. Initially, the previous active on/off states of the switches 941–944, which have been stored in non-volatile memory, are recalled. Then, when an emergency call is received, an operator activates the E-master switch 945.

At step 1001, E-master switch 945 transmits an input signal to the interface module 21. At step 1002, the interface module processes the input signal. At step 1003, the interface module 21 transmits the input signal in the form of a network message to the central control unit 14. At step 1004, the central control unit processes input signal.

At step 1005, the control unit causes blinking of the LED indicators 955–959 of the sequenced emergency lighting subsystems 951–954. In particular, the control unit transmits control signals (in the form of network messages) to the interface modules that are connected to the LED indicators 955–959, which in turn transmit the control signals to the LED indicators 955–959 themselves, in the manner previously described. The operation of the indicators 955–959 is the same as has previously been described, namely, the LED indicators 955–959 blink when the switches 941–944 are turned on but the lighting subsystems 951–954 are not turned on. As the subsystems 951–954 turn on one by one, so too do the LED indicators 955–959. Accordingly, because the operation of the LED indicators 955–959 indicators is the same as has been described elsewhere, the operation of the LED indicators 955–959 will not be described further.

At step 1006, the central control unit generates first, second, third, fourth and fourth control signals. At step 1007, the central control unit 14 transmits the first control signal in the form of a network message to the interface module 35. At step 1008, the interface module 35 transmits the first control signal in the form of a power signal to the first emergency lighting subsystem 951.

The control unit 14 then transmits additional control signals at one-half second intervals. Thus, after a one-half second delay at step 1009, the central control unit transmits the second control signal in the form a network message to the interface module 31 at step 1010. At step 1011, the interface module 31 then sends the second control signal in the form of a power signal to the second emergency lighting subsystem 952. After another one-half second delay at step 1012, the central control unit 14 transmits the third control signal in the form a network message to the interface module 34 at step 1013. At step 1014, the interface module 34 then sends the third control signal in the form of a power signal to the third emergency lighting subsystem 953. Finally, after another one-half second delay at step 1015, the central control unit 14 transmits the third control signal in the form a network message to the interface module 35 at step 1016. At step 1017, the interface module 35 then sends the second control signal in the form of a power signal to the fourth emergency lighting subsystem 954. As previously indicated in connection with step 510 of FIG. 5, there are a variety of ways in which the blinking/flashing of outputs can be achieved, using either only a single control signal or using a first control signal followed by multiple additional control signals.

Figures 11A, 11B:
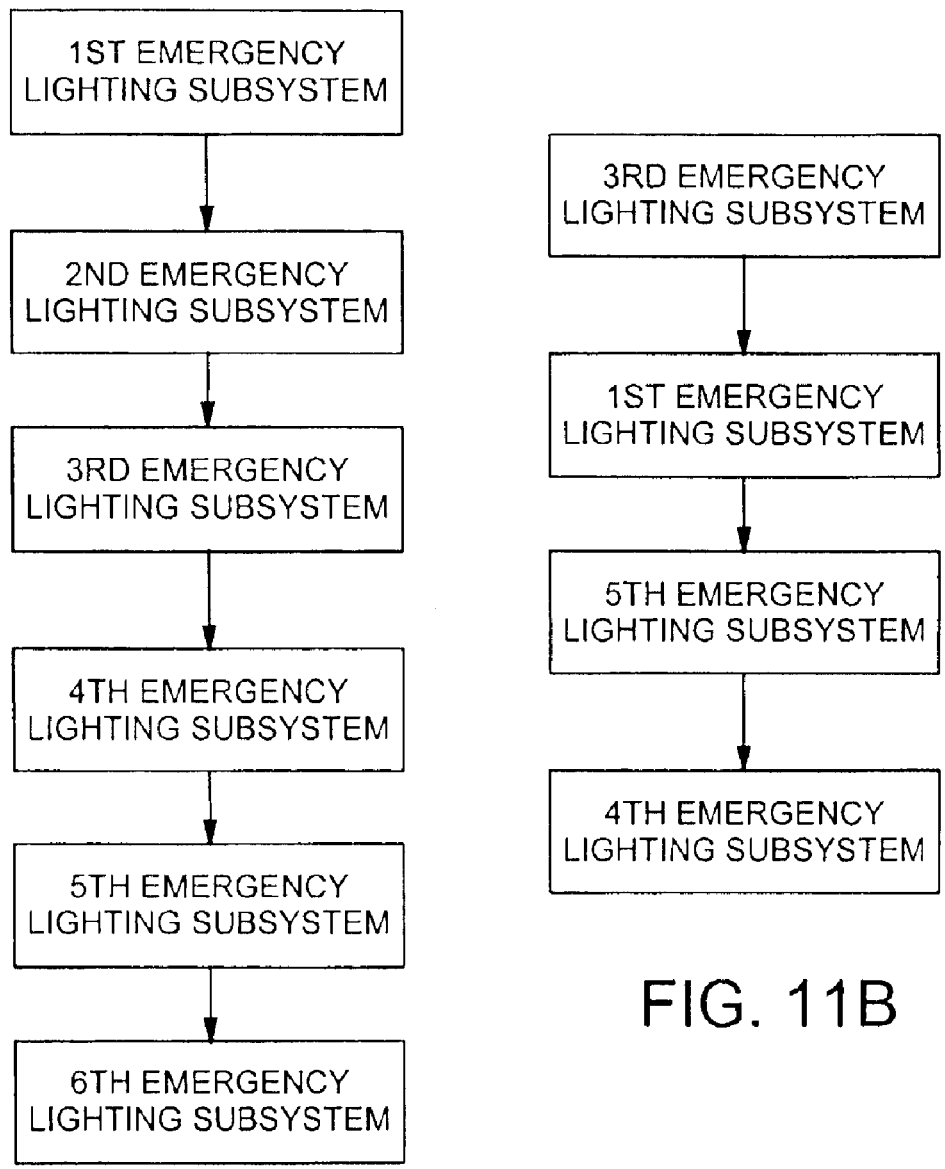
FIGS. 11A–11B are flowcharts showing the operation of the control system of FIG. 9 to implement load sequencing in different orders depending on an operating mode of the fire truck.

Referring now to FIGS. 11A and 11B, another advantage of the control system 12 is the flexibility of the load sequencer 916. Like the load manager 616, the load sequencer 916 can operate as a function of the operating mode of the fire truck. Thus, in FIG. 11A, the load sequencer 916 turns subsystems on in a first order (1st, 2nd, 3rd, 4th, 5th, 6th) in a first operating mode of the fire truck 10. In a different operating mode of the fire truck, a somewhat different group of subsystems is load sequenced and they are load sequenced in a different order (3rd, 1st, 5th, 4th, 7th, 8th). The two different modes of operation can be activated, for example by two different master on/off switches. In the context of emergency lighting systems, this arrangement is useful where it is desirable to have the emergency lighting subsystems load sequence differently depending on whether the fire truck is traveling from the fire station to the fire or vice versa.

As another example of load sequencing performed as a function of the operating mode of the truck, it may be noted that, because the control unit 14 knows the on/off states of all of the output devices 50, load sequencing can be performed taking into account the current on/off state of the output devices that are load sequenced. For example, if some output devices are already turned on, then the load sequencer 916 can immediately proceed to the next output device without wasting time turning on a device that is already turned on. This advantageously permits load sequencing to be performed more quickly.

3. Aerial Control

Figure 12:
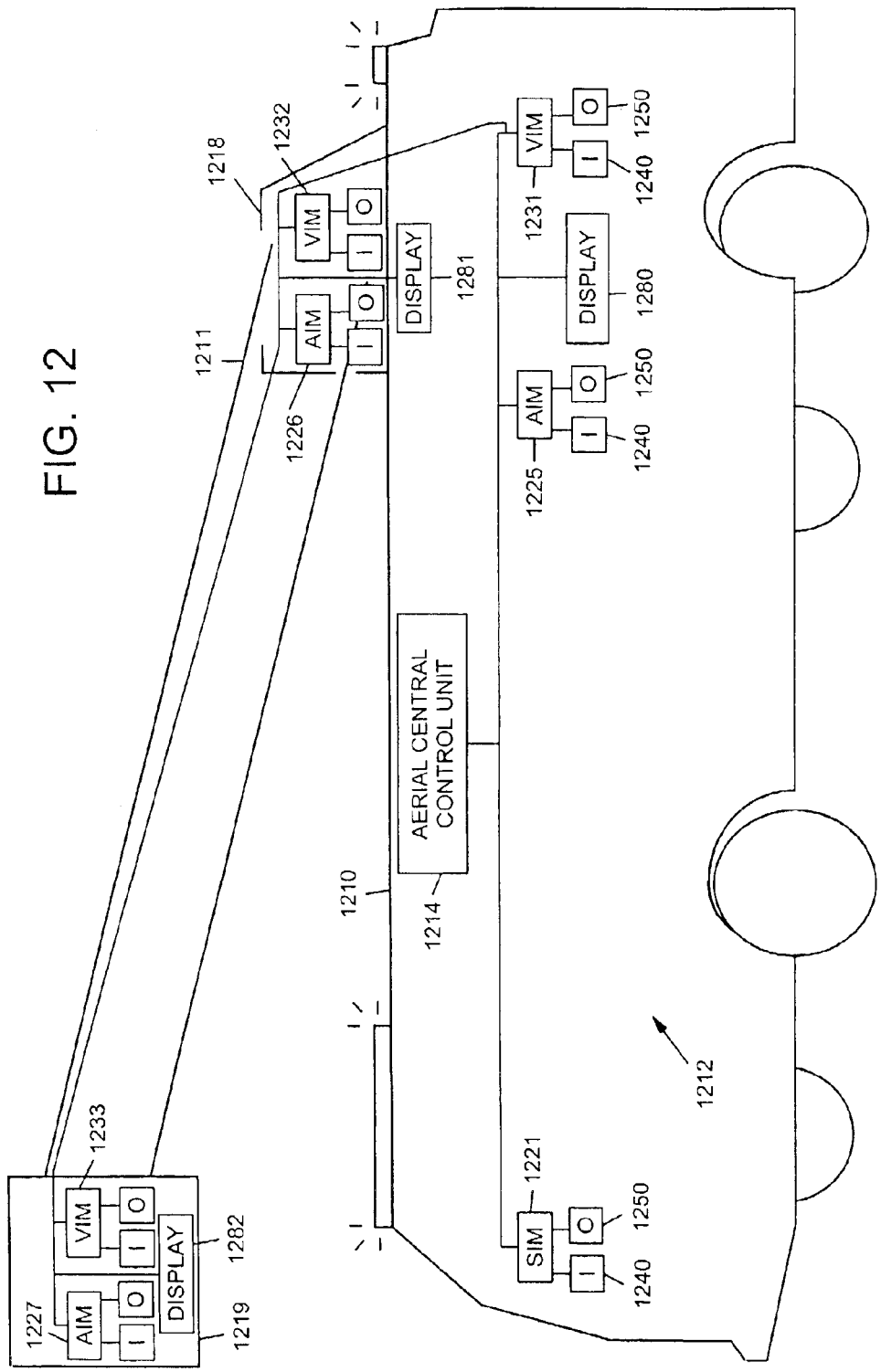
FIG. 12 is a schematic view of an aerial device having a control system according to another embodiment of the present invention.
Figure 13:
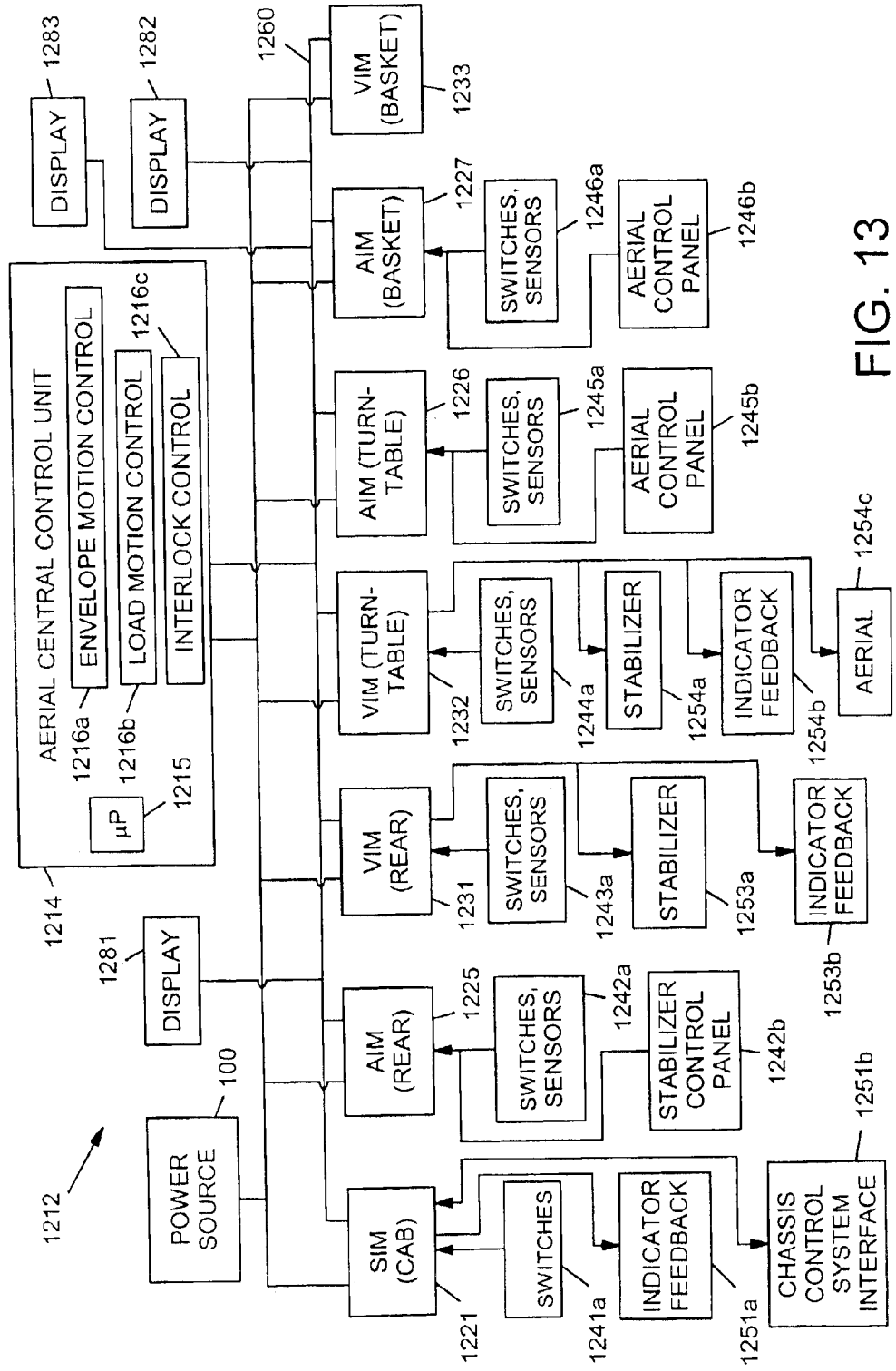
FIG. 13 is a more detailed block diagram of the control system of FIG. 12.

Referring now to FIG. 12, a preferred embodiment of a fire truck 1210 with an aerial 1211 having an aerial control system 1212 is illustrated. By way of overview, the control system 1212 comprises an aerial central control unit 1214, a plurality of microprocessor-based interface modules 1220, 1230 and 1235, a plurality of input devices 1240, and a plurality of output devices 1250. The central control unit 1214 and the interface modules 1220, 1230 and 1235 are connected to each other by a communication network 1260.

The control system 1212 is similar in most respect to the control system 12, with the primary difference being that the control system 1212 is used to control the output devices 1250 on the aerial 1211 based on input status information from the input devices 1240, rather than to control the output devices 50 on the chassis 11. The interface modules 1220 and 1230 may be identical to the interface modules 20 and 30, respectively, and the central control unit 1214 may be identical to the central control unit 14 except that a different control program is required in connection with the aerial 1211. Accordingly, the discussion above regarding the interconnection and operation of the interface modules 20 and 30 with the input devices 40 and output devices 50 applies equally to the central control unit 1214, except to the extent that the control system 1212 is associated with the aerial 1211 and not with the chassis 11.

The aerial control system 1212 also includes the interface modules 1225–1227, which are similar to the interface modules 20 and 30 except that different I/O counts are utilized. In the preferred embodiment, the interface modules 1225–1227 have twenty-eight switch inputs (two of which are configurable as frequency inputs). As previously noted, rather than using several different types of interface modules, it may be desirable to use only a single type of interface module in order to reduce inventory requirements. Additionally, the number of interface modules and the I/O counts are simply one example of a configuration that may be utilized.

It is desirable to use a control system 1212 for the aerial 1211 which is separate from the control system 12 in order to provide a clear separation of function between systems associated with the aerial 1211 and systems associated with the chassis 11. Additionally, as a practical matter, many fire trucks are sold without aerials and therefore providing a separate aerial control system enables a higher level commonality with respect to fire trucks that have aerials and fire trucks that do not have aerials.

A specific example will now be given of a preferred interconnection of the interface modules with a plurality of input devices 1240 and output devices 1250. The interface module 1221 receives inputs from switches 1241a which may include for example an aerial master switch that activates aerial electrical circuits, an aerial PTO switch that activates the transmission to provide rotational input power for the hydraulic pump, and a platform leveling switch that momentarily activates a platform (basket) level electrical circuit to level the basket relative to the current ground grade condition. The LED indicators 1251 provide visual feedback regarding the status of the input switches 1241a.

The interface modules 1225 and 1231 are located near a ground-level control station at a rear of the fire truck 10. The interface modules 1225 and 1231 receive inputs from switches 1242a and 1243a that include, for example, an auto level switch that activates a circuit to level the fire truck using the stabilizer jacks and an override switch that overrides circuits for emergency operation. The interface modules 1225 and 1231 may also receive inputs from an operator panel such as a stabilizer control panel 1242b, which includes switches that control the raising and lowering of front and rear stabilizer jacks, and the extending and retracting of front and rear stabilizer jacks. The stabilizer is an outrigger system which is deployed to prevent the fire truck from becoming unstable due to the deployment of an aerial system (e.g., an eighty-five foot extendable ladder). The interface module 1231 may drive outputs that are used to control deployment the stabilizer, which can be deployed anywhere between zero and five feet.

The interface modules 1226 and 1232 are located near a turn table 1218 at the rear of the fire truck 10. The interface modules may receive inputs from switches and sensors 1244a and 1245a, as well as switches that are part of an aerial control panel 1245b and are used to control the extension/retraction, raising/lowering, and rotation of the aerial 1211. The interface modules 1226 and 1232 drive outputs that control the extension/retraction, raising/lowering, and rotation of the aerial 1211, as well as LED indicators 1254b that provide operator feedback regarding the positions of switches and other I/O status information. The interface modules 1227 and 1233 are located in the basket of the aerial and provide duplicate control for the extension/retraction, raising/lowering, and rotation of the aerial.

Additional inputs and outputs 1251b may be used to establish a communication link between the control system 12 and the control system 1212. In other words, the digital on/off outputs of one control system can be connected to the switch inputs of the other control system, and vice versa. This provides for a mechanism of transferring I/O status information back and forth between the two control systems 12 and 1212.

The control system 1212 has complete motion control of the aerial 1211. To this end, the control program 1216 includes an envelope motion controller 1216a, load motion controller 1216b and interlock controller 1216c. Envelope motion control refers to monitoring the position of the aerial and preventing the aerial from colliding with the remainder of the fire truck 10, and otherwise preventing undesirable engagement of mechanical structures on the fire truck due to movement of the aerial. Envelope motion control is implemented based on the known dimensions of the aerial 1211 and the known dimensions and position of other fire truck structures relative to the aerial 1211 (e.g., the position and size of the cab 17 relative to the aerial 1211) and the position of the aerial 1211 (which is measured with feedback sensors 1244a and 1245a). The control system 1212 then disallows inputs that would cause the undesirable engagement of the aerial 1211 with other fire truck structures.

Load motion control refers to preventing the aerial from extending so far that the fire truck tips over due to unbalanced loading. Load motion control is implemented by using an appropriate sensor to measure the torque placed on the cylinder that mechanically couples the aerial 1211 to the remainder of the fire truck. Based on the torque and the known weight of the fire truck, it is determined when the fire truck is close to tipping, and warnings are provided to the operator by way of text messages and LED indicators.

Interlock control refers to implementing interlocks for aerial systems. For example, an interlock may be provided that require the parking brake be engaged before allowing the aerial to move, that require the stabilizers to be extended and set before moving the aerial 1211, that require that the aerial PTO be engaged before attempting to move the aerial, and so on.

Advantageously, therefore, the control system makes the operation of the aerial much safer. For example, with respect to load motion control, the control system 1212 automatically alerts firefighters if the extension of the aerial is close to causing the fire truck to tip over. Factors such as the number and weight of people in the basket 1219, the amount and weight of equipment in the basket 1219, the extent to which the stabilizers are deployed, whether and to what extent water is flowing through aerial hoses, and so on, are taken into account automatically by the torque sensors associated with the cylinder that mounts the aerial to the fire truck. This eliminates the need for a firefighter to have to monitor these conditions manually, and makes it possible for the control system 1212 to alert an aerial operator to unsafe conditions, and puts less reliance on the operator to make sure that the aerial is operating under safe conditions.

4. Scene Management

Figure 34:
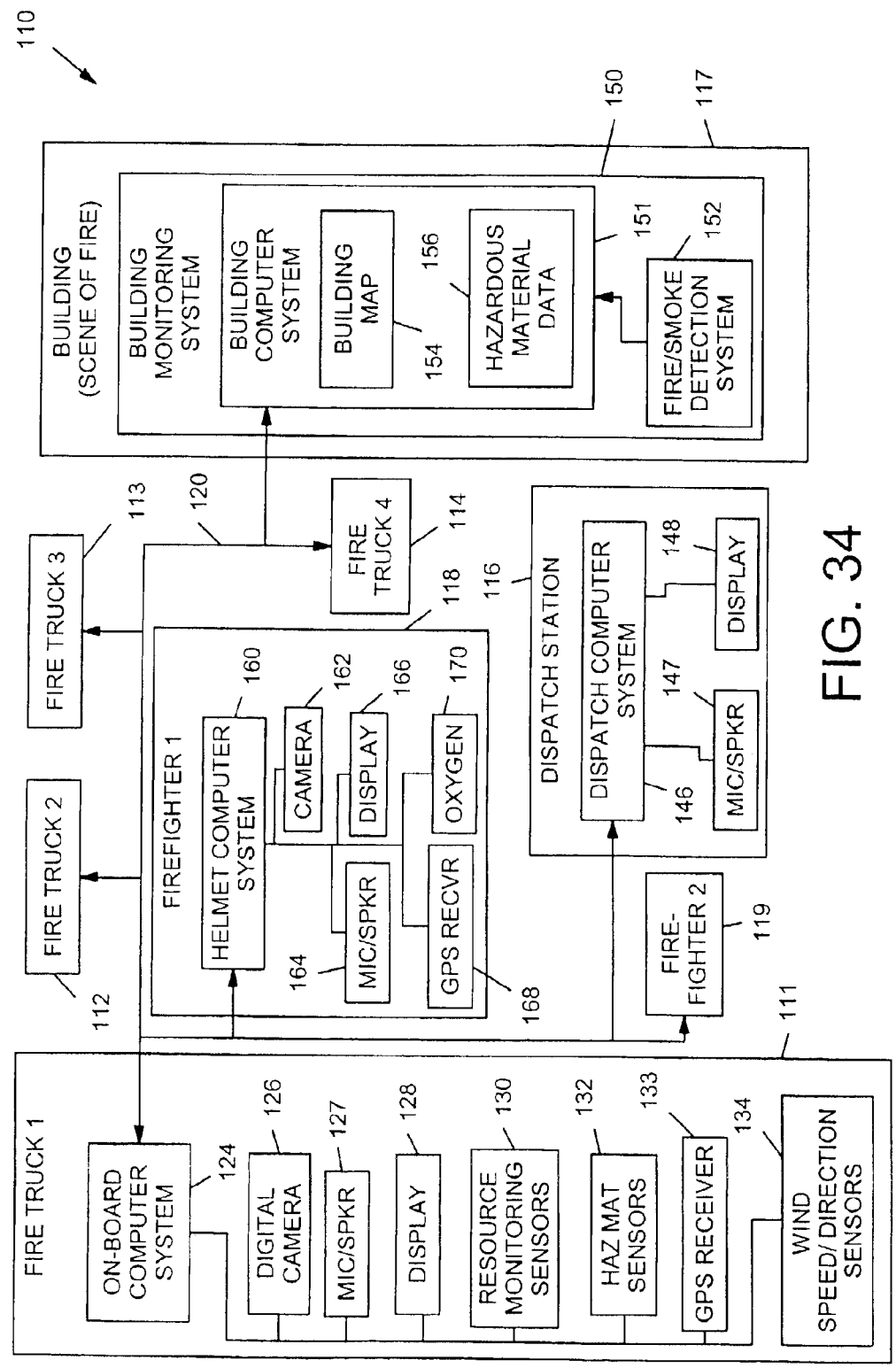
FIG. 34 is a block diagram of a fire fighting system that includes multiple fire fighting vehicles and other systems according to another preferred embodiment of the present invention.

Referring now to FIG. 34, a firefighting system 110 in accordance with another preferred aspect of the invention is shown. The system 110 comprises a plurality of fire trucks 111–114, a central dispatch station 116, and a wireless communication network 120 which connects the fire trucks 111–114 and the central dispatch station 116. Also shown is a building 117, which is assumed to be the scene of a fire, as well as a pair of firefighters 118–119 who are assumed to be located inside the building 117. Of course, although four fire trucks and two firefighters are shown, it is also possible to use the system 110 in conjunction with fewer or additional fire trucks and/or firefighters. Also, although in the preferred embodiment the firefighting system 110 includes all of the devices shown in FIG. 34, it is also possible to construct a firefighting system that only uses some of the devices shown in FIG. 34.

The fire trucks 111–114 are each constructed in generally the same manner as the fire truck 10 previously described, and therefore each have a control system 12 or 1412 as previously described in connection with FIGS. 1–13. The fire trucks 111–114 each further include a digital camera 126, a speaker/microphone system 127, a display 128, resource monitoring sensors 130, hazardous material sensors 132, and wind speed/direction sensors 134. Although these features are described in connection with the fire truck 111 in FIG. 34, it should be noted that the fire trucks 112–114 include these features as well.

Figure 35:
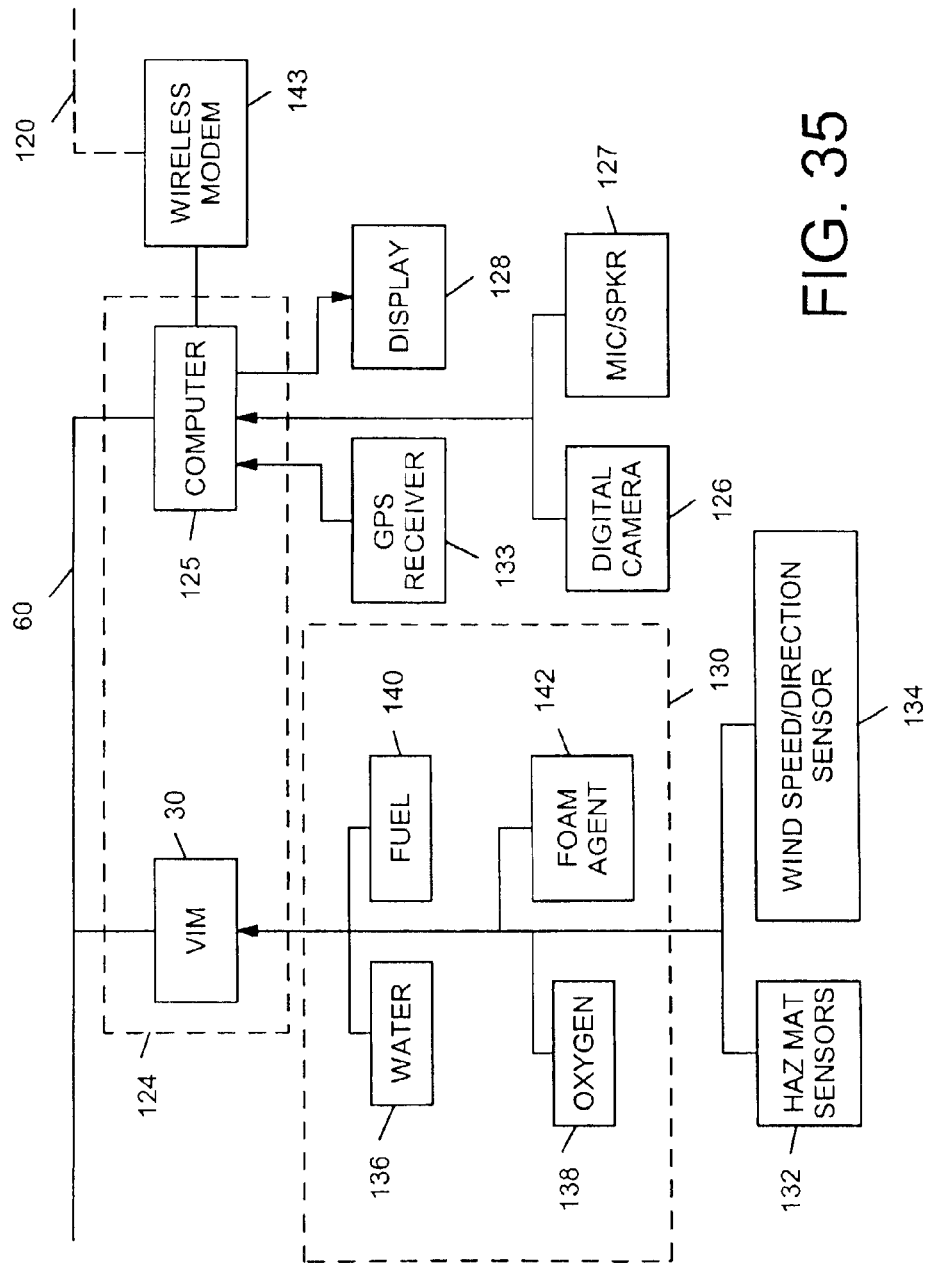
FIG. 35 is a block diagram showing one of the firefighting vehicles of FIG. 34 in greater detail.

Referring now also to FIG. 35, the fire truck 111 is shown in greater detail. The computer system 124 may be implemented using a single computer, but is preferably implemented using a computer 125 in combination with one or more of the interface modules 30 previously described in connection with FIGS. 1–13. In this regard, it may be noted that the sensors 130–134 are preferably specific ones of the sensors 44a, 45a, 46a, 47a, and 48a that are connected to the interface modules 31–35 as previously described. The sensors 130–134 are therefore connected to the interface module (or modules) 30 which in turn is connected to the communication network 60. The computer 125 is also connected to the communication network 60 along with the interface modules 20 and 30 and therefore is able to receive data from anywhere in the control system 12. Assuming a single central control unit 14 is used as described in connection with FIGS. 1–13, data is received by the computer 125 from the interface modules 20 and 30 by way of the central control unit 14. Alternatively, if a distributed control scheme is used as described in connection with FIGS. 14–24, then data may be received directly from the interface modules 20 and 30.

The resource monitoring sensors 130 further include a water level sensor 136, an oxygen level sensor 138, a fuel level sensor 140, and a foam agent sensor 142. The water level sensor 136 monitors the amount of water in an on-board storage tank (not shown) available to be pumped and dispensed on the fire in progress. The oxygen level sensor 138 monitors the amount of oxygen available for life support systems for firefighters in or near the scene of the fire. The fuel level sensor 140 monitors the amount of fuel available for the engine 92 of the fire truck 10. The foam agent sensor 142 monitors the amount of foam agent available to be dispensed on the fire in progress. Other sensors that monitor the levels of other consumable resources may also be provided.

In addition to the resource monitoring sensors 130, the hazardous material sensors 132 and the wind speed/direction sensors 134 are also provided. The hazardous material sensors 132 include sensors that monitor the air for hazardous materials combusting or emitted from the fire. The wind speed/direction sensors 134 include one or more sensors that in combination measure wind speed and direction.

The computer 125 is connected to the communication network 60 along with the interface modules 20 and 30 and itself serves as an additional interface module. The computer 125 is different than the interface modules 20 and 30 in that the computer 125 has enhanced graphics capability to permit the computer 125 to interface with video I/O devices, specifically, an input device in the form of the digital camera 126 and an output device in the form of the display 128. The computer 125 is capable of receiving streaming digital video information from the digital camera 126 and using the digital information, as well as information from other sources, to drive the display 128. The digital camera 126 may be any device that is capable of generating digital video information. Preferably, the digital camera 126 is a ruggedized webcam and is mounted at a location on the fire truck 111 that permits a clear view of the fire to be developed, for example, on the roof of the fire truck 111 or at the end of an aerial of the fire truck 111. The display 128 is connected to the wireless communication network 120 by way of the computer 125 and receives digital video information from the communication network 120 by way of the computer 125. The display 128 is preferably a ruggedized, flat panel touch screen SVGA display or better, allowing for the display of high resolution streaming video information on-board the fire truck 111. The display 128 may be mounted in an operator compartment or on the side of the fire truck 111, for example. The computer 125 is preferably also connected to a speaker/microphone system 127 which comprises a microphone and a speaker system that are connected to the computer 125, e.g., by way of a sound card. The speaker/microphone system 127 is used to acquire and communicate voice information over the communication network 120, as detailed below.

The computer 125 is connected to a wireless modem 143 which connects the computer 125 to the communication network 120. Preferably, the communication network 120 is implemented using the internet and the wireless modem 143 connects the computer 125 to a secure area of the world wide web ("the web"). The wireless modem 143 is a cellular telephone modem and connects the computer 125 to the internet by way of a wireless telephone link to an internet service provider. The cellular telephone service used in this regard services the geographic region which includes the building 117 and preferably services the entire municipal region serviced by the fire trucks 111–114. In practice, it may be desirable to use multiple cellular telephone modems operating in parallel at each vehicle to obtain additional bandwidth to permit the computer 125 to receive and display high resolution video information from the other fire trucks 112–114 in real time. Alternatively, a high bandwidth internet connection could also be established by establishing respective satellite links between the fire trucks 111–114 and an internet-enabled based station. Other forms of high bandwidth wireless networks may also be used, including network links that do not involve the internet.

Finally, the computer 125 is connected to the global positioning system (GPS) receiver 135. The GPS receiver 135 provides the computer 125 with pinpoint coordinates regarding the location of the fire truck 111.

Referring back to FIG. 34, the central dispatch station 116 further includes a central dispatch computer system 146 and a display 148. The central dispatch station 116 coordinates deployment of fire trucks vehicles to fires. The central dispatch station 116 is connected to the communication network 120 and receives information from the fire trucks 111–114 and the building 117 as described below. The display 148 is connected to the communication network 120 by way of the dispatch computer system 146 and receives digital video information from the communication network 120 by way of the dispatch computer system 146.

The building 117 comprises a building monitoring system 150 which further includes a building computer system 151 and a fire/smoke detection system 152. The building computer system 150 has stored therein building map information 154 and data 156 describing the storage locations of hazardous materials throughout the building 117. The fire/smoke detection system 152 comprises a plurality of fire/smoke detection sensors 157 and 158 (see FIG. 36) distributed throughout the building 117. Herein, a "fire/smoke detection sensor" is a sensor that is capable of detecting fire and/or smoke.

The building map information 154 may simply comprise a digitized form of the architectural plans for the building 117. Preferably, however, the building map information 154 is provided in a simplified format that shows only the basic layout of the building 117. Preferably, the building map information 154 also includes a plurality of GPS waypoints which pinpoint fiducial locations in the building 117 to permit registration of the building map information 154 with location information acquired from other GPS devices. In particular, the GPS coordinates are preferably used to relate specific locations shown on the building map to specific lateral/longitudinal coordinates, so that images of other objects having known GPS coordinates (such as the fire trucks 111–114 and the firefighters 118–119) superimposed on to the building map information 154, as detailed below.

Rather being stored in the building computer system 151, the building map information may alternatively be stored in the dispatch computer system 146 and/or in the computer systems 124 and 160. In this regard, it may be noted that most municipalities require that building plans be on file with the municipality. Therefore, it may be preferable as a practical matter to ensure that appropriate electronic building plans are also in place for all buildings in a municipality before a fire occurs. If necessary, simplified building maps may be generated based upon paper copies of on-file building plans, especially since only the most basic building plan information is used in the system 110.

The hazardous material information 156 comprises information which pertains to the types of hazardous materials located in the building 117 and information which pertains to the locations of the various types of hazardous materials in the building 117. Often, hazardous materials are stored in known production areas or in designated storage areas, and the hazardous material information may comprise the locations of these areas. Alternatively, containers that store the hazardous materials may be provided with position transponders to permit the location of the containers to be tracked in real time. In this event, the transponders are preferably provided with unique identifying codes to identify the container and thereby identify the hazardous material in the container as well as other specifics (e.g., amount, type, toxicity, volatility, age, and so on).

The firefighters 118–119 are assumed to be inside the building 117. As with the fire trucks 111–114, the firefighters 118–119 are provided with generally the same equipment even though only the firefighter 118 is shown in detail. The firefighter 118 is provided with a computer system 160, a digital camera 162, a microphone/speaker system 164, a display 166, a GPS receiver 168 and an oxygen sensor 170. Preferably, the devices 160–170 are lightweight, ruggedized, and integrally provided in the form of an intelligent helmet. The computer system 160 is connected to the communication network 120 by way of a cellular telephone modem as previously described in connection with the computer 125. The digital camera 162 is preferably mounted to provide a view of the fire in progress as seen by the firefighter 118. The microphone/speaker system 164 is mounted in the helmet and allows for voice communication with the firefighter 118 over the communication network 120. The display 166 may be provided in the form of a transparent eye piece which allows for the injection of video into the eye piece, such that the firefighter 118 can simultaneously view the video information as well as the firefighter's own surroundings (akin to night vision equipment). Alternatively, the display 158 may be provided in the form of a heads-up display in which video information is projected onto a visor of the helmet. Other arrangements may also be used, such as a small flat panel display mounted on an exterior surface of an arm panel of the firefighter's protective clothing. The GPS receiver 168 provides the computer 160 with the real time coordinates of the firefighter 118 inside the building 117, thereby allowing the firefighter's location to be transmitted over the communication network 120. Finally, the oxygen sensor 170 is also connected to the computer system 160 and permits the oxygen supply level available to the firefighter 118 to be broadcast over the communication network 120. Of course, other sensors could also be mounted in the helmet or elsewhere with the firefighter and used to broadcast information over the communication network 120.

Figure 36:
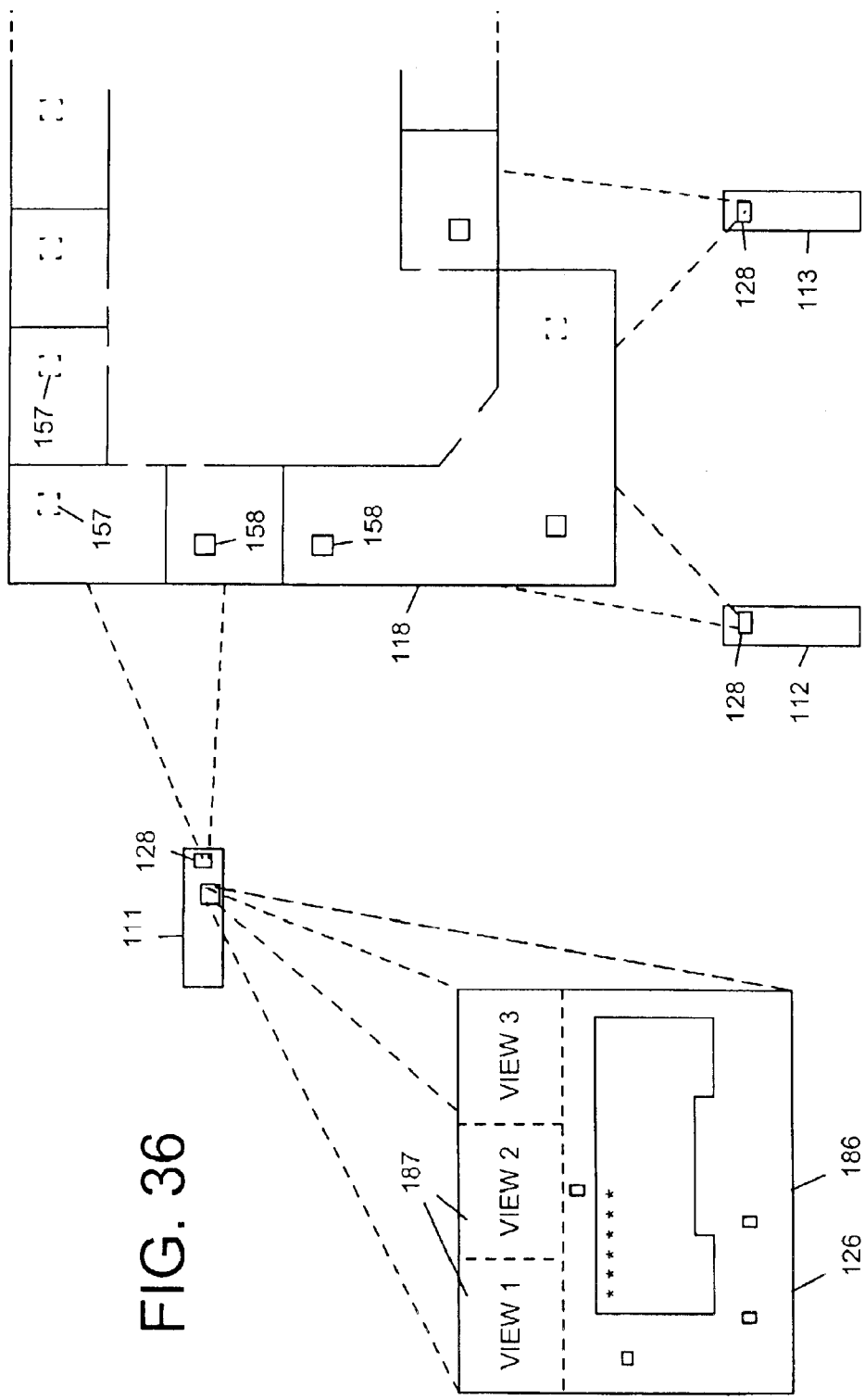
FIG. 36 is a diagram showing the operation of the system of FIG. 34.

Referring now to FIGS. 36–39, the operation of the system of FIG. 34 will now be described. FIG. 36 shows a simplified plan view of the building 117 (including interior office space, meeting rooms, corridors, laboratories, and/or warehouse space) which is assumed to be located at the scene of a fire. The fire trucks 111–114 as well as the firefighters 118–119 are located around the perimeter of the building 117 to fight the fire. In FIG. 36, only about one-half of one floor of the building 117 is shown, however, the building 117 is also shown on the display 128. The fire truck 114 is located at a position that cannot be seen in FIG. 36 except on the display 128.

Figure 37:
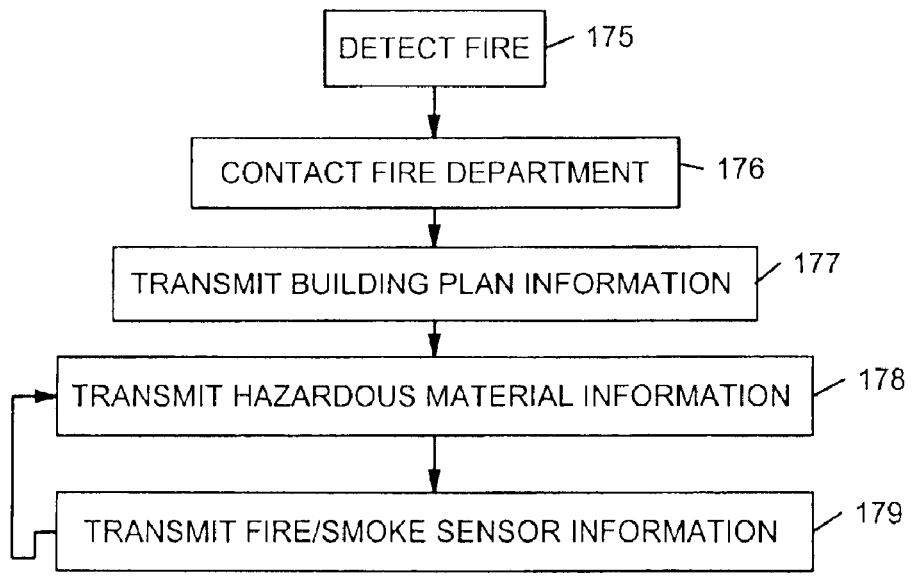
FIGS. 37–38 are flowcharts showing the operation of the system of FIG. 34 in greater detail.
Figure 38:
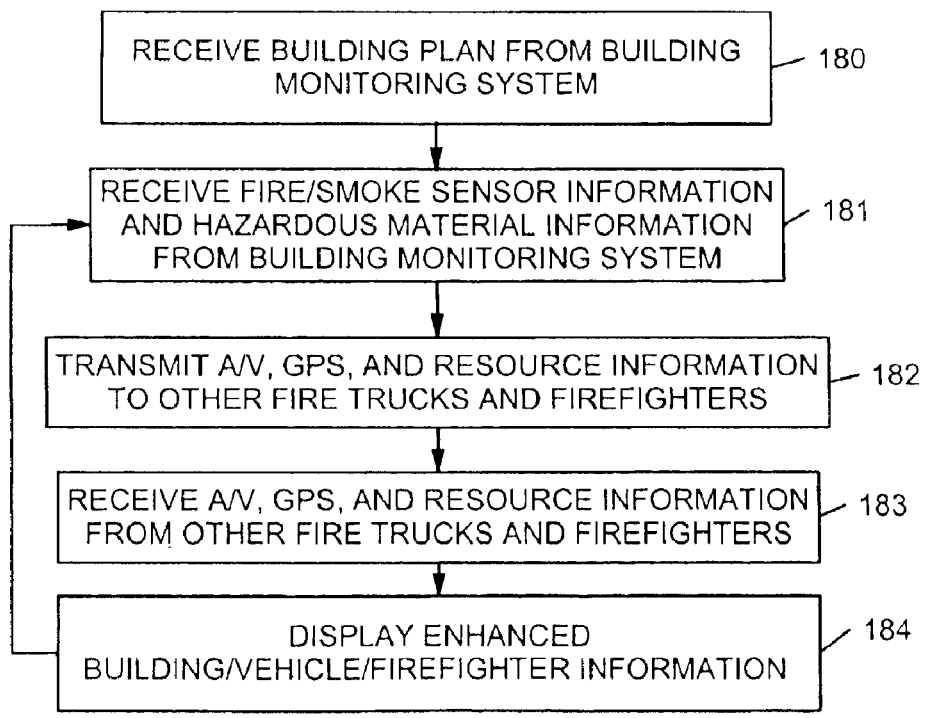

FIGS. 37–38 are flowcharts that describe the operation of the system of FIG. 34 in the context of the scene of FIG. 36. With reference to FIG. 37, FIG. 37 shows the operation of the building computer system 151. It may be noted that, although the steps are shown in a particular order in FIG. 37, there is no need for the steps to be performed in the order shown.

When a fire breaks out at the building 117, the fire is detected at step 175 by the building computer system 151 using the fire/smoke detection system 152. At step 176, the building computer system 151 contacts the local fire department, and in response the fire trucks 111–114 and firefighters 118–119 are deployed to the scene of the fire. At step 177, the building computer system 152 transmits the building map information 154 to the fire trucks 111–114, the central dispatch station 116, and the firefighters 118–119 by way of the communication network 120. For example, in the context of a municipal fire department, fire department officials may coordinate with the owners of local businesses and other buildings to ensure that the building computer system 151 is provided with e-mail an address for the dispatch computer system 146, which can then forward the building map information 154 to the computer systems 124 and 160. Alternatively, the building map information 154 and may be transmitted to the computer systems 124 and 160 directly, or may already be stored in the computer systems 124 and 160.

At step 178, the building computer system 151 transmits hazardous material information 156 to the fire trucks 111–114, the central dispatch station 116, and the firefighters 118–119 by way of the communication network 120. At step 179, the building computer system 151 transmits information from the fire/smoke detection system 152 to the fire trucks 111–114, the central dispatch station 116, and the firefighters 118–119 by way of the communication network 120. Again, the transmissions in steps 178 and 179 may occur either directly or indirectly by way of the dispatch station 116. Steps 178 and 179 are thereafter repeated at regular intervals throughout the duration of the fire or as long as the computer system 151 remains operational. (In this regard, it may be noted that, other than the sensors 157 and 158, some or all of the computer system 151 may be located off-site, thereby allowing the computer system 151 to remain operational throughout the duration of the fire.) Because the steps 178 and 179 are repeated at regular intervals, the fire trucks 111–114 and firefighters 118–119 are provided with information updated in real time pertaining to the locations of active fire/smoke detection sensors and the locations of hazardous materials (in the case where position transponders are used) inside the building at the scene of the fire.

With reference to FIG. 38, FIG. 38 shows the operation of the computer systems 124, 146, and 160. Again, although the steps are shown in a particular order in FIG. 38, there is no need for the steps to be performed in the order shown. After the fire breaks out, the computer systems 124, 146, and 160 receive the building map information 154 from the building monitoring system at step 180. At step 181, the computer systems 124, 146, and 160 receive updated information from the fire/smoke detection system 152 and updated hazardous material information 156.

At step 182, the computer systems 124 and 160 transmit audio-visual information, GPS location information, and resource information to other ones of the fire trucks 111–114 and the firefighters 118–119 by way of the communication network 120. It may be noted that the dispatch computer 146 does not perform step 182 in the illustrated embodiment. For the fire trucks 111–114, the transmitted audio-visual information includes digital image information acquired by the digital camera 126 and digital voice information acquired by the speaker/microphone system 127, the transmitted GPS information includes the GPS coordinates acquired by the GPS receivers 133, and the transmitted resource information includes the information generated by the resource monitoring sensors 130. For the firefighters 118–119, the transmitted audio-visual information includes digital image information acquired by the digital camera 162 and digital voice information acquired by the speaker/microphone system 164, the transmitted GPS information includes the GPS coordinates acquired by the GPS receiver 168, and the transmitted resource information includes information generated by the oxygen sensor 170.

At step 183, the computer systems 124, 146 and 160 receive the audio-visual information, GPS location information, and resource information from the other ones of the fire trucks 111–114 and firefighters 118–119 transmitted in step 182. At step 184, the computer systems 124, 146 and 160 drive the displays 128, 148 and 166, respectively, to display some or all of the information received at step 183.

FIG. 36 shows an image 186 generated by the display 128 of the fire truck 111 and displayed to an operator of the fire truck 111. Although the image is shown as being generated at the fire truck 111, the same or similar images are preferably also at the remaining fire trucks 112–114 and/or at the dispatch station 116. The same image could also be generated for the firefighters 118–119 by the display 166, however, it is preferred that the firefighters 118–119 be provided with a more simplified image as detailed below.

The image 186 includes multiple views 187 of the fire in progress. The views 187 may be displayed based on digital video information generated by the digital cameras 126 of any of the fire trucks 111–114 and/or based on digital video information generated by the digital cameras 162. Therefore, the operator of the fire trucks 111–114 and/or the dispatcher at the dispatch station 116 is provided with the ability to view the scene of the fire from multiple vantage points at a single, potentially remotely-located display.

Figure 39:
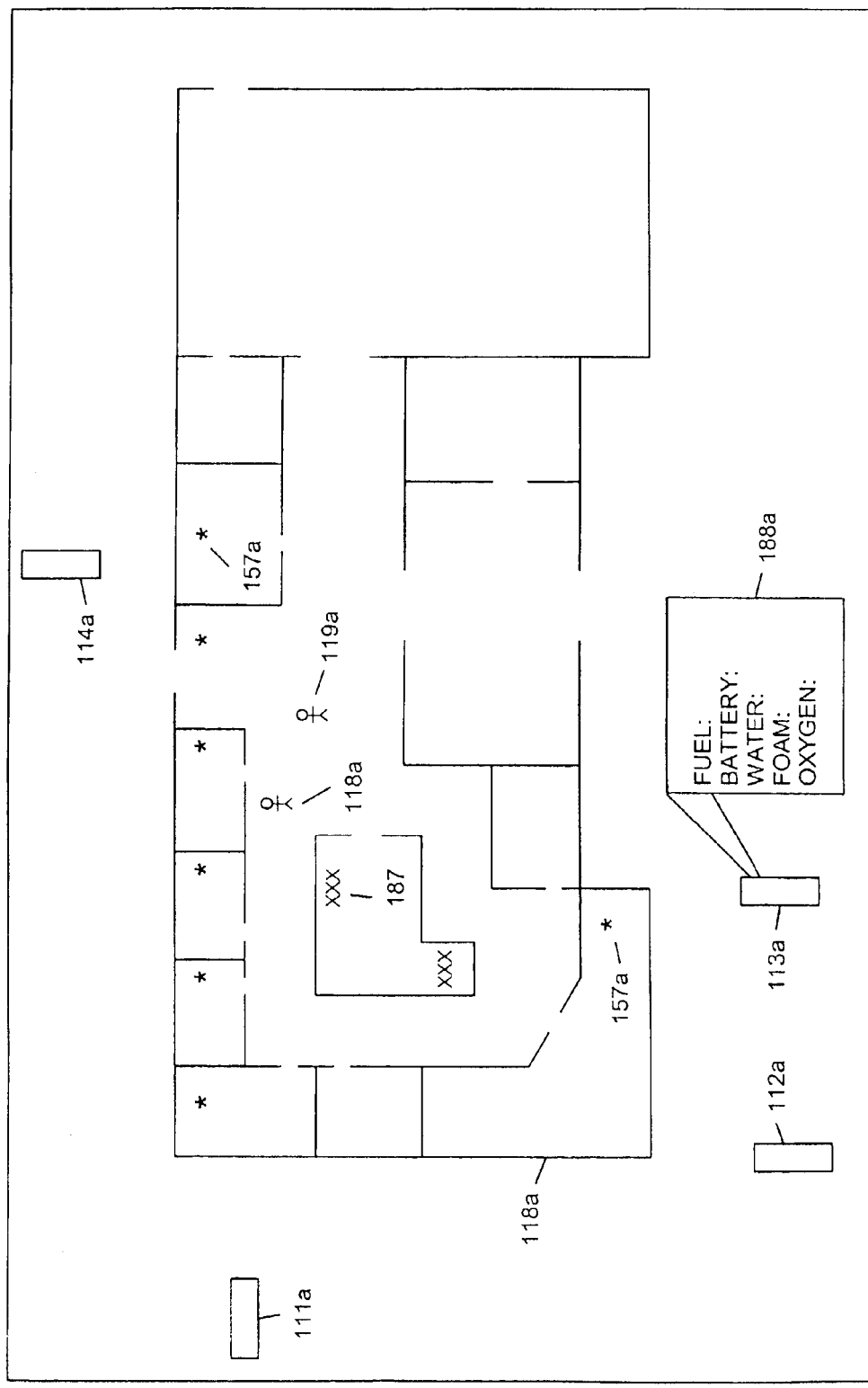
FIG. 39 is an image displayed to a user of the system of FIG. 34.

The image 186 also includes the building map information 154 received from the building computer system 151. The portion of the image 186 that includes the building map information as well as other information is shown in greater detail in FIG. 39. Referring now also to FIG. 39, the image 186 includes a plurality of icons used to display additional information to the operator. The computer 125 uses the GPS coordinates received from the GPS receivers 133 and 168 as previously described to display the icons simultaneously with the building map information 154, thereby displaying an enhanced building map that provides an overall indication of the relative locations of various components of the fire fighting system 110. Specifically, the image 186 includes icons 111a–114a that display the locations of the fire trucks 111–114, respectively, relative to the building 117. The image 186 also includes icons 111a–114a that display the locations of the fire trucks 111–114, respectively. The image 186 also includes icons 157a that indicate which ones of the fire/smoke detection sensors 157 are active (that is, are in a state that indicates that fire or smoke has been detected) and where the active sensors 157 are located. The image 186 also includes icons 159a that display the locations of the hazardous materials 159 located in the building 117.

The computer systems 124 and 146 are preferably provided with web browser interfaces, thereby allowing the operator to obtain additional, more detailed information by clicking on or touching (in the case of a touch screen interface) various portions of the image. The computer systems 124 and 146 then modify the image 186 in response to receiving the operator input. For example, as shown in FIG. 39, the operator is able to click on the icon 113a representing the fire truck 113 to display resource levels acquired by the resource monitoring sensors 130. Additionally, with reference to FIG. 36, when the operator clicks on the icon 113a for the fire truck 113, one of the views 187 changes so as to be supplied with digital video information supplied by the digital camera 126 mounted on the fire truck 113. In connection with the firefighters 118 and 119, the operator is able to click on the icons 118a and 119a to have the digital video information from the digital camera 162 displayed on the image 186, and to have an information displayed pertaining to the amount of oxygen remaining as detected by the oxygen level sensor 170. The operator is also able to click on one of the icons 118a–119a to establish a private voice communication link with the respective firefighter 118–119 to permit a particularly urgent message to be communicated to the firefighter 118–119 without the firefighter 118–119 being distracted by other voice traffic. The operator is also able to click on one of the icons 159a representing the hazardous material to find out additional information regarding the hazardous material, such as information pertaining to the amount, type, toxicity, volatility, age, and so on of the hazardous material. Some of this information may also be communicated by adjusting the appearance of the icon 159a (e.g., the icons 159a may be formed of different letters to represent different types of hazardous materials). The operator can also click on one of the views 187 to have the view displayed in a larger format.

It is therefore seen that a tremendous amount of detailed information regarding the scene of the fire is easily accessible to the operator of the fire trucks 111–114 and the dispatcher at the dispatch station 116. This information can be used to facilitate resource deployment decisions. For example, in FIG. 39, the fire chief may decide to move the fire truck 112 to a position between the fire trucks 111 and 114, since the information in FIG. 39 indicates that more resources are needed on the other side of the building 117. This is especially the case because the locations of hazardous materials inside the building 117 are known, and it may be possible to fight the fire in a manner that prevents the fire from spreading to portions of the building 117 that store hazardous materials. Alternatively, depending on the situation, it may be possible to deploy firefighters to extricate stored hazardous materials from the building 117. Such a dangerous activity, if undertaken, can be carefully monitored in real time from the fire trucks 111–114 or the dispatch station 116 because the locations of the firefighters 118–119, the locations of active fire/smoke detection sensors 157, and the locations of the hazardous materials can be monitored in real time. Therefore, firefighter safety and fire fighting effectiveness are improved.

As previously noted, the fire trucks 111–114 are provided with the microphone/speaker systems 127 and the firefighters are provided with the microphone/speaker systems 164 that are used to acquire and exchange voice data. Preferably, the icons 111a–114a and 118a–119a are displayed differently (i.e., highlighted) when voice data is received from the respective fire truck 111–114 or the respective firefighter 118a–119a. As a result, when an operator of the fire truck 111 is listening to voice data come over the speaker system 127, for example, the image 186 provides the operator with an indication of which firefighter or fire truck operator is talking by highlighting the appropriate icon 111a–114a and 118a–119a. Additionally, by clicking on the appropriate firefighter icon 118a–119a, it is possible to also view the digital video information acquired by the digital camera 162 carried by the firefighter 118 or 119, and thereby view the scene of the fire from the perspective of the firefighter inside the building. This arrangement therefore greatly enhances improves the ability to communicate with firefighters located inside the building 117 at the scene of the fire, and therefore further improves firefighter safety and effectiveness.

In addition to displaying resource information for one fire truck/firefighter at a time, it may also be desirable to provide a resource manager window as shown in FIG. 40. Referring now to FIG. 40, the resource manager 189 is executed by the computer systems 124 and 146 and displayed on the displays 128 and 148. The resource manager displays information regarding levels of consumable resources available as indicated by the sensors 130 and 170. The information is displayed in the form of a chart with the consumable resource levels of each of the fire trucks 111–114 and firefighters 118–119 being displayed in the form of amount of time remaining before the consumable resource is completely depleted. Therefore, it is possible for a fire chief, dispatcher or other responsible party to quickly assess system status and determine when/where reinforcement resources will be required.

As previously noted, the same information that is transmitted to the fire trucks 111–114 is preferably also transmitted to the firefighters 118–119 inside the building 117. The image displayed to the firefighters 118–119 may be the same as the image 186 displayed to the operator of the fire trucks 111–114. The firefighters 118–119 are therefore provided with building map information for the building 117. Additionally, the firefighters 118–119 are also provided with a superimposed indication of their current position (updated in real time) inside the building 117 as well as a superimposed indication of the location (also updated in real time) of active fire/smoke detection sensors 157. Advantageously, this arrangement increases firefighter safety and effectiveness by allowing the firefighters 118–119 to navigate the building 117 more safely and with greater ease.

Preferably, the computer system 160 is equipped with voice recognition software to permit the computer system 160 to adjust the image displayed to the firefighter 118 in response to voice commands. The voice command interface may be used in lieu of the point and click operator interface or touch screen interface described above and to cause the computer system 160 to perform other specific tasks. For example, when the firefighter wishes to exit the building 117, the firefighter 118 is provided with the ability to issue a voice command to the computer system 160 (such as "find the nearest exit"). The computer system 160 then executes a pre-stored exit-finding algorithm to determine the nearest safe exit (taking into account active or previously active fire alarms) and displays a series of arrows that guide the firefighter 118 to the exit. The arrows are preferably provided with a 3-D appearance such that the arrows appear closer as the firefighter 118 approaches the point at which a right/left turn is required. More complicated direction-giving schemes could also be used. For example, the entire interior of the building 117 may be displayed in 3-D format, such that structures in the building 117 are seen to move past the firefighter 118 as the firefighter 118 progresses through the building (in a manner akin to modern virtual reality video games), thereby allowing particular doors to be highlighted by the computer system 160 as the firefighter 118 moves through the building 117. This approach, however, is not preferred.

Figure 41:
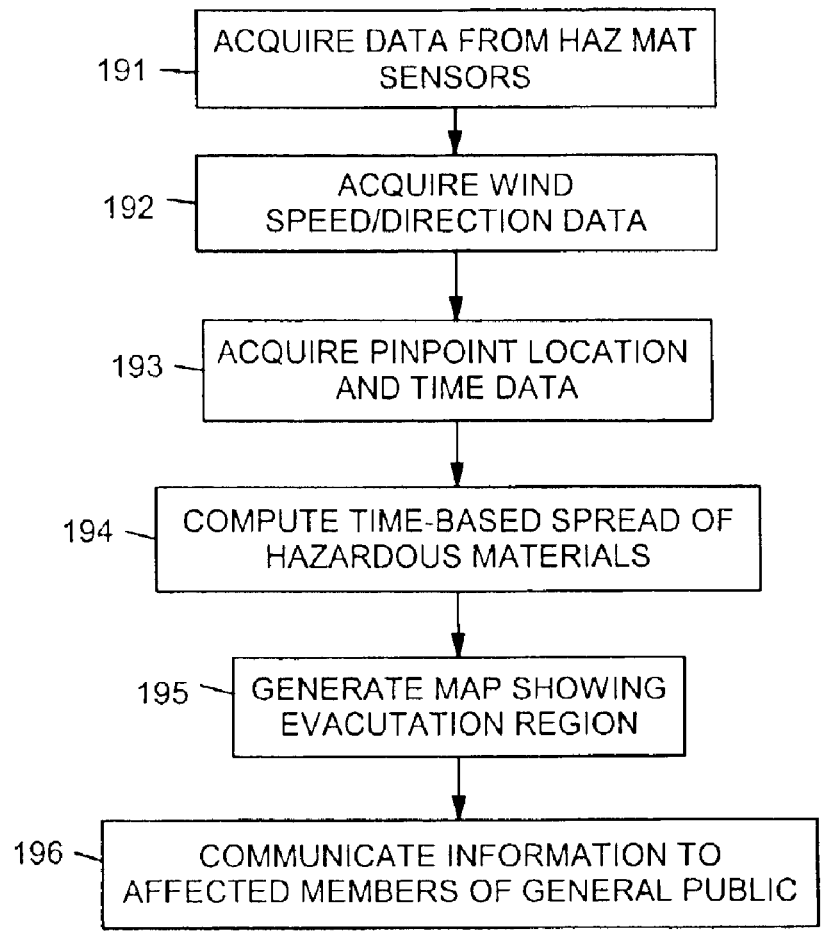
FIG. 41 is a flowchart showing another aspect of the operation of the system of FIG. 34 in greater detail.

The communication network 120 may also be used to communicate emergency information to the general public. For example, with reference to FIG. 41, evacuation information may be communicated. Thus, at step 191 of FIG. 41, data is acquired from hazardous material sensors 132. At step 192, wind speed/direction data is acquired from sensors 134. Preferably, step 191 is performed over several minutes to obtain not just instantaneous wind speed but also a profile of wind gusts. At step 193, the computer system 124 receives pinpoint location and time information describing the time at which the hazardous materials began to be spread and the source location. This information, for example, may be manually entered by an operator. At step 194, a rate of movement of the hazardous materials is computed based on the wind speed and direction. At step 195, a map is generated showing a tentative evacuation region. At step 196, an electronic alert message is sent to residents of the geographic area to advise the residents of the threat of the hazardous material. The electronic alert message (e.g., an e-mail message) may be used to complement other forms of communication (e.g., a siren) to provide residents with more detailed information as to the nature of the threat and/or written instructions as to how to proceed.

The preferred fire fighting system 110 therefore also improves community safety. As previously discussed, in situations where the scene of the fire stores hazardous materials, community safety is improved because the firefighters are provided with more information regarding the location, types, amounts and so on of hazardous materials at the scene of the fire and therefore are better able to tailor their fire fighting efforts to prevent the release of hazardous materials into the atmosphere. Additionally, in situations where hazardous materials are released, citizens are provided with better information regarding the nature of the threat and therefore are more likely to respond appropriately.

5. Additional Aspects

From the foregoing description, a number advantages of the preferred fire truck control system are apparent. In general, the control system is easier to use, more flexible, more robust, and more reliable than existing fire truck control systems. In addition, because of these advantages, the control system also increases firefighter safety because the many of the functions that were previously performed by firefighters are performed automatically, and the control system also makes possible features that would otherwise be impossible or at least impractical. Therefore, firefighters are freed to focus on fighting fires.

The control system is easier to use because the control system provides a high level of cooperation between various vehicle subsystems. The control system can keep track of the mode of operation of the fire truck, and can control output devices based on the mode of operation. The functions that are performed on the fire truck are more fully integrated to provide a seamless control system, resulting in better performance.

For example, features such as load management and load sequencing are implemented in the control program executed by the central control unit. No additional hardware is required to implement load management and load sequencing. Therefore, if it is desired to change the order of load sequencing, all that is required is to modify the control program. It is also possible to have different load sequencing defined for different modes of operation of the vehicle with little or no increase in hardware. The manner in which load management is performed can also be changed dynamically during the operation of the fire truck.

The control system is robust and can accept almost any new feature without changes in wiring. Switches are connected to a central control unit and not to outputs directly, and new features can be programmed into the control program executed by the central control unit. A system can be modified by adding a new switch to an existing interface module, or by modifying the function of an existing switch in the control program. Therefore, modifying a system that is already in use is easy because little or no wiring changes are required.

Additionally, because the control system has access to input status information from most or all of the input devices on the fire truck and has control over most or all of the output devices on the fire truck, a high level of cooperation between the various subsystems on the fire truck is possible. Features that require the cooperation of multiple subsystems are much easier to implement.

The fire truck is also easier to operate because there is improved operator feedback. Displays are provided which can be used to determine the I/O status of any piece of equipment on the vehicle, regardless of the location of the display. Additionally, the displays facilitate troubleshooting, because troubleshooting can be performed in real time at the scene of a fire when a problem is occurring. Troubleshooting is also facilitated by the fact that the displays are useable to display all of the I/O status information on the fire truck. There is no need for a firefighter to go to different locations on the fire truck to obtain required information. Troubleshooting is also facilitated by the provision of a central control unit which can be connected by modem to another computer. This allows the manufacturer to troubleshoot the fire truck as soon as problems arise.

LED indicators associated with switches also improve operator feedback. The LEDs indicate whether the switch is considered to be off or on, or whether the switch is considered to be on but the output device controlled by the switch is nevertheless off due to some other condition on the fire truck.

Because the control system is easier to use, firefighter safety is enhanced. When a firefighter is fighting fires, the firefighter is able to more fully concentrate on fighting the fire and less on having to worry about the fire truck. To the extent that the control system accomplishes tasks that otherwise would have to be performed by the firefighter, this frees the firefighter to fight fires.

The control system is also more reliable and maintainable, in part because relay logic is replaced with logic implemented in a control program. The logic in the control program is much easier to troubleshoot, and troubleshooting can even occur remotely by modem. Also mechanical circuit breakers can be replaced with electronic control, thereby further reducing the number of mechanical failure points and making current control occur more seamlessly. The simplicity of the control system minimizes the number of potential failure points and therefore enhances reliability and maintainability.

The system is also more reliable and more maintainable because there is less wire. Wiring is utilized only to established dedicated links between input/output devices and the interface module to which they are connected. The control system uses distributed power distribution and data collecting. The interface modules are interconnected by a network communication link instead of a hardwired link, thereby reducing the amount of wiring on the fire truck. Most wiring is localized wiring between the I/O devices and a particular interface module.

Additionally, the interface modules are interchangeable units. In the disclosed embodiment, the interface modules 20 are interchangeable with each other, and the interface modules 30 are interchangeable with each other. If a greater degree of interchangeability is required, it is also possible to use only a single type of interface module. If the control system were also applied to other types of equipment service vehicles (e.g., snow removal vehicles, refuse handling vehicles, cement/concrete mixers, military vehicles such as those of the multipurpose modular type, on/off road severe duty equipment service vehicles, and so on), the interface modules would even be made interchangeable across platforms since each interface module views the outside world in terms of generic inputs and outputs, at least until configured by the central control unit. Because the interface modules are interchangeable, maintainability is enhanced. An interface module that begins to malfunction due to component defects may be replaced more easily. On power up, the central control unit downloads configuration information to the new interface module, and the interface module becomes fully operational. This enhances the maintainability of the control system.

Because the interface modules are microprocessor-based, the amount of processing required by the central control unit as well as the amount of communication that is necessary between the interface modules and the central control unit is reduced. The interface modules perform preprocessing of input signals and filter out less critical input signals and, as a result, the central control unit receives and responds to critical messages more quickly.

B. Military Vehicle Control System

Figure 14:
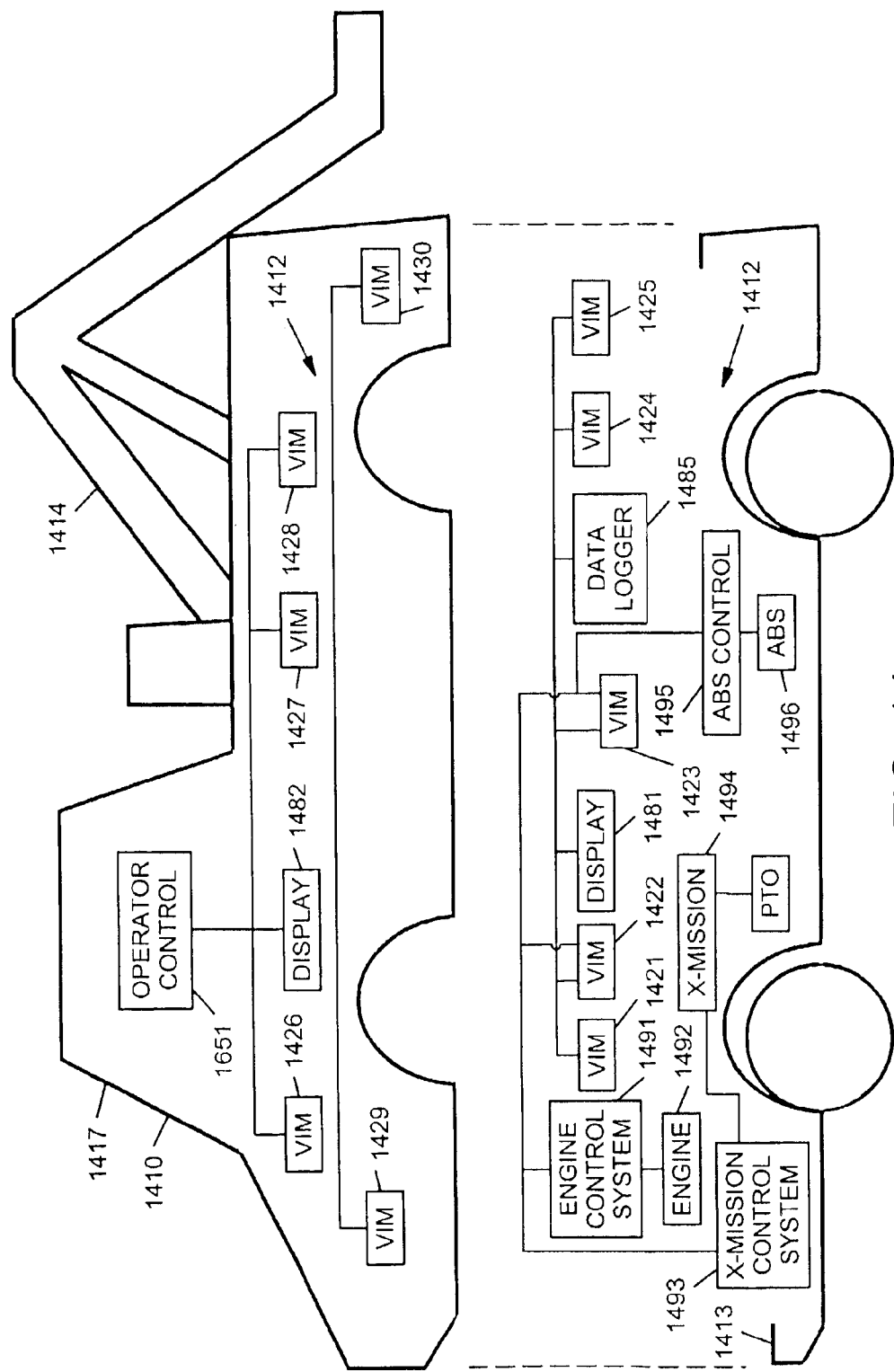
FIG. 14 is a schematic view of a military vehicle having a control system according to another embodiment of the present invention.

Referring now to FIG. 14, a preferred embodiment of a military vehicle 1410 having a control system 1412 is illustrated. As previously indicated, the control system described above can be applied to other types of equipment service vehicles, such as military vehicles, because the interface modules view the outside world in terms of generic inputs and outputs. Most or all of the advantages described above in the context of fire fighting vehicles are also applicable to military vehicles. As previously described, however, it is sometimes desirable in the context of military applications for the military vehicle control system to be able to operate at a maximum level of effectiveness when the vehicle is damaged by enemy fire, nearby explosions, and so on. In this situation, the control system 1412 preferably incorporates a number of additional features, discussed below, that increase the effectiveness of the control system 1412 in these military applications.

By way of overview, the control system 1412 comprises a plurality of microprocessor-based interface modules 1420, a plurality of input and output devices 1440 and 1450 (see FIG. 15) that are connected to the interface modules 1420, and a communication network 1460 that interconnects the interface modules 1420. The control system 1412 preferably operates in the same manner as the control system 12 of FIGS. 1–13, except to the extent that differences are outlined are below. A primary difference between the control system 12 and the control system 1412 is that the control system 1412 does not include a central control unit that is implemented by a single device fixed at one location. Rather, the control system 1412 includes a central control unit that is allowed to move from location to location by designating one of the interface modules 1420 as a "master" interface module and by further allowing the particular interface module that is the designated master interface module to change in response to system conditions. As will be detailed below, this feature allows the control system 1412 to operate at a maximum level of effectiveness when the military vehicle 1410 is damaged. Additional features that assist failure management are also included.

Figure 20:
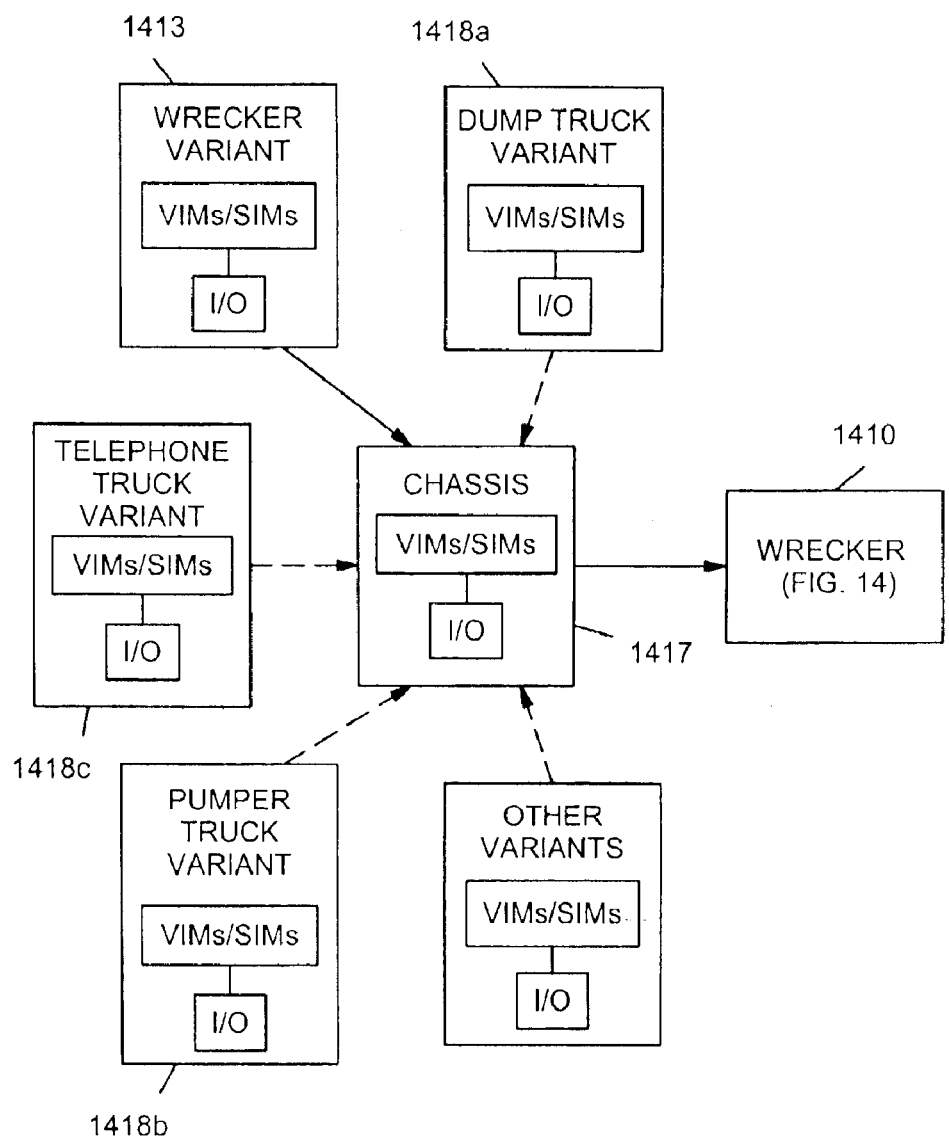
FIG. 20 is an overview of a preferred variant vehicle system.

More specifically, in the illustrated embodiment, the control system 1412 is used in connection with a military vehicle 1410 which is a multipurpose modular military vehicle. As is known, a multipurpose module vehicle comprises a chassis and a variant module that is capable of being mounted on the chassis, removed, and replaced with another variant module, thereby allowing the same chassis to be used for different types of vehicles with different types of functionality depending on which variant module is mounted to the chassis. In the illustrated embodiment, the military vehicle 1410 is a wrecker and includes a wrecker variant module 1413 mounted on a chassis (underbody) 1417 of the military vehicle 1410. The weight of the variant module 1413 is supported by the chassis 1417. The variant module 1413 includes a mechanical drive device 1414 capable of imparting motion to solid or liquid matter that is not part of the military vehicle 1410 to provide the military vehicle 1410 with a particular type of functionality. In FIG. 14, where the variant module 1413 is a wrecker variant, the mechanical drive device is capable of imparting motion to a towed vehicle. As shown in FIG. 20, the variant module 1413 is removable and replaceable with other types of variant modules, which may include a dump truck variant 1418a, a water pump variant 1418b, a telephone variant 1418c, and so on. Thus, for example, the wrecker variant 1413 may be removed and replaced with a water pump variant 1418b having a different type of drive mechanism (a water pump) to provide a different type of functionality (pumper functionality). The I/O devices 1440 and 1450 used by the vehicle 1410 include devices that are the same as or similar to the non-fire truck specific I/O devices of FIGS. 1–13 (i.e., those types of I/O devices that are generic to most types of vehicles), as well as I/O devices that are typically found on the specific type of variant module chosen (in FIG. 14, a wrecker variant).

The interface modules 1420 are constructed in generally the same manner as the interface modules 20 and 30 and each include a plurality of analog and digital inputs and outputs. The number and type of inputs and outputs may be the same, for example, as the vehicle interface modules 30. Preferably, as described in greater detail below, only a single type of interface module is utilized in order to increase the field serviceability of the control system 1412. Herein, the reference numeral 1420 is used to refer to the interface modules 1420 collectively, whereas the reference numerals 1421–1430 are used to refer to specific ones of the interface modules 1420. The interface modules are described in greater detail in connection with FIGS. 15–18.

Also connected to the communication network 1460 are a plurality of displays 1481 and 1482 and a data logger 1485. The displays 1481 and 1482 permit any of the data collected by the control system 1412 to be displayed in real time, and also display warning messages. The displays 1481 and 1482 also include membrane pushbuttons that allow the operators to scroll through, page through, or otherwise view the screens of data that are available. The membrane pushbuttons may also allow operators to change values of parameters in the control system 1412. The data logger 1485 is used to store information regarding the operation of the military vehicle 1410. The data logger 1485 may also be used as a "black box recorder" to store information logged during a predetermined amount of time (e.g., thirty seconds) immediately prior to the occurrence of one or more trigger events (e.g., events indicating that the military vehicle 1410 has been damaged or rendered inoperative, such as when an operational parameter such as an accelerometer threshold has been exceeded).

Finally, FIG. 14 shows an engine system including an engine 1492 and an engine control system 1491, a transmission system including a transmission 1493 and a transmission control system 1494, and an anti-lock brake system including an anti-lock brake control system 1495. These systems may be interconnected with the control system 1412 in generally the same manner as discussed above in connection with the engine 92, the engine control system 91, the transmission 93, the transmission control system 94, and the anti-lock brake system 36 of FIG. 1.

Figure 15:
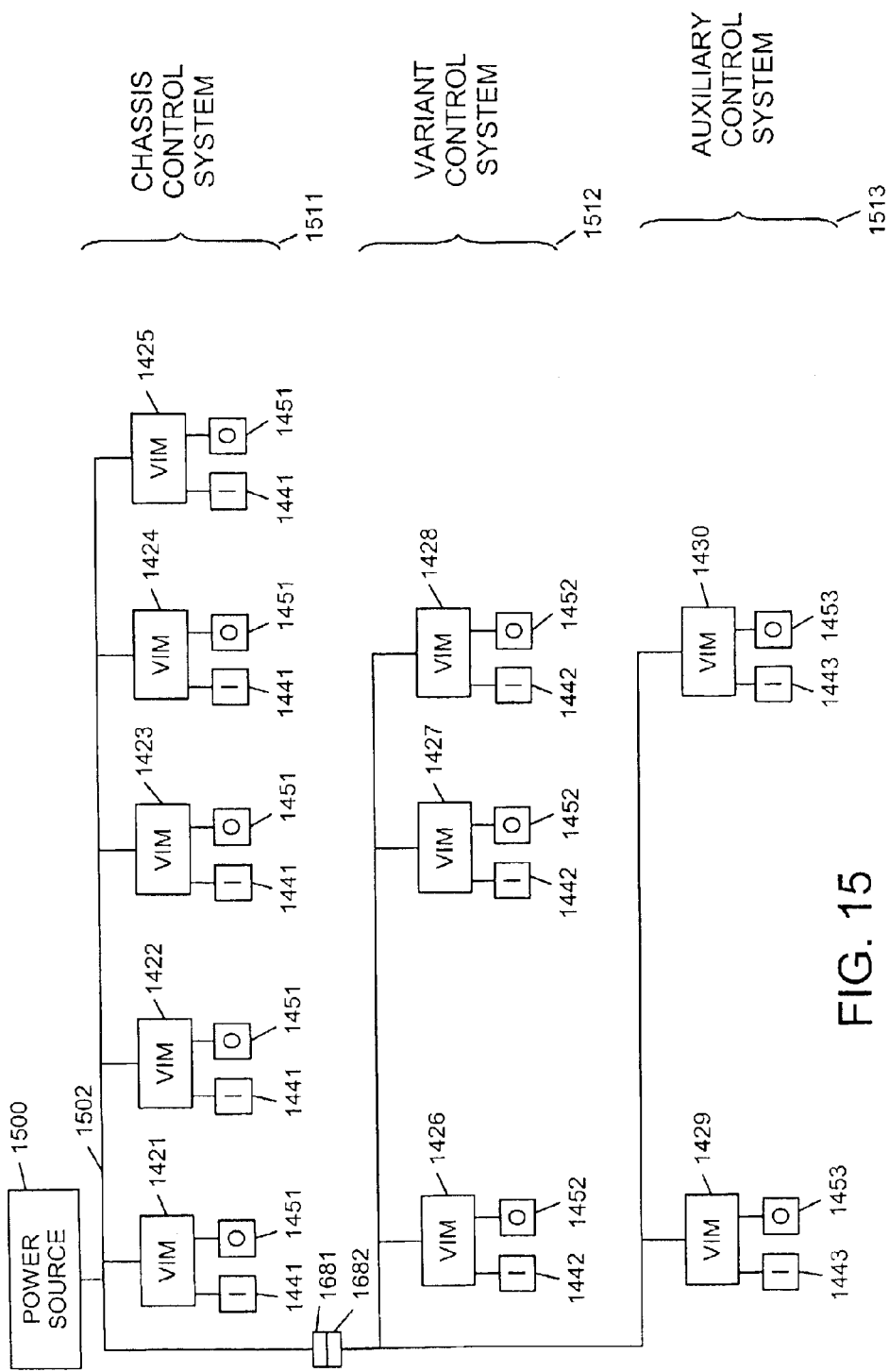
FIGS. 15–16 are block diagrams of the control system of FIG. 14 showing selected aspects of the control system in greater detail.

Referring now also to FIGS. 15–18, the structure and interconnection of the interface modules 1420 is described in greater detail. Referring first to FIG. 15, the interconnection of the interface modules 1420 with a power source 1500 is described. The interface modules 1420 receive power from the power source 1500 by way of a power transmission link 1502. The interface modules 1420 are distributed throughout the military vehicle 1410, with some of the interface modules 1420 being located on the chassis 1417 and some of the interface modules 1420 being located on the variant module 1413.

The control system is subdivided into three control systems including a chassis control system 1511, a variant control system 1512, and an auxiliary control system 1513. The chassis control system 1511 includes the interface modules 1421–1425 and the I/O devices 1441 and 1451, which are all mounted on the chassis 1417. The variant control system 1512 includes the interface modules 1426–1428 and the I/O devices 1442 and 1452, which are all mounted on the variant module 1413. The auxiliary control system 1513 includes the interface modules 1429–1430 and the I/O devices 1443 and 1453, which may be mounted on either the chassis 1417 or the variant module 1413 or both.

The auxiliary control system 1513 may, for example, be used to control a subsystem that is disposed on the variant module but that is likely to be the same or similar for all variant modules (e.g., a lighting subsystem that includes headlights, tail lights, brake lights, and blinkers). The inclusion of interface modules 1420 within a particular control system may also be performed based on location rather than functionality. For example, if the variant module 1413 has an aerial device, it may be desirable to have one control system for the chassis, one control system for the aerial device, and one control system for the remainder of the variant module. Additionally, although each interface module 1420 is shown as being associated with only one of the control systems 1511–1513, it is possible to have interface modules that are associated with more than one control system. It should also be noted that the number of sub-control systems, as well as the number of interface modules, is likely to vary depending on the application. For example, a mobile command vehicle is likely to have more control subsystems than a wrecker variant, given the large number of I/O devices usually found on mobile command vehicles.

The power transmission link 1502 may comprise a single power line that is routed throughout the military vehicle 1410 to each of the interface modules 1420, but preferably comprises redundant power lines. Again, in order to minimize wiring, the interface modules 1420 are placed so as to be located as closely as possible to the input devices 1440 from which input status information is received and the output devices 1450 that are controlled. This arrangement allows the previously-described advantages associated with distributed data collection and power distribution to be achieved. Dedicated communication links, which may for example be electric or photonic links, connect the interface modules 1421–1430 modules with respective ones of the I/O devices, as previously described.

Figure 16:
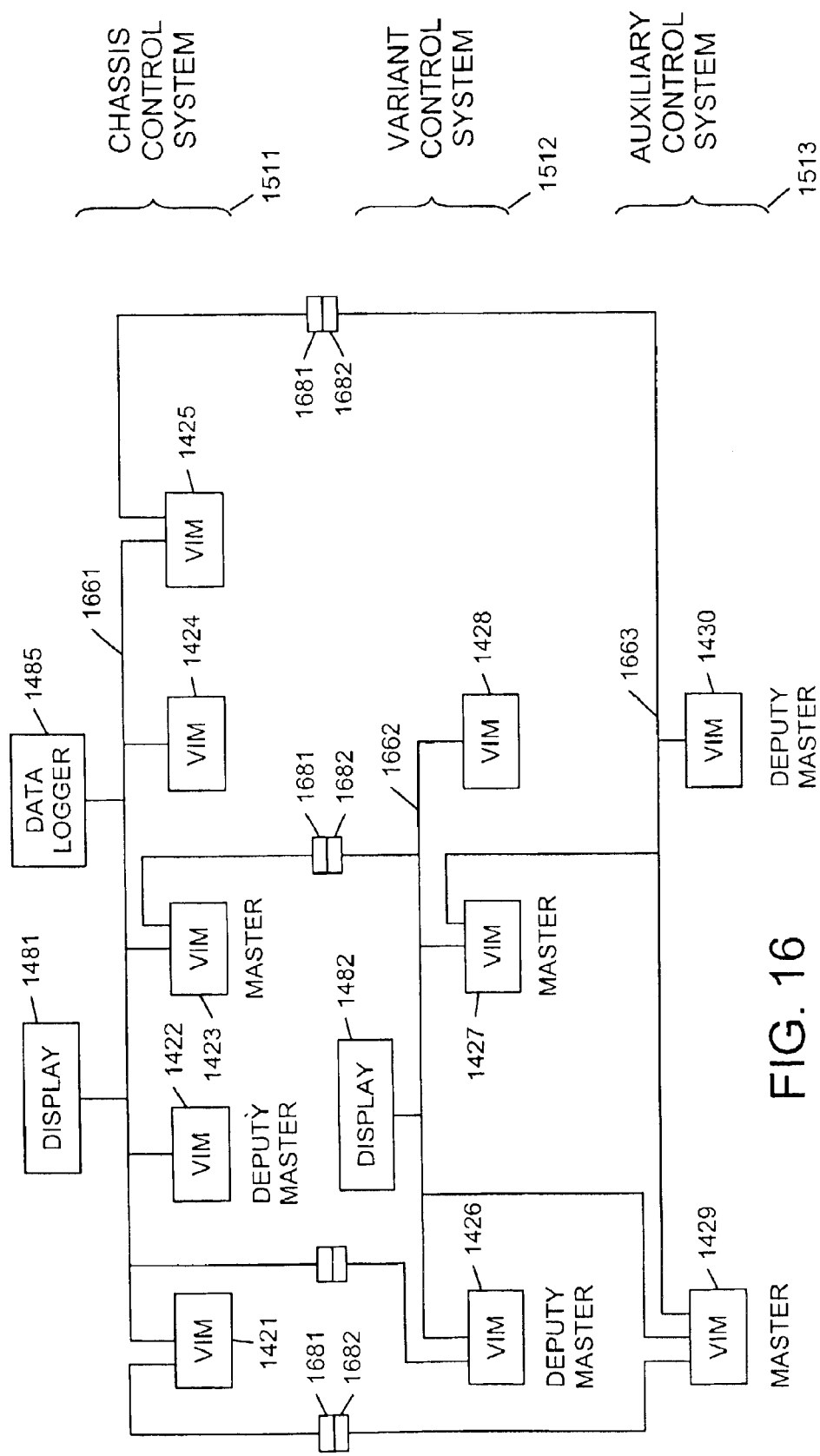
Figure 17A:
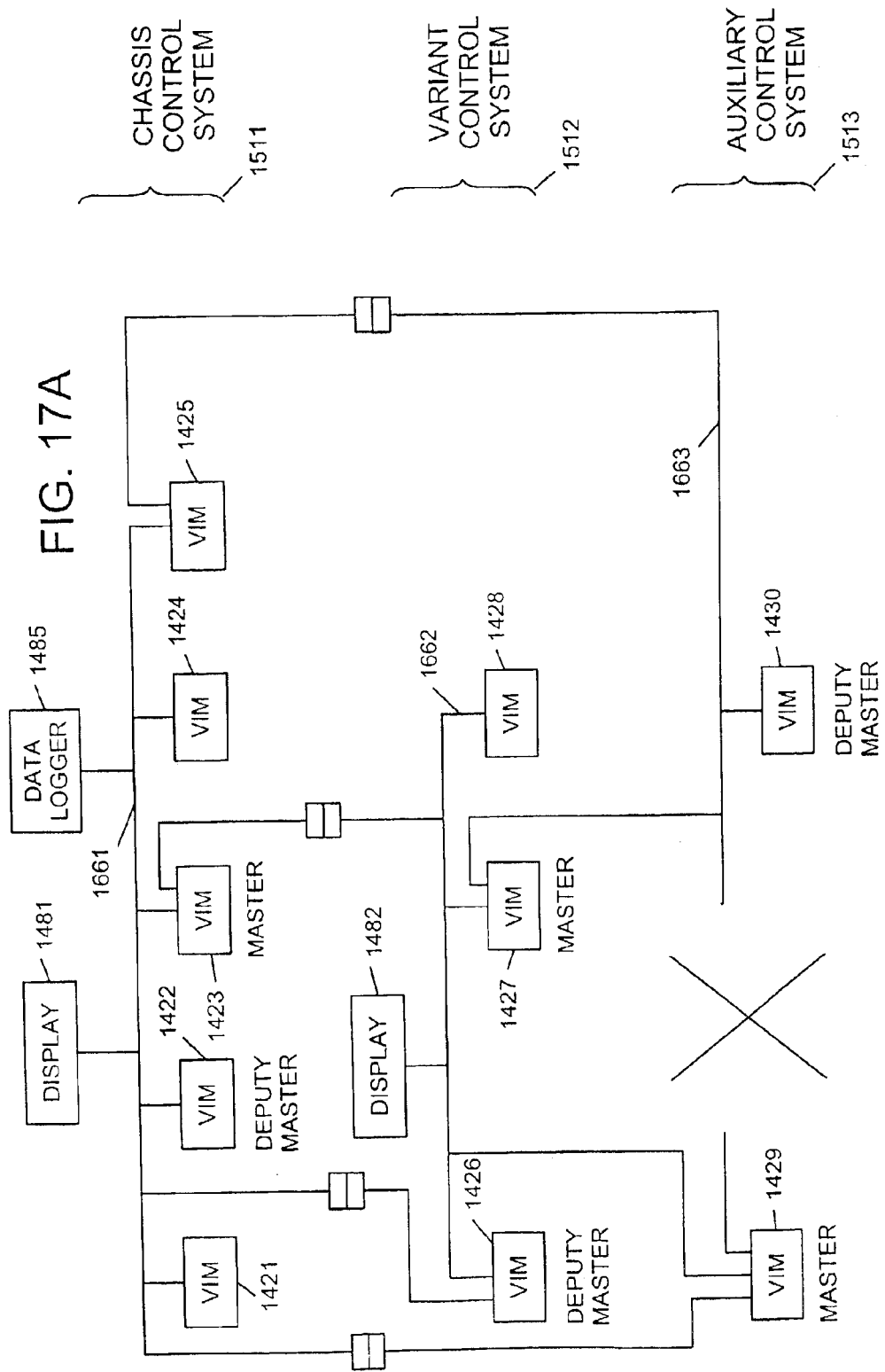

Referring next to FIG. 16, the interconnection of the interface modules 1420 by way of the communication network 1460 is illustrated. As previously indicated, the control system 1412 is subdivided into three control systems 1511, 1512 and 1513. In accordance with this arrangement, the communication network 1460 is likewise further subdivided into three communication networks 1661, 1662, and 1663. The communication network 1661 is associated with the chassis control system 1511 and interconnects the interface modules 1421–1425. The communication network 1662 is associated with the variant control system 1512 and interconnects the interface modules 1426–1428. The communication network 1663 is associated with the auxiliary control system 1513 and interconnects the interface modules 1429–1430. Communication between the control systems 1511–1513 occurs by way of interface modules that are connected to multiple ones of the networks 1661–1663. Advantageously, this arrangement also allows the interface modules to reconfigure themselves to communicate over another network in the event that part or all of their primary network is lost. For example, in FIG. 17A, when a portion of the communication network 1663 is lost, the interface module 1429 reconfigures itself to communicate with the interface module 1430 by way of the communication network 1662 and the interface module 1427.

In practice, each of the communication networks 1661–1663 may be formed of two or more communication networks to provide redundancy within each control system. Indeed, the connection of the various interface modules 1420 with different networks can be as complicated as necessary to obtain the desired level of redundancy. For simplicity, these potential additional levels of redundancy will be ignored in the discussion of FIG. 16 contained herein.

The communication networks 1661–1663 may be implemented in accordance with SAE J1708/1587 and/or J1939 standards, or some other network protocol, as previously described. The transmission medium is preferably fiber optic cable in order to reduce the amount of electromagnetic radiation that the military vehicle 1410 produces, therefore making the vehicle less detectable by the enemy. Fiber optic networks are also more robust to the extent that a severed fiber optic cable is still usable to create two independent networks, at least with reduced functionality.

When the variant module 1413 is mounted on the chassis 1417, connecting the chassis control system 1511 and the variant control system 1512 is achieved simply through the use of two mating connectors 1681 and 1682 that include connections for one or more communication busses, power and ground. The chassis connector 1682 is also physically and functionally mateable with connectors for other variant modules, i.e., the chassis connector and the other variant connectors are not only capable of mating physically, but the mating also produces a workable vehicle system. A given set of switches or other control devices 1651 on the dash (see FIG. 14) may then operate differently depending on which variant is connected to the chassis. Advantageously, therefore, it is possible to provide a single interface between the chassis and the variant module (although multiple interfaces may also be provided for redundancy). This avoids the need for a separate connector on the chassis for each different type of variant module, along with the additional unutilized hardware and wiring, as has conventionally been the approach utilized.

Upon power up, the variant control system 1512 and the chassis control system 1511 exchange information that is of interest to each other. For example, the variant control system 1512 may communicate the variant type of the variant module 1413. Other parameters may also be communicated. For example, information about the weight distribution on the variant module 1413 may be passed along to the chassis control system 1511, so that the transmission shift schedule of the transmission 1493 can be adjusted in accordance with the weight of the variant module 1413, and so that a central tire inflation system can control the inflation of tires as a function of the weight distribution of the variant. Similarly, information about the chassis can be passed along to the variant. For example, where a variant module is capable of being used by multiple chassis with different engine sizes, engine information can be communicated to a wrecker variant module so that the wrecker variant knows how much weight the chassis is capable of pulling. Thus, an initial exchange of information in this manner allows the operation of the chassis control system 1511 to be optimized in accordance with parameters of the variant module 1413, and vice versa.

It may also be noted that the advantages obtained for military variants can also be realized in connection with commercial variants. Thus, a blower module, a sweeper module, and a plow module could be provided for the same chassis. This would allow the chassis to be used for a sweeper in summer and a snow blower or snow plow in winter.

As shown in FIG. 16, each control system 1511–1513 includes an interface module that is designated "master" and another that is designated "deputy master." Thus, for example, the chassis control system 1511 includes a master interface module 1423 and a deputy master interface module 1422. Additional tiers of mastership may also be implemented in connection with the interface modules 1421, 1424 and 1425.

The interface modules 1420 are assigned their respective ranks in the tiers of mastership based on their respective locations on the military vehicle 1410. A harness connector at each respective location of the military vehicle 1410 connects a respective one of the interface modules 1420 to the remainder of the control system 1412. The harness connector is electronically keyed, such that being connected to a particular harness connector provides an interface module 1420 with a unique identification code or address M. For simplicity, the value M is assumed to be a value between 1 and N, where N is the total number of interface modules on the vehicle (M=10 in the illustrated embodiment).

The interface modules 1420 each store configuration information that, among other things, relates particular network addresses with particular ranks of mastership. Thus, for example, when the interface module 1423 boots up, it ascertains its own network address and, based on its network address, ascertains that it is the master of the control system 1511. The interface module 1423 serves as the central control unit so long as the interface module 1423 is competent to do so. As shown in FIG. 17B, if it is determined that the interface module 1423 is no longer competent to serve as master (e.g., because the interface module 1423 has been damaged in combat), then the interface module 1422 becomes the master interface module and begins serving as the central control unit. This decision can be made, for example, by the interface module 1423 itself, based on a vote taken by the remaining interface modules 1420, or based on a decision by the deputy master.

Figure 18:
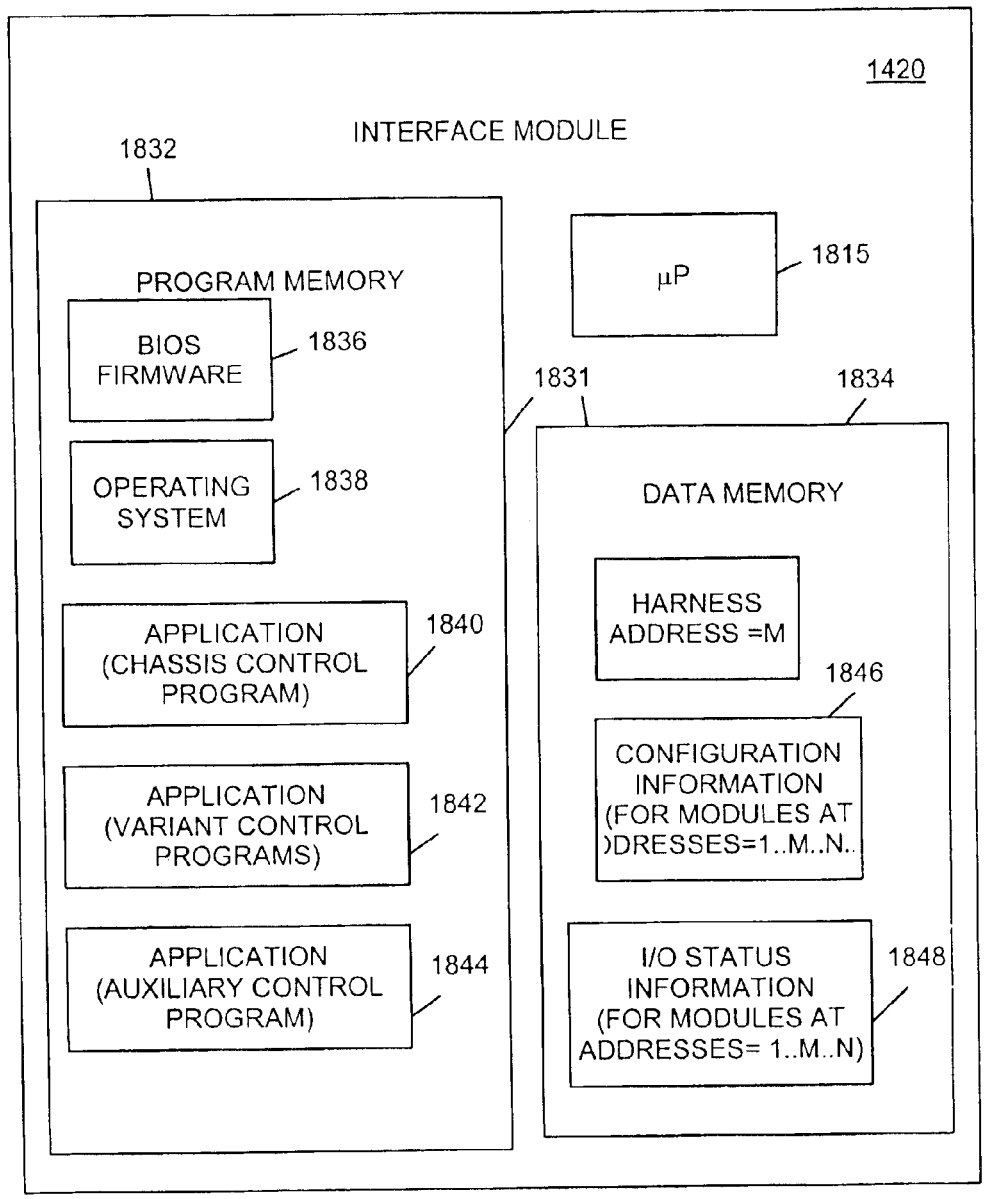
FIG. 18 is a diagram showing the memory contents of an exemplary interface module in greater detail.

Referring next to FIG. 18, an exemplary one of the interface modules 1420 is shown in greater detail. The interface modules 1420 each include a microprocessor 1815 that is sufficiently powerful to allow each interface module to serve as the central control unit. The interface modules are identically programmed and each include a memory 1831 that further includes a program memory 1832 and a data memory 1834. The program memory 1832 includes BIOS (basic input/output system) firmware 1836, an operating system 1838, and application programs 1840, 1842 and 1844. The application programs include a chassis control program 1840, one or more variant control programs 1842, and an auxiliary control program 1844. The data memory 1834 includes configuration information 1846 and I/O status information 1848 for all of the modules 1420–1430 associated with the chassis 1417 and its variant module 1413, as well as configuration information for the interface modules (N+1 to Z in FIG. 18) of other variant modules that are capable of being mounted to the chassis 1417.

It is therefore seen that all of the interface modules 1420 that are used on the chassis 1417 and its variant module 1413, as well as the interface modules 1420 of other variant modules that are capable of being mounted to the chassis 1417, are identically programmed and contain the same information. Each interface module 1420 then utilizes its network address to decide when booting up which configuration information to utilize when configuring itself, and which portions of the application programs 1840–1844 to execute given its status as a master or non-master member of one of the control systems 1511–1513. The interface modules are both physically and functionally interchangeable because the interface modules are capable of being plugged in at any slot on the network, and are capable of performing any functions that are required at that slot on the network.

This arrangement is highly advantageous. Because all of the interface modules 1420 are identically programmed and store the same information, the interface modules are physically and functionally interchangeable within a given class of vehicles. Thus, if an interface module 1420 on one variant module is rendered inoperative, but the variant module is otherwise operational, the inoperative interface module can be replaced with an interface module scavenged from another inoperative vehicle. When the replacement interface module 1420 reboots, it will then reconfigure itself for use in the new vehicle, and begin operating the correct portions of the application programs 1840–1844. This is the case even when the two vehicles are different types of vehicles.

Additionally, if a highly critical interface module is rendered inoperable, the highly critical interface module can be swapped with an interface module that is less critical. Although the input/output devices associated with the less critical interface module will no longer be operable, the input/output devices associated with the more critical interface module will be operable. This allows the effectiveness of the military vehicle to be maximized by allowing undamaged interface modules to be utilized in the most optimal manner. In this way, the field serviceability of the control system 1412 is dramatically improved. Further, the field serviceability of the control system 1412 is also improved by the fact that only a single type of interface module is used, because the use of a single type of interface module makes it easier to find replacement interface modules.

Additionally, as previously noted, each interface module 1420 stores I/O status information for all of the modules 1420–1430 associated with the chassis 1417 and its variant module 1413. Therefore, each interface module 1420 has total system awareness. As a result, it is possible to have each interface module 1420 process its own inputs and outputs based on the I/O status information in order to increase system responsiveness and in order to reduce the amount of communication that is required with the central control unit. The main management responsibility of the central control unit or master interface module above and beyond the responsibilities of all the other interface modules 1420 then becomes, for example, to provide a nexus for interface operations with devices that are external to the control system of which the central control unit is a part.

Referring now to FIG. 19, FIG. 19 is a truth table that describes the operation of the control system 1412 in the event of failure of one of the interface modules 1420 and/or one of the input devices 1440. The arrangement shown in FIG. 19 allows the control system 1412 to be able to continue to operate in the event of failure using a "best guess" method of controlling outputs.

In the example of FIG. 19, two output devices are controlled based on two input devices. For example, the first output device may be headlights of the military vehicle 1410, the first input device may be a combat switch or combat override switch that places the entire vehicle into a combat mode of operation, and the second input may be an operator switch for operator control of the headlights. The second output device is discussed further below. For simplicity, only the input states of two binary input devices are shown. In practice, of course, the control logic for most output devices will usually be a function of more input devices, in some cases ten or more input devices including analog input devices. Nevertheless, the simplified truth table of FIG. 19 is sufficient to obtain an understanding of this preferred aspect of the invention.

The truth table of FIG. 19 shows a number of different possible input states and the corresponding output states. In the first two states, when the combat override switch (input #1) is off, then the headlights (output #1) are controlled as a function of the operator switch. Thus, if the operator switch is on, then the control system 1412 turns the headlights on, and if the operator switch is off, then the control system 1412 turns the headlights off. In the third and fourth input states, the combat override switch is on, and therefore the control system 1412 turns the headlights off in order to make the vehicle less detectable by the enemy. It may be noted that the control system 1412 ignores the input state of the second input device when the combat override switch is on. The third column in the truth table could therefore instead be the output of a safety interlock, since safety interlocks are another example of input information that is sometimes ignored when a combat override is turned on. This would allow the control system 1412 to take into account the urgency of a combat situation while still also implementing safety functions to the extent that they do not interfere with the operation of the vehicle 1410.

The truth table also has a number of additional states (five through nine) corresponding to situations in which one or both of the inputs is designated as undetermined ("?" in FIG. 19). Thus, for example, in states five and six, the input state of the operator switch (input #2) is designated as undetermined. The undetermined state of the operator switch may be the result of the failure of the interface module that receives the input signal from the operator switch, a failure of the electrical connection between the switch and the interface module, and/or a failure of the operator switch itself. In the fifth state, when the combat override switch is off and the state of the operator switch is undetermined, the control system 1412 turns on the headlights, based on the assumption that if it is nighttime the operator wants the lights on and if it is daytime the operator does not have a strong preference either way. In the sixth state, when the combat override switch is on and the state of the operator switch is undetermined, the control system 1412 turns off the headlights, because the headlights should always be turned off in the combat mode of operation.

In states seven through nine, the input state of the combat override switch (input #1) is designated as undetermined. The undetermined state of the combat override switch may be caused by generally the same factors that are liable to cause the state of the operator switch to be undetermined. In all of these states, the control system 1412 turns off the headlights, based on the worst case assumption that the military vehicle may be in combat and that therefore the headlights should be turned off.

The arrangement shown in FIG. 19 is thus applied to all output devices 1450 on the military vehicle. In this way, the control logic for controlling the output devices is expanded to take into account a third "undetermined" state for each of the input devices, and an entire additional layer of failure management is added to the control logic. In this way, the control system 1412 is able to remain operational (at least in a best guess mode) when the input states of one or more input devices cannot be determined. This prevents output devices that have an output state based on the input state of a given input device from being crippled when a system failure causes one or more input devices to be lost.

This arrangement also allows the output state of each output device to be programmed individually in failure situations. In other words, when a given input device is lost, the control system can be programmed to assume for purposes of some output devices (using the above described truth table arrangement) that the input device is on and to assume for the purposes of other output devices that the input device is off. For example, in FIG. 19, if output device #2 is another output device that is controlled by the same operator switch, the control system can be programmed to assume for purposes of output device #2 that the operator switch is off in state five rather than on, such that the control system turns off the output device #2 in state five. In this way, it is not necessary to assume the same input state for purposes of all output devices.

It may also be noted that military vehicles tend to make widespread use of redundant sensors. In this case, by connecting the redundant sensors to different ones of the interface modules, the state table for each output device can be modified to accept either input, thereby making it possible for the control system 1412 to obtain the same information by a different route. Further, if the redundant sensors disagree on the input status of a system parameter, then this disagreement itself can be treated as an undetermined input state of an input device. In this way, rather than using a voting procedure in which the sensors vote on the state of the input device for purposes of all output devices, the uncertainty can be taken into account and best guess decisions regarding how to operate can be made for each of the various output devices individually.

As previously described, each interface module 1420 has total system awareness. Specifically, the data memory 1834 of each interface module 1420 stores I/O status information 1848 for not only local I/O devices 1440 and 1450 but also for non-local I/O devices 1440 and 1450 connected to remaining ones of the interface modules 1420. Referring now to FIGS. 21–24, a preferred technique for transmitting I/O status information between the interface modules 1420 will now be described. Although this technique is primarily described in connection with the chassis control system 1511, this technique is preferably also applied to the variant control system 1512 and the auxiliary control system 1513, and/or in the control system 12.

Figure 21:
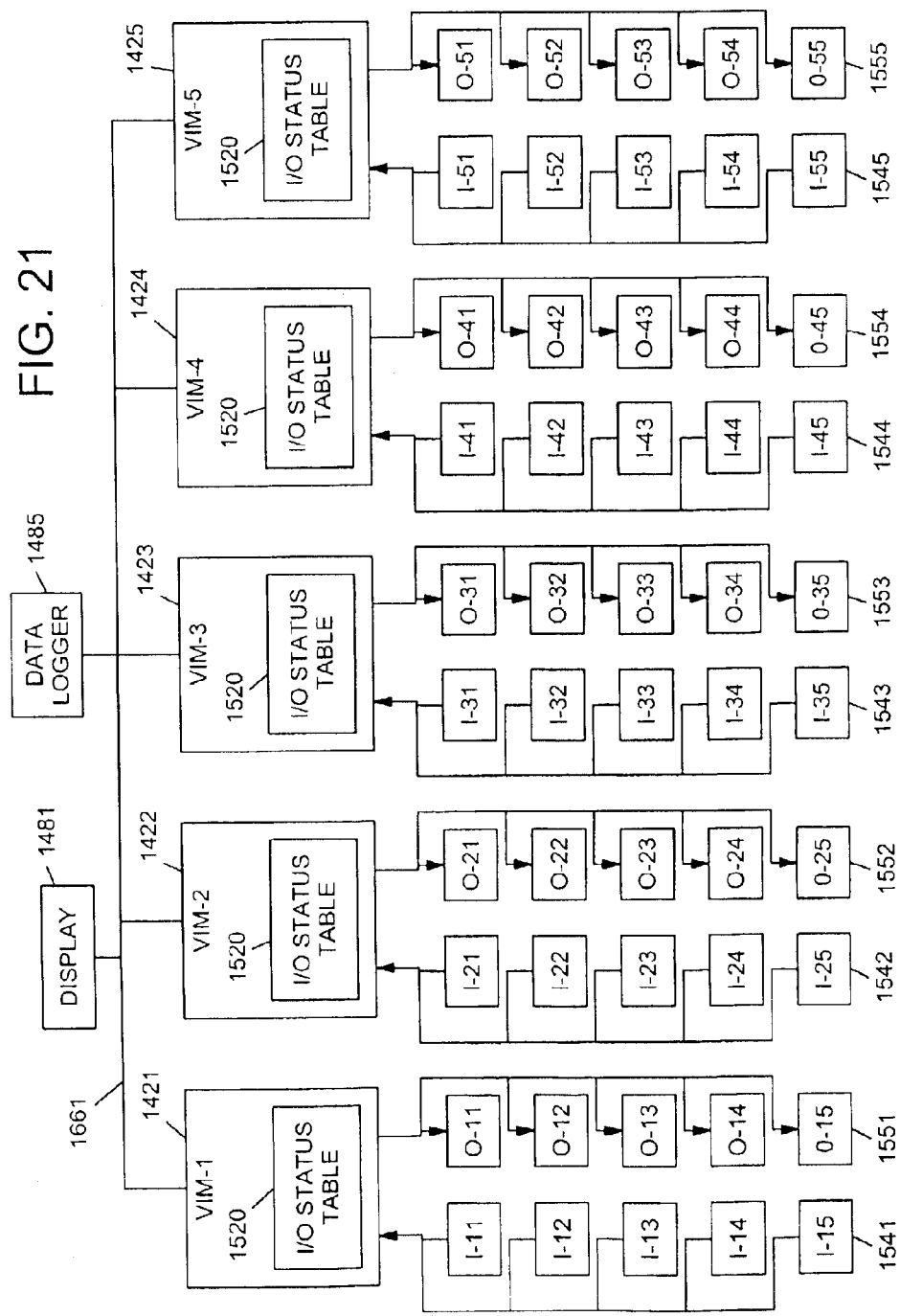
FIG. 21 is a block diagram of the control system of FIG. 14 showing selected aspects of the control system in greater detail.

Referring first to FIG. 21, as previously described, the chassis control system 1511 includes the interface modules 1421–1425, the input devices 1441, and the output devices 1451. Also shown in FIG. 21 are the display 1481, the data logger 1485, and the communication network 1661 which connects the interface modules 1421–1425. In practice, the system may include additional devices, such as a plurality of switch interface modules connected to additional I/O devices, which for simplicity are not shown. The switch interface modules may be the same as the switch interface modules 20 previously described and, for example, may be provided in the form of a separate enclosed unit or in the more simple form of a circuit board mounted with associated switches and low power output devices. In practice, the system may include other systems, such as a display interface used to drive one or more analog displays (such as gauges) using data received from the communication network 1661. Any additional modules that interface with I/O devices preferably broadcast and receive I/O status information and exert local control in the same manner as detailed below in connection with the interface modules 1421–1425. As previously noted, one or more additional communication networks may also be included which are preferably implemented in accordance with SAE J1708/ 1587 and/or J1939 standards. The communication networks may be used, for example, to receive I/O status information from other vehicle systems, such as an engine or transmission control system. Arbitration of I/O status broadcasts between the communication networks can be performed by one of the interface modules 1420.

To facilitate description, the input devices 1441 and the output devices 1451 have been further subdivided and more specifically labeled in FIG. 21. Thus, the subset of the input devices 1441 which are connected to the interface module 1421 are collectively labeled with the reference numeral 1541 and are individually labeled as having respective input states I-11 to I-15. Similarly, the subset of the output devices 1451 which are connected to the interface module 1421 are collectively labeled with the reference numeral 1551 and are individually labeled as having respective output states O-11 to O-15. A similar pattern has been followed for the interface modules 1422–1425, as summarized in Table I below:

TABLE I

| Interface Module | Input Devices | Input States | Output Devices | Output States |
|---|---|---|---|---|
| 1421 | 1541 | I-11 to I-15 | 1551 | O-11 to O-15 |
| 1422 | 1542 | I-21 to I-25 | 1552 | O-21 to O-25 |
| 1423 | 1543 | I-31 to I-35 | 1553 | O-31 to O-35 |
| 1424 | 1544 | I-41 to I-45 | 1554 | O-41 to O-45 |
| 1425 | 1545 | I-51 to I-55 | 1555 | O-51 to O-55 |

Of course, although five input devices 1441 and five output devices 1451 are connected to each of the interface modules 1420 in the illustrated embodiment, this number of I/O devices is merely exemplary and a different number of devices could also be used, as previously described.

The interface modules 1420 each comprise a respective I/O status table 1520 that stores information pertaining to the I/O states of the input and output devices 1441 and 1451. Referring now to FIG. 22, an exemplary one of the I/O status tables 1520 is shown. As shown in FIG. 22, the I/O status table 1520 stores I/O status information pertaining to each of the input states I-11 to I-15, I-21 to I-25, I-31 to I-35, I-41 to I-45, and I-51 to I-55 of the input devices 1541–1545, respectively, and also stores I/O status information pertaining to each of the output states O-11 to O-15, O-21 to O-25, O-31 to O-35, O-41 to O-45, and O-51 to O-55 of the output devices 1551–1555, respectively. The I/O status tables 1520 are assumed to be identical, however, each I/O status table 1520 is individually maintained and updated by the corresponding interface module 1420. Therefore, temporary differences may exist between the I/O status tables 1520 as updated I/O status information is received and stored. Although not shown, the I/O status table 1520 also stores I/O status information for the interface modules 1426–1428 of the variant control system 1512 and the interface modules 1429–1430 of the auxiliary control system 1513.

In practice, although FIG. 22 shows the I/O status information being stored next to each other, the memory locations that store the I/O status information need not be contiguous and need not be located in the same physical media. It may also be noted that the I/O status table 1520 is, in practice, implemented such that different I/O states are stored using different amounts of memory. For example, some locations store a single bit of information (as in the case of a digital input device or digital output device) and other locations store multiple bits of information (as in the case of an analog input device or an analog output device). The manner in which the I/O status table is implemented is dependent on the programming language used and on the different data structures available within the programming language that is used. In general, the term I/O status table is broadly used herein to encompass any group of memory locations that are useable for storing I/O status information.

Also shown in FIG. 22 are a plurality of locations that store intermediate status information, labeled IM-11, IM-21, IM-22, and IM-41. The intermediate states IM-11, IM-21, IM-22, and IM-41 are processed versions of selected I/O states. For example, input signals may be processed for purposes of scaling, unit conversion and/or calibration, and it may be useful in some cases to store the processed I/O status information. Alternatively, the intermediate states IM-11, IM-21, IM-22, and IM-41 may be a function of a plurality of I/O states that in combination have some particular significance. The processed I/O status information is then transmitted to the remaining interface modules 1420.

Figure 23:
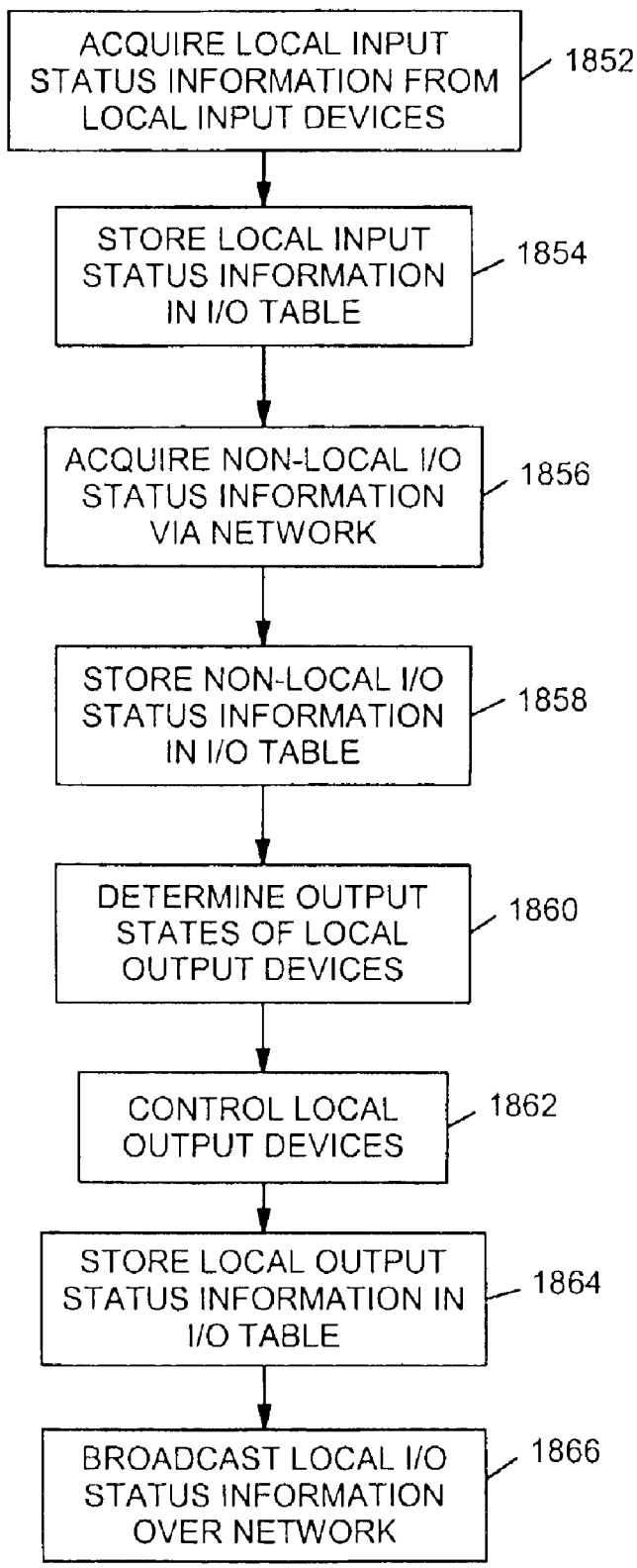
FIG. 23 is a flowchart describing the operation of the control system of FIG. 21 in greater detail.
Figure 24:
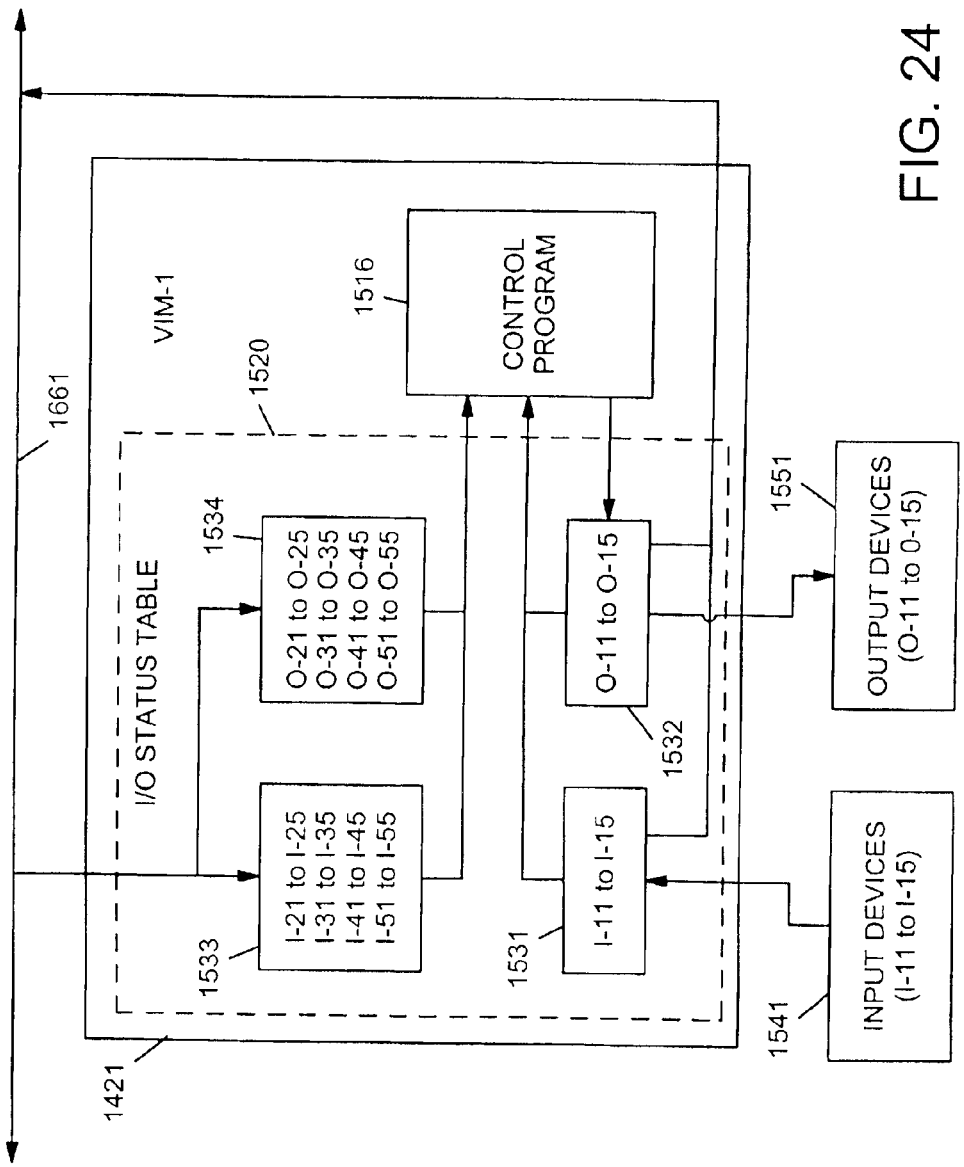
FIG. 24 is a data flow diagram describing data flow through an exemplary interface module during the process of FIG. 23.

Referring now to FIGS. 23–24, FIG. 23 is a flowchart describing the operation of the control system of FIG. 21, and FIG. 24 is a data flow diagram describing data flow through an exemplary interface module during the process of FIG. 23. As an initial matter, it should be noted that although FIG. 23 depicts a series of steps which are performed sequentially, the steps shown in FIG. 23 need not be performed in any particular order. In practice, for example, modular programming techniques are used and therefore some of the steps are performed essentially simultaneously. Additionally, it may be noted that the steps shown in FIG. 23 are performed repetitively during the operation of the interface module 1421, and some of the steps are in practice performed more frequently than others. For example, input information is acquired from the input devices more often than the input information is broadcast over the communication network. Although the process of FIG. 23 and the data flow diagram of FIG. 24 are primarily described in connection with the interface module 1421, the remaining interface modules 1422–1425 operate in the same manner.

At step 1852, the interface module 1421 acquires input status information from the local input devices 1541. The input status information, which pertains to the input states I-11 to I-15 of the input devices 1541, is transmitted from the input devices 1541 to the interface module 1421 by way of respective dedicated communication links, as previously described in connection with FIGS. 3–4. At step 1854, the input status information acquired from the local input devices 1541 is stored in the I/O status table 1520 at a location 1531. For the interface module 1421, the I/O devices 1541 and 1551 are referred to as local I/O devices since the I/O devices 1541 and 1551 are directly coupled to the interface module 1421 by way of respective dedicated communication links, as opposed to the remaining non-local I/O devices and 1542–1545 and 1552–1555 which are indirectly coupled to the interface module 1421 by way of the communication network 1661.

At step 1856, the interface module 1421 acquires I/O status information for the non-local input devices 1542–1545 and the non-local output devices 1552–1555 by way of the communication network 1661. Specifically, the interface module 1421 acquires input status information pertaining to the input states I-21 to I-25, I-31 to I-35, I-41 to I-45, I-51 to I-55 of the input devices 1542–1545, respectively, and acquires output status information pertaining to the output states O-21 to O-25, O-31 to O-35, O-41 to O-45, O-51 to O-55 of the output devices 1552–1555. The input status information and the output status information are stored in locations 1533 and 1534 of the I/O status table 1520, respectively.

At step 1860, the interface module 1421 determines desired output states O-11 to O-15 for the output devices 1551. As previously noted, each of the interface modules 1420 stores a chassis control program 1840, one or more variant control programs 1842, and an auxiliary control program 1844. The interface module 1421 is associated with the chassis control system 1511 and, therefore, executes a portion of the chassis control program 1840. (The portion of the chassis control program 1840 executed by the interface module 1421 is determined by the location of the interface module 1421 on the military vehicle 1410, as previously described.) The interface module 1421 executes the chassis control program 1840 to determine the desired output states O-11 to O-15 based on the I/O status information stored in the I/O status table 1520. Preferably, each interface module 1420 has complete control of its local output devices 1450, such that only I/O status information is transmitted on the communication network 1460 between the interface modules 1420.

At step 1862, the interface module 1421 controls the output devices 1551 in accordance with the desired respective output states O-11 to O-15. Once the desired output state for a particular output device 1551 has been determined, control is achieved by transmitting a control signal to the particular output device 1551 by way of a dedicated communication link. For example, if the output is a digital output device (e.g., a headlight controlled in on/off fashion), then the control signal is provided by providing power to the headlight by way of the dedicated communication link. Ordinarily, the actual output state and the desired output state for a particular output device are the same, especially in the case of digital output devices. However, this is not always the case. For example, if the headlight mentioned above is burned out, the actual output state of the headlight may be "off," even though the desired output state of the light is "on." Alternatively, for an analog output device, the desired and actual output states may be different if the control signal is not properly calibrated for the output device.

At step 1864, the interface module 1421 stores output status information pertaining to the desired output states O-11 to O-15 for the output devices 1551 in the I/O status table 1520. This allows the output states O-11 to O-15 to be stored prior to being broadcast on the communication network 1661. At step 1866, the interface module 1421 broadcasts the input status information pertaining to the input states I-11 to I-15 of the input devices 1541 and the output status information pertaining to the output states O-11 to O-15 of the output devices 1551 over the communication network 1661. The I/O status information is received by the interface modules 1422–1425. Step 1866 is essentially the opposite of step 1856, in which non-local I/O status information is acquired by the interface module 1421 by way of the communication network 1661. In other words, each interface module 1420 broadcasts its portion of the I/O status table 1520 on the communication network 1661, and monitors the communication network 1661 for broadcasts from the remaining interface modules 1420 to update the I/O status table 1520 to reflect updated I/O states for the non-local I/O devices 1441 and 1451. In this way, each interface module 1420 is able to maintain a complete copy of the I/O status information for all of the I/O devices 1441 and 1451 in the system.

The interface modules 1423 and 1425 are used to transmit I/O status information between the various control systems 1511–1513. Specifically, as previously noted, the interface module 1423 is connected to both the communication network 1661 for the chassis control system 1511 and to the communication network 1662 for the variant control system 1512 (see FIG. 17). The interface module 1423 is preferably utilized to relay broadcasts of I/O status information back and forth between the interface modules 1421–1425 of the chassis control system 1511 and the interface modules 1426–1428 of the variant control system 1512. Similarly, the interface module 1425 is connected to both the communication network 1661 for the chassis control system 1511 and the to the communication network 1663 for the auxiliary control system 1513 (see FIG. 17), and the interface module 1425 is preferably utilized to relay broadcasts of I/O status information back and forth between the interface modules 1421–1425 of the chassis control system 1511 and the interface modules 1429–1430 of the auxiliary control system 1513.

The arrangement of FIGS. 21–24 is advantageous because it provides a fast and efficient mechanism for updating the I/O status information 1848 stored in the data memory 1834 of each of the interface modules 1420. Each interface module 1420 automatically receives, at regular intervals, complete I/O status updates from each of the remaining interface modules 1420. There is no need to transmit data request (polling) messages and data response messages (both of which require communication overhead) to communicate information pertaining to individual I/O states between individual I/O modules 1420. Although more I/O status data is transmitted, the transmissions require less overhead and therefore the overall communication bandwidth required is reduced.

This arrangement also increases system responsiveness. First, system responsiveness is improved because each interface module 1420 receives current I/O status information automatically, before the information is actually needed. When it is determined that a particular piece of I/O status information is needed, there is no need to request that information from another interface module 1420 and subsequently wait for the information to arrive via the communication network 1661. The most current I/O status information is already assumed to be stored in the local I/O status table 1520. Additionally, because the most recent I/O status information is always available, there is no need to make a preliminary determination whether a particular piece of I/O status information should be acquired. Boolean control laws or other control laws are applied in a small number of steps based on the I/O status information already stored in the I/O status table 1520. Conditional control loops designed to avoid unnecessarily acquiring I/O status information are avoided and, therefore, processing time is reduced.

It may also be noted that, according to this arrangement, there is no need to synchronize the broadcasts of the interface modules 1420. Each interface module 1420 monitors the communication network 1661 to determine if the communication network 1661 is available and, if so, then the interface module broadcasts the I/O status information for local I/O devices 1441 and 1451. (Standard automotive communication protocols such as SAE J1708 or J1939 provide the ability for each member of the network to monitor the network and broadcast when the network is available.) Although it is desirable that the interface modules rebroadcast I/O status information at predetermined minimum intervals, the broadcasts may occur asynchronously.

The technique described in connection with FIGS. 21–24 also provides an effective mechanism for detecting that an interface module 1420 has been rendered inoperable, for example, due to damage incurred in combat. As just noted, the interface modules 1420 rebroadcast I/O status information at predetermined minimum intervals. Each interface module 1420 also monitors the amount of time elapsed since an update was received from each remaining interface module 1420. Therefore, when a particular interface module 1420 is rendered inoperable due to combat damage, the inoperability of the interface module 1420 can be detected by detecting the failure of the interface module 1420 to rebroadcast its I/O status information within a predetermined amount of time. Preferably, the elapsed time required for a particular interface module 1420 to be considered inoperable is several times the expected minimum rebroadcast time, so that each interface module 1420 is allowed a certain number of missed broadcasts before the interface module 1420 is considered inoperable. A particular interface module 1420 may be operable and may broadcast I/O status information, but the broadcast may not be received by the remaining interface modules 1420 due, for example, to noise on the communication network.

This arrangement also simplifies the operation of the data logger 1485 and automatically permits the data logger 1485 to store I/O status information for the entire control system 1412. The data logger 1485 monitors the communication network 1661 for I/O status broadcasts in the same way as the interface modules 1420. Therefore, the data logger 1485 automatically receives complete system updates and is able to store these updates for later use.

As previously noted, in the preferred embodiment, the interface modules 1423 and 1425 are used to transmit I/O status information between the various control systems 1511–1513. In an alternative arrangement, the interface module 1429 which is connected to all three of the communication networks 1661–1663 could be utilized instead. Although less preferred, the interface module 1429 may be utilized to receive I/O status information from each of the interface modules 1421–1428 and 1430, assemble the I/O status data into an updated I/O status table, and then rebroadcast the entire updated I/O status table 1520 to each of the remaining interface modules 1421–1428 and 1430 at periodic or aperiodic intervals. Therefore, in this embodiment, I/O status information for the all of the interface modules 1420 is routed through the interface module 1429 and the interface modules 1420 acquire I/O status information for non-local I/O devices 1440 and 1450 by way of the interface module 1429 rather than directly from the remaining interface modules 1420.

From the foregoing description, a number of advantages of the preferred military vehicle control system are apparent, some of which have already been mentioned. First, the control system is constructed and arranged such that failure at a single location does not render the entire vehicle inoperable. The control system has the ability to dynamically reconfigure itself in the event that one or more interface modules are lost. By avoiding the use of a central control unit that is fixed at one location, and using a moving central control unit, there is no single point failure. If a master interface modules fails, another interface module will assume the position of the central control unit.

Additionally, because the interface modules are interchangeable, if one interface module is damaged, it is possible to field service the control system by swapping interface modules, obtained either from within the vehicle itself or from another vehicle, even if the other vehicle is not the same variant type. This allows the effectiveness of the military vehicle to be maximized by allowing undamaged interface modules to be utilized in the most optimal manner.

The use of the control system 1412 in connection with multipurpose modular vehicles is also advantageous. When the variant module is mounted to the chassis, all that is required is to connect power, ground and the communication network. Only one connector is required for all of the different types of variants. This avoids the need for a separate connector on the chassis for each different type of variant module, along with the additional unutilized hardware and wiring, as has conventionally been the approach utilized.

Moreover, since every interface module has a copy of the application program, it is possible to test each interface module as an individual unit. The ability to do subassembly testing facilitates assembly of the vehicle because defective mechanisms can be replaced before the entire vehicle is assembled.

Finally, the advantages regarding flexibility, robustness, ease of use, maintainability, and so on, that were discussed above in connection with fire fighting vehicles also apply to military vehicles. For example, it is often desirable in military applications to provide vehicles with consoles for both a left-hand driver and a right-hand driver. This option can be implemented without complex wiring arrangements with the preferred control system, due to the distributed data collection and the intelligent processing of information from input devices. Likewise, features such as "smart start" (in which vehicle starting is controlled automatically to reduce faulty starts due to operator error) can be implemented by the control system without any additional hardware.

C. Electric Traction Vehicle

Referring now to FIGS. 25–29, a control system for an electric traction vehicle 1910 is shown. An electric traction vehicle is a vehicle that uses electricity in some form or another to provide all or part of the propulsion power of the vehicle. This electricity can come from a variety of sources, such as stored energy devices relying on chemical conversions (batteries), stored electrical charge devices (capacitors), stored energy devices relying on mechanical stored energy (e.g. flywheels, pressure accumulators), and energy conversion products. A hybrid electric vehicle is an electric traction vehicle that uses more than one sources of energy, such as one of the electrical energy storage devices mentioned above and another source, such as an internal combustion engine. By having more than one source of energy some optimizations in the design can allow for more efficient power production, thus one can use power from different sources to come up with a more efficient system for traction. The disclosure herein can be used to implement electric vehicles in general and/or hybrid electric vehicles in particular. The electric vehicle 1910 can implement any of the other vehicle types described herein (e.g., fire fighting vehicle, military vehicle, snow blower vehicle, refuse-handling vehicle, concrete mixing vehicle) as well as others not described herein. Thus, the following teachings regarding the electric vehicle system may be combined with any/all of the teachings contained herein.

The electric traction vehicle 1910 preferably comprises a vehicle platform or vehicle support structure 1912, drive wheels 1914, a power source or principal power unit 1916, a power storage unit 1922, electric motors 1928, servo or drive controllers 1930, an energy dissipation device 1932, and interface modules 1934. The vehicle 1910 further comprises a control system with a plurality of input and output devices which vary depending on the application for which the vehicle 1920 is used. For example, if the vehicle 1910 is a fire truck, then the vehicle 1910 has input and output devices such as those described in connection with FIGS.

1–13 in connection with the fire truck 10. Except to the extent that different I/O devices are used, the control system the same as the control system 1412 as described in FIGS. 14–24 and is used to receive inputs from these input devices and control these output devices. The interface modules 1934 are part of this control system and preferably are constructed and operate in the same manner as the interface modules 1420 as described above. Specifically, each interface module 1934 preferably processes its own inputs and outputs based on I/O status information received via I/O status broadcasts from the other interface modules 1934.

Interconnecting the interface modules 1934 on the electric traction vehicle 1910 is a communication network 1976 and an AC power bus assembly 1942 through which the vehicle and its various functions are controlled and operated. The communication network 1976 corresponds to the communication network 60 of FIG. 2 in the case of an electric fire truck vehicle and to the communication network 1460 in the case of a electric military vehicle. The communication network 1976 is used to communication I/O status information between the interface modules 1934. The AC bus assembly 1942 is a power transmission link and corresponds to the power transmission link 102 of FIG. 2 in the case of an electric fire truck vehicle and to the power transmission link 1502 of FIG. 15 in the case of an electric military vehicle. Also connected to the AC bus assembly 1942 are the principal power unit 1916, the power storage unit 1922, and the energy dissipation device 1932. The interface modules 1934 include rectifier circuitry to convert AC power from the AC bus assembly 1942 to DC power for output devices such as LED indicators. Also, it may be noted that the AC power is also provided directly to the drive controllers 1930, which operate under the control of the interface modules 1934. It is also contemplated that wireless communication between the interface modules 1934 and the various modules 1984 can be achieved including communication of signals 1974 via radio waves, microwaves, and fiber optical paths including relay via satellite to a central command center.

Figure 25:
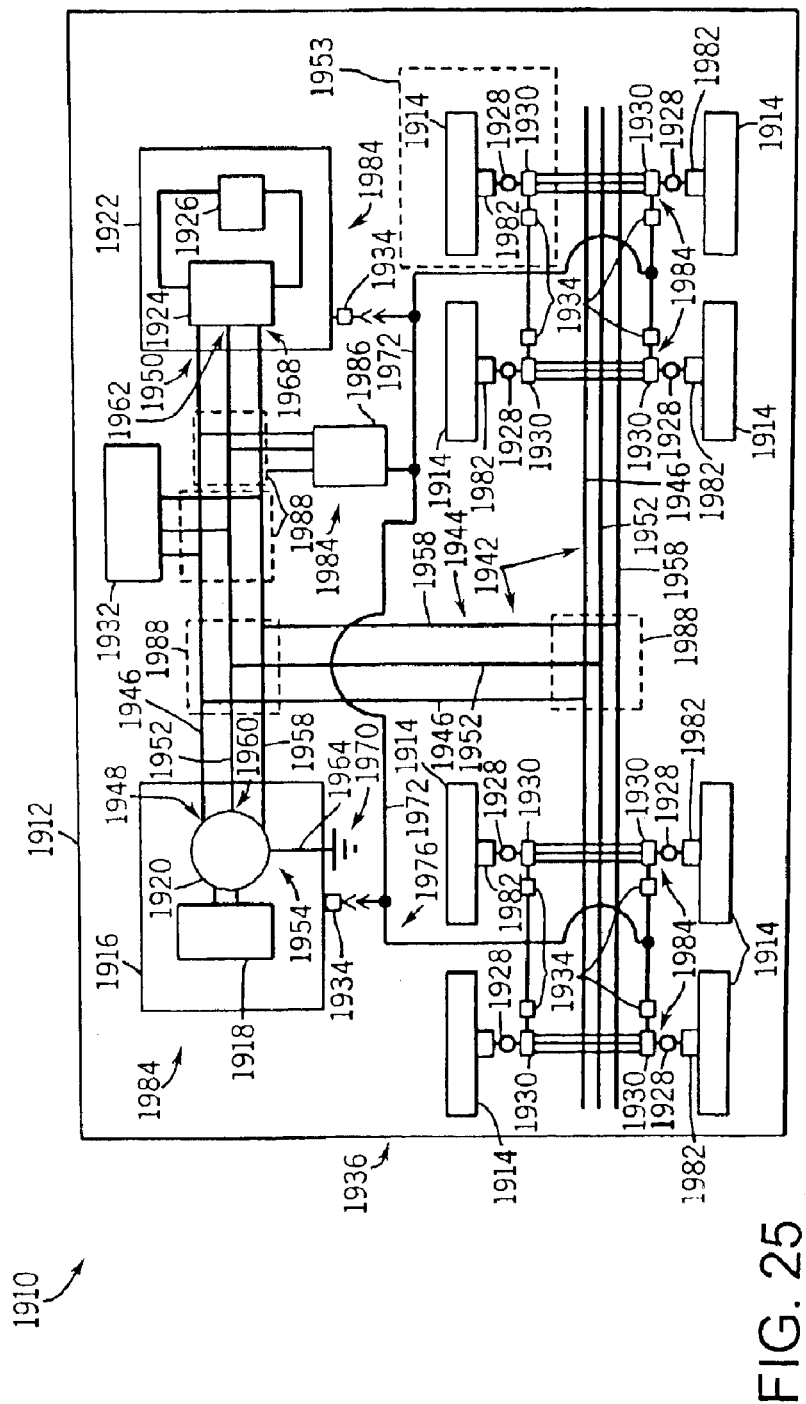
FIG. 25 is a schematic diagram of an exemplary embodiment of an electric traction vehicle providing an exemplary embodiment of an AC bus assembly coupled to various modules on the vehicle.
Figure 32A:
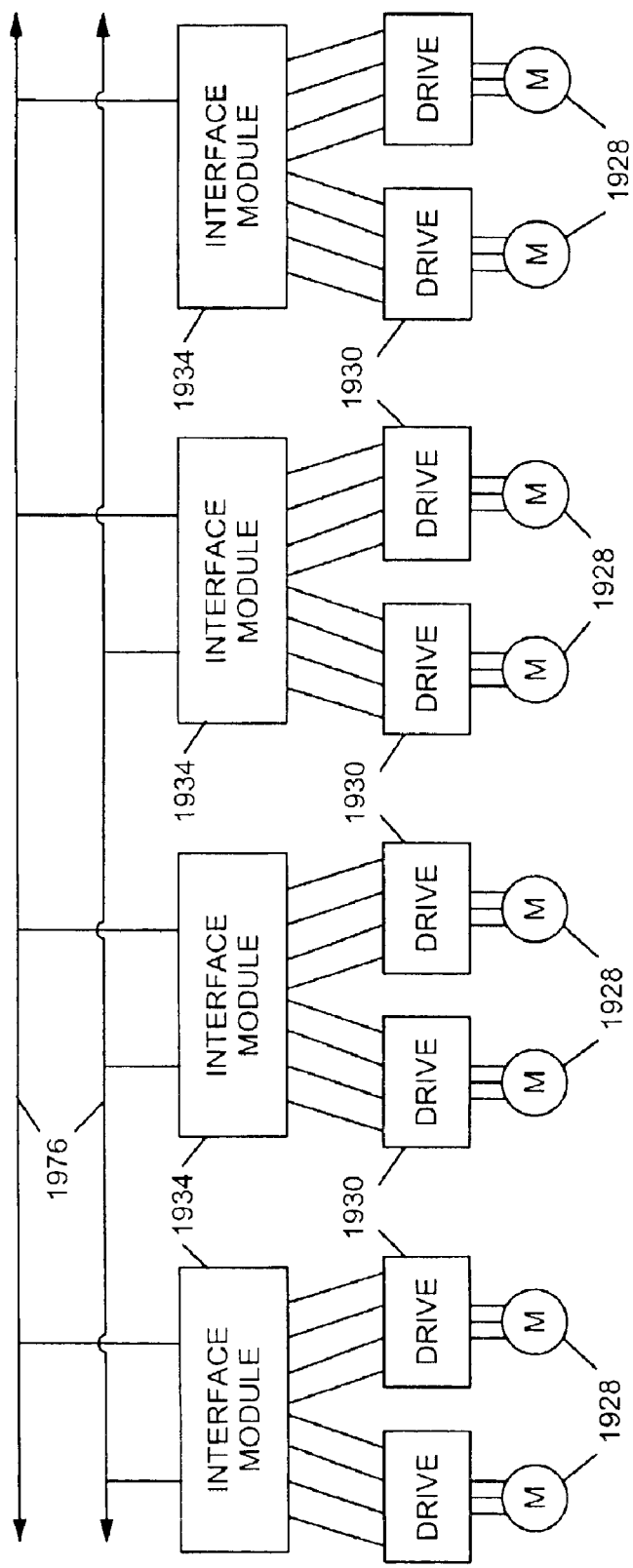
FIGS. 32A–32B is a block diagram showing various configurations for connecting interface modules to drive controllers in the electric traction vehicle of FIG. 25.
Figure 32B:
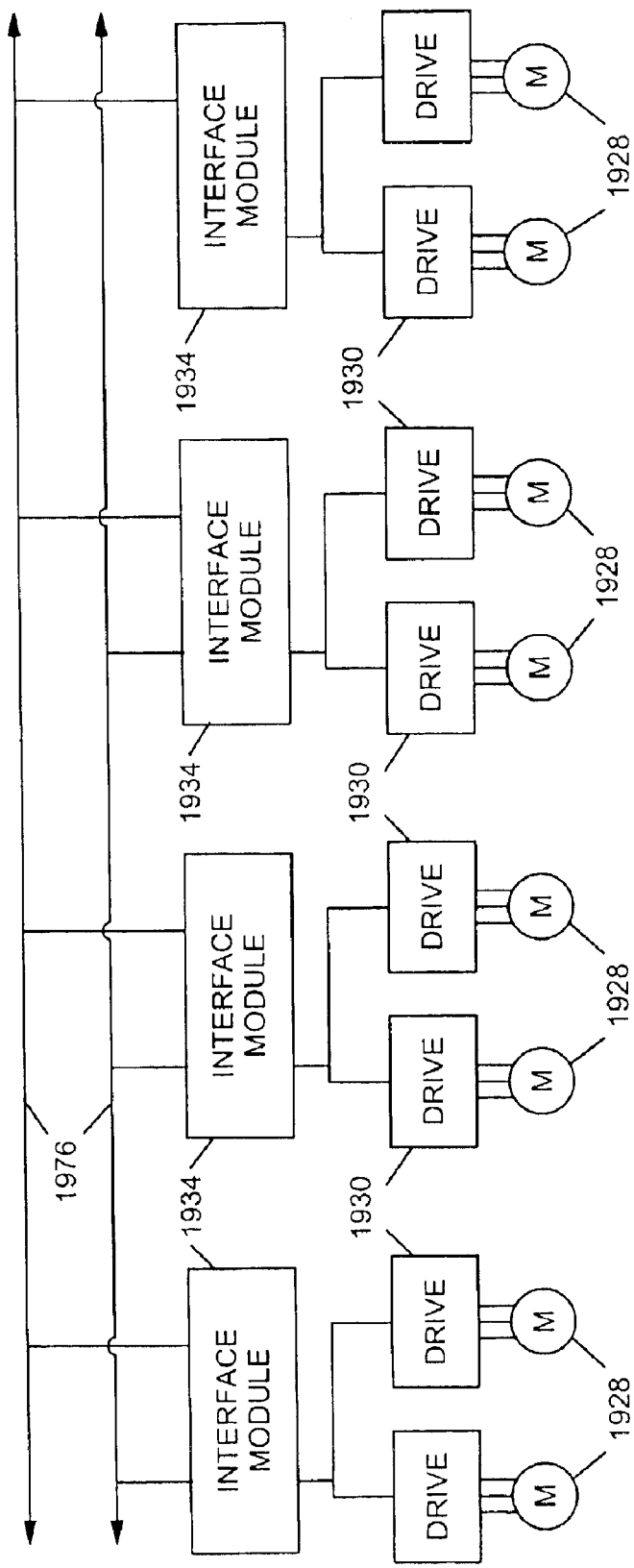

With reference to FIGS. 32A–32B, it may be noted that many commercially-available servo drive controllers may be network-enabled and therefore an option exists as to the manner in which the interface modules 1934 are connected to the drive controllers 1930. Thus, in FIG. 32A, each interface module 1934 is connected to one or more drive controllers 1930 by way of dedicated communication links for hardwired control of the drive controllers 1930. In the illustrated embodiment, three digital links and one analog link are shown for each drive controller 1930 representing, for example, a stop/run output, a forward/reverse output, a generation/regeneration output, and a variable torque command (0–100%) output from the interface module 1934. As indicated in FIG. 25, power from the AC bus assembly 1942 is preferably provided directly to the drive controllers 1930 (rather than through the interface modules 1934), and therefore each of the dedicated communication links is used to transmit only information and not power. Each interface module 1934 is then connected to the communication network 1976 which, in FIG. 32A, is implemented as two separate networks (e.g., a network dedicated for use with the interface modules 1934, and a separate J1939 network to connect to the electronic control units for the engine, transmission, anti-lock brake and central tire inflation systems).

In FIG. 32B, each interface module 1934 is connected to one or more drive controllers 1930 by way of a communication network for network control of the drive controllers 1930. The same information may be transmitted as in FIG. 32A except that the information is transmitted by way of the communication network. Because the AC bus assembly 1942 is connected directly to the drive controllers 1930, there is no need to transmit power from the interface modules 1934 to the drive controllers 1930. Each interface module 1934 is then connected to the communication network 1976. If only two network ports are included on the interface modules 1934, then information obtained from the electronic control units for the engine, transmission, anti-lock brake and central tire inflation systems may be obtained from other interface modules (not shown) connected to a J1939 network. Alternatively, the interface modules 1934 may be provided with a third network port.

The electric motors 1928 are appropriately sized traction motors. An exemplary embodiment of an electric traction vehicle 1910 employs an AC, three phase induction electric motor having a simple cast rotor, machine mount stator and sealed ball bearings. An induction motor is preferred because it avoids brushes, internal switches and sliding contact devices, with the rotor being the only moving part of the traction motor. Control of the electric motor 1928 is achieved by the interface module 1934 through the drive controller 1930 which is coupled to the motor 1928. The torque output of the motor 1928 is adjusted based on inputs received from the operator and transmitted to the interface module 1934 over the communication network 1976.

The drive wheels 1914 are rotatably mounted on the vehicle platform 1912 with an electric motor 1928 coupled to at least one wheel 1914. In one embodiment, the drive wheels 1914 are each be coupled to respective electric motors 1928, which in turn are each coupled to respective drive controllers 1930, which in turn are coupled to respective interface modules 1934.

Various embodiments of an electric traction vehicle 1910 are based on the number of wheels 1914 that are driven on the vehicle 1910. For instance, one embodiment includes a drive wheel 1914 coupled to an electric motor 1928, which in turn is coupled to a drive controller 1930, which in turn is coupled to an interface module 1934, which in turn is coupled to other interface modules (for other vehicle I/O) by way of the communication network 1976. The vehicle can also include four drive wheels 1914 coupled to four respective electric motors 1928, which in turn are coupled to four respective drive controllers 1930, which in turn are coupled to four respective interface modules 1934, which in turn are coupled to other interface modules and to each other by way of the communication network 1976. In the embodiment of FIG. 1, eight drive wheels 1914 are coupled to eight respective electric motors 1928, which in turn are coupled to eight respective drive controllers 1930, which in turn are coupled to eight respective interface modules 1934, which in turn are coupled to other interface modules and to each other by way of the communication network 1976. Other configurations may also be used, and the ratio of motors, wheels, servo drives and interface modules need not be one-to-one relative to each other. Thus, for example, each interface module 1934 may control one wheel, one axle, a tandem set of axles, or other set of wheels. As described in greater detail below, the vehicle 1910 can also include pairs of drive wheels 1914 which are driven in tandem by a respective one of the plurality of electric motors 1928. Typically, at least two of the wheels are steerable.

The torque output of each motor 1928 is adjusted to meet the requirements established in the associated interface module 1934 from the I/O status information. The electric motors 1928 may operate to produce electric torque to drive the drive wheels 1914 or may operate in a regenerative braking mode to provide power to the power storage unit 1922, as determined by inputs received from an operator of the electric traction vehicle 1910.

The electric traction vehicle 1910 can be configured with one or more modular independent coil spring suspensions for steerable and non-steerable wheel assemblies and driver and non-driver axles. Details of such modular independent coil spring suspensions can be found in U.S. Pat. Nos. 5,538,274, 5,820,150, and 6,105,984 incorporated herein by this reference, which are assigned to the assignee of the present invention.

The principal power unit 1916 and the power storage unit 1922 are mounted on the vehicle platform 1912. As previously noted, the principal power unit 1916 provides power for multiple electric motors 1928 coupled to individual drive wheels 1914. This simplifies the transmission of power to the wheels 1914 as compared to a non-electric vehicle by eliminating the torque converter, transmission, transfer case, and drive shafts. Further, because multiple electric motors 1928 are used, the horse power requirements of each electric motor 1928 are such that standard commercially available electric motors may be used even in the case of a heavy duty military vehicle.

The principal power unit 1916 includes a prime mover or engine 1918 coupled to a generator or alternator 1920. The prime mover 1918 can be a gas turbine or an internal combustion engine. The principal power unit 1916 can also be a fuel cell or a nuclear power device. The fuel cell may for example be a hydrogen-oxygen fuel cell that produces electrical power in the process of a chemical reaction that combines oxygen and hydrogen to create water. If a DC source is used, an inverter may be used to convert DC power from the DC source to AC power for the AC bus assembly 1942. In the preferred embodiment, the prime mover 1918 is a diesel engine optimized for operation at a constant speed (revolutions per minute). Operating the diesel engine at a constant, optimal speed eliminates inefficiencies associated with changing RPM levels during acceleration and deceleration, improves overall efficiency, and reduces emissions.

The generator/alternator 1920 is preferably a synchronous generator producing 460 to 480 volts, three phase, AC 60 Hz power for the electric traction vehicle 1910. However, it is contemplated that different sized generators or alternators can be coupled to the prime mover for purposes of generating either higher or lower electrical power. For instance, a single phase system can be utilized or a system that generates 720 volt power system can be used or a system that operates at a frequency other than 60 Hz, such as 50 Hz which is typical in European countries. It is also contemplated that the power generated by the principal power unit 1916 can be modified by appropriate auxiliary modules such as a step-down transformer to provide power to operate ancillary equipment on or associated with the electric traction vehicle 1910 such as pumps, instruments, tools, lights, and other equipment.

The AC bus assembly 1942 includes a plurality of phase conductors 1944. A first conductor 1946 having a first end 1948 and second end 1950 together with a second conductor 1952 having a first end 1954 and a second end 1956 can be configured together with a neutral 1964 to provide single phase power in one embodiment of the vehicle 1910. A third conductor 1958 having a first end 1960 and a second end 1962 can be used in conjunction with the first conductor 1946 and the second conductor 1952 to provide three phase power as shown in FIG. 1. The conductors 1944 can be stranded metal wire such as copper or aluminum sized and clad to transmit the power generation contemplated in the vehicle 1910 design. The conductors 1944 can also be solid metal bars, generally referred to as bus bars, composed of appropriate clad metals, such as copper or aluminum, as will be appreciated by one ordinarily skilled in the art.

Also connected to the AC power bus assembly 1942 is the power storage unit 1922, as previously mentioned. The power storage unit 1922 includes an electric power converter 1924 and an energy storage device 1926. The power storage unit 1922 can be configured to provide electric power above and beyond that required of the principal power unit 1916. The energy storage device 1926 can be electric capacitors, storage batteries, a flywheel, or hydraulic accumulators. The electric power converter 1924 can be configured to convert the AC power generated by the principal power unit 1916 to DC power and transfer such converted power to the storage device 1926. The electrical power converter 1924 can also convert the energy stored in the energy storage device 1926 back to AC power to augment and supplement the AC power generated by the principal power unit 1916 over the AC power bus assembly 1942. Applicants have determined that additional horsepower of short-term power can be provided into the AC power bus assembly 1942 over the phase conductors 1944 by discharge of an on-board capacitor or battery pack (energy storage device 1926) under control of the power storage unit 1922. (Depending on the application, the additional power may be in the range of 100–600 or more horsepower, such as 200–300 horsepower.) In one embodiment, the energy storage device 1926 is formed of a bank of ultracapacitors, such as the PC 2500 ultracapacitor available from Maxwell Technologies, 9244 Balboa Avenue San Diego, Calif. 92123. These devices provide a high electrical energy storage and power capacity and have the ability to deliver bursts of high power and recharge rapidly from an electrical energy source/sink over hundreds of thousands of cycles.

An advantage constructing the energy storage device 1926 of capacitors is that capacitors are relatively easy to discharge. Therefore, it is possible to discharge the energy storage device 1926 when maintenance is to be performed on the vehicle 1910 to avoid electrocution of maintenance personnel. In FIG. 25, the power storage unit 1922 (including the energy storage device 1926) operates under the control of one of the interface modules 1934. In one embodiment, the interface module 1934 is used to discharge the energy storage device responsive to operator inputs. For example, a capacitor discharge switch may be provided in the cab of the vehicle 1910 and/or near the energy storage device 1926 and coupled to a nearby interface module 1934. When the operator activates the switch, the interface modules 1934 cooperate responsive to ensure that no electrical power is being coupled to the AC bus assembly 1942 by the generator 1920 and any other power generating devices, such that the energy storage device 1926 is the only power source coupled to the AC bus assembly 1942 (e.g., when the prime mover or engine 1918 is not moving or is not coupled to the AC bus assembly 1942, the generator 1920 does not provide electrical power to the AC bus assembly 1942). Therefore, any stored electrical power in the energy storage device 1926 dissipates to power consuming devices that are coupled to the AC bus assembly 1942. A variety of power consuming devices may be provided for this purpose. For example, an energy dissipation device 1932 (described in greater detail below) may be used for this purpose. The dissipating capacity (e.g., resistor size and power ratings) of the energy dissipation device may be determined as a function of the desired amount of discharge time. Other power consuming devices already coupled to the AC bus assembly 1942, such as an engine cooling fan, may also be used. In this configuration, the interface module 1934 to which the engine cooling fan is connected turns on the engine cooling fan when it is determined that the operator input at the capacitor discharge switch has been received.

The power storage unit 1922 may be coupled to the communication network 1976 and controlled by the interface module 1934. The combined electrical power from the principal power unit 1916 and the power storage unit 1922 will all be available on the AC power bus assembly 1942 for use by the electric motors 1928 or by any other module 1984 or auxiliary module 1986 as determined by the operator at the user interface 1936 of the interface module 1934.

In operation, the power storage unit 1922 receives power from the principal power unit 1916 over conductors 1944 of the AC power bus assembly 1942. The power received is converted into the appropriate energy mode required by the energy storage device 1926 and maintained in the energy storage device 1926 until required during the operation of the vehicle 1910. If the principal power unit 1916 is not functioning for any reason, the energy in the power storage unit can be utilized to operate, for a given period of time, the vehicle 1910 or any of the modules 1984 or auxiliary modules 1986 mounted on the vehicle 1910. In the context of a military vehicle, the power storage unit 1922 may also be used in stealth modes of operation to avoid the noise associated with the prime mover (e.g., diesel engine) 1918 and the generator 1920.

Energy storage recharge of the power storage unit 1922 by the principal power unit 1916 begins automatically and immediately after the vehicle 1910 arrives at its destination and continues during the vehicle's return run to its original location. The state of charge of the power storage unit 1922 is maintained between missions by a simple plug connection to a power receptacle in the vehicle's garage or storage location, which receptacle will automatically disconnect as the vehicle 1910 leaves such site. The power storage unit 1922 can also receive energy generated by the electric motors 1928 when the motors are configured in a regeneration mode in which case they function as a generator. Such functionality is utilized in a braking procedure for the vehicle as determined by the operator at a user interface 1936 (see FIG. 26). The electric motor 1928 and AC power bus assembly 1942 can also be configured to regenerate power back to the principal power unit 1916.

Figure 26:
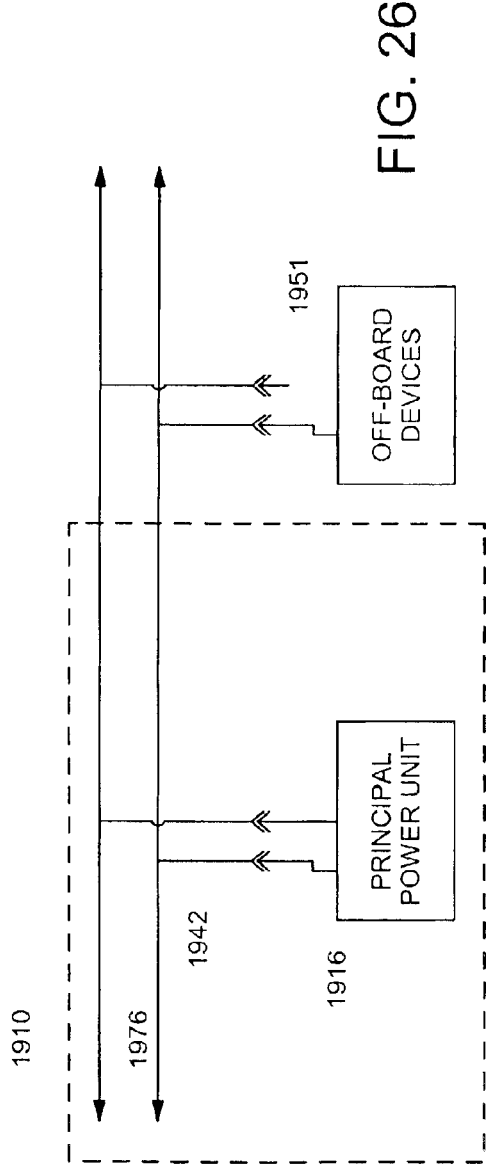
FIG. 26 is a schematic diagram showing the vehicle of FIG. 25 being used as a mobile electric power plant.

As shown in FIG. 26, the vehicle 1910 can also serve as an on-site power source for off-board electric power consuming devices 1951. For example, in the context of a military vehicle, the vehicle 1910 can serve as a mobile electric generator. When the vehicle is stationary, the electric motors 1928 consume substantially zero power. Therefore, electric power that would otherwise be used to drive movement of the vehicle 1910 can be supplied to off-board equipment. In the context of an ARFF vehicle, if an airport loses electricity due to a failure in the power grid, an ARFF vehicle that implements the system described herein can be used to generate power for the airport by connecting the power bus for the airport to the AC bus assembly 1942 through the use of a suitable connector. Likewise, at the scene of a fire, the AC bus assembly 1942 can be used to provide power for scene lighting. In one preferred embodiment, the power generating capacity of the vehicle 1910 is in the neighborhood of about 500 kilowatts of electricity, which is enough to power approximately 250–300 typical homes. Depending on the size of the vehicle 1910 and the principal power unit 1916, the power generating capacity may be smaller (e.g., 250 kilowatts) or larger (e.g., 750 kilowatts). Additionally, because the AC bus assembly 1942 provides 480V, three phase, AC 60 Hz power, which is commonly used in industrial settings, there is no need to convert the power from the AC bus assembly 1942. In this regard, in FIG. 26, the off-board power-consuming devices 1951 are shown not to be connected to the communication network 1976, because the power provided by the AC bus assembly 1942 can be provided to a variety of standard devices, including devices which are not specifically designed for use with the vehicle 1910.

Preferably, an energy dissipation device 1932 is coupled to the AC bus assembly 1942 and the communication network 1976. If it is determined that the principal power unit 1916 or the electric motors 1928 or any other auxiliary module 1986 generating too much power or are not utilizing sufficient power, the excess power can be dissipated through the energy dissipation device 1932. An example of an energy dissipation device 1932 is a resistive coil that may be additionally cooled by fans or an appropriate fluid. Another example of an energy dissipation device 1932 is a steam generator which utilizes excess heat generated in the vehicle to heat water to produce steam. Another example of an energy dissipation device is to have the system back feed the generator to act as a motor and use the engine as an air pump to pull power out of the system. The energy dissipation device, for example, may be used during regenerative braking when the level of charge in the capacitor bank forming the energy storage device 1926 is near its peak.

Figure 27:
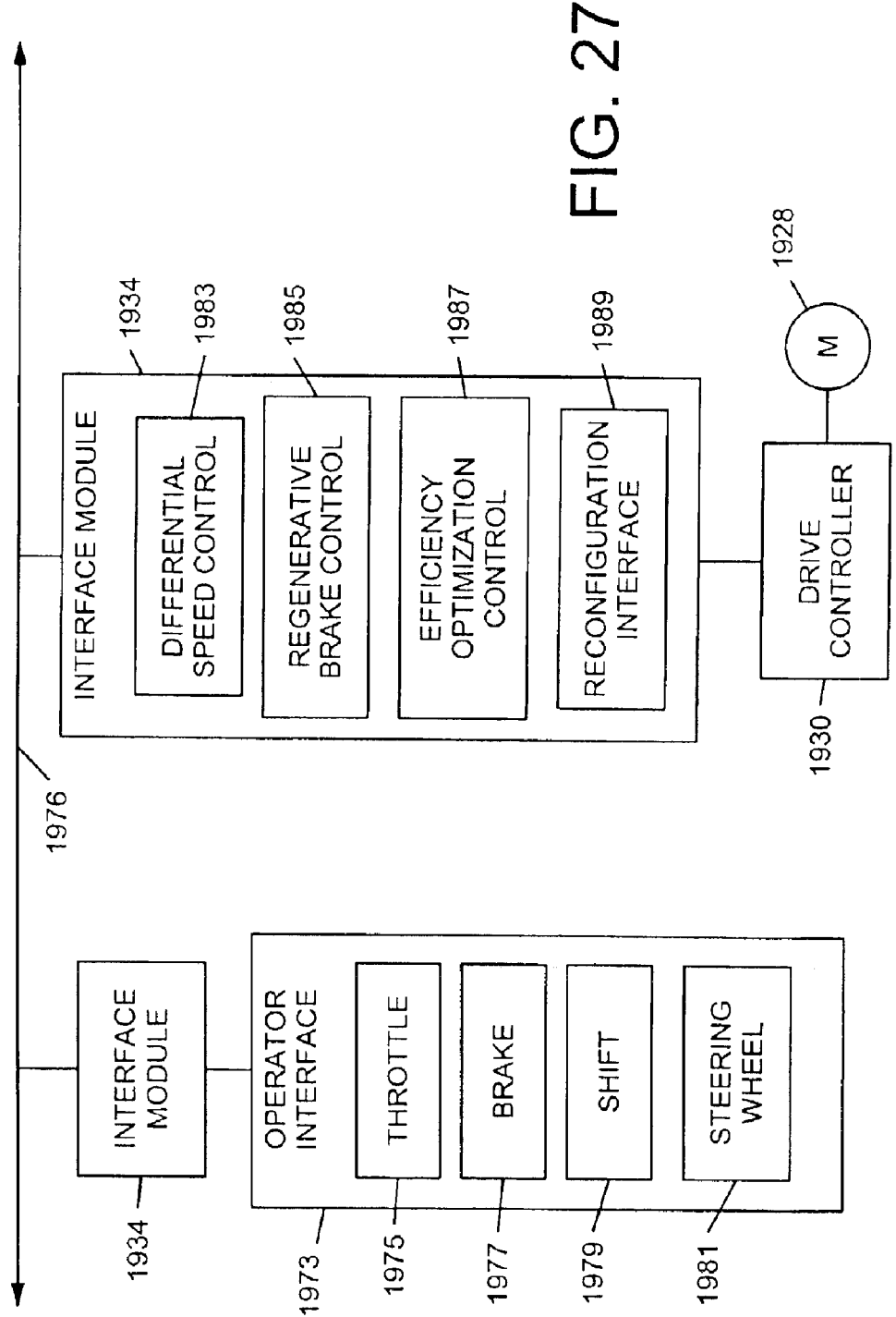
FIG. 27 is a schematic diagram showing selected aspects of a control system of FIG. 25 in greater detail.

Referring now to FIG. 27, selected aspects of the vehicle 1910 of FIG. 25 are shown in greater detail. The vehicle 1910 further comprises an operator interface 1973 which includes a throttle pedal 1975, brake pedal 1977, shift control 1979, and steering wheel 1981. In FIG. 27, these input devices are shown as being connected to a common interface module 1934 which is connected to the communication network 1976 along with the interface modules 1934 coupled to the electric motors 1928 (only one of which is shown in FIG. 26). Although the input devices 1975–1981 are shown as being coupled to a common same interface module, the input devices may also be coupled to different interface modules. The operator interface may also receive inputs from other input devices to raise or lower the vehicle, lock the suspension, control a load-handling system, and control vehicle operation in stealth modes of operation (e.g., operating exclusively on the power storage unit 1922). The operator interface 1973 may include a display that displays information to the operator such as speed, charge level of the storage unit 1922, generator efficiency, direction of travel, alarm status, fuel economy, temperatures, pressures, and data logging information.

Each interface module 1934 receives the I/O status information from the operator interface 1973. For those interface modules that are connected to a respective drive controller 1930 and electric motor 1928, the I/O status information from the operator interface 1973 is processed to provide control signals to control the electric motor 1928. This process is shown in FIG. 27.

Figure 28:
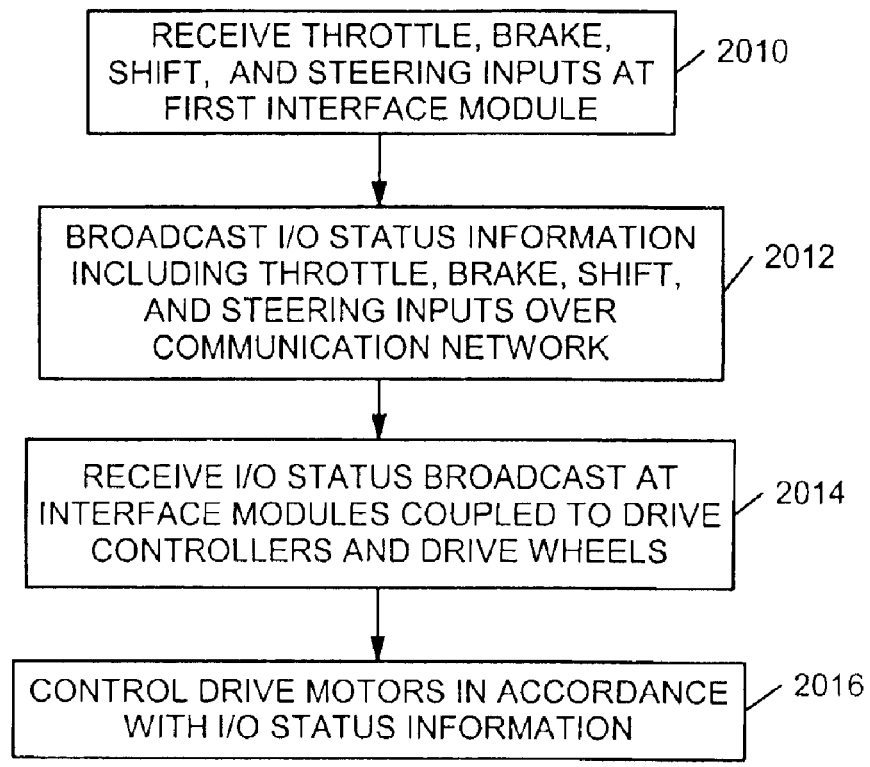
FIG. 28 is a flowchart showing the operation of a control system of FIG. 25 in greater detail.
Figure 30:
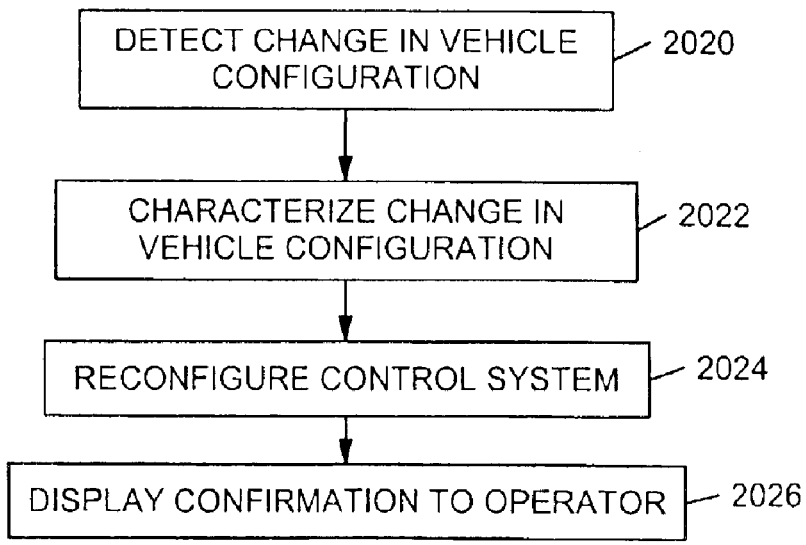
FIG. 30 is a flowchart showing another aspect of the operation of a control system of FIG. 25 in greater detail.

Referring now to FIG. 28, at step 2010, throttle, brake, shift, and steering inputs are received from the operator at the interface module 1934 which is connected to the operator interface 1973. At step 2012, the throttle, brake, shift and steering inputs are transmitted by way of the communication network 1976 (during I/O status broadcasts as previously described). At step 2014, this information is received at each of the remaining interface modules 1934. At step 2016, the interface modules 1934 that control the electric motors 1928 use the throttle, brake, shift and steering inputs to control the electric motors 1928. To this end, the interface modules 1934 determine a speed or torque command and provide this command to the drive controller 1930. Other information, such as vehicle weight, minimum desired wheel speed, wheel slip control parameters, and other information may also be used. Although the vehicle 1910 does not include a mechanical transmission, the shift input from the shift input device 1979 may be used to cause the electric motors 1928 to operate at different operating points depending on a status of the shift input device, with each of the operating points corresponding to different torque production capabilities (or different tradeoffs between vehicle responsiveness/acceleration capability and motor efficiency).

Each interface module 1934 preferably includes a number of control subprograms, including a subprogram 1983 for differential speed control, a subprogram 1985 for regenerative brake control, a subprogram 1987 for efficiency optimization control, and a configuration interface 1989. These programs provide for further control of the torque/speed command given by each interface module 1934 to the respective drive controller 1930.

The differential speed control program 1987 accepts the steering angle as an input and controls the motor speed of each motor 1928 such that the wheels 1914 rotate at slightly different speeds during vehicle turning maneuvers. The differential speed control program 1987 is an electronic implementation of a mechanical differential assembly. The steering angle input may also be used by another interface module 1934 to control a steering mechanism of the vehicle 1910 to thereby control a direction of travel of the vehicle 1910. Preferably, steering control takes into account other I/O status information (such as vehicle speed) and is optimized to avoid vehicle slippage ("scrubbing") during turn maneuvers. The differential speed control program 1987 monitors motor torque output along with other system parameters such that the speed difference between motors does not go above a predefined limit. This can be controlled both side by side and front to back and combinations of both. By commanding torque and monitoring and adjusting for speed difference, optimal tractive force can be put to ground in any traction condition.

Regenerative brake control program 85 controls the motor 1928 such that the motor provides a braking action to brake the vehicle 1910 in response a regeneration/auxiliary signal is received. For example, a signal may be received from a brake pedal request (the brake pedal 1977 is pressed), no TPS count, or other user controlled input/switch. This causes the motor 1928 to act as a generator to regenerate power back to the power storage unit 1922 or the principal power unit 1916 via the AC bus assembly 1942. In addition to regenerative braking, a standard anti-lock brake system is also used.

The efficiency optimization control program 87 controls motor speed and torque conditions to allow a first subset of the motors 1928 to operate at an optimal power for a particular speed, and a second subset of the motors 1928 to operate in a regenerative mode. Having one set of motors operate 1928 at an optimal power for a particular speed and a second set of motors 1928 operate in a regenerative mode is more efficient and draws less net power than having all of the motors 1928 operating at a non-optimal speed. Alternative power matching schemes may also be used in which optimum efficiency for some of the motors 1928 is reached by having some of the remaining motors 1928 operate in a non-torque producing mode.

Configuration interface program 1989 allows for reconfiguration of the vehicle 1910 depending on which types of auxiliary modules are mounted to the vehicle 1910. The configuration program 1989 detects what type of auxiliary modules are connected to the vehicle, and adjusts the configuration of the control program executed by the interface modules 1934 to take into account the particular configuration of the vehicle 1910 as determined by which auxiliary modules are present.

In particular, in the preferred embodiment, the principal power unit 1916, the power storage unit 1922, and the energy dissipation device 1932 are provided as auxiliary modules 1984 that are removably mounted on the vehicle platform and are removably connected to the communication network 1976 and the AC bus assembly 1942 by way of a suitable connector assembly. Other auxiliary modules 1986 may also be provided. An auxiliary module 1986 can be any type of equipment or tool required or associated with the function and operation of the vehicle 1910. For example, the auxiliary module can be a pump, a saw, a drill, a light, etc. The auxiliary module 1986 is removably connected to the communication network 1976 and the AC bus assembly 1942. A junction 1988 is used to facilitate the connection of the modules to the communication network 1976 and the AC power bus assembly 1942 and multiple junctions 1988 are located at convenient locations throughout the vehicle 1910. The junctions 1988 can accommodate various types of connections such as quick connectors, nuts and bolts, solder terminals, or clip terminals or the like. The junction 1988 can include a connector to accommodate connection to the communication network 1976 and/or the AC bus assembly 1942. Additional auxiliary modules can be added to the vehicle 1910 as circumstances and situations warrant.

Figure 29:
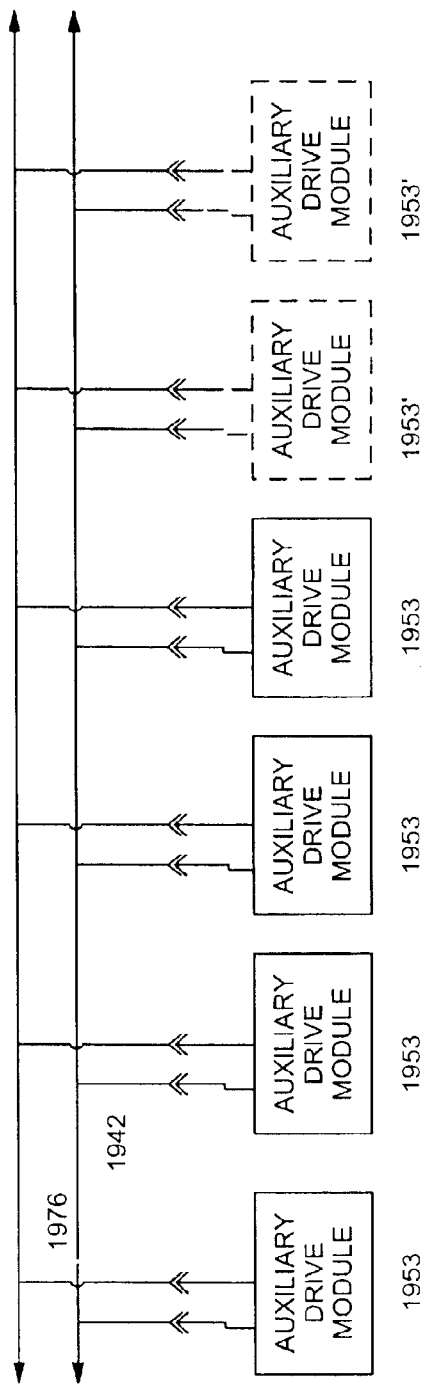
FIG. 29 is a schematic diagram showing auxiliary drive modules used in the vehicle of FIG. 25.

In the preferred embodiment, and as shown in FIG. 29, auxiliary drive modules 1953 are used that each include a respective one of the drive wheels 1914, a respective one of the electric motors 1928, a respective one of the drive controllers 1930, and a respective one of the interface modules 1934. Like the other auxiliary modules discussed above, the auxiliary drive modules 1953 are capable of being removed, replaced, and added to the vehicle 1910. To this end, each auxiliary drive module includes an electrical connector that mates with a compatible electrical connector one the vehicle platform 1912 and a mechanical mounting system (e.g., a series of bolts) that allows the auxiliary drive module 1953 to be quickly mounted to or removed from the vehicle 1910. The electrical connector connects the interface module 1934 to a communication network 1976 and connects the drive controller 1930 to the AC bus assembly 1942. Therefore, if one auxiliary drive module 1953 malfunctions, the auxiliary drive module 1953 can be removed and replaced with a properly functioning auxiliary drive module 1953. This allows the vehicle 1910 to return immediately to service while the inoperable drive module is serviced. This arrangement also allows the same vehicle to be provided with different drive capacities depending on intended usage. For example, under one usage profile, the vehicle 1910 may be provided with four auxiliary drive modules 1953. Under a second usage profile, the vehicle 1910 may be provided with two additional auxiliary drive modules 1953' for extra drive capacity. Additionally, the vehicle platform 1912 is preferably a generic vehicle platform that is used with several different types of vehicles having different application profiles requiring different drive capacities. In this regard, it may also be noted that the principal power unit 1916 is also capable of being removed and replaced with a principal power unit 1916 with a larger electric generation capacity. This feature is therefore advantageous in that auxiliary drive modules 1953 are capable of being added to and removed from the vehicle as a unit to achieve a corresponding increase or decrease in the drive capacity of the vehicle 1910, thereby giving the vehicle 1910 a reconfigurable drive capacity. As previously indicated, the system can be configured to have one of the interface modules 1934 control a single drive wheel 1914, an entire axle assembly (one or two motor configuration) as well as a tandem axle assembly (one and two motor axle configurations), as well as other permutations and combinations.

Referring to FIG. 28, FIG. 28 shows the operation of the configuration program 1989. At step 2020, it is detected that there has been a change in vehicle configuration. The auxiliary module may be any of the auxiliary modules described above. Step 2020 comprises detecting that an auxiliary module has been added in the case of an added auxiliary module, and comprises detecting that an auxiliary module has been removed in the case of a removed auxiliary module. If an auxiliary module has been rendered in operable (e.g., one of the electric motors 1928 has failed), then step 2020 comprises detecting that the inoperable auxiliary module has failed.

At step 2022, the configuration change is characterized. For example, if an auxiliary module has been added or removed, the type and location of the added/removed auxiliary module is determined. If one auxiliary module has been replaced with another auxiliary module, the location at which the change was made as well as the module type of the added and removed auxiliary modules is determined. In the case where the auxiliary module comprises an interface module 1934, the different characteristics of the different auxiliary modules may be stored in the respective interface modules 1934. As a result, step 2022 may be performed by querying the interface module 1934 of the removed auxiliary module (before it is removed) and by querying the interface module of the added auxiliary module.

At step 2024, the vehicle 1910 is reconfigured to accommodate the added auxiliary drive module. Step 2024 comprises updating control algorithms in the interface modules 1934. For example, if two auxiliary drive modules are added, the control algorithms may be updated to decrease the horsepower produced by the original motors 1928 in response to a particular throttle input to take into account the additional horsepower provided by the added electric motors 1928. Alternatively, if one of the electric motors 1928 fails or is otherwise rendered inoperable, then the updating compensates for less than all drive wheels being driven by causing the remaining electric motors to be controlled to provide additional horsepower. This gives the vehicle 1910 different modes of operation, for example, a first mode of operation in which the electric motors are controlled such that all of the plurality of drive wheels are driven, and a second mode of operation in which the electric motors are controlled such that less than all of the plurality of drive wheels are driven.

At step 2026, a confirmation is sent to the operator of the vehicle 1910 via a display of the operator interface 1973 to confirm that the vehicle has been reconfigured. It may also be desirable to transmit this information to other systems. For example, one of the interface modules 1934 may be provided with a wireless modem, and the change in configuration information may be transmitted wireless to an off-board computer using a radio frequency (RF) communication link. Indeed, any of the information stored in any of the interface modules or any of the other vehicle computers (e.g., engine control system, transmission control system, and so on) may be transmitted to an off-board computer system in this manner to allow off-board vehicle monitoring and/or off-board vehicle troubleshooting. The transfer of information may occur through a direct modem link with the off-board vehicle computer or through an Internet connection.

Thus, the vehicle 1910 has a modular construction, with the principal power unit 1916, the power storage unit 1922, the energy dissipation device 1932, the auxiliary drive modules 1953, other drive modules 1984 and 1986, and so on, being provided as modules that can be easily added to or removed from the vehicle. Any number of such modules can be added and is limited only by the extent to which suitable locations which connections to the communication network and AC bus assembly 1942 exist on the vehicle 1910. Once such a device is added, the control system is automatically reconfigured by the interface modules 1934.

Figure 31A:
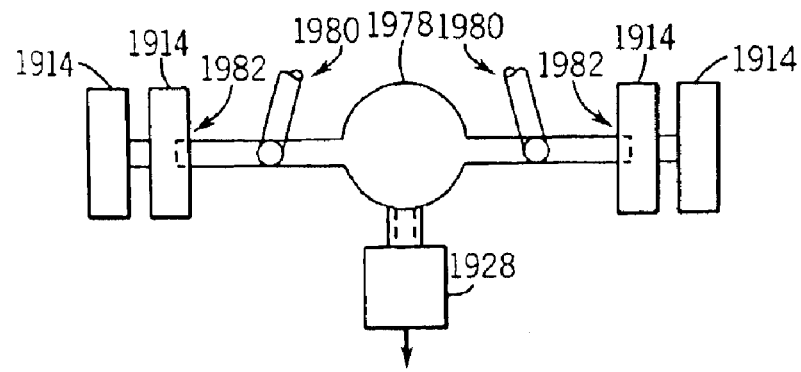
FIG. 31A is a top plan view illustration of an exemplary embodiment of a differential assembly coupled to an electric motor for driving at least two wheels and supported by a suspension assembly.
Figure 31B:
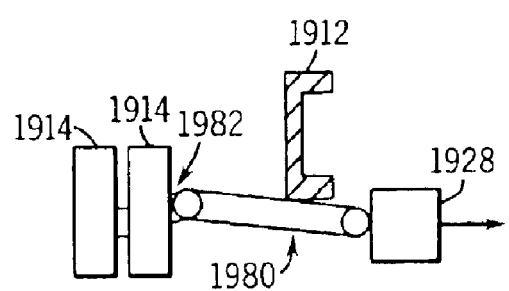
FIG. 31B is an end view partial sectional view of an exemplary embodiment of an electric traction vehicle support structure coupled to a suspension assembly which suspends at least one wheel relative to the vehicle support structure.

FIG. 25 illustrates the wheels 1914 being driven directly by an electric motor 1928 through an appropriate wheel-end reduction assembly 1982 if necessary. Referring now to FIGS. 31A–31B, a wheel-end reduction assembly 1982 can also couple the wheels 1914 to a differential assembly 1978 via drive shafts. A plurality of wheel-end reduction assemblies 1982 can couple the wheels 1914 to their respective electric motors 1928. Another embodiment of the vehicle 1910 includes a differential assembly 1978 coupled to the electric motor 1928 for driving at least two wheels 1914 as shown in FIG. 27. Additional differential assemblies 1978, such as three assemblies 1978, with each differential assembly coupled to an electric motor 1928 for driving at least two wheels, can also be configured in the vehicle 1910.

Figure 33:
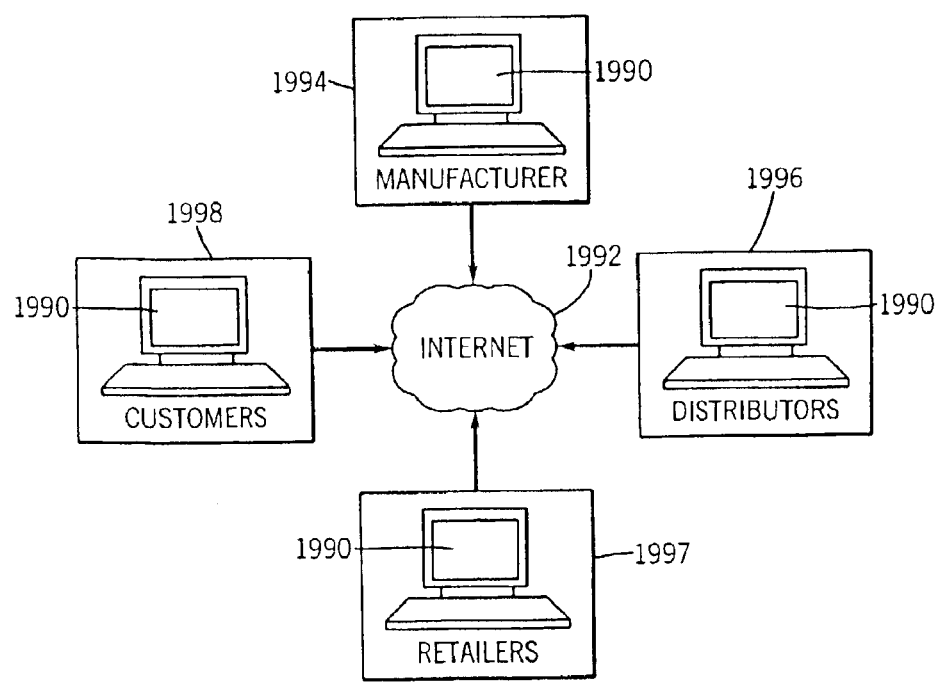
FIG. 33 is a schematic block diagram illustrating various entities connected to the Internet for the transmission of data indicative of an electric traction vehicle.

Referring now to FIG. 33, a method of transferring data indicative of an electric traction vehicle 1910 to potential customers over the Internet 1992 includes obtaining information on an electric traction vehicle 1910 including dates, prices, shipping times, shipping locations, general shipping data, module type, inventory, specification information, graphics, source data, trademarks, certification marks and combinations thereof. The method further includes entering the information on to a terminal 1990 that is operationally connected to an Internet server. Terminal 1990 may be microprocessor, a computer, or other conventionally known device capable of operationally connecting to a conventionally known Internet server. The method further includes transmitting to the information from terminal 1990 to the Internet server that is operationally connected to Internet 1992. Information be transmitted to the internet from the interface modules 1934 and may include any of the information stored in the interface modules 1934 or any other vehicle computer, as previously noted. The method allows manufacturers 1994, distributors 1996, retailers 1997 and customers 1998, throughout the use of terminals 1990, to transmit information, regarding the electric traction vehicle 1910 and the potential sale of the electric traction vehicle 1910 to customers, to one another individually, collectively or by any combination thereof.

Thus, there is provided an electric traction vehicle of modular design with the modules interconnected by an AC bus assembly and a data bus network. Other embodiments using other types of vehicles are possible. For example, an electric traction vehicle using a modular component design can be utilized as a fire truck for use at an airport or one that can negotiate severe off-road terrain. The vehicle can also be used in a military configuration with the ability to negotiate extreme side slopes and negotiate extreme maneuvers at high speeds. The modular aspect of the vehicle architecture will allow for optimum placement of components to maximize performance with regard to center of gravity which will facilitate its operational capabilities.

D. Network Assisted Monitoring, Service, and Repair

Figure 42:
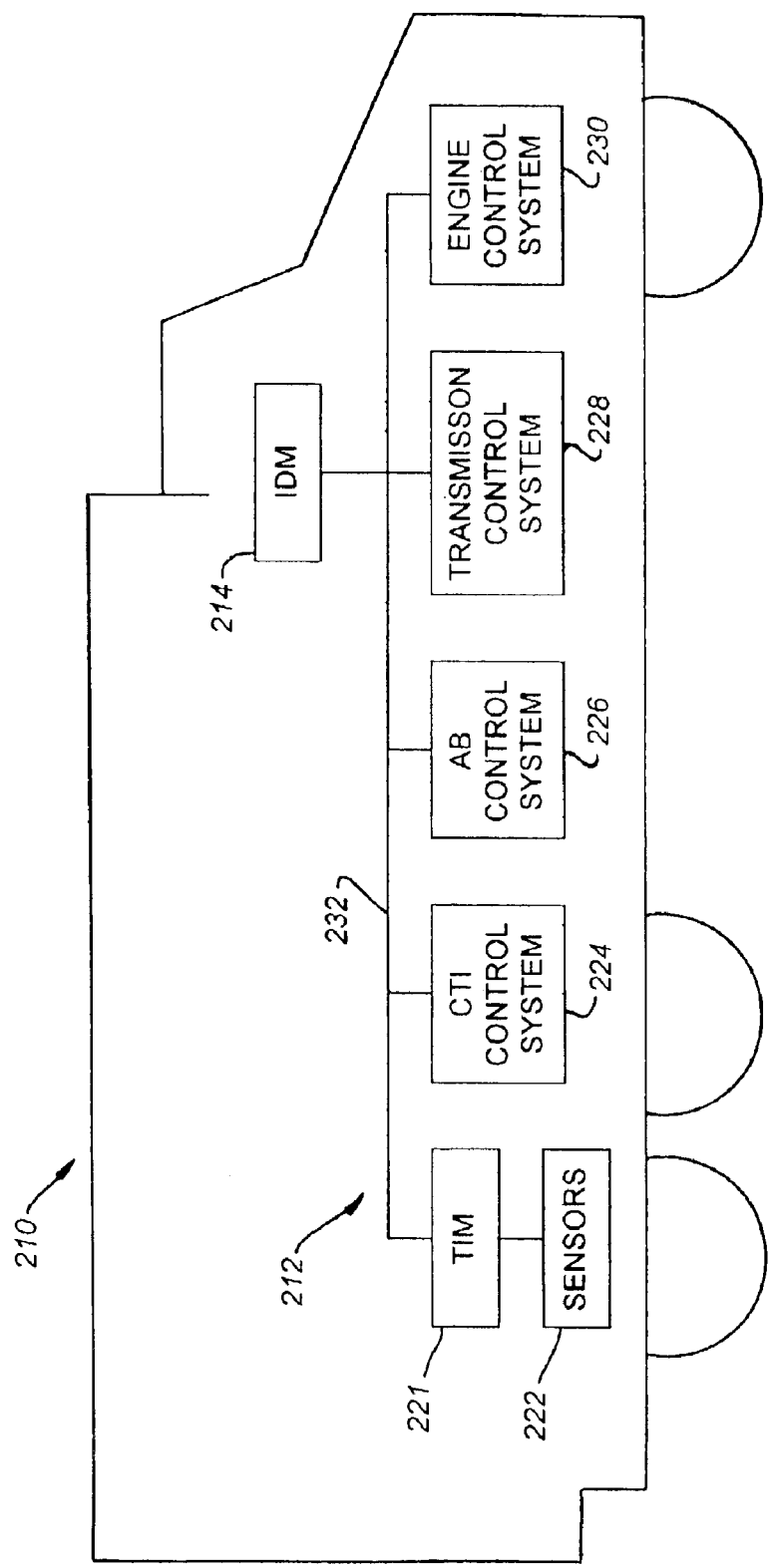
FIG. 42 is a schematic view of a military vehicle having a diagnostic system according to one embodiment of the present invention.

Referring now to FIG. 42, a preferred embodiment of an equipment service vehicle 210 having a diagnostic system 212 according to an embodiment of the invention is illustrated. By way of overview, the diagnostic system 212 comprises an intelligent display module 214, a test interface module 221 connected to a plurality of sensors 222, and a plurality of additional vehicle control systems 224–230. The intelligent display module 214, the test interface module 221, and the plurality of additional vehicle control systems 224–230 are interconnected with each other by way of a communication network 232.

More specifically, the vehicle 210 is a military vehicle and, in particular, a medium tactical vehicle. However, it should be understood that the diagnostic system 212 of FIG. 42 could also be used with other types of military vehicles. For example, the diagnostic system 212 could be used in connection with heavy equipment transporter vehicles, which are used to transport battle tanks, fighting and recovery vehicles, self-propelled howitzers, construction equipment and other types of equipment. These types of vehicles are useable on primary, secondary, and unimproved roads and trails, and are able to transport in excess of 100,000 pounds or even in the range of 200,000 pounds or more. The diagnostic system 212 can also be used in connection with palletized load transport vehicles, in which a mobile truck and trailer form a self-contained system capable of loading and unloading a wide range of cargo without the need for forklifts or other material handling equipment. Such trucks are provided with a demountable cargo bed and a hydraulically powered arm with a hook that lifts the cargo bed on or off the truck. These trucks may be also provided with a crane to drop off the pallets individually if the entire load is not needed. Further, the diagnostic system 212 can also be used in connection with trucks designed for carrying payloads for cross country military missions. Such trucks may include, for example, cargo trucks, tractors, fuel servicing trucks, portable water trucks, and recovery vehicles (with crane and winch). Such trucks are capable of passing through water crossings three or four or more feet deep. These trucks can also be used for missile transports/launchers, resupply of fueled artillery ammunition and forward area rearm vehicles, refueling of tracked and wheeled vehicles and helicopters, and recovery of disabled wheeled and tracked vehicles. The diagnostic system 212 can be used in connection with a wide range of other military vehicles as well.

The intelligent display module 214 provides an operator interface to the diagnostic system 212 and also provides intelligence used to conduct diagnostic tests and other services. In particular, the intelligent display module 214 includes a test control module 215 (which further includes a microprocessor 216 and a diagnostic program 217) and an operator interface 218 (which further includes a display 219 and a keypad 220) (see FIG. 43).

In the preferred embodiment, the test control module 215 and the operator interface 218 are provided as a single, integrated unit (namely, the intelligent display module 214) and share the same housing as well as at least some of the internal electronics. Other arrangements are possible, however. For example, as can be easily imagined, it would also be possible to provide the test control module 215 and the operator interface 218 in the form of separate physical units, although this arrangement is not preferred for reasons of increased cost and parts count. Both the test control module 215 and the operator interface 218 can be obtained in the form of a single, integrated unit from Advanced Technology, Inc., Elkhart, Ind. 46517. This product provides a generic flat panel 4 line×20 character display 219, four button keypad 220, microprocessor 216, and memory that is capable of being programmed with a program (such as the diagnostic program 217) to customize the intelligent display module for a particular application. Of course, a more (or less) elaborate intelligent display module could also be utilized. For example, if on-line parts ordering capability is incorporated as detailed below, then a display module with an SVGA flat touch screen monitor with a microprocessor and memory may be preferred. Also, the test control module 215 may be implemented using one of the interface modules 20, 30, 1420 previously described, providing that the interface module has sufficient graphics capability to drive a display.

Also in the preferred embodiment, the intelligent display module 214 is semi-permanently mounted within the vehicle 210. By semi-permanently mounted, it is meant that the intelligent display module 214 is mounted within the vehicle 210 in a manner that is sufficiently rugged to withstand normal operation of the vehicle for extended periods of time (at least days or weeks) and still remain operational. However, that is not to say that the intelligent display module 214 is mounted such that it can never be removed (e.g., for servicing of the intelligent display module) without significantly degrading the structural integrity of the mounting structure employed to mount the intelligent display module 214 to the remainder of the vehicle 210. The intelligent display module 214 is preferably mounted in an operator compartment of the vehicle 210, for example, in a storage compartment within the operator compartment or on an operator panel provided on the dashboard.

The operation of the test control module 215, and in particular of the microprocessor 216 to execute the diagnostic program 217, is shown and described in greater detail below in conjunction with the flowchart of FIG. 45. In general, the microprocessor 216 executes the diagnostic program 217 to diagnose subsystem faults, to display fault information, to maintain vehicle maintenance records, and to perform data logging for system diagnosis and/or for accident reconstruction. Depending on the application, it may be desirable to incorporate additional services as well, or to incorporate fewer than all of these services.

The operator interface 218 includes the display 219 which is used to communicate (and, in particular, to display) information to the operator. For example, the display 219 is used to prompt the operator to enter information into the keypad 220, or to take certain actions with respect to the vehicle during testing (e.g., bring the engine to a specified RPM level). The display 219 is also used to display a menu or series of menus to allow the operator to select a test to be performed or to select another service of the intelligent display module 214 to be utilized. The display 219 is also used to display status information during system startup and during testing, and to display any error messages that arise during system startup or during testing. The display 219 is also used to display input data and fault mode indicators from control systems 224–230, and any other information from additional vehicle subsystems. The display 219 is also used to display information from discrete sensors such as the sensors 222. The display 219 is also used to display the results of diagnostic tests that are performed (e.g., a pass/fail message or other message).

Preferably, the display 219 displays all of this information to the operator in a user-friendly format as opposed to in the form of codes that must be interpreted by reference to a separate test or service manual. This is achieved in straightforward fashion by storing in the memory of the intelligent display module 214 information of the type commonly published in such manuals to facilitate manual interpretation of such codes, and using this information to perform the translation automatically. Likewise, as previously noted, the display 219 is used to prompt the operator to take certain actions with respect to the vehicle during testing and to otherwise step the operator through any test procedures, without reference to a test manual. This allows the amount of operator training to be reduced.

The operator interface 218 also includes the keypad 220 which is used to accept or receive operator inputs. For example, the keypad 220 is used to allow the user to scroll through and otherwise navigate menus displayed by the display 219 (e.g., menus of possible tests to be performed on the vehicle 210), and to select menu items from those menus.

As previously noted, it would also be possible to utilize a more elaborate intelligent display module. For example, a more elaborate keypad 220 could be utilized if more data entry capability is desired. In this regard, however, it is noted that the intelligent display module 214 also preferably includes a communication port that allows the display module to communicate with a personal computer 233 by way of a communication network 232 (see FIG. 43). The personal computer 233 can be used to retrieve, manipulate and examine data stored within the intelligent display module 214. For example, if the intelligent display module 214 includes a data logger as described below, the personal computer can be used to retrieve and examine the information stored by the data logger. Likewise, if the intelligent display module 214 implements a vehicle maintenance jacket, the personal computer 233 can be used to retrieve and modify data stored in the vehicle maintenance jacket. Further, using the personal computer 233, it is possible to integrate the diagnostic system 212 with an interactive electronic technical manual (IETM), to allow the interactive electronic technical manual to access the data available from the diagnostic system 212.

The test interface module 221 accepts requests from the intelligent display module 214 for information from the sensors 222, retrieves the requested information from the respective sensor 222, converts input signals from the respective sensor 222 into a format that is compatible with the communication network 232, and transmits the information from the respective sensor 222 to the intelligent display module 214 via the communication network 232. The test interface module 221 is therefore implemented as a passive unit with no standard broadcasts that burden the communication network 232. As a result, in operation, the test interface module 221 does not regularly transmit data on the communication network 232. Rather, the test interface module 221 passively monitors the communication network 232 for information requests directed to the interface module 221. When an information request is received, the test interface module 221 obtains the requested information from the relevant sensor 222, and then transmits the requested information on the communication network 232 to the intelligent display module 214. Alternatively, in accordance with the arrangement described in FIGS. 20–23, it may be desirable to implement the test interface module 221 as an active unit that broadcasts input status information in the same manner as the interface modules 1420.

The test interface module 221 may, for example, include as many inputs as there are sensors 222. Each input may include associated switches for configuring the input, an analog-to-digital converter to convert analog signals to a digital format, and any other signal processing circuitry. The number of inputs is not important, since it is possible to use fewer test interface modules each with a larger number of inputs, or more test interface modules each with a smaller number of inputs. The number of inputs is not limited in any particular way and is determined by need.

In practice, the test interface module 221 may be a commercially available unit capable of putting information from discrete sensors onto a communication network such as SAE (Society of Automotive Engineers) J1708. The test interface module 221 preferably also meets applicable standards for underhood installation, such as SAE J1455, to allow the test interface module to be located in close proximity to the sensors 222 to reduce wiring. The test interface module may, for example, be obtained from Advanced Technology Inc., Elkhart, Ind. 46517 (PN 3246282). Again, however, a wide range of devices of varying construction and complexity could be utilized to implement the test interface module 221.

Figure 43:
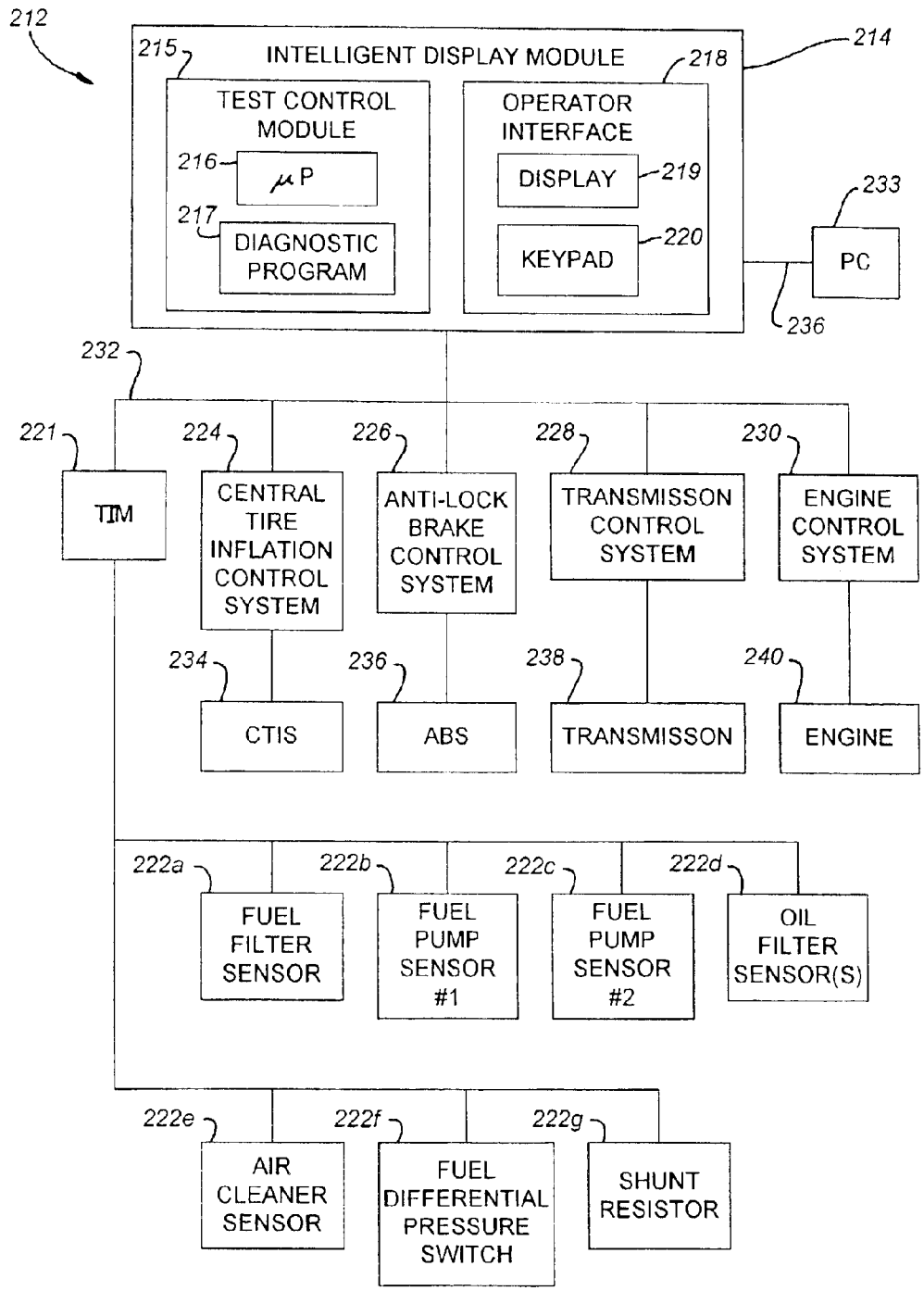
FIG. 43 is a block diagram of the diagnostic system of FIG. 42 showing selected aspects of the diagnostic system in greater detail.

The test interface module 221 is connected to the plurality of sensors 222 which are each capable of obtaining information pertaining to the health and operation of a vehicle subsystem. "Health" and "operation" are interrelated and information that pertains to one will, at least to some extent, pertain to the other as well. The sensors 222 are discrete sensors in the sense that they are not integrally provided with the control systems 224–230 and associated controlled mechanical systems (e.g., engine, transmission, and so on) 234–240. The sensors are add-on devices that are used only in connection with the intelligent display module 214. In general, discrete sensors are preferably only used when the information provided by the sensor is not otherwise available on the communication network 232. In FIG. 43, the sensors 222 are shown to include a fuel filter inlet pressure sensor 222a, fuel pump outlet pressure sensor 222b, fuel return pressure sensor 222c, oil filter sensors 222d, an air cleaner pressure sensor 222e, a fuel differential pressure switch 222f, and a shunt resistor 222g (used to determine compression imbalance based on unequal current peaks in the starter current).

In addition to the intelligent display module 214 and the test interface module 221, the diagnostic system 212 also includes a plurality of additional vehicle control systems 224–230, as previously noted. As shown in FIG. 43, the control system 240 is a central tire inflation control system that controls a central tire inflation system (CTIS) 34, the control system 226 is an anti-lock brake control system that controls an anti-lock brake system (ABS) 236, the control system 228 is a transmission control system that controls a transmission 238, and the control system 230 is an engine control system that controls an engine 240. The vehicle subsystems formed by the mechanical systems 234–240 and associated control systems 224–230 are conventional and are chosen in accordance with the intended use of the vehicle 210.

The control systems 224–230 each store information pertaining to the health and operation of a respective controlled system. The control systems 224–230 are capable of being queried and, in response, making the requested information available on the communication network 232. Because the vast amount of information required for performing most diagnostic tests of interest is available from the control systems 224–230 by way of the communication network 232, it is possible to drastically reduce the number of discrete sensors 222 that are required. Thus, as just noted, discrete sensors are preferably only used when the information provided by the sensor is not otherwise available on the communication network 232.

Typically, each of the control systems 224–230 comprises a microprocessor-based electronic control unit (ECU) that is connected to the communication network 232. When the intelligent display module 214 requires status information pertaining to one of the mechanical systems 234–240, the intelligent display module 214 issues a request for the information to the respective one of the control systems 224–230. The respective control system then responds by making the requested information available on the communication network 232.

Typical ECUs for transmission and engine control systems are capable of producing fault codes and transmitting the fault codes on the communication network 232. Depending on the type of fault, the fault codes may be transmitted automatically or alternative only in response to a specific request for fault information. Typical ECUs for central tire inflation systems and anti-lock brake systems also transmit fault codes but, in most commercially available systems, fault codes are transmitted only in response to specific requests for fault information. When a fault code is transmitted on the communication network 232, the intelligent display module 214 receives the fault codes from the communication network 232, interprets the fault codes, and displays the interpreted fault codes to a human operator using the display 219.

It may be noted that the diagnostic system 212 may be implemented as a stand-alone system or in the context of the control systems 12 and 1412 described in connection with FIGS. 1–23. For example, in the context of the control system 1412, the communication network 232 and the communication network 1460 may be the same network, such that the intelligent display module 214 and the test interface module 221 are disposed on the communication network 1460 along with the interface modules 1420. When combined in this manner, the anti-lock brake control system 226 and anti-lock brake control system 1495 are in practice the same devices, as are the transmission control system 228 and the transmission control system 1493, and the engine control system 230 and the engine control system 1491, and also as are the respective controlled subsystems. The intelligent display module 214 maintains a dynamically updated I/O status table 1520 by listening to the I/O status broadcasts made by the interface modules 1420 and the control systems 224–230, as described in connection with FIGS. 20–23. This makes it possible to connect the sensors 222 to the communication network 232 by way of one or more of the interface modules 1420 rather than through the use of a separate dedicated test interface module, and making it possible to eliminate redundant sensors. A further advantage of this arrangement is that the intelligent display module 214 has access to all of the I/O status information provided by the interface modules 1420.

Figure 44:
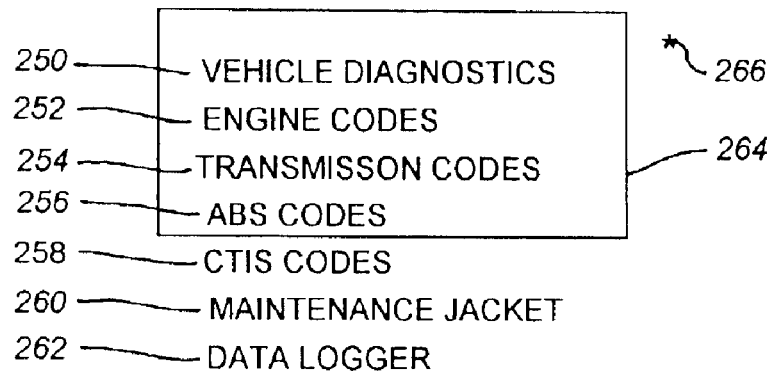
FIG. 44 is a menu displayed by a display of the diagnostic system of FIG. 42 showing various services offered by the diagnostic system.

Referring now to FIG. 44, in general, during operation, the display 219 displays menus to the operator and the keypad receives operator inputs used to navigate the menu, make menu selections, and begin testing. Assuming other services are also provided, the operator is first prompted to select an option from among a list of options that includes options of other services provided by the intelligent display module 214. The list of options may include, for example, an option 250 to perform vehicle diagnostic testing, an option 252 to view engine codes, an option 254 to view transmission codes, an option 256 to view ABS codes, an option 258 to view CTIS codes, an option 260 to view and/or modify data in the vehicle maintenance jacket, and an option 262 to view information stored in a data logger. Given that the display 219 is a four line display in the preferred embodiment, a vertically sliding winding 264 is used to scroll through the options, and the user presses a select button on the keypad 220 when a cursor 266 is positioned on the desired option. As previously noted, other options may also be provided.

Figure 45:
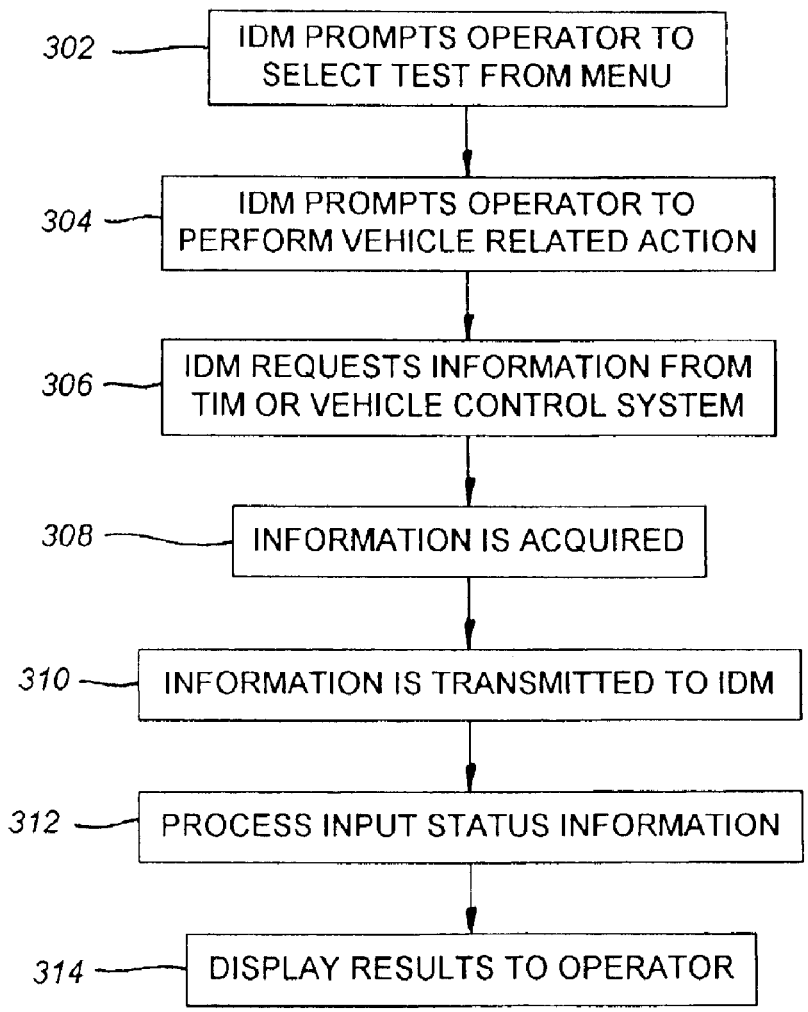
FIG. 45 is a flow chart showing the operation of the diagnostic system of FIG. 42 to perform a diagnostic test procedure.

Referring now to FIG. 45, a flowchart showing the operation of the diagnostic system of FIGS. 42–43 to perform a diagnostic test is illustrated. In connection with military vehicles, the diagnostic system 212 may for example be made capable of performing the following diagnostic tests, all of which provide information pertaining to the health and operation of the tested subsystem:

| Test | Test Description and Application | Exemplary Measurement Range(s) |
|---|---|---|
| ENGINE TESTS | | |
| Engine RPM (AVE) | Measures average speed of engine crankshaft. | 50–5000 RPM |
| Engine RPM, Cranking SI only | Measures cranking RPM. Performed with ignition ON. Inhibit spark plug firing allowing cranking without starting. | 50–1500 RPM |
| Power Test (RPM/SEC) | Measures engine's power producing potential in units of RPM/SEC. Used when programmed engine constants and corresponding Vehicle Identification Number (VID) have not been established. | 500–3500 RPM/s |
| Power Test (% Power) | Measures percentage of engine's power producing potential compared to full power of a new engine. | 0–100% |
| Compression Unbalance (%) | Evaluates relative cylinder compression and displays percent difference between the | 0–90% |

-continued

| Test | Test Description and Application | Exemplary Measurement Range(s) |
|---|---|---|
| | highest and the lowest compression values in an engine cycle. | |
| IGNITION TESTS | | |
| Dwell Angle (TDC) | Measures number of degrees that the points are closed. | 10–72 @ 2000 RPM |
| Points Voltage (VDC) | Measures voltage drop across the points (points positive to battery return). | 0–2 VDC |
| Coil Primary | Measures voltage available at the coil positive terminal of the operating condition of the coil. | 0–32 VDC |
| FUEL/AIR SYSTEM TESTS | | |
| Fuel Supply Pressure (psi) | | 0–100 psi |
| Fuel Supply Pressure (psi) | This test measures the outlet pressure of the fuel pump. | 0–10 psi<br>0–30 psi<br>0–100 psi<br>0–300 psi |
| Fuel Return Pressure (psi) | Measures return pressure to detect return line blockage, leaks, or insufficient restrictor back pressure. | 0–100 psi |
| Fuel Filter Pressure Drop (PASS/FAIL) | Detects clogging via opening of a differential pressure switch across the secondary fuel filter. | PASS/FAIL |
| Fuel Solenoid Voltage (VDC) | Measures the voltage present at the fuel shutoff solenoid positive terminal. | 0–32 VDC |
| Air Cleaner Pressure Drop (RIGHT) (In $H_2O$) | Measures suction vacuum in air intake after the air cleaner relative to ambient air pressure to detect extent of air cleaner clogging. | 0–60 in. $H_2O$ |
| Air Cleaner Pressure Drop (LEFT) (In $H_2O$) | Second air cleaner on dual intake systems. | 0–60 in. $H_2O$ |
| Turbocharger Outlet Pressure (RIGHT) (In Hg) | Measures discharge pressure of the turbocharger. | 0–50 in. Hg |
| Turbocharger Outlet Pressure (LEFT) (In Hg) | Second turbocharger on dual intake systems. | 0–50 in. Hg |
| Airbox Pressure (In Hg) | Measures the airbox pressure of two stroke engines. This measurement is useful in detecting air induction path obstructions or leaks. | 0–20 in. Hg<br>0–50 in. Hg |
| Intake Manifold Vacuum (In Hg) | Spark ignition engine intake system evaluation. | 0–30 in. Hg |
| Intake Manifold Vacuum Variation (In Hg) | Spark ignition engine intake system evaluation. | 0–30 in. Hg |
| LUBRICATION/COOLING SYSTEM TESTS | | |
| Engine Oil Pressure (psi) | Measures engine oil pressure. | 0–100 psi |
| Engine Oil Filter | Measures the pressure drop across the engine oil filter as indicator of filter element clogging. | 0–25 psi |
| Engine Oil Temperature (° F.) | Primarily applicable to air cooled engines. Requires transducer output shorting switch on vehicle to perform system zero offset test. | 120–300° F. |

-continued

| Test | Test Description and Application | Exemplary Measurement Range(s) |
|---|---|---|
| Engine Coolant Temperature (° F.) | Transducer output shorting switch on vehicle required. | 120–300° F. |

STARTING/CHARGING SYSTEM TESTS

| Test | Test Description and Application | Exemplary Measurement Range(s) |
|---|---|---|
| Battery Voltage (VDC) | Measure battery voltage at or near battery terminals. | 0–32 VDC |
| Starter Motor Voltage (VDC) | Measures the voltage present at the starter motor positive terminal. | 0–32 VDC |
| Starter Negative Cable Voltage Drop (VDC) | Measures voltage drop on starter path. A high voltage indicates excessive ground path resistance. | 0–2 VDC |
| Starter Solenoid Volts (VDC) | Measures voltage present at the starter solenoid's positive terminal. Measures current through battery ground path shunt. | 0–32 VDC |
| Starter Current, Average (amps) | Measures starter current. | 0–1000 A<br>0–2000 A |
| Starter Current First Peak (Peak Amps, DC) | Provides a good overall assessment of complete starting system. Tests condition of the starting circuit and battery's ability to deliver starting current. The measurement is made at the moment the starter is engaged and prior to armature movement. Peak currents less than nominal indicate relatively high resistance caused by poor connections, faulty wiring, or low battery voltage. | 0–1000 A<br>0–2000 A |
| Battery Internal Resistance (Milliohms) | Evaluate battery condition by measuring battery voltage and current simultaneously. | 0–999.9 mohm |
| Starter Circuit Resistance (Milliohms) | Measures the combined resistance of the starter circuit internal to the batteries. | 0–999.9 mohm |
| Battery Resistance Change (Milliohms/sec) | Measures rate of change of battery resistance as an indicator of battery condition. | 0–999.9 mohm/s |
| Battery Current | Measures current to or from the battery. | −999–1000 A<br>−999–2000 A |
| Battery Electrolyte Level (PASS/FAIL) | Determines whether electrolyte in the sensed cell is of sufficient level (i.e., in contact with electrolyte probe). | PASS/FAIL |
| Alternator/Generator Output Voltage (VDC) | Measures output voltage of generator/alternator. | 0–32 VDC |
| Alternator/Generator Field Voltage (VDC) | Measures voltage present at alternator/generator field windings. | 0–32 VDC |
| Alternator/Generator Negative Cable Voltage Drop (VDC) | Measures voltage drop in ground cable and connection between alternator/generator ground terminal and battery negative terminal. | 0–2 VDC |
| Alternator Output Current Sense (VAC-RMS) | Measures voltage output at the current transformer in 650 ampere alternator. | 0–3 VAC |
| Alternator AC Voltage Sense (VAC-RMS) | Measures alternator output voltage. | 0–22 VAC |

In general, the specific diagnostic tests that are performed will be selected depending on the application, including the type of equipment utilized by the vehicle 210. Most or all tests may be simple in nature from a data acquisition standpoint, involving primarily bringing the vehicle to a particular operating condition (e.g., engine speed), if necessary, and obtaining information from a suitable transducer constructed and placed to measure the parameter of interest, although more elaborate tests could also be utilized. Any number of different vehicle parameters can be measured, each providing a separate data point regarding the operational health of the vehicle. By providing an operator with enough data points regarding the operational health of the vehicle, the operator can use this information in a known way to determine whether the vehicle is in good working order, or whether some subsystem or component thereof needs to be repaired or replaced.

At step 302, once the vehicle diagnostic option is selected, the display 219 displays a menu of various tests that are available to the operator, and the operator is prompted to select a test from the test menu. Again, the list of options may comprise dozens of options, such as some or all of those listed above, and/or tests other than those listed above, and the operator can scroll through the menu and selected the desired option.

At Step 304, the operator is prompted to perform a vehicle related action. This step, which may or may not be necessary depending on the type of test performed, may be used to prompt the operator to start the engine to develop fuel pressure, oil pressure, and so on, depending on which vehicle parameter is tested. For example, if it is desired to test the operational health of the battery, then the operator may be prompted to engage the starter for a predetermined amount of time to establish a current draw on the battery.

At Step 306, the intelligent display module 214 issues a request for information from the test interface module 221 and/or from one or more of the control systems 224–230. As previously noted, the test interface module 221 does not continually broadcast information on the communication network 232, because the sensors 222 connected to the test interface module are used only for diagnostic testing and because presumably diagnostic testing will be performed only infrequently. Therefore, when the intelligent display module 214 needs information from one of the sensors 222 pursuant to a test requested to be performed by the operator at the operator interface 218, the intelligent display module 214 requests the test interface module 221 for this information.

Alternatively, the needed information may be of a type that is available from one of the control systems 224–230. The control systems 224–230 are not only able to acquire information from sensors located within the systems 234–240, but are also able to maintain information derived from sensors located within the systems 234–240. For example, the engine control system 230 may maintain information pertaining to the average RPM of the engine, which is a parameter that is not directly measurable but that can be easily calculated based on parameters that are directly measurable. Through the communication network 232, all of this information is made available to the diagnostic system 212. When the intelligent display module 214 needs information from one of the control systems 224–230 pursuant to a test requested to be performed by the operator at the operator interface 218, the intelligent display module 214 requests the respective control system for this information.

At Step 308, the requested information is retrieved from one of the sensors 222 by the test interface module 221, or from memory or an internal sensor by the respective control system 224–230. At step 309, the information is transmitted from the test interface module 221 or from one of the control systems 224–230 to the intelligent display module 214 by way of the communication network 232.

Alternatively, the needed information may be of a type that is available from one of the interface modules 1420. In this case, the information is readily available in the I/O status table 1520 maintained by the intelligent display module 214, without there being a need to specifically request the information.

At step 312, the input status information is processed at the intelligent display module 214. For example, if fuel supply pressure is measured by one of the sensors 222, then the measured fuel supply pressure may be compared with upper and lower benchmark values to determine whether the fuel pressure is at an acceptable level, or whether it is too high or too low. Finally, at step 314, the results of the test are displayed to the operator.

As has been previously noted, in addition to performing diagnostic tests, the intelligent display module 214 can also be used to provide other services to an operator. For example, the intelligent display module 214 can be used to allow the operator to view engine codes, to view transmission codes, to view ABS codes, and to view CTIS codes. In practice, these services can be implemented simply by allowing acquiring the respective codes from the respective control system 224–230, and displaying the codes to the operator. Additionally, the control systems 224–230 may automatically transmit fault information on the communication network 232, and the intelligent display module 214 can listen for such fault information and display the fault information to the user when it appears on the communication network 232.

The intelligent display module 214 also includes sufficient memory to allow maintenance information to be stored therein to implement maintenance jacket functionality. The maintenance log may consist of a table comprising a variety of fields, such as registration numbers, chassis serial number, vehicle codes, and dates and descriptions of maintenance actions performed. This information may be retrieved and manipulated utilizing the computer 234 when the vehicle 210 is taken to a maintenance depot. If the computer 234 is provided with an interactive electronic technical manual (IETM) for the vehicle 210, this allows the IETM to have access to all of the diagnostic data acquired by the intelligent display module 214 as well as all of the maintenance data stored by the intelligent display module 214. This greatly enhances the ability to perform vehicle maintenance and diagnostics on the vehicle 210.

Additionally, sufficient memory capacity is preferably provided so that status information from the test interface module 221 as well as the control systems 224–230 can be sampled and stored at frequent, regular intervals in a circular data queue (i.e., with new data eventually replacing old data in the circular queue). This allows the intelligent display module 214 to provide a data logger service so that input data acquired over a period of time can be viewed to allow an assessment of dynamic conditions leading to a fault to be evaluated. Additionally, the vehicle is preferably provided with one more sensors that indicate whether a severe malfunction (e.g., the vehicle being involved in an accident) has occurred. When inputs from these sensors indicates that a severe malfunction has occurred, data logging is stopped, so that data leading up to the severe malfunction is stored in a manner similar to a so-called "black box recorder."

Referring now to FIGS. 46–49, as previously mentioned, the control systems 12 and 1412 can be used in connection with a variety of different types of equipment service vehicles. The same is true of the diagnostic system 212. FIGS. 46–49 show some of the vehicles that can employ the control systems 12 and 1412 and/or the diagnostic system 212.

Figure 46:
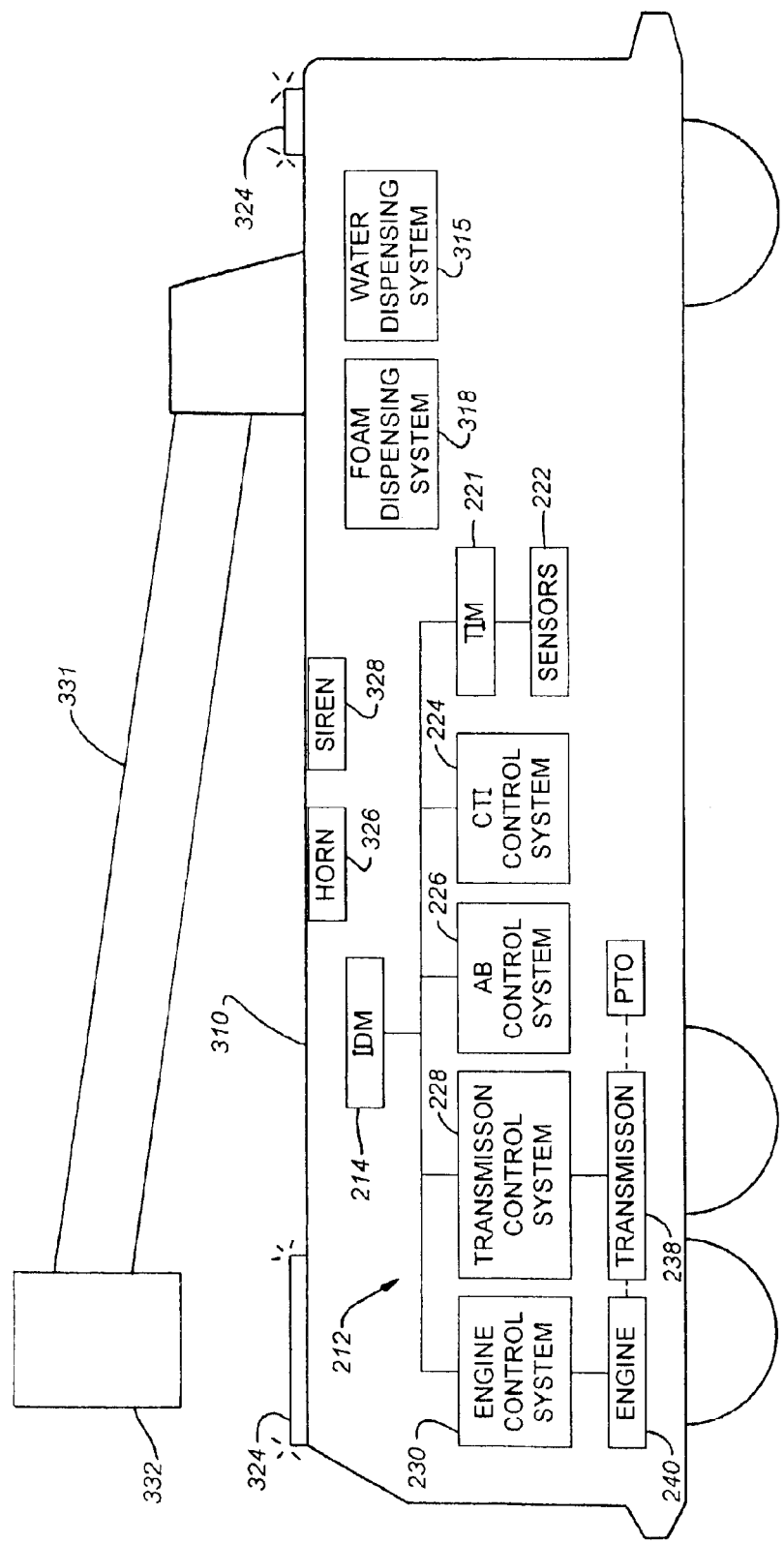
FIG. 46 is a schematic view of a firefighting vehicle having a diagnostic system in accordance with FIGS. 42–45.

Referring first to FIG. 46, FIG. 46 is a schematic view of a fire fighting vehicle 310 that utilizes the diagnostic system 212. The fire fighting vehicle 310 comprises a water dispensing system 315 including water hoses, pumps, control valves, and so on, used to direct water at the scene of a fire. The fire fighting vehicle 310 may also comprise a foam dispensing system 318 as an alternative fire extinguishing system. The fire fighting vehicle 310 also comprises emergency lighting 324, which may in practice be red and white or red, white and blue flashing lights, as well as an emergency horn 326 and an emergency siren 328 used, among other things, for alerting motorists to the presence of the fire fighting vehicle 310 in transit to or at the scene of a fire. The fire fighting vehicle 310 may also comprise an extendable aerial 331 that supports a basket 332 used to vertically carry fire fighting personnel to an emergency situation at the scene of a fire. The diagnostic system 212 may be used to diagnose vehicle malfunctions in the manner described above in connection with the vehicle 210, as well as to diagnose malfunctions of the specialized systems described above found on fire fighting vehicles. Of course, the features of the fire fighting vehicle 310 in FIG. 46 and the fire fighting vehicle 10 of FIGS. 1–13 (including the features pertaining to the I/O status table 1520 described in connection with FIGS. 21–24) may be combined.

Figure 47:
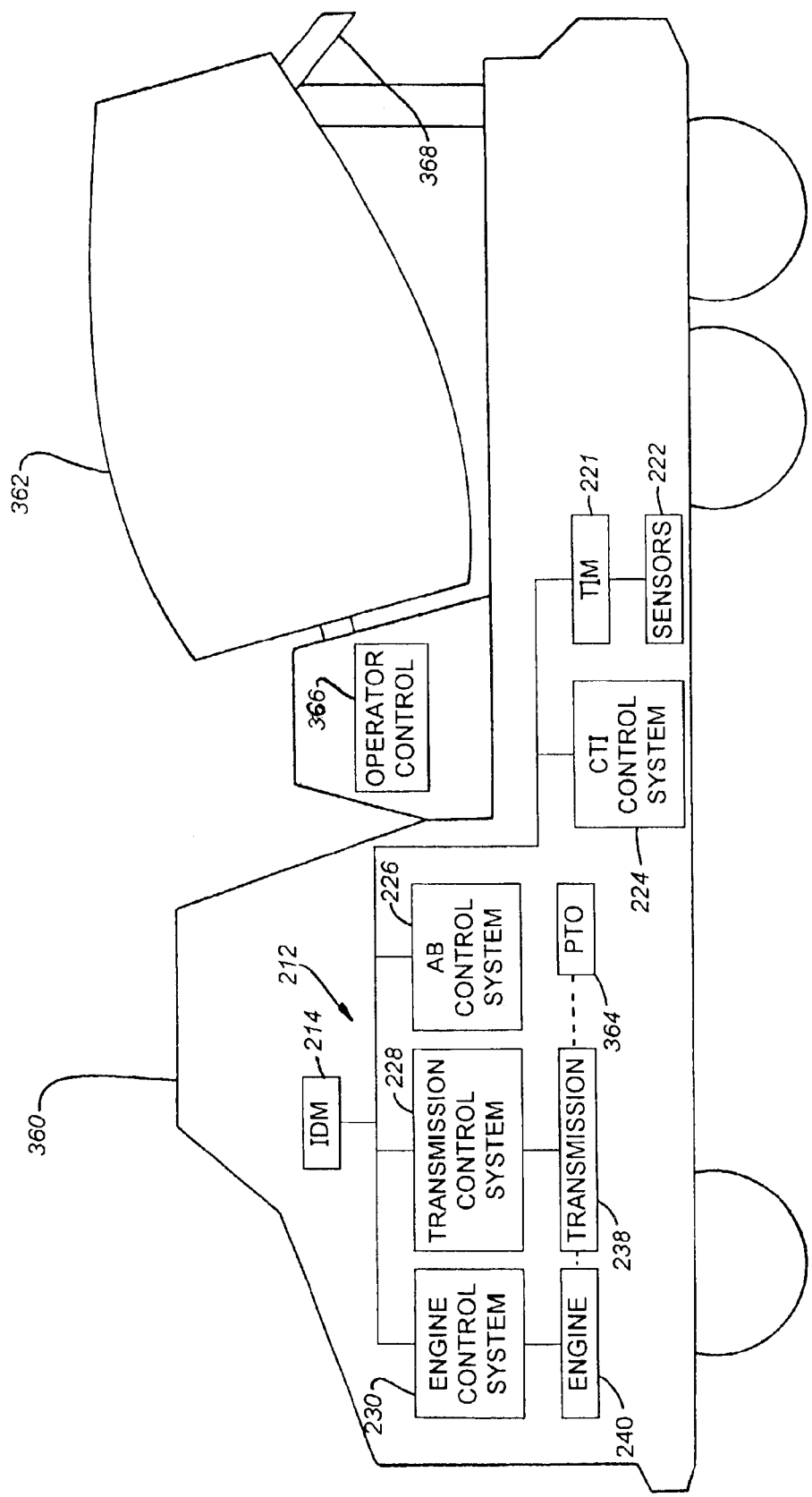
FIG. 47 is a schematic view of a mixing vehicle having a diagnostic system in accordance with FIGS. 42–45.

Referring now to FIG. 47, a schematic view of another type of equipment service vehicle 360 that utilizes the diagnostic system 212 of FIGS. 1–4 is shown. The equipment service vehicle 360 is a mixing vehicle such as a cement mixing vehicle. The mixing vehicle 360 comprises a rotatable mixing drum 362 that is driven by engine power from the engine 240 via a power takeoff mechanism 364. The mixing vehicle 360 also includes a dispenser or chute 368 that dispenses the mixed matter or material, for example, mixed cement. The chute 368 is moveable to allow the mixed cement to be placed at different locations. The chute 368 may swing from one side of the concrete mixing vehicle 360 to the other side. Rotation of the mixing drum 362 is controlled under operator control using an operator control panel 366 including chute and drum controls comprising one or more joysticks or input devices. Additional controls may be provided inside the operator compartment for driver or passenger control of the drum 362 and chute 368, for example, a dash-mounted control lever to control drum rotation direction, a console-mounted joystick to control external hydraulic valves for chute up/down and swing right/left. Drum rotation start/stop may be controlled using a switch on top of the joystick lever. Outside controls mounted may include chute up/down and swing right/left and remote engine throttle. Drum rotation direction controls may be mounted on right side of front fender. The diagnostic system 212 is used to diagnose vehicle malfunctions in the manner described above in connection with the vehicle 210, as well as to diagnose malfunctions of the specialized systems described above found on mixing vehicles.

The mixing vehicle 360 may also include the control system 1412 described above. In such an arrangement, for example, an interface module 1420 is located near the operator control panel 366 receiving operator inputs which the control system 1412 uses to control of the mixing drum 362. An additional interface module 1420 may also be provided in an operator compartment of the mixing vehicle 360 to interface with input devices inside the operator compartment which permit driver control of the mixing drum 362. Interface modules 1420 are also connected to output devices such as a drive mechanism that controls rotation of the mixing drum 362 and a drive mechanism that controls movement of the chute 368. For example, if drum and chute movement are driven by engine power from the engine 240 via a power takeoff mechanism 364, the interface modules 1420 may be used to control output devices 1450 in the form of electronically controlled hydraulic valves that control the flow of hydraulic power from the engine to the mixing drum and electronically controlled hydraulic valves that control the flow of hydraulic power from the engine to the chute. Alternatively, if electric drive motors are used to drive drum and chute movement (for example, in the context of a mixing vehicle implemented using the electric vehicle 1910 as described above), then the interface modules 1420 may be used to control the drive motors. In operation, inputs are received from the operator controls at one interface module 1420 may be transmitted to the interface modules 1420 that control the valves during I/O status broadcasts, which in turn control operation of the drum 362 and chute 368 based on the operator inputs. Other devices, such as air dryers, air compressors, and a large capacity (e.g., 150 gallon) water system may be connected to interface modules 1420 and controlled in accordance with operator inputs received from similar input devices at the operator panels and transmitted over the communication network. Additional interface modules 1420 may be used to receive inputs from input devices 1440 in the operator compartment and control output devices 1450 such as FMVSS lighting as described above.

Figure 48:
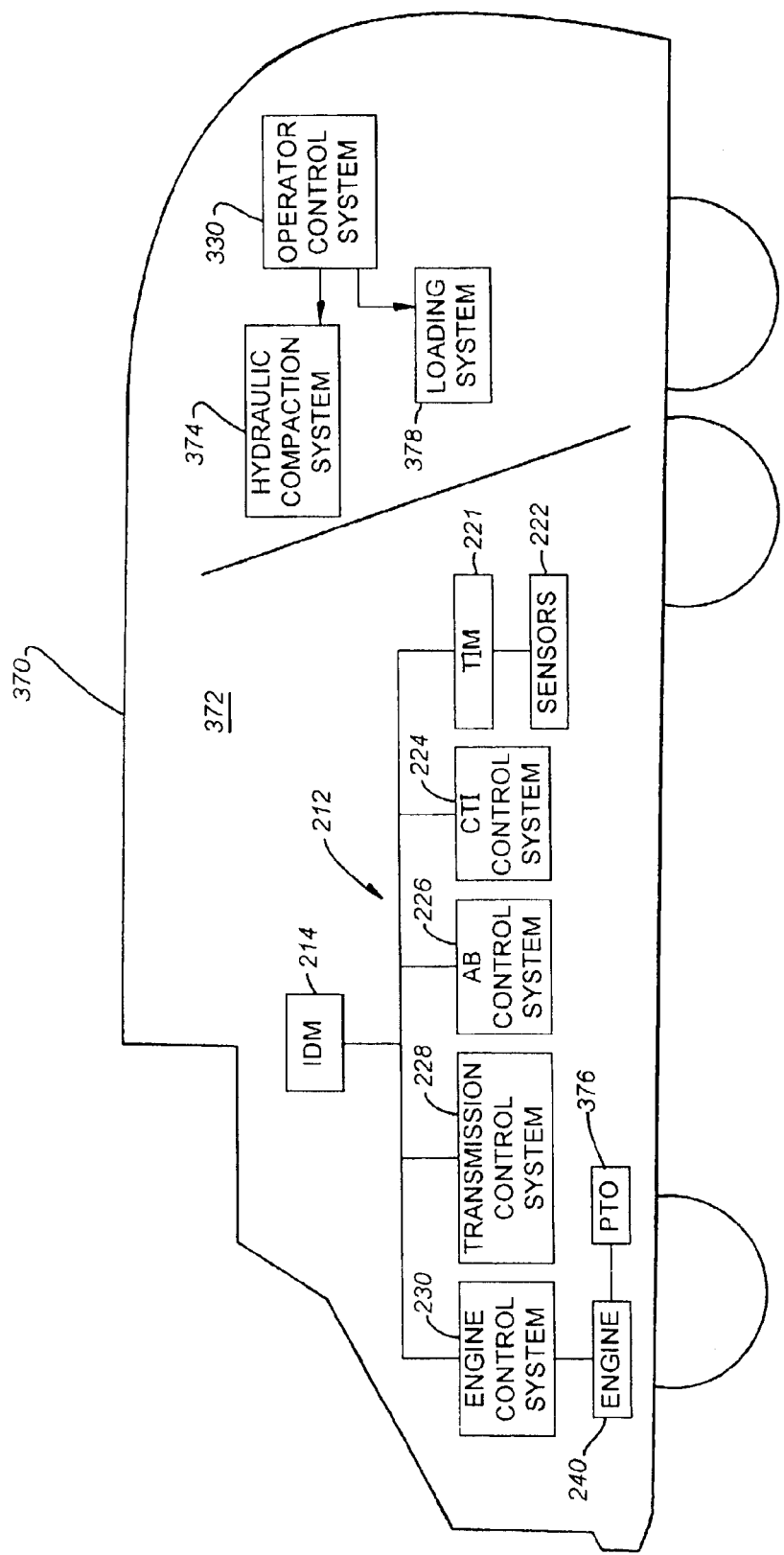
FIG. 48 is a schematic view of a refuse handling vehicle having a diagnostic system in accordance with FIGS. 42–45.

Referring now to FIG. 48, a schematic view of another type of equipment service vehicle 370 that utilizes the diagnostic system 212 of FIGS. 1–4 is shown. The equipment service vehicle 370 is a refuse handling vehicle and comprises one or more refuse compartments 372 for storing collected refuse and other materials such as goods for recycling. The refuse handling vehicle 370 also includes a hydraulic compactor 374 for compacting collected refuse. The hydraulic compactor 374 is driven by engine power from the engine 240 via a power takeoff mechanism 376. The refuse handling vehicle may also include an automatic loading or tipping system 378 for loading large refuse containers and for transferring the contents of the refuse containers into one of the compartments 372. The loading system 378 as well as the hydraulic compactor may controlled under operator control using a control panel 379. The diagnostic system 212 may be used to diagnose vehicle malfunctions in the manner described above in connection with the vehicle 210, as well as to diagnose malfunctions of the specialized systems described above found on refuse handling vehicles.

The refuse handling vehicle 370 may also include the control system 1412 described above. In such an arrangement, an interface module 1420 is located near the hydraulic compactor 374 and controls valves associated with the hydraulic compactor 374. Another interface module 1420 located adjacent the automatic loading or tipping system 378 controls hydraulic valves associated with the system 378. Again, the interface modules 1420 may be used to control the drive motors instead of hydraulic valves in the context of. Another interface module 1420 is located adjacent the operator control panel 379 and is connected to receive operator inputs from input devices 1440 which are part of the control panel 379. In operation, inputs are received from the operator controls at one interface module 1420 and are transmitted to the interface modules 1420 that control the hydraulic valves during I/O status broadcasts, which in turn control operation of the hydraulic compactor 374 and loading system 378 based on the operator inputs. Additional interface modules may be used to receive inputs from input devices 1440 in the operator compartment and control output devices 1450 such as FMVSS lighting as described above.

Figure 49:
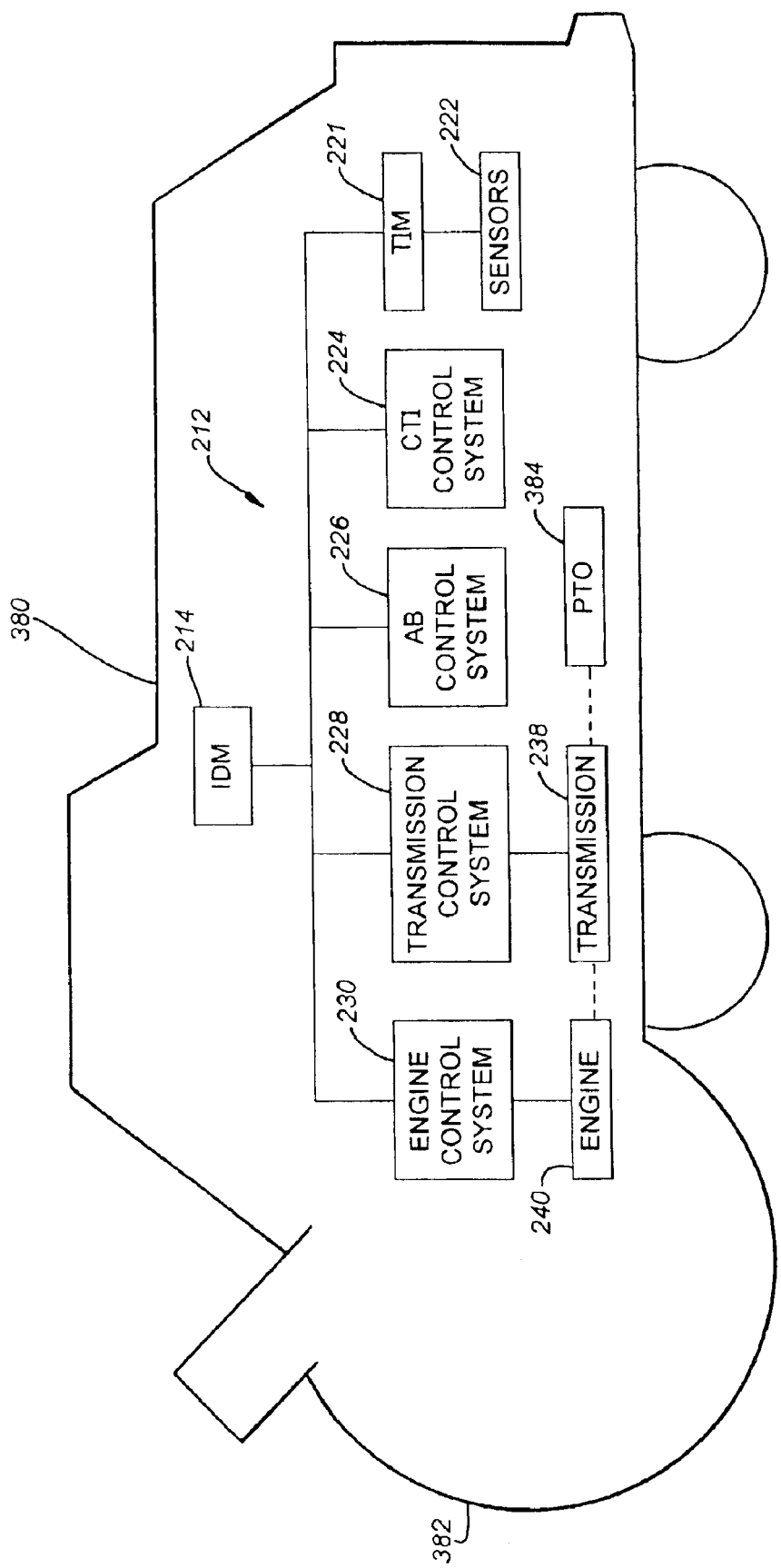
FIG. 49 is a schematic view of a snow removal vehicle having a diagnostic system in accordance with FIGS. 42–45.

Referring now to FIG. 49, a schematic view of another type of equipment service vehicle 380 that utilizes the diagnostic system 212 of FIGS. 1–4 is shown. The equipment service vehicle 380 is a snow removal vehicle and comprises a snow removal device 382 which may, for example, be a rotary blower, plow, or sweeper. The snow removal device 382 may be driven by engine power from the engine 240 via a power takeoff mechanism 384 to remove snow from a region near the snow removal vehicle 380 as the snow removal vehicle 380 is moving. The diagnostic system 212 may be used to diagnose vehicle malfunctions in the manner described above in connection with the vehicle 210, as well as to diagnose malfunctions of the specialized systems described above found on snow removal vehicles.

The snow removal vehicle 380 may also include the control system 1412 described above. An interface module 1420 located adjacent an operator compartment receives operator inputs from input devices 1440 located in the operator compartment. One or more additional interface modules 1420 receive the operator input during I/O status broadcasts, and in response controls various output devices 1450 such as FMVSS lighting as described above. Preferably, the snow removal vehicle 380 employs the teachings of U.S. Pat. No. 6,266,598, entitled "Control System and Method for a Snow Removal Vehicle," hereby expressly incorporated by reference. The preferred snow removal vehicle disclosed therein comprises an impeller, an engine system, and an engine control system. The engine system includes a traction engine which is coupled to drive wheels of the snow removal vehicle, and is adapted to drive the drive wheels to drive movement of the snow removal vehicle. The engine system also includes an impeller engine which is coupled to the impeller and is adapted to drive the impeller to drive snow removal. The engine control system receives feedback information pertaining to operation of the impeller, and controls the engine system based on the feedback information. The engine control system includes a communication network, a microprocessor-based traction engine control unit which is coupled to the traction engine and is adapted to control the traction engine, a microprocessor-based impeller engine control unit which is coupled to the impeller engine and is adapted to control the impeller engine, and a microprocessor-based system control unit. The system control unit is coupled to the traction engine control unit and the impeller engine control unit by way of the network communication link. The system control unit is adapted to receive the feedback information pertaining to the operation of the impeller, and to generate a control signal for the traction engine control unit based on the feedback information.

Advantageously, due to the utilization of a network architecture in the preferred embodiment, the diagnostic system is able to use sensors and other sources of information that are already provided on the vehicle, because it is able to interact with other vehicle control systems such as the engine control system, the anti-lock brake control system, the central tire inflation control system, and so on, via a communication network. The fact that the diagnostic system is connected to these other systems, which are all typically capable of providing a vast array of status information, puts this status information at the disposal of the diagnostic system.

Further, due to the utilization of an intelligent display module in the preferred embodiment, it is possible for the intelligent display module to be connected to the communication network and collect information as necessary for a variety of purposes. Thus, the preferred intelligent display module is microprocessor-based and is capable of executing firmware to provide additional functionality such as data logging, accident reconstruction, and a vehicle maintenance record. Again, this functionality can be achieved by taking advantage of the information available from the vehicle subsystems by way of the network architecture.

Moreover, by mounting the intelligent display module on board the vehicle in the preferred embodiment, for example, in an operator compartment, it is not necessary to bring the vehicle to a maintenance depot to have vehicle malfunctions diagnosed. The services offered by the intelligent display module are available wherever and whenever the vehicle is in operation.

Figure 50:
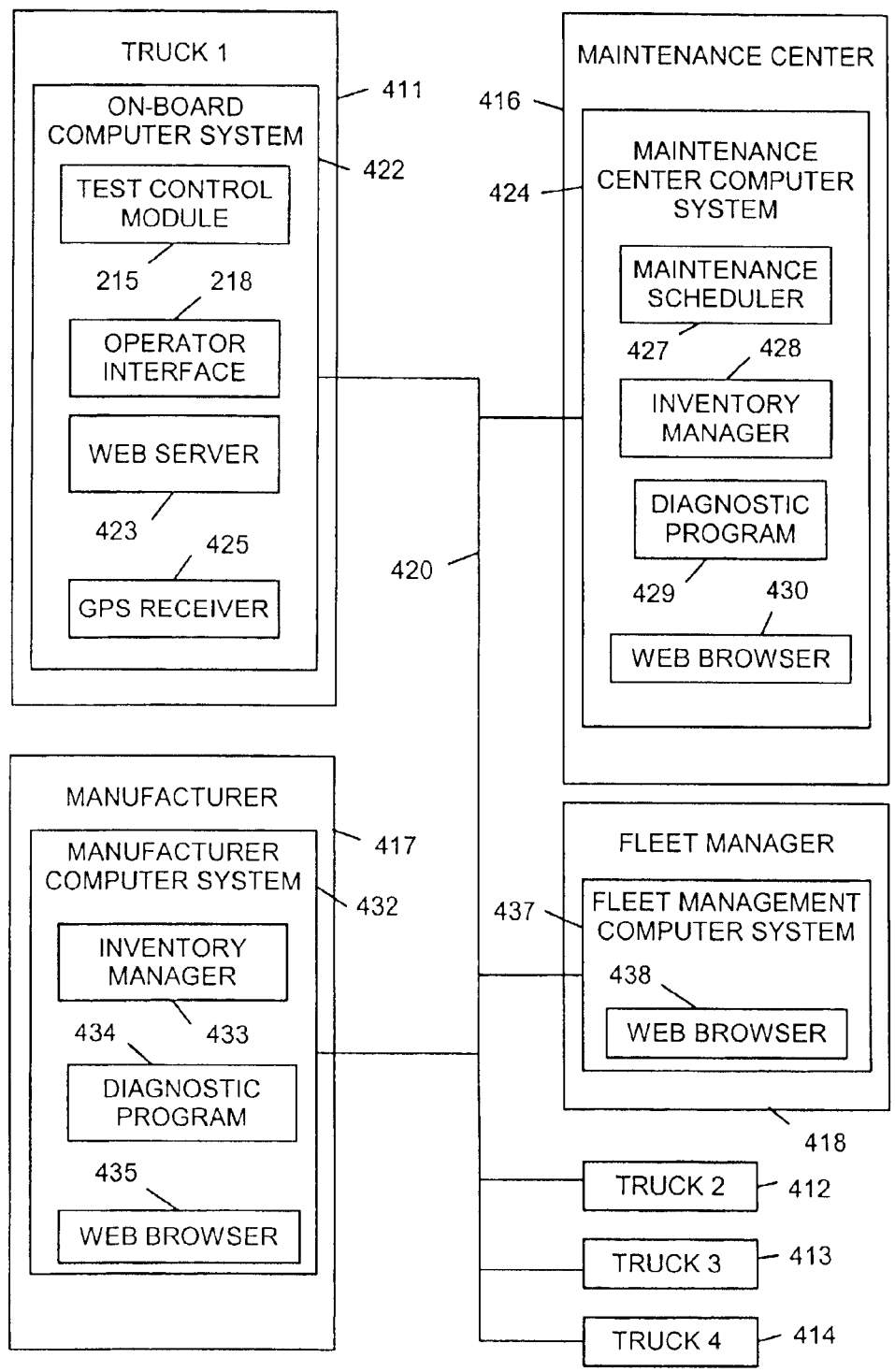
FIG. 50 is a schematic view of vehicle maintenance, monitoring, parts ordering, readiness assessment, and deployment system according to another embodiment of the present invention.

Referring now to FIG. 50, an overview of a system 410 that utilizes the diagnostic system 212 is illustrated. The system 410 interconnects the computing resources of a plurality of vehicles 411–414 with those of a maintenance center 416, a manufacturer facility 417, and a fleet manager 418 using a communication network 420. Of course, although four vehicles are shown, it is possible to use the system 410 in connection with fewer or additional vehicles. Also, although in the preferred embodiment the system 410 includes all of the devices shown in FIG. 50, it is also possible to construct a system that uses only some of the devices in FIG. 50.

The vehicles 411–414 are assumed to be military vehicles, although the vehicles could also be any of a variety of other types of vehicles including the other types of equipment service vehicles described herein (e.g., fire fighting vehicles, concrete transport and delivery vehicles, military vehicles, ambulances, refuse transport vehicles, liquid transport vehicles, snow removal vehicles, and so on). The vehicles 411 each have a control system 1412 as previously described, and therefore the on-board computer system 422 includes a plurality of interface modules 1420. The vehicles 411–414 each include an on-board computer system 422 which further includes the test control module 215 and the operator interface 218 previously described above in connection with FIGS. 42–49. The on-board computer system 422 also includes a web server program 423 and is coupled to a global positioning system (GPS) receiver 425. Although these features are discussed in connection with the vehicle 411 in FIG. 50, it should be noted that the vehicles 412–414 include these features as well (although the vehicles 411–414 need not all be the same type of vehicle).

The web server program 423, which is executed on the intelligent display module 214 or on another computer connected to the network 232, allows an operator using the maintenance center computer system 424, the manufacturer computer system 432 and/or the fleet management computer system 437 to access vehicle information. For example, the operator is given access to the information in the I/O status table 1520 maintained by the intelligent display module 214 using a web interface. Thus, the operator can click on depictions of individual input devices 40, 1440 and output devices 50, 1550, and the web server 423 responds by providing information as to the status of those devices. Additionally, the operator is also given access to information from the control systems 224–230. Thus, the operator can click on a depiction of the central tire inflation system 234 to obtain central tire inflation system information, can click on a depiction of the brake system 236 to obtain brake system information, can click on a depiction of the transmission system 238 to obtain transmission system information, and/or can click on a depiction of the engine 240 to obtain engine information. When the web server 423 receives these operator inputs, the web server 423 provides the requested information to the operator by way of the communication network 420. It may also be desirable to provide the on-board computer system 422 with web-browser functionality to allow the on-board computer system 422 to obtain information from the maintenance center computer system 424 and/or the manufacturer computer system 432.

Rather than clicking on various vehicle components, a list of I/O states for all or some of the I/O devices 1440 and 1450 and/or I/O status information from the control systems 224–230 may be displayed to the operator. For example, a particular input or output may be identified with a descriptive identifier (e.g., "PTO Solenoid") with an indication as to whether the input/output is on or off (e.g., by placing the words "on" or "off" next to the descriptive identifier, or through the use of a color indicator whose color varies according to I/O state). For analog I/O devices, meters, gauges, or other image corresponding to the I/O device may be displayed, without displaying the entire vehicle and without use of the web server 423 and web browsers 430, 435, 438. Various examples are shown in FIGS. 57–67. All of the I/O status information is preferably capable of being transferred automatically and on a real-time basis for real-time remote monitoring of any aspect of operation of the vehicle 411.

In an alternative embodiment, the web server 423 may be provided in an off-board computer system and the on-board computer system 422 can post information to the web server 423. The off-board computer system used to implement the web server may for example be any of the computer systems 424, 432, 437 discussed below. This would allow the same functionality to be achieved while at the same time reducing the amount of communication required between the on-board computer system 422 and the off-board computer systems that wish to view information from the on-board computer system 422.

The GPS receiver 425 permits vehicle position to be determined. The on-board computer system 422 can then transmit the vehicle position information to the computer systems 424, 432, 437 along with the other I/O status information.

The maintenance center 416 is a facility to which the vehicles 411–414 may be taken for maintenance. For example, in the context of a fleet of military vehicles, the maintenance center 416 may be a maintenance depot that is used to service the military vehicles. For a fleet of municipal vehicles, the maintenance center may be a municipal facility where the vehicles are stored and maintained. Alternatively, the maintenance center 416 may be operated by a private outside contractor such as a service station hired to maintain and service municipal vehicles. Likewise, where the fleet of vehicles is privately owned, the maintenance center 416 may be internally operated or operated by an outside contractor. The structure and functions of the maintenance center computer system 424 may be combined with those of the computer systems 432 or 437, for example, where the maintenance center is owned/operated by the manufacturer 417 or the fleet manager 418.

The computer system 416 of the maintenance center 416 further includes a maintenance scheduling system 427, an inventory management system 428, a diagnostic program 429 and a browser and/or server program 430. The maintenance scheduling system 427 is a program executed by the maintenance center computer system 424 that develops and maintains a schedule (typically, at specified time slots) for vehicle servicing at the maintenance center 416. The inventory management system 428 is a program that monitors in-stock inventory of replacement parts for the maintenance center 416. A "part" is any device or substance (system, subsystem, component, fluid, and so on) that is part of the vehicle and not cargo. Typically, each part has an associated part number that facilitates ordering and inventory management. The diagnostic program 429 may be the same as the diagnostic program 217 previously described. In this regard, it may be noted that the computer system 416 is capable of manipulating the I/O devices of the vehicle 411 by sending appropriate commands to the control system 1420 of the vehicle 411.

The web browser 430 allows an operator of the maintenance center computer system 424 to access the information content of the web site provided by the web server 423 of the vehicle 411. Thus, as previously described, the operator can click on various vehicle subsystems or input/output devices, and the web server 423 will receive these inputs and provide the operator with the requested information. The Internet browsing program may be any one of many different types of software from a full scale browser down to a simple browser that is commonly used for Internet enabled wireless phones, depending on how information is presented to the operator.

The manufacturer 417 is a manufacturer of the vehicles 411–414 and/or a manufacturer of replacement parts for the vehicles 411–414. The manufacturer 417 has a manufacturer computer system 432 which includes an inventory management system 433, a diagnostic program 434, and a web browser 435. The inventory management system 434 is a program that monitors in-stock inventory for the manufacturer 417. The web browser 435 and the diagnostic program 434 may be the same as described in connection with the diagnostic program 429 and the web browser 430 of the maintenance center computer system 424.

The fleet manager 418 is the entity that owns or leases the vehicles 411–414, for example, a municipality, the military, and so on. The fleet manager 418 has a fleet manager computer system 437 that includes a web browser 438. The web browser 438 allows the fleet manager 418 to monitor the status and position of the vehicle 411 as previously described in connection with the web browser 430.

The computer systems 422, 424, 432 and 437 of the vehicles 411–414, the maintenance center 416, the manufacturer 417, and the fleet manager 418, respectively, are all connected to the communication network 420. The communication network 420 is preferably the Internet. The Internet is preferred because it is a convenient and inexpensive network that provides worldwide communication capability between the computer systems 422, 424, 432 and 437. Additionally, the Internet permits communication between the on-board computer system 422 and the maintenance center computer system 424 using electronic mail format or other commonly used Internet communication formats. Preferably, security/encryption techniques are used which allow the Internet to be used as a secure proprietary wide area network. A variety of other types of networks may also be used, such as a wireless local area network, a wireless wide area network, a wireless metropolitan area network, a wireless long-haul network, a secure military network, or a mobile telephone network.

The on-board computer system 422 is preferably connected to the Internet by way of a wireless modem. Preferably, the on-board computer system 422 uses a cellular telephone modem with coverage in the geographic region in which the vehicle 411 operates and capable of establishing a dial-up connection to the Internet by way of a telephone link to an Internet service provider. Other communication networks and devices may be used, such as a satellite link, infrared link, RF link, microwave link, either through the Internet or by way of other secure networks as mentioned above. Additionally, the on-board computer system 422 may use some other form of custom or commercially available software to connect to the computer systems 424, 432 and 437, especially if an Internet connection is not used.

Figure 51:
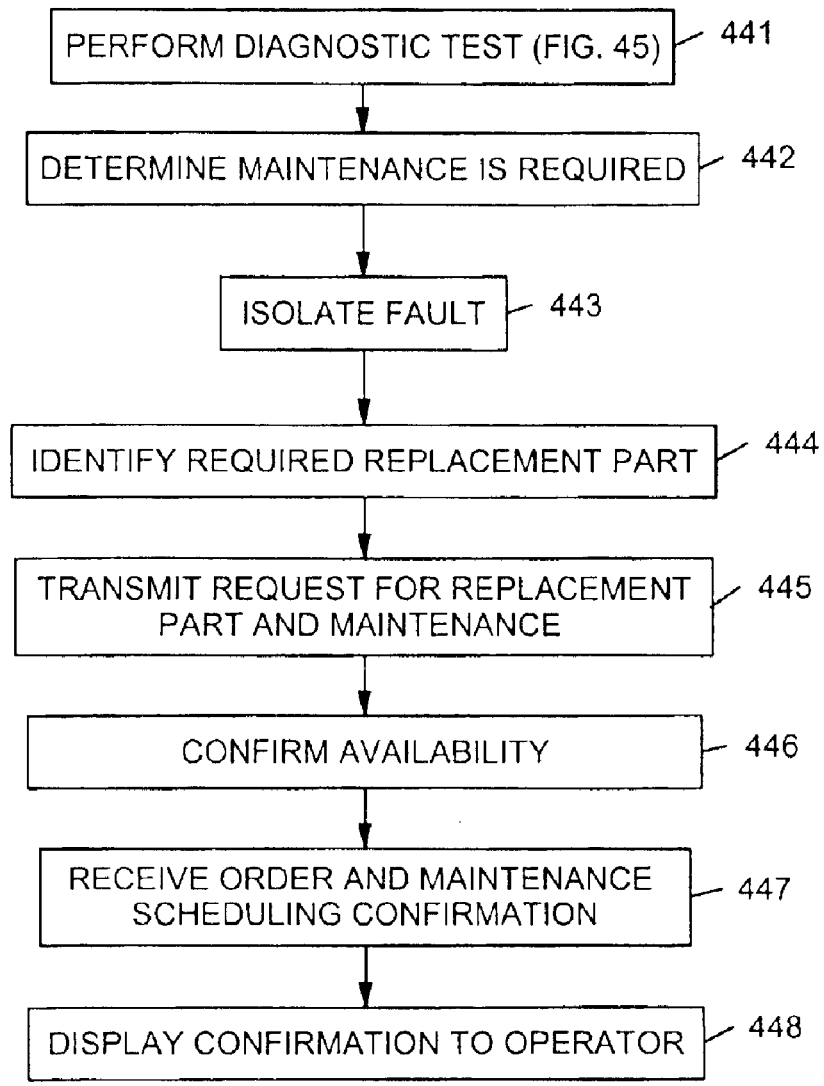
FIG. 51 is a flowchart showing the operation of an on-board vehicle computer system in the system of FIG. 50 during a parts ordering process.
Figure 52:
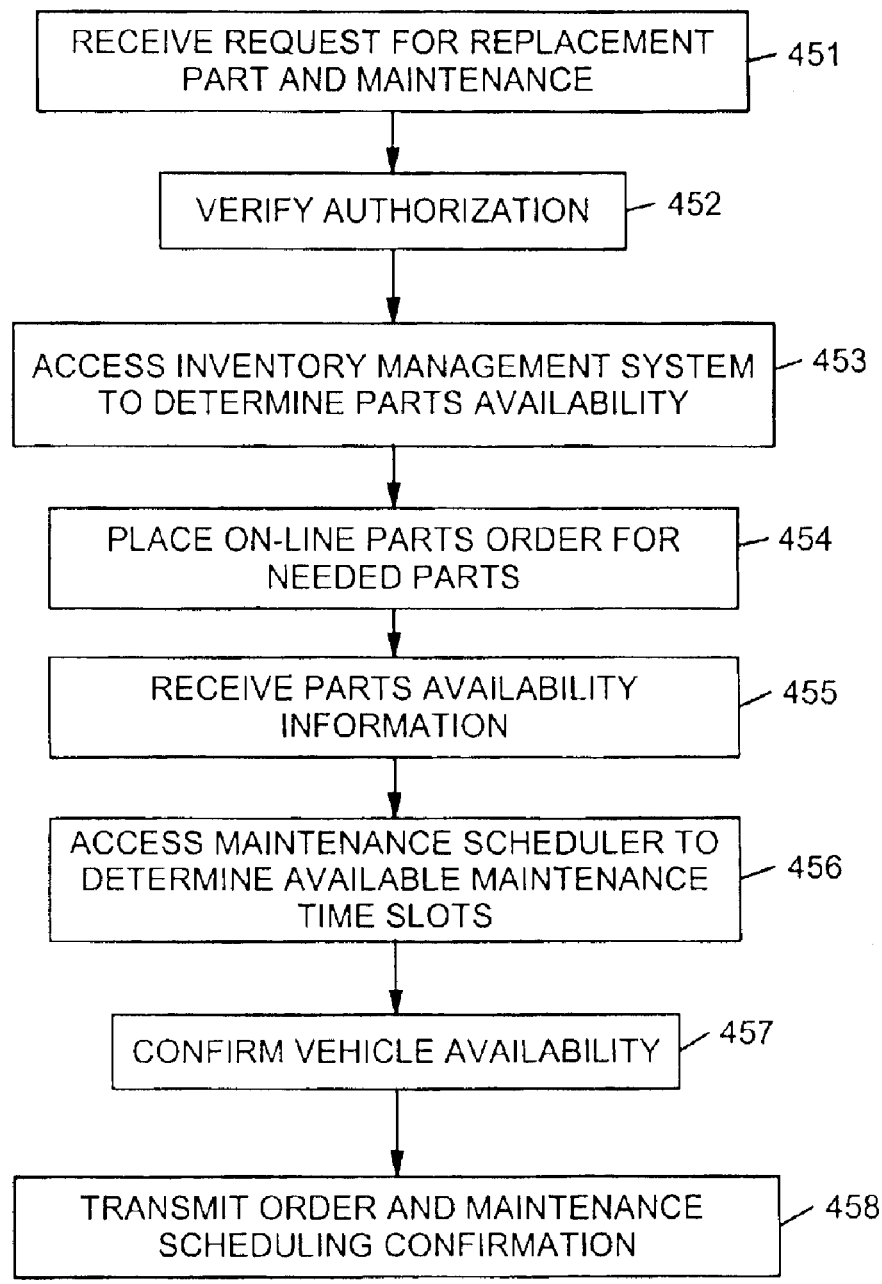
FIG. 52 is a flowchart showing the operation of a maintenance center computer system in the system of FIG. 50 during a parts ordering process.

Referring now to FIGS. 51–52, the operation of the system 410 to order a replacement part and schedule maintenance for the vehicle 411 is illustrated. FIG. 51 shows the operation of the on-board computer system 422. FIG. 52 shows the operation of the maintenance center computer system 424 which cooperates with the on-board computer system 422. Referring first to FIG. 51, at step 441, a diagnostic test is performed to measure a vehicle parameter. As previously mentioned, the system 411 is preferably used in connection with the diagnostic system 212 described in connection with FIGS. 42–49, and the diagnostic test may be any of the tests described in connection with FIGS. 42–49 or other tests.

Preferably, step 441 is performed continuously throughout normal operation of the vehicle 441. Thus, as the vehicle 411 travels on the highway, for example, vehicle operating conditions are monitored and the tests identified in Table II are performed without operator involvement.

At step 442, the test control module 215 determines that maintenance is required, for example, by comparing the measured operating parameters to reference values for the operating parameters. The operating parameters may, for example, include temperatures, pressures, electric loads, volumetric flow of material, and so on, as described above. Upper and/or lower reference values are stored in a database or table in the test control module 215. The reference values for the operating parameters may be stored based on values provided by the manufacturer of the vehicle 411 or are set based on information provided by the manufacturer and based on actual usage conditions. In addition, the reference values may be updated periodically when the on-board computer system 422 connects to the appropriate maintenance center computer system 424. If the measured operating parameter is outside an acceptable range as defined by the reference values, then maintenance is required.

At step 443, when it is determined that an operating parameter is outside an acceptable range at step 442, the diagnostic system 212 fault isolates to a replaceable part. The manner in which step 443 is performed depends on the parameter that is out of range. Many types of vehicle parts wear out regularly, and the fact that a particular parameter is out of range often has a high correlation with a particular part being in need of replacement. For example, and with reference to Table II, if the measured parameter is battery resistance change, and the battery resistance change is out of range, then this indicates that the battery needs to be replaced. If the measured parameter is starter current, and the starter current is low, then this indicates that the starter needs to be replaced. If the measured parameter is current through an output device (e.g., a light bulb), and no current flows through the output device, then this indicates that the output device needs to be replaced. If the measured parameter is a fluid level, and the fluid level is below a predetermined level as indicated by a fuel gauge, then this indicates that additional fluid is required to replace lost fluid. Additionally, a significant number of routine maintenance items may be identified in this manner. Thus, the diagnostic system 212 preferably monitors actual usage (e.g., distance traveled, engine hours, and so on) to determine when routine maintenance (e.g., a tire change, an oil change) is required, indicating that one or more parts (e.g., one or more tires, or the oil and the oil filter) of the vehicle are in need of replacing. (In this regard, it may be noted that the process of FIG. 51 may also be used even where no replacement part is ordered, for example, to schedule a preventive maintenance checkup based on actual vehicle usage.)

Further, the I/O states of the input devices 1440 and output devices 1450 may be compared to detect inconsistencies and thereby locate devices that are in need of replacing. For example, if the input state of a particular input device 1440 is inconsistent with I/O status information received from one or more other (possibly, redundant) devices, then this indicates that the particular input device 1440 is in need of replacing. Moreover, the I/O circuitry of the interface modules 1420 provides additional health and operation information regarding the I/O devices 1440 and 1450. For example, if the voltage across a particular input device is zero volts, and the expected input range for that input device is +1.0 volt to +5.0 volts, then this indicates that the input device 1440 is in need of replacement. Alternatively, if a given output device 1450 never draws any power regardless of the perceived output state of the output device 1450, then this indicates that the output device 1450 is in need of replacing. Thus, by testing voltage and current conditions in the I/O circuitry of the interface modules 1420, an indication of particular input devices 1440 or output devices 1450 that are in need of replacing may be obtained.

In a limited number of circumstances, it is desirable for the fault isolating step 443 to be performed at least partially in response to operator inputs. Specifically, operator inputs are desirable when an out-of-range parameter indicates that maintenance is required, but the parameter (or combination of parameters) that is out-of-range is not highly correlated with failure of a particular part. In this case, then operator inputs may be used in combination with other inputs to identify which part is in need of replacing. For example, the diagnostic system 212 may be able to fault isolate to a limited number of parts or groups of parts which potentially need to be replaced. The parameters that are out of range, along with other diagnostic data and the parts or groups of parts that potentially need to be replaced, are then displayed to the operator using the display 219. The operator may for example be the driver of the vehicle or maintenance personnel assigned to maintain or repair the vehicle. Operator inputs are then acquired which make a final selection of the parts or groups of parts to be replaced based on the operator's professional judgment or other information.

Additionally, operator input may also be desirable in the case of replacement parts that have a cost which exceeds a predetermined threshold level (e.g., replacement parts that are considered to be particularly expensive). In this case, the results of the fault isolating step 443 are preferably displayed to the operator, and the operator is requested to confirm that the fault isolating step 443 has been performed correctly. In a particularly preferred embodiment, the operator is further requested to provide an identification code (to identify the operator and confirm that the operator has the requisite authority to make such a determination) and/or an authorization code (to provide a paper trail and confirm that any required authorizations for order the replacement part have been received). The on-board computer system 424 then verifies that the identification code identifies an operator having the requisite authority to order such a part and request such maintenance, and/or confirms that the authorization code is valid and therefore any required authorizations for order the replacement part have been received.

The health and operation information that is used by the diagnostic system 212 to perform step 443 may be derived from a variety of sources. First, as previously noted, the control systems 224–230 have built in test capability and are able to provide health and operation information regarding the respective controlled subsystems 234–240. Additionally, numerous sensors may be located throughout the vehicle and connected to one of the interface modules 1420. Further, the I/O circuitry of the interface modules 1420 provides additional health and operation information regarding the I/O devices 1440 and 1450 to which it is connected. To the extent that the amount of health and operation information available to the diagnostic system 212 is increased (e.g., through the use of improved built-in test capabilities or the use of additional sensors), the ability of the diagnostic system 212 to fault isolate will be improved.

At step 444, which may be performed concurrently with step 443, the diagnostic system 212 identifies the part number of the replacement part required to return the vehicle 411 to operating condition. Thus, if the diagnostic system 212 determines that the battery needs to be replaced at step 443, then at step 444 the diagnostic system identifies the part number of the battery to be replaced. Step 444 is preferably performed using a database that identifies all parts on-board the vehicle 411, including part numbers and pricing information. The data base is preferably located on the on-board computer system 422 and is integrated with the previously-discussed maintenance jacket which is stored in the computer system 422 and which comprises a log of maintenance activities performed on the vehicle 411. In order for the data base to be kept current, the database is updated periodically by establishing an Internet link with the manufacturer computer system 432. Alternatively, the database may be stored at the fleet manager computer system 437 and accessed via a network connection over the communication link 420. For example, this is advantageous if the functionality of the fleet manager computer system 437 is combined with the functionality of the maintenance center computer system 424 in a single computer system. In this situation, the inventory management system 428 can maintain inventory levels in a manner that takes into account how many vehicles use a particular part. The inventory management system 428 can also query the diagnostic systems 212 of particular vehicles to assess how soon particular parts may need to be replaced.

At step 445, after the fault has been isolated and the replacement part has been identified, a request for a replacement part along with a request for maintenance is transmitted to the maintenance center computer system 424. If the parts data base is stored at the on-board computer system 422, then the request for the replacement part may simply comprises a request for a part identified by a particular part number (e.g., "Battery, part no. 1234"). If the parts data base is stored at the maintenance center computer system 424, then the request for the replacement part simply comprises a request for a new part without specifying a part number. The operator identification code and/or authorization code are preferably also transmitted.

Step 445 is preferably performed whenever a part is identified that is in need of replacing. However, step 445 may also be performed in delayed fashion after the maintenance center computer system 424 initiates contact with the on-board computer system 422 and queries whether any parts and maintenance are required.

Referring now also to FIG. 52, FIG. 52 shows the operation of the maintenance center computer system 424 after the parts and maintenance request is transmitted from the on-board computer system 422. At step 451, the maintenance center computer system receives the request for the parts and maintenance request from the on-board computer system 422. At step 452, the maintenance center computer system 424 verifies the authorization for the ordered part. For example, the maintenance center computer system 424 confirms that the identification code identifies an operator having the requisite authority to order such a part and request such maintenance, and/or confirms that the authorization code is valid and therefore any required authorizations for order the replacement part have been received.

At step 453, the maintenance computer system 424 accesses the inventory management system 428 for the maintenance center 416 to determine if the requested part is available in on-site inventory. For example, for low dollar value or common parts, the part is likely to already be available on-site. For high dollar value or irregular parts, the part may have to be ordered from the manufacturer 417.

At step 454, assuming the requested part is determined to be not available on-site in step 453, then the maintenance center computer system 424 places an on-line order for the part with the manufacturer computer system 432. When the manufacturer computer system 432 receives the order, it accesses the inventory management system 433. If the part is on-hand at the manufacturer 417, the part can be shipped to the maintenance center for next day delivery. If the part is not on-hand, the manufacturer computer system 432 determines the amount of time until the part will be available (taking into account any backlog of orders). The manufacturer computer system 432 then transmits a message to the maintenance center computer system 424 confirming the order and indicating an expected delivery date for the part to the maintenance center. This information may, for example, be sent in the form of e-mail message that is received by automatic scheduling program as well as a personal e-mail account associated with a supervisor or manager of the maintenance center 416.

At step 455, the maintenance center computer system 424 receives the message from the manufacturer computer system 432 confirming the order and indicating the expected delivery date. At step 456, the maintenance center computer system 424 accesses the maintenance scheduler 427 to determine the next available maintenance slot after the replacement part is delivered.

At step 457, the maintenance center computer system 424 confirms availability of the vehicle 411, for example, by transmitting a message to the fleet management computer system 437 to confirm vehicle availability. Alternatively, a message may be sent to the operator of the vehicle 411 and displayed using the 219 to prompt the operator to confirm vehicle availability (shown as step 446 in FIG. 51). As a further alternative, the vehicle 411 may be programmed with usage scheduling information, so that the vehicle is able to determine whether it is available during a given time slot. If the vehicle 411 is not available during a given time slot, then another time slot is considered.

At step 458, the maintenance center computer system 424 transmits an order and maintenance scheduling confirmation message to the on-board computer system 422. Referring back to FIG. 51, at step 447, the order and maintenance scheduling confirmation message is then received by the on-board computer system and, at step 448, displayed to the operator of the vehicle 411.

In some situations, after connecting, the maintenance center computer system 424 may completely control diagnosis of the problem, for example, under the control of an operator at the maintenance center 416. Thus, the operator can execute a diagnostic program that directly manipulates I/O states of the input devices 1440 and output devices 1450, and/or that interfaces with the control systems 224–230 to control a respective one of the systems 234–240. In this regard, it may be noted that, in the preferred embodiment, all electric/electronic devices that are not directly connected to one of the control systems 224–230 are directly connected to one of the interface modules 1420. Therefore, a remote operator at the maintenance center 416 can have complete control of all electric devices on board the vehicle 411, and can control such things as engine ignition, engine cranking, and so on.

The maintenance center computer system 424 may also download a diagnostic program that is then used by the on-board computer system 422. Also, diagnostic data can be transmitted to the maintenance center computer system 424 to create a record of the tests performed and routines run for use in diagnosing future problems or for analyzing past problems.

Figure 53:
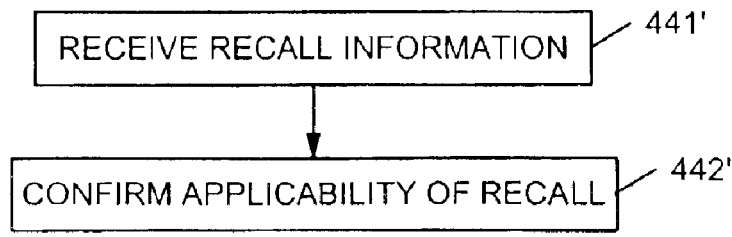
FIG. 53 is another flowchart showing the operation of an on-board computer system in the system of FIG. 50 during a parts ordering process.

Referring now to FIG. 53, in another embodiment, the system 400 is used to distribute recall information for the vehicle 411 and to schedule maintenance in connection with the recall. The recall notice information is transmitted from the maintenance center computer system 424 and, at step 441', is received at the on-board computer system 422. At step 442', the on-board computer system 422 confirms the applicability of the recall. For example, the on-board computer system 422 confirms that the vehicle 411 is configured in such a manner that it utilizes the part that is the subject of the recall. Steps 441' and 442' roughly correspond to steps 441–444 in FIG. 51, in as much as both groups of steps identify a part that is in need of replacing. Thereafter, the operation of the on-board computer system 422 and the maintenance center computer system 424 is generally the same as previously described, with the two computer systems 422 cooperating to schedule the vehicle 411 for maintenance to replace the part that is the subject of the recall.

In an alternative embodiment, the recall information may be transmitted directly from the manufacturer computer system 432 to the on-board computer system 422. For example, if the vehicle 411 is not part of a fleet of vehicles, and may be serviced at any one of a plurality of different repair centers, the recall notice information may be simply displayed to the operator of the vehicle 411 using the display 219. The information sent to the operator preferably includes a notice that the vehicle 411 is the subject of a recall, information regarding compliance such as nearby service centers available to perform the recall maintenance, and other information. The operator then has the option of scheduling maintenance to comply with the recall. However, it is necessary for an operator input to be received (e.g., a key press) indicating that the recall information has been considered in order to remove the recall information from the display 219. When the operator input is received, a message is transmitted back to the manufacturer computer system 432 confirming that the operator received the recall information. This arrangement allows a manufacturer of the vehicle 411 to verify that the recall information was received by the operator of the vehicle 411, even if the recall information is ultimately ignored.

The system 410 is also useable for firmware upgrades. Firmware may be updated on a periodic or aperiodic basis any time the on-board computer system 422 and the maintenance center computer system 424 establish communication. For example, the on-board computer system 422 may connect to the maintenance center computer system 424 to order a replacement part. If a certain period of time has expired since the last firmware upgrade then at the time the computer systems connect to order the part, the on-board computer system 422 may check for an available firmware upgrade. Many embodiments for upgrading firmware are within the scope of the present equipment service vehicle system. For example, the operator may initiate the firmware upgrade process or the on-board computer system 422 may initiate the process independent of any other need to connect to the maintenance center computer system 424. Also, there may be situations where the firmware upgrade is sufficiently important that the maintenance center computer system 424 connects to the on-board computer system 422 for the express purpose of upgrading the firmware. Once transferred to the on-board computer system 422, the firmware is then transmitted to and installed by each of the interface modules 1420 within the on-board computer system 422. This arrangement may also be used to install firmware for the control systems 224–230.

Figure 54:
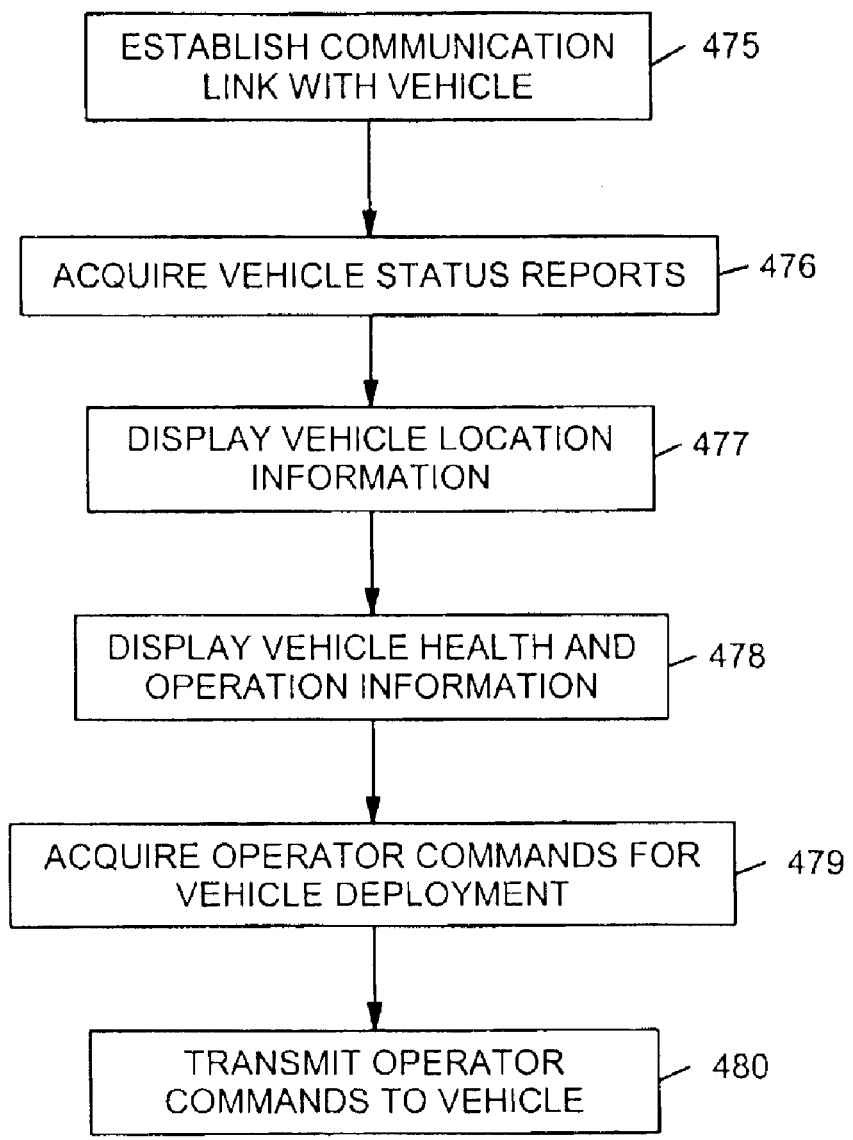
FIG. 54 is a flowchart showing the operation of a maintenance center computer system in the system of FIG. 50 during a readiness assessment process.
Figure 55:
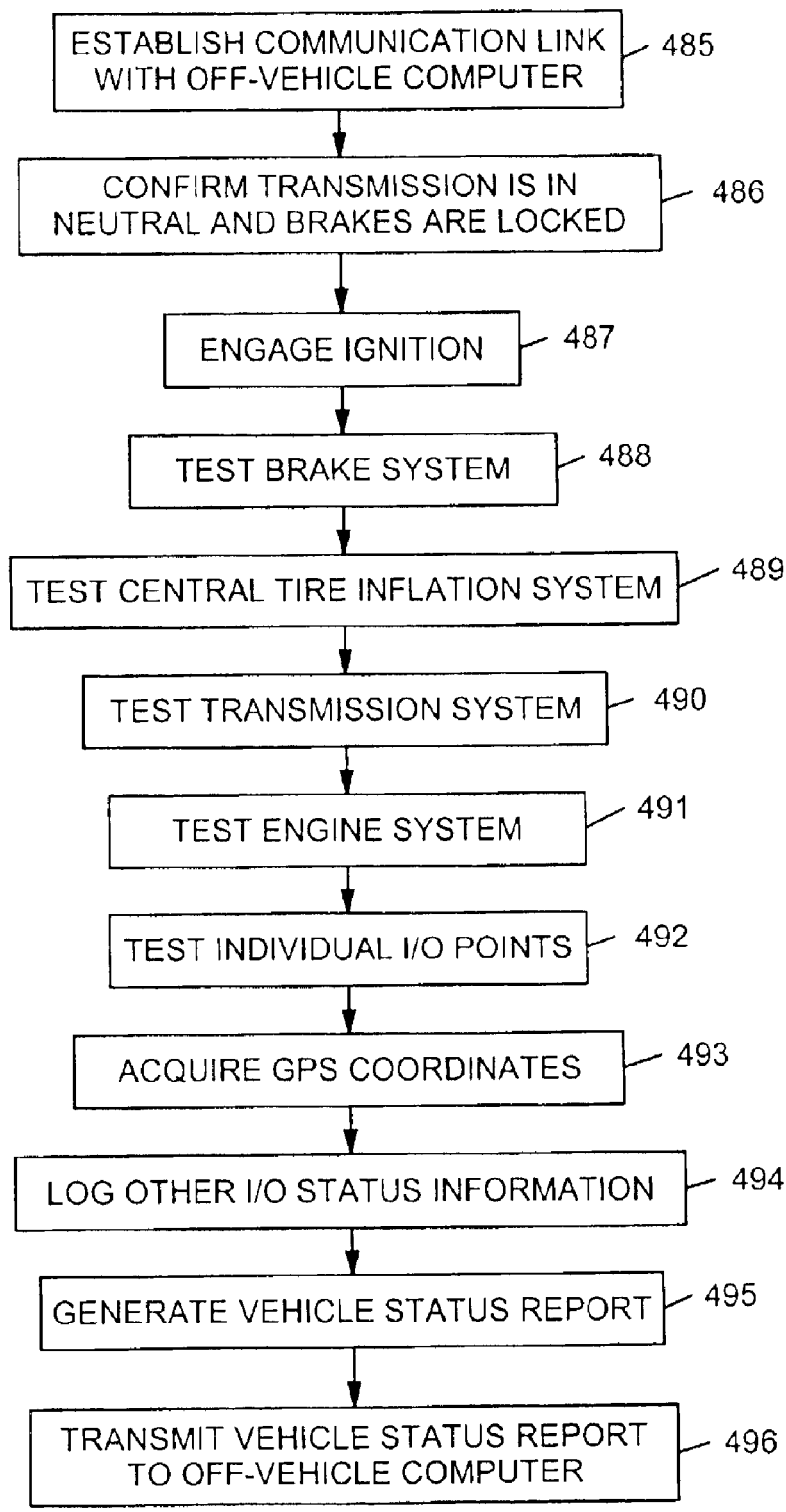
FIG. 55 is a flowchart showing the operation of an on-board vehicle computer system in the system of FIG. 50 during a readiness assessment.

Referring now also to FIGS. 54–55, a preferred fleet monitoring, real time mission readiness assessment, and vehicle deployment method is shown. The method shown in FIGS. 54–55 is useable to obtain a real time assessment of each vehicle in a fleet of vehicles. This is useful, for example, in the context of a natural disaster or other emergency when it is not known which vehicles are operational, and the locations of the vehicles is not known. Again, by way of example, the method is described in the context of the system 400 of FIG. 50. FIG. 54 shows the operation of the fleet management 437. FIG. 55 shows the operation of the on-board computer system 422. Although FIGS. 54–55 are discussed in the context of the vehicle 411, the process of FIGS. 54–55 are preferably performed in connection with all of the vehicles in the fleet.

Referring first to FIG. 54, at step 475, the fleet management computer system 437 establishes a communication link with the vehicle 411 using the communication network 420. In the context of municipal applications, a cellular telephone modem may be used to connect the vehicle to a secure area of the Internet, allowing the fleet management computer 437 to communicate with the vehicles 411–414 by way of the Internet. In the context of military applications, a secure military network is used to implement the communication network 420. At step 476, a vehicle status report is acquired from the vehicles 411.

Referring now also to FIG. 55, the operation of the on-board computer system 422 of the vehicle 411 to generate such a status report is shown. At step 485, a communication link is established with the fleet management computer system 437. Step 485 corresponds to step 475 in FIG. 54. At steps 486–494, the on-board computer system 422 performs a series of tests that assess the operability of various vehicle subsystems. By testing each of the individual subsystems, an overall assessment of the mission readiness of the vehicle 411–414 is obtained.

Thus, at step 486, the test control module confirms that the transmission is in neutral and the brakes are locked. Step 486 is performed so that when the ignition is engaged at step 487, it is known that the vehicle will remain stationary. More complete health and operational testing may be performed when the engine is turned on, however, the vehicle may be completely unattended and therefore vehicle movement should be avoided for safety reasons. For example, in the context of military vehicles, in which vehicles may be rendered inoperable if a storage site or other stockpile of equipment and vehicles is bombed, it is desirable for the vehicle health and operation to be ascertained even though no operator is present. Likewise, in the context of municipal applications, in which vehicles may be rendered inoperable in the event of a natural disaster (such as a tornado or hurricane) or a man-made disaster (such as a large scale industrial accident or a terrorist attack), it is again desirable for the vehicle health and operation to be ascertained even though no operator is present.

At step 487, as previously noted, the ignition is engaged. The ignition input device which receives an input from the operator (in the form of an ignition key turning) is preferably one of the input devices 1440. Therefore, by manipulating the I/O states in the I/O status table 1520, the vehicle 411 is commanded to behave as though the ignition key is turned even though no operator is in fact present at the vehicle. The ignition key input state can be manipulated remotely in the same manner as any other input state for an input device 1440 connected to an interface module 1420.

At step 488, the anti-lock brake control system 226 tests the brakes 236. The control system 226 performs built-in self tests to ensure the operability of the control system 226 and of the mechanical components of the brake system 236. If no response is received by the on-board computer system 422 from the brake control system 226, then it is assumed that the brake system 226 has been rendered inoperable. At steps 489, 490, and 491, respectively, the central tire inflation system, the transmission system 238, and the engine system 240 are tested in generally the same manner that the anti-lock brake system 236 is tested, specifically, through the use of built-in self test capabilities. Additionally, the tests set forth above in Table II may also be performed. It should be noted that the systems 234–240 need not be tested one after the other as shown in FIG. 55 but, in practice, may be tested concurrently. Further, in addition to employing the built-in self test capabilities of the control systems 224–230, it may also desirable to employ additional health and operation information that is attainable by way of any sensors that are connected to the interface modules 1420. Information pertaining to the operational health of the systems 234–240, such as whether respective system 234–240 passed or failed particular tests, is then logged.

In step 492, the interface modules 1420 test individual input devices 1440 and output devices 1450. For example, the input devices 1440 can be tested by ensuring that redundant input sensors provide the same input information, and by ensuring that the input devices provide input signals that are within an expected range. The output devices 1450 may be tested by using input devices 1440 which are feedback sensors to evaluate the response of the output devices 1450 to signals that are applied to the output devices 1450. Additionally, I/O drive circuitry of the interface modules 1420 may be used to determine the current through and/or the voltage across the output devices 1450. Alternatively, separate input devices 1440 may be used which are voltage or current sensors. This information can be used to assess the consumed power by each output device 1450 and determine whether the consumed power is within a predetermined range.

At step 493, the GPS coordinates of the vehicle 411 are acquired using the GPS receiver 425. At step 494, other I/O status information is acquired and logged from the I/O status table 1520. Preferably, all of the information in the I/O status table 1520 is logged. As a result, the I/O status report contains information regarding such parameters as fuel level. Additionally, in the context of multi-purpose vehicles, information regarding the configuration of the vehicle 411 may be stored in the I/O status table 1520. Therefore, after a natural disaster, it will be known whether a particular vehicle is presently configured with a dump truck variant module, a wrecker variant module, or a snow removal variant module, for example.

At step 495, the information which logged during steps 487–494 is compiled into the vehicle status report. Of course, step 495 may also be performed concurrently as each of the steps 486–493 is completed. Preferably, during step 495, a summary conclusion is also generated based on the results of the tests performed during steps 487–494. For example, the summary conclusion may be "fully operational" if the results of the tests performed during steps 487–494 determine that all subsystems are at or near a level of full operability, "operational with limited damage" if the test results indicate that one or more subsystems has sustained significant damage but the vehicle is still useful for at least some intended purposes, "inoperable" if the test results indicate that that one or more subsystems has sustained significant damage and the vehicle is not useful for any intended purpose, and "inconclusive" if the tests could not be performed or if the test results provide conflicting information regarding the operability of the vehicle 411. At step 496, the vehicle status report is then transmitted from the on-board computer system 422 to the fleet management computer system 437.

Referring back to FIG. 54, after the vehicle status report is acquired by the fleet management computer 437, the fleet management computer system 437 displays to an operator the vehicle location information at step 477 and the vehicle health and operation information at step 478. Preferably, steps 477–478 are performed in the following manner. Specifically, the vehicle location, health, and operation information is displayed to the operator of the fleet management computer system 437 using the web browser 438. For example, in the context of a fleet of municipal vehicles, the web browser 438 displays a city map with icons representing the vehicles superimposed on the city map at locations corresponding to the actual position of the vehicles. The icons are displayed in a manner which is indicative of the level of health and operation of the vehicle. For example, a red icon indicates an inoperable vehicle, a yellow icon indicates a semi-operable vehicle, and a green icon represents a vehicle which is substantially fully operable. Alternatively, only two colors may be used (e.g., green and red), with varying levels of gradations between red and green being used to indicate a percentage level of operability. Further, the displayed icons preferably vary according to the type of vehicle represented. For example, an icon representing a fire truck may be displayed as a small representation of a fire truck, whereas an icon representing a wrecker vehicle may be displayed as a small representation of a wrecker vehicle. In the context of variant vehicles, the variant vehicle may be represented in different ways depending on the type of variant module mounted on the vehicle chassis. In this way, the operator is able to view the city map displayed by the web browser 438 and obtain an immediate overall picture of the real time locations of the operable vehicles available for responding to the natural disaster. Likewise, in military applications, a battlefield commander is able to view a map of the battlefield and obtain an immediate overall picture of the locations of the operable military vehicles. Again, different types of military vehicles may be represented using different icons. Further, in both military and municipal contexts, to obtain additional information, the operator of the fleet management computer system 437 can click on the iconic representation of a particular vehicle to obtain additional information as previously described.

At step 479, the fleet management computer system 437 acquires operator commands for vehicle deployment. For example, in military applications, a commander can control troop movements by clicking on particular vehicles and dragging the vehicles on the screen to new locations on the display of the battlefield map. When the operator clicks on a particular vehicle and moves the vehicle to a new location on the battlefield or city map, the new location of the vehicle on the map is converted to GPS coordinates, and the new GPS coordinates are transmitted at step 480 to the vehicle as part of a command from the operator to move the vehicle to the new location. In similar fashion, in municipal applications, a fire chief or dispatcher can cause fire trucks to be deployed to specified locations by clicking and dragging the icon to the desired location on the city map. Once the icon is dragged to the new location, a shadow icon is displayed at the new location until the vehicle reaches the commanded position, allowing the operator of the fleet management computer system 437 to know the actual vehicle position as well as the vehicle's commanded position. When the vehicle reaches its commanded position, the shadow icon is no longer displayed.

As will be appreciated, various combinations of the above-described features have already been described by way of example. However, as will be appreciated, additional combinations are possible. For example, various types of equipment service vehicles have been described, including fire fighting vehicles, mixing vehicles, snow removal vehicles, refuse handling vehicles, wrecker vehicles, and various types of military vehicles. All of the features described in connection with one of these vehicles may also be used in connection with any of the remaining types of vehicles.

Figure 56:
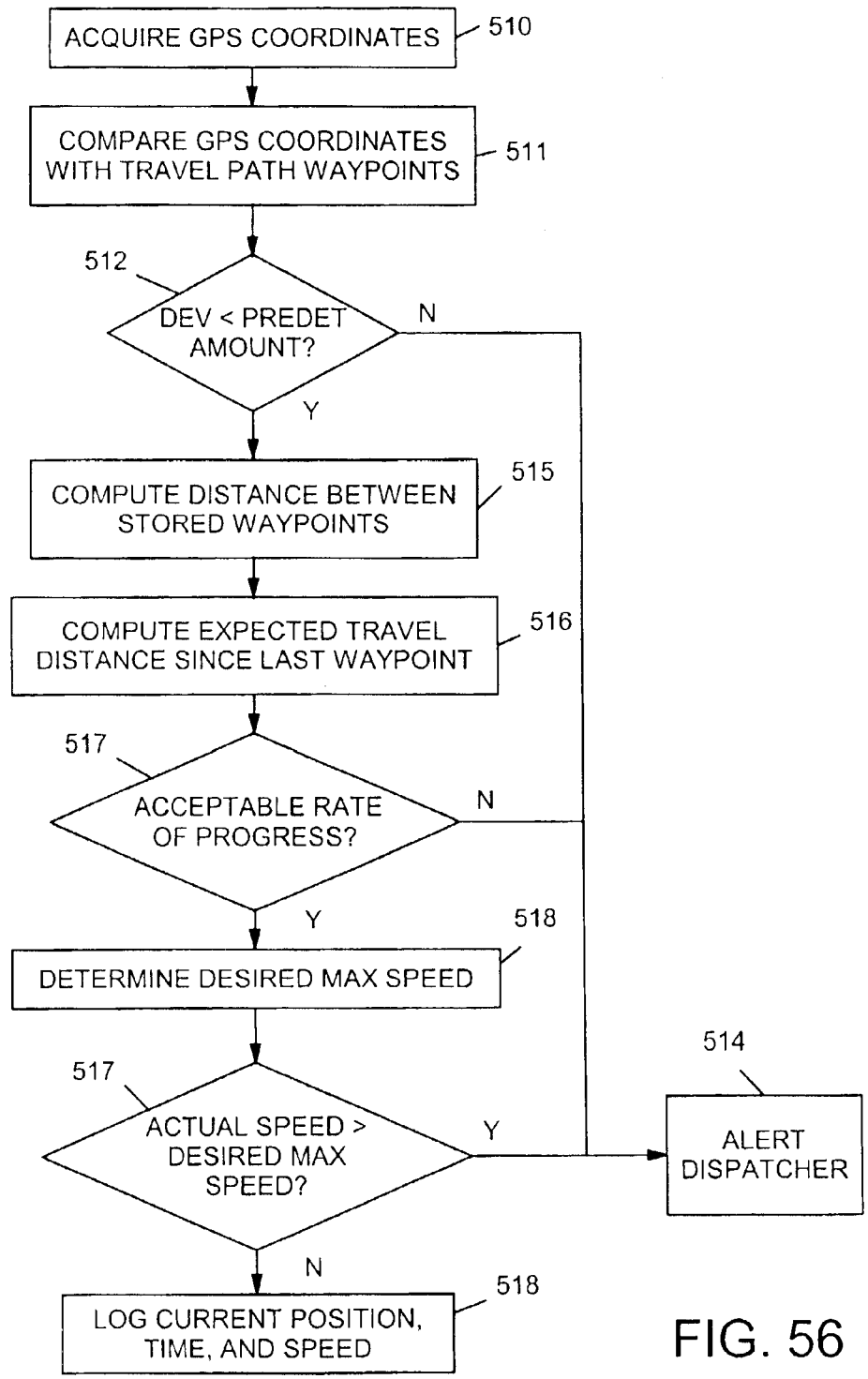
FIG. 56 is a flowchart showing the operation of the system of FIG. 50 to detect non-conformance to a predetermined route.
Figure 57:
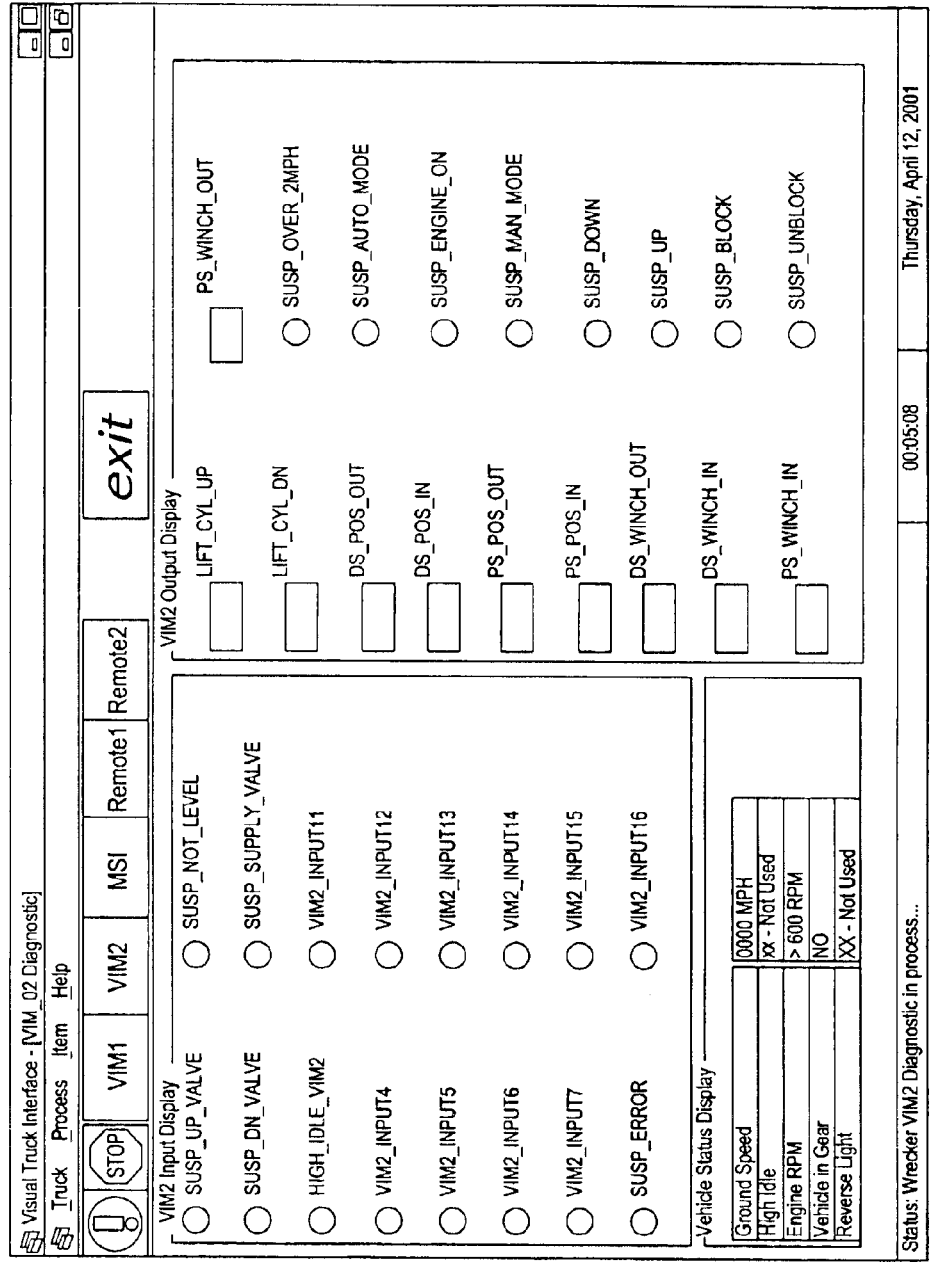
FIGS. 57–67 are various examples of screen display for real time remote monitoring of vehicle I/O status information.
Figure 58:
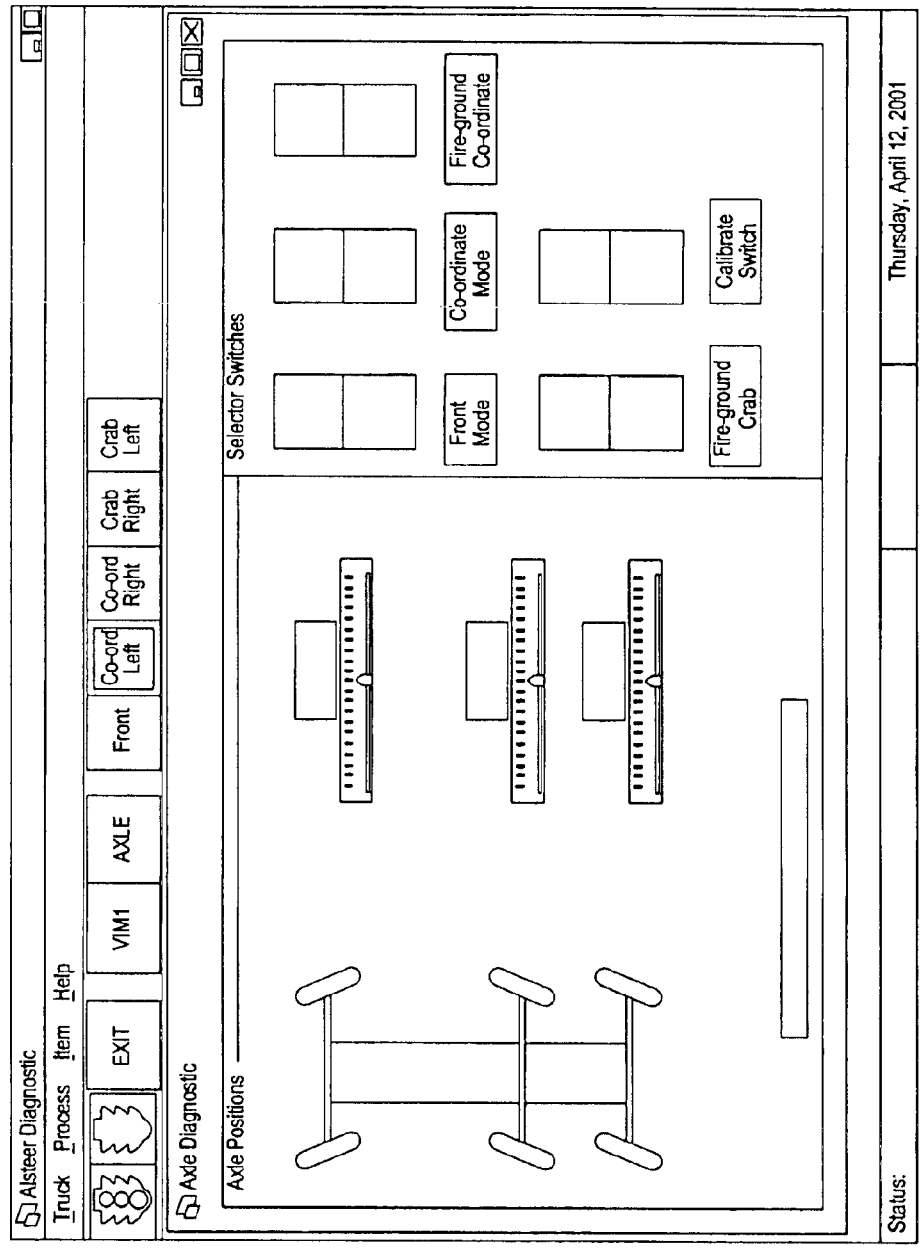
Figure 59:
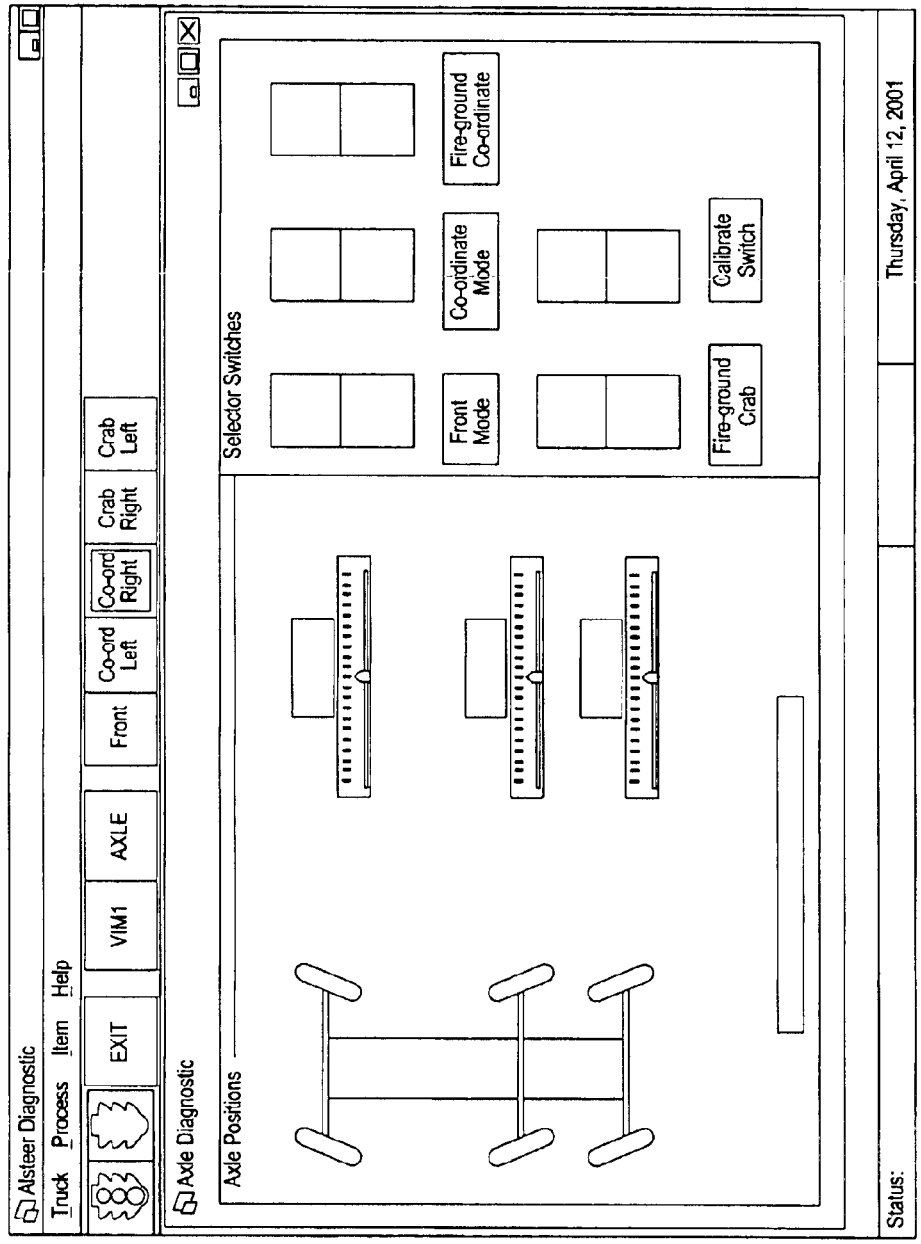
Figure 60:
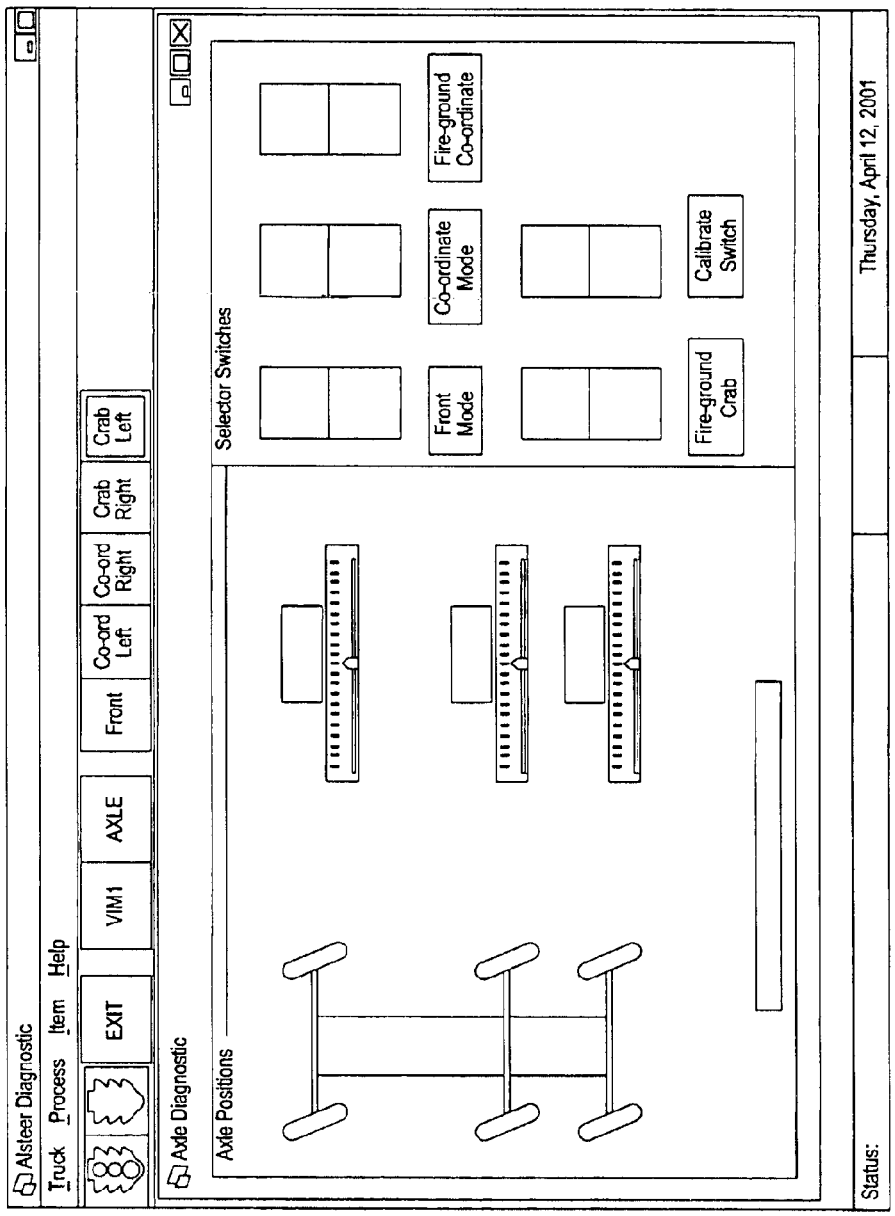
Figure 61:
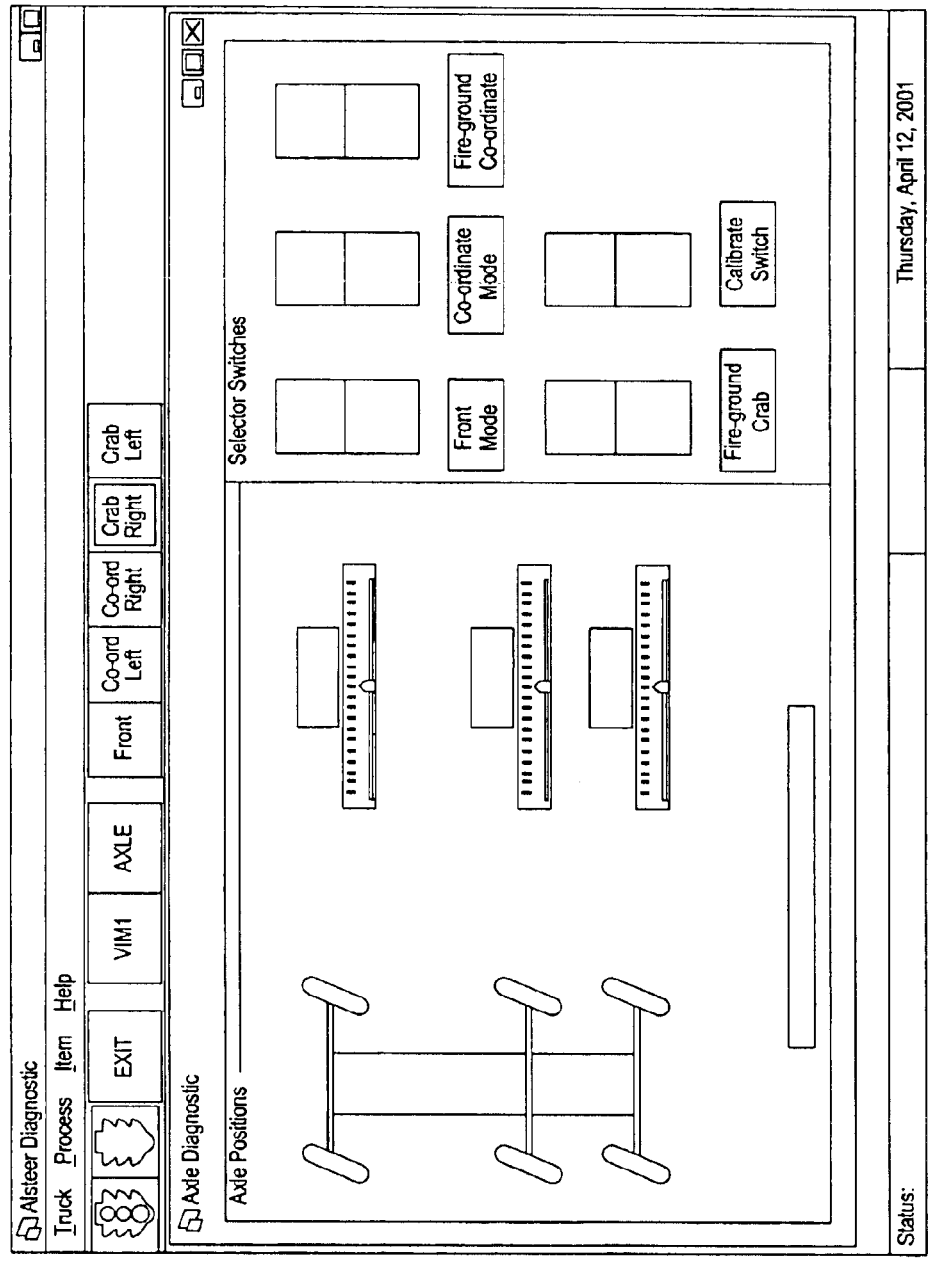
Figure 62:
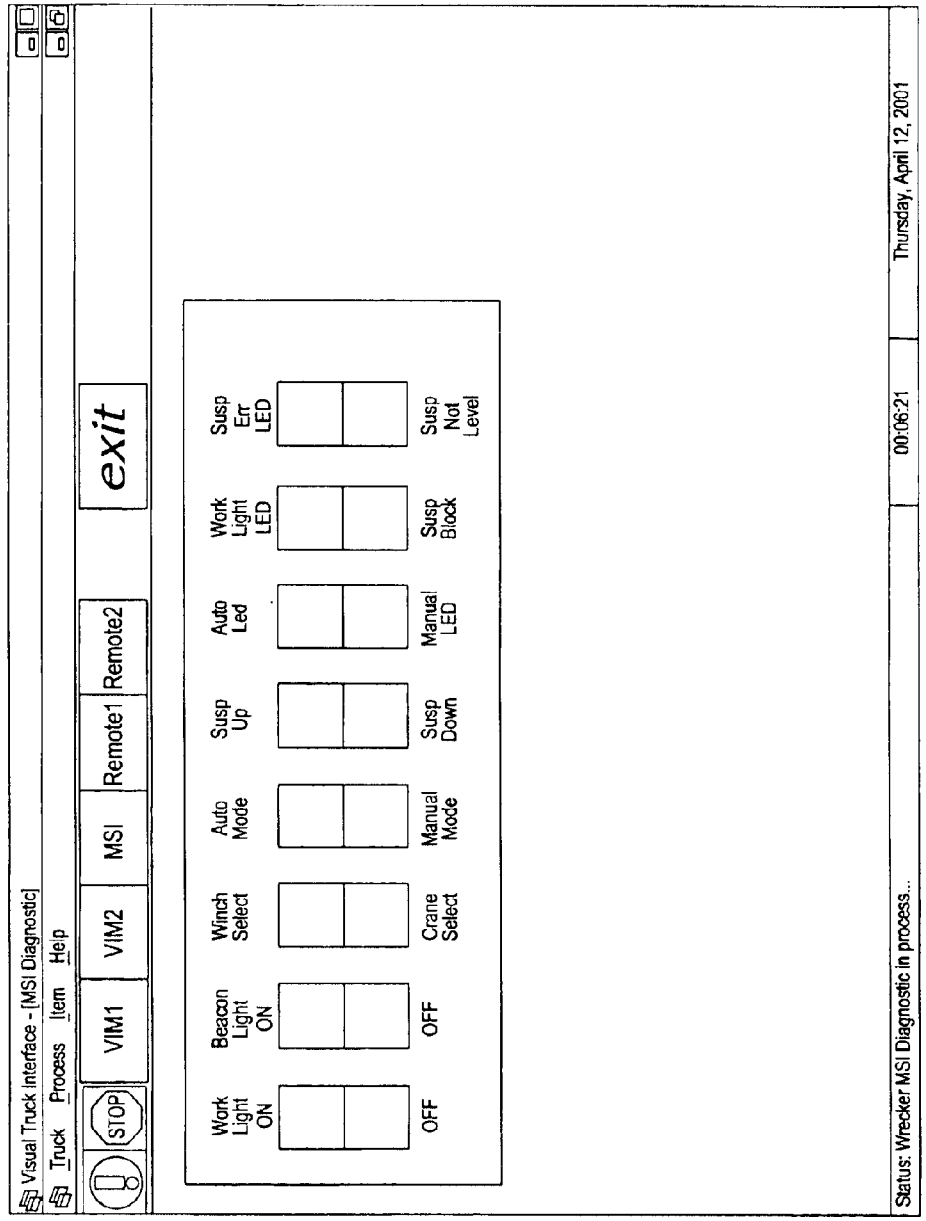
Figure 63:
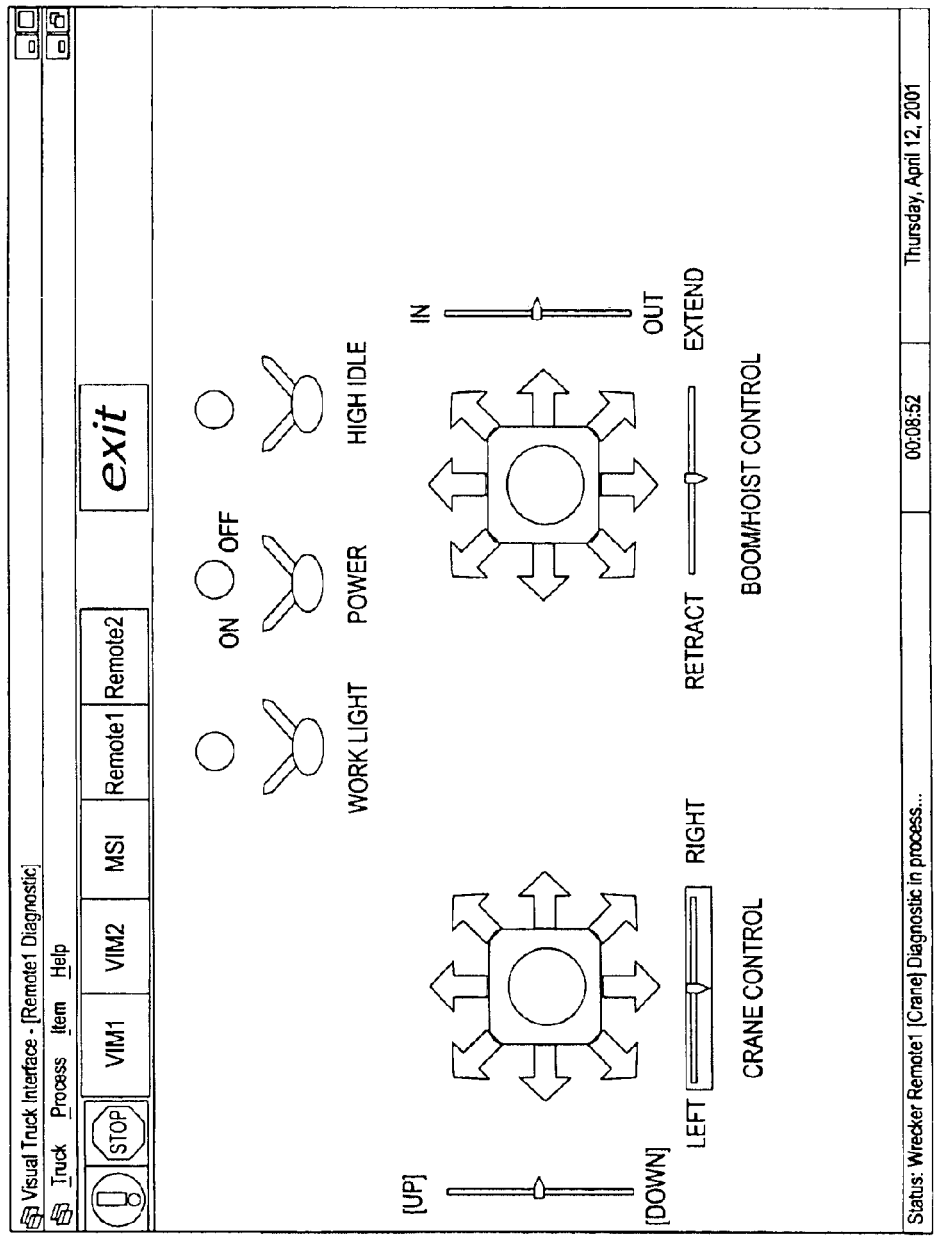
Figure 64:
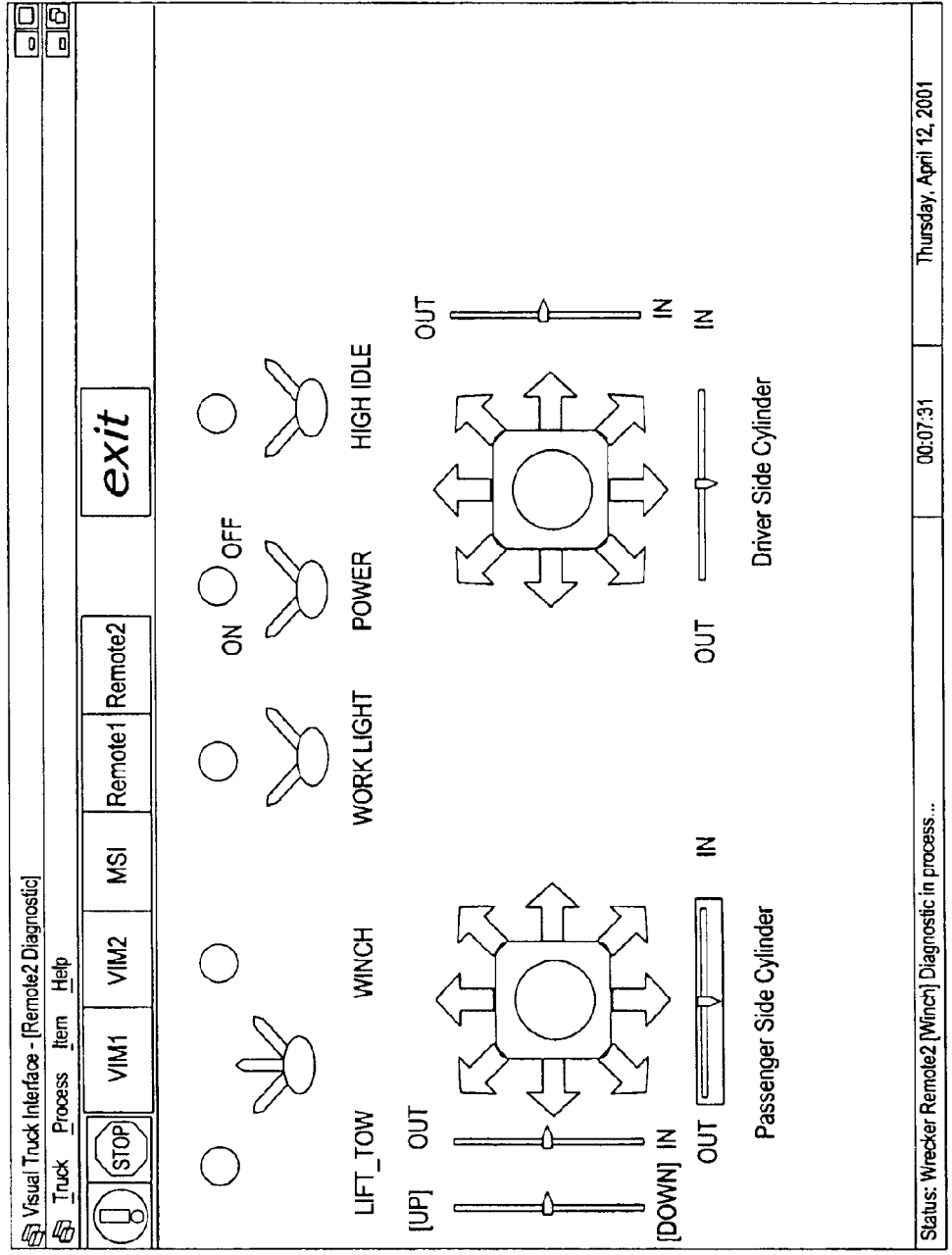
Figure 65:
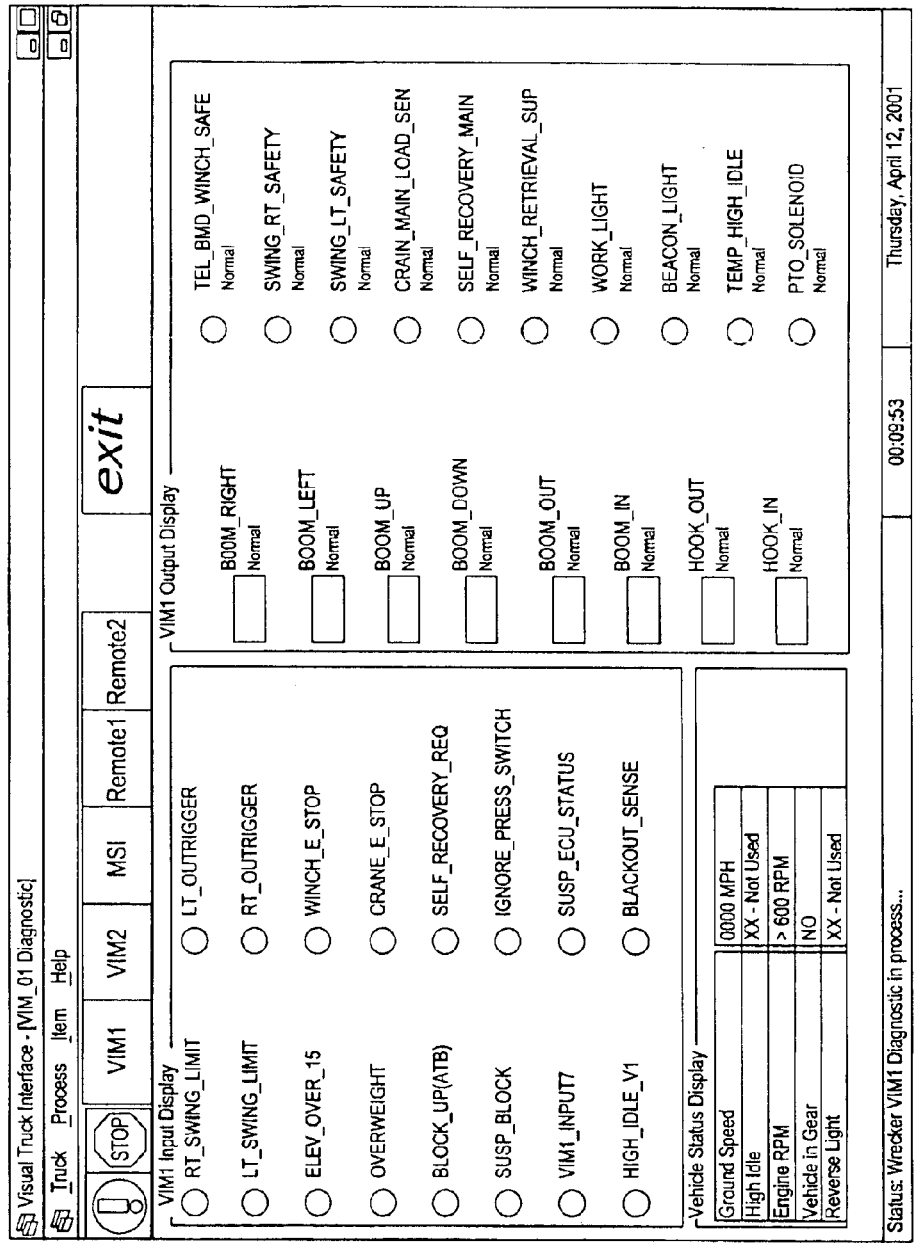
Figure 66:
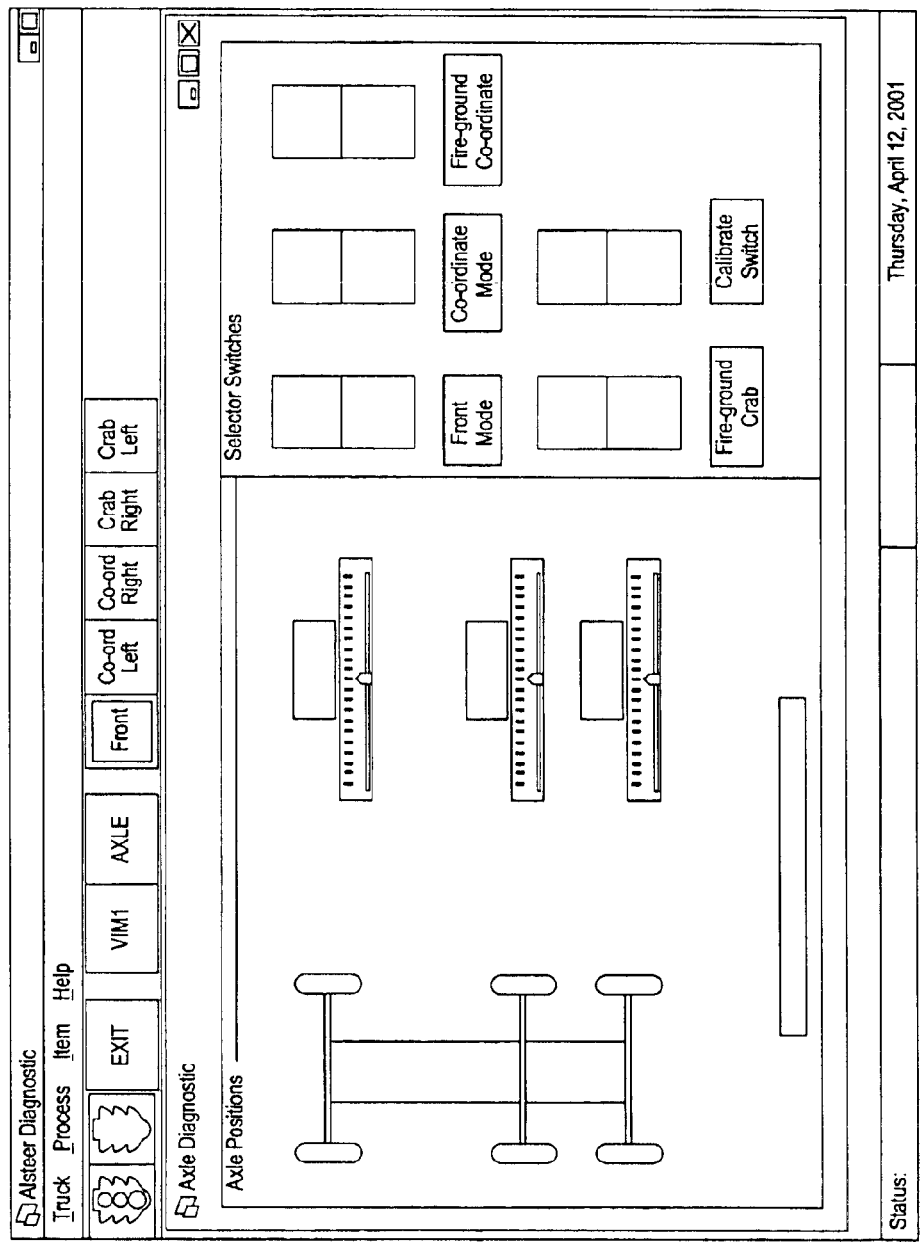
Figure 67:
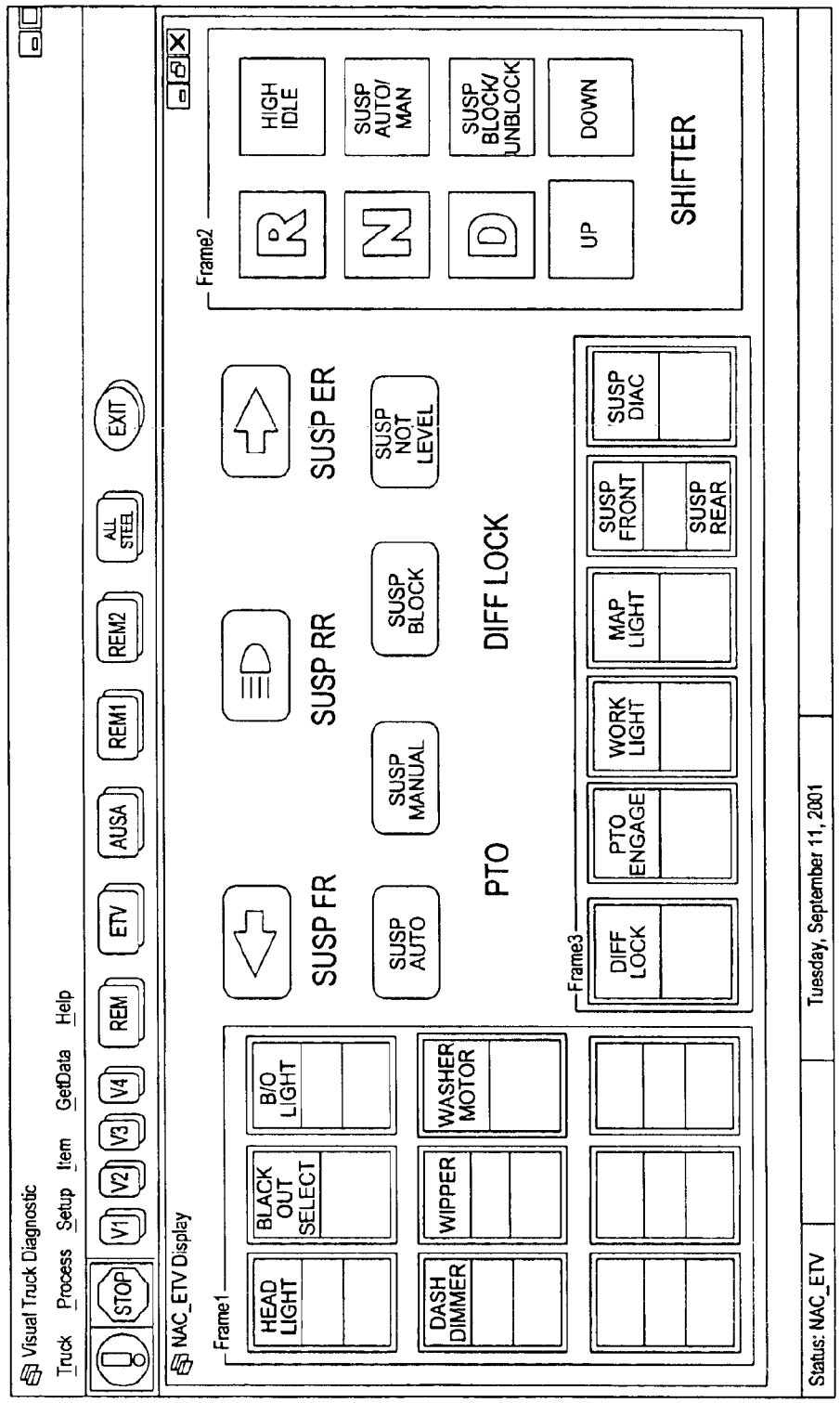

Referring now to FIG. 56, owners of equipment service vehicles often devise particular routes or other practices which are designed to enhance safety of the vehicle and the general public while maintaining overall efficiency. For example, the owner of the vehicle may have a certain route laid out with a pre-determined number of pickups and deliveries, which the operator of the vehicle can accomplish in a reasonable amount of time without driving the vehicle at an excessive speed or in an otherwise unsafe manner. Given that these routes have been laid out, it is often desirable to have a way of ensuring that the driver conforms to these routes. FIG. 56 is a flowchart showing the operation of the system 410 to detect non-conformance to a predetermined route.

At step 511 the GPS receiver 425 acquires GPS coordinates for the vehicle 411. At step 512, the GPS coordinates are compared with coordinates of travel path waypoints. Preferably, either the on-board computer system 422 or the fleet management computer system 437 includes a map of the predetermined travel paths (or a series of predetermined travel paths for different tasks). The map of the predetermined travel path is defined by a series of waypoints which in turned are a defined by a GPS coordinates for specific locations along the travel path. The travel path waypoints may be spaced at any distance; however, vehicle path monitoring will be more accurate to the extent the waypoints are closer together. Waypoint manager software may be used to define travels paths and download waypoints for the travel paths into the on-board computer system 422 or the fleet management computer system 437.

If the comparing step 512 is performed at the on-board computer system 422, then the waypoints are loaded into the on-board computer system 422. If the comparing step 512 is performed at the fleet management computer system 437, then the GPS coordinates acquired during step 511 are transmitted to the fleet management computer system 437 by way of the communication network 420. The advantage of performing the comparison at the vehicle is that it eliminates the need for constant communication between the vehicle and the dispatch station. The advantage of having the comparison performed at the dispatch station is that it ensures that the dispatch station is constantly updated with the vehicle position, making real time remote monitoring possible.

At step 513, the difference between the actual GPS coordinates with the nearest travel waypoint is compared with a pre-determined amount. If the difference is greater than a pre-determined amount, then this indicates that the operator has deviated from the pre-determined travel path. Each waypoint is provided with permissible lateral and longitudinal deviation values. Alternatively, single value may be used for simplicity. If the deviation is more than a pre-determined amount, then an alert message is sent to the operator of the dispatcher display at step 514.

If the difference is less than a pre-determined amount, then the distance between stored waypoints is computed (step 515) and the expected travel distance since the last waypoint is computed (step 516). Then, at step 517, it is determined whether the vehicle is progressing at an acceptable rate. This is used to determine, for example, whether the vehicle is on the side of the road. For example, the driver may have stopped the vehicle and, therefore, still on the travel path, but the driver is not progressing at an acceptable rate. By providing real time updates to the dispatcher, the dispatcher can immediately contact the driver to ascertain the source of the problem. Additionally, the dispatcher can make a determination as to whether another vehicle should be used to complete the driver's route.

If the driver is still on the route and is progressing at an acceptable rate, then everything appears to be in order and the current position, time, and speed are logged at step 518. The process of FIG. 56 is repeated at regular intervals. Assuming vehicle position monitoring is performed by the fleet management computer 437, it is possible to construct a map showing the positions of the vehicle 411 throughout the day. Thus, as the driver operates the vehicle, the position of the vehicle is logged at different times. Based on vehicle position as a function of time, a map is constructed showing the vehicle's position over time. Additionally, it is possible to log all of the I/O status information throughout the day. Thus, a complete picture of vehicle utilization of the course of a day (or other time period) may be obtained. Additionally, vehicle parameters may be monitored in real time to diagnose equipment malfunctions, click on the vehicle to obtain additional information. For example, vehicle loading may be ascertained to determine whether the vehicle 411 has spare capacity.

According to another embodiment, configurator software may be used to configure a control system such as control system 1412 for a vehicle. Different options are often made available to purchasers of equipment service vehicles and often the different available options include significantly different amounts and/or types of hardware and hence I/O devices. In order to facilitate design and manufacture of such vehicles in such situations, the configurator software provides a vehicle designer with the ability to custom-design a control system 1412 for a particular vehicle. The configurator software may be provided, for example, on a Microsoft® Windows™ platform and be provided with a typical windows user interface. The user interface may include various buttons representing interface modules and possibly also different types of I/O devices, such as any or all of the I/O devices mentioned herein. In one embodiment, an object-oriented approach is used such that each of the icons is embedded with intelligence regarding the particular type of module or device it represents.

In order to program a new control system 1412, the designer opens up a new file and, for example, clicks on an interface module button to drag an interface module into the designer's workspace. The designer then clicks on the interface module to open a dialog box that lists inputs and outputs. For example, for an interface module that supports fifteen inputs and fifteen outputs, the dialog box lists fifteen inputs and fifteen outputs. The operator is provided with the ability to configure the various inputs and outputs of the interface module via the dialog box. Alternatively or in addition, the operator may be provided with the ability to click and drag I/O devices into the workspace and establish connections between the interface modules and the I/O devices. Individual I/O devices may be provided names (e.g., "left front headlight"). For each of the inputs and outputs, information regarding processing to be performed by the interface module is specified by the operator and received by the configurator software. For example, for inputs, parameters such as switch debounce times, input filtering, input scaling, alarm limits, and other parameters may be specified. For outputs, parameters such as PWM frequencies, output scaling, limits, and other parameters may be specified. Also, for output devices, a control algorithm or logic may be specified. For example, for an analog output device, a control algorithm such as a PID algorithm may be specified that is a function of one or more of the parameters measured by various ones of the input devices. Likewise, for a digital output device, a Boolean equation may be specified that describes the on/off state of the output device as a function of the on/off states of one or more input devices coupled to the same interface module and/or to one or more remaining interface modules. The user interface may also restate the Boolean equation to the operator using device names assigned by the operator to provide a user friendly description. This process is repeated for all of the interface modules and all of the I/O devices that are to be included on the vehicle. The data that is generated using this process is stored in a file structure that can be uploaded into the interface modules located on the vehicle. In one embodiment, the data is stored as part of an Microsoft Access® data base and the Access data base is uploaded into the interface modules.

Each interface module is provided with a generic control program that is customized by the configuration data generated during the foregoing process. Thus, each interface module is provided with information regarding the types of I/O devices to which it is connected and the I/O processing that is to be performed in connection with those I/O devices. The firmware of the interface module executes against the configuration data. Notably, there is no need to compile code and load the compiled code onto the vehicle, because only data (in most cases) is being uploaded onto the vehicle. This allows vehicle firmware to be generic for all vehicles and allows the firmware to be updated at any time. After a new revision of firmware is uploaded, the interface module may use the new firmware to execute against the old (albeit still valid) configuration data.

Preferably, for unusual I/O devices, provision is preferably made to allow the user to upload specialized code for the I/O device into the interface module. Thus, for example, the user may be provided with the ability to write an executable program for a particular output device and then upload the program with the data for that particular output device. The executable code is then executed by the interface module during operation of the control system 1412. This provides greater flexibility to employ different types of output devices.

This arrangement is advantageous because it facilitates configuration of vehicle control systems. This arrangement also allows parts of the vehicle configuration to be configured and maintained independently. For example, it is possible to upgrade the firmware without affecting the vehicle configuration. Also, it is easier to provide different users or operators (e.g., designer, field service operator) with different levels of access.

Throughout the specification, numerous advantages of preferred embodiments have been identified. It will be understood of course that it is possible to employ the teachings herein so as to without necessarily achieving the same advantages. Additionally, although many features have been described in the context of a vehicle control system comprising multiple modules connected by a network, it will be appreciated that such features could also be implemented in the context of other hardware configurations. Further, although various figures depict a series of steps which are performed sequentially, the steps shown in such figures generally need not be performed in any particular order. For example, in practice, modular programming techniques are used and therefore some of the steps may be performed essentially simultaneously. Additionally, some steps shown may be performed repetitively with particular ones of the steps being performed more frequently than others. Alternatively, it may be desirable in some situations to perform steps in a different order than shown.

Many other changes and modifications may be made to the present invention without departing from the spirit thereof.

What is claimed is:

1. An electric traction vehicle comprising:
    a vehicle platform;
    a communication network;
    a power source mounted on the vehicle platform;
    a plurality of drive wheels rotatably mounted on the vehicle platform;
    a plurality of electric motors coupled to respective ones of the plurality of drive wheels;
    a plurality of microprocessor-based interface modules coupled to each other by way of the communication network, the plurality of microprocessor-based interface modules also being coupled to the plurality of electric motors and being configured to process input information received by way of the communication network to control the plurality of electric motors.

2. The vehicle of claim 1, wherein the plurality of drive wheels is a first plurality of drive wheels, wherein the vehicle comprises a second plurality of drive wheels, each of the second plurality of drive wheels being paired with respective ones of the first plurality of drive wheels such that each pair of drive wheels is driven in tandem by a respective one of the plurality of electric motors.

3. The vehicle of claim 1, wherein the plurality of electric motors includes at least four electric motors, and wherein the plurality of microprocessor-based interface modules includes at least four microprocessor-based interface modules.

4. The vehicle of claim 1, wherein the plurality of electric motors includes at least eight electric motors, and wherein the plurality of microprocessor-based interface modules includes at least four microprocessor-based interface modules.

5. The vehicle of claim 1, wherein the power source provides AC power and is connected to the plurality of interface modules by way of an AC bus assembly.

6. The vehicle of claim 5, wherein the AC bus assembly is configured to provide three phase power having a frequency of either about 50 Hz or about 60 Hz and a voltage in a range of about 460–480 VAC.

7. The vehicle of claim 6, wherein the vehicle further comprises an electrical connector to allow a power-consuming system off-board the vehicle to be connected to the vehicle and draw power from the AC bus assembly, and wherein the AC bus assembly is capable of providing at least 250 kilowatts of power to the off-board power-consuming system.

8. The vehicle of claim 7, wherein the vehicle is a tactical military vehicle.

9. The vehicle of claim 7, wherein the vehicle is a firefighting vehicle, and wherein the AC bus assembly provides power to scene lighting at the scene of a fire.

10. The vehicle of claim 5, wherein the vehicle is a hybrid electric vehicle with the power source comprising a diesel engine coupled to an electric generator.

11. The vehicle of claim 5, wherein the power source comprises a fuel cell coupled to an inverter, the inverter converting DC power from the fuel cell to AC power for the AC bus assembly.

12. The vehicle of claim 1, further comprising a plurality of auxiliary drive modules, and wherein the vehicle has a reconfigurable drive capacity, the reconfigurable drive capacity being achieved by way of the auxiliary drive modules, each of the plurality of auxiliary drive modules comprising an additional microprocessor-based interface module, an additional electric motor, and an additional drive wheel, the auxiliary drive modules being capable of being added to and removed from the vehicle as a unit to achieve a corresponding increase or decrease in the drive capacity of the vehicle.

13. The vehicle of claim 1,
wherein the plurality of interface modules include a compensation program with two modes of operation,
wherein, in the first mode of operation, the plurality of interface modules control the electric motors such that all of the plurality of drive wheels are driven,
wherein, in the second mode of operation, the plurality of interface modules control the electric motors such that less than all of the plurality of drive wheels are driven, the compensation program compensating for less than all drive wheels being driven by causing the remaining electric motors to be controlled to provide additional horsepower to compensate for the undriven drive wheel.

14. The vehicle of claim 12, wherein the plurality of microprocessor-based interface modules and the plurality of additional microprocessor-based interface modules cooperate to reconfigure the vehicle upon the addition and removal of the plurality of auxiliary modules.

15. The vehicle of claim 1, wherein each of the plurality of interface modules is configured to control the respective electric motor to brake the vehicle.

16. The vehicle of claim 1, wherein each of the plurality of interface modules is configured to control the respective electric motor to regenerate power back to one of the principal power unit and the power storage unit.

17. The vehicle of claim 1, further comprising a plurality of drive controllers, the plurality of drive controllers being coupled between respective ones of the plurality of microprocessor-based interface modules and respective ones of the plurality of electric motors.

18. The vehicle of claim 1, wherein the plurality of interface modules include a program that causes the plurality of electric motors to simulate a mechanical differential assembly, such that the plurality of drive wheels rotate at different speeds during vehicle turning maneuvers.

19. A method of operating an electric traction vehicle, comprising:
providing the electric traction vehicle, the electric vehicle comprising a vehicle platform, a communication network, a power source mounted on the vehicle platform and connected to an AC bus assembly, a drive wheel rotatably mounted on the vehicle platform, an electric motor coupled to the drive wheel, a first microprocessor-based interface module coupled to the electric motor, and a plurality of additional microprocessor-based interface modules including a second microprocessor-based interface module, the second interface module being coupled to a throttle input device, and the first and second interface modules being coupled to each other by way of the communication network;
receiving a throttle input from the throttle input device, the throttle input being received at the second interface module;
transmitting the throttle input from the second interface module to the first interface module by way of the communication network; and
controlling the electric motor using the first interface module, the first interface module controlling a speed of the electric motor in accordance with the throttle input received from the throttle input device.

20. A method according to claim 19, further comprising
receiving a brake input from a brake input device at one of the plurality of additional interface modules;
transmitting the brake input from the additional interface module to the first interface module by way of the communication network; and
wherein the first interface module controls the electric motor so as to operate in a regenerative braking mode in response to the brake input being active, the regenerative braking mode causing electric power to be drawn from the first and second electric motors and provided to a power storage unit on board the vehicle.

21. A method according to claim 19, further comprising
receiving a transmission input from a shift input device at one of the plurality of additional interface modules;
transmitting the transmission input from the additional interface module to the first interface module by way of the communication network; and
wherein the first interface module controls the electric motor so as to operate at different operating points depending on a status of the shift input device.

22. A method according to claim 19, further comprising
receiving a steering angle input from a steering input device at a first one of the plurality of additional interface modules;
transmitting the steering angle input from the first additional interface module to a second one of plurality of additional interface modules by way of the communication network;
controlling a steering mechanism of the vehicle using the second one of the plurality of additional interface modules, the steering mechanism being controlled in accordance with the steering angle input to control a direction of travel of the vehicle; and wherein the first interface module controls the electric motor in accordance with the steering angle input to operate at different speeds during turning maneuvers.

23. The method of claim 19, wherein the vehicle further comprises second, third, fourth, fifth, sixth, seventh, and eighth electric motors; and wherein the plurality of additional interface modules control speeds of the second, third, fourth, fifth, sixth, seventh, and eighth electric motors in accordance with the throttle input received from the throttle input device.

24. The method of claim 19, wherein the AC bus assembly is configured to provide three phase power having a frequency of either about 50 Hz or about 60 Hz and a voltage in a range of about 460–480 VAC.

25. The method of claim 24, wherein the vehicle further comprises an electrical connector to allow a power-consuming system off-board the vehicle to be connected to the vehicle and draw power from the AC bus assembly, and wherein the AC bus assembly is capable of providing at least 50 kilowatts of power to the off-board power-consuming system.

26. The method of claim 25, wherein vehicle is a tactical military vehicle.

27. The method of claim 25, wherein vehicle is a fire fighting vehicle, and further comprising the step of providing power from the AC bus assembly provides to scene lighting at the scene of a fire.

28. The method of claim 23, wherein the vehicle is a hybrid electric vehicle with the power source comprising a diesel engine coupled to an electric generator, and wherein the method further comprises using the diesel engine to mechanically drive the electric generator and using the generate to convert mechanical power from the diesel engine to electric power.

29. The method of claim 23, wherein the power source comprises a fuel cell coupled to an inverter, and wherein the method further comprises using the inverter to convert DC power from the fuel cell to AC power for the AC bus assembly.

30. The method of claim 19, further comprising detecting that an auxiliary drive module has been added to the vehicle, the auxiliary drive module comprising an additional microprocessor-based interface module, an additional electric motor, and an additional drive wheel; and reconfiguring the vehicle to accommodate the added auxiliary drive module, including updating control algorithms in the first interface module to decrease the horsepower produced by the electric motor in response to a particular throttle input.

31. The method of claim 19, wherein the plurality of interface modules include a compensation program with two modes of operation, wherein in the first mode of operation, the plurality of interface modules control the electric motors such that all of the plurality of drive wheels are driven, wherein in the second mode of operation, the plurality of interface modules control the electric motors such that less than all of the plurality of drive wheels are driven, the compensation program compensating for less than all drive wheels being driven by causing the remaining electric motors to be controlled to provide additional horsepower to compensate for the undriven drive wheel.

32. The method of claim 19, wherein the plurality of microprocessor-based interface modules and the plurality of additional microprocessor-based interface cooperate to reconfigure the vehicle upon the addition and removal of a plurality of auxiliary modules, the plurality of auxiliary modules each including an additional microprocessor-based interface module, an additional electric motor, and an additional drive wheel.

33. The method of claim 19, wherein each of the auxiliary modules is removable and replaceable with a different auxiliary unit having different characteristics, the different characteristics being programmed into the interface module, and wherein the system is capable of reconfiguring itself automatically when a new auxiliary system is mounted on the vehicle.

34. A method of generating electric power comprising:

providing an electric traction vehicle, the electric vehicle comprising a vehicle platform, a communication network, a power source mounted on the vehicle platform and connected to an AC bus assembly, a drive wheel rotatably mounted on the vehicle platform, an electric motor respectively coupled to the drive wheel, a first microprocessor-based interface module coupled to the electric motor, and a plurality of additional microprocessor-based interface modules including a second microprocessor-based interface module, the second interface module being coupled to a throttle input device, and the first and second interface modules being coupled to each other by way of the communication network;

producing electric power using the power source and providing the electric power to the AC bus assembly;

providing power to off-board, electric power-consuming devices using the AC bus assembly, the AC bus assembly providing the power to the off-board devices when the vehicle is stationary and the electric motor is consuming substantially no power from the AC bus assembly, and wherein the AC bus assembly provides three phase power having a frequency of either about 50 Hz or about 60 Hz and a voltage in a range of about 460–480 VAC, and wherein the AC bus assembly provides in excess of 250 kilowatts of power.

35. A method according to claim 34, wherein the power source comprises a generator, and wherein the method further comprises using a power storage unit mounted on the vehicle to supplement the power provided by the generator.

36. A method according to claim 34, wherein AC bus assembly provides in excess of 750 kilowatts of power.

37. A vehicle comprising:

(A) first and second drive wheels;

(B) a power source;

(C) a power transmission link;

(D) a plurality of input devices;

(E) a plurality of output devices, the plurality of output devices including first and second motor drive systems, the first and second motor drive systems including first and second electric motors, the first and second electric motors being respectively coupled to the first and second drive wheels and being capable of applying torque to the first and second drive wheels to drive motion of the vehicle;

(F) a communication network;

(G) a plurality of microprocessor-based interface modules, the plurality of interface modules being coupled to the power source by way of the power transmission link, the plurality of interface modules being interconnected to each other by way of the communication network, each of the plurality of interface modules being coupled to respective ones of the plurality of input devices and the plurality of output devices by way of respective communication links, the plurality of interface modules cooperating to control the plurality of output devices based on input status information from the plurality of input devices; and wherein at least one of the plurality of interface modules controls power distribution to the first and second motor drive systems to control a speed of the vehicle.

38. A vehicle comprising:

(A) a first drive wheel, the first drive wheel being capable of contacting land and driving motion of the vehicle;

(B) a second drive wheel, the second drive wheel being capable of contacting land and driving motion of the vehicle in cooperation with the first drive wheel;

(C) a fuel cell, the fuel cell being capable of providing electric energy;

(D) a power transmission link;

(E) a plurality of input devices;

(F) a plurality of output devices, the plurality of output devices including (1) a first motor drive system, the first motor drive system including a first servo drive and a first electric motor, the first electric motor being coupled to the first drive wheel and being capable of applying torque to the first drive wheel to drive motion of the vehicle, (2) a second motor drive system, the second motor drive system including a second servo drive and a second electric motor;

(G) a communication network;

(H) a plurality of microprocessor-based interface modules, the plurality of interface modules being coupled to the fuel cell by way of the power transmission link, the plurality of interface modules being interconnected to each other by way of the communication network, each of the plurality of interface modules being coupled to respective ones of the plurality of input devices and the plurality of output devices by way of respective communication links, the plurality of interface modules cooperating to control the plurality of output devices based on input status information from the plurality of input devices, the plurality of interface modules being distributed throughout the vehicle; and wherein at least one of the plurality of interface modules controls power distribution to the first and second motor drive systems to control a speed of the vehicle.

39. A control method for a military vehicle having a plurality of input devices and a plurality of output devices, comprising:

(A) determining desired output states of a first subset of the plurality of output devices based on I/O status information stored in an I/O status table, the determining step being performed by an interface module that comprises the I/O status table, the interface module being coupled to a first subset of the plurality of input devices and the first subset of the plurality of output devices, the first subset of the plurality of output devices including an electric motor that drives forward motion of the military vehicle, the interface module being further coupled to a plurality of additional interface modules by way of a communication network, the plurality of additional interface modules being coupled to a second subset of the plurality of input devices and a second subset of the plurality of output devices, the I/O status information stored in the I/O status table including input status information pertaining to input states of the first subset of the plurality of input devices and input status information pertaining to input states of the second subset of the plurality of input devices;

(B) controlling the first subset of the plurality of output devices including the electric motor in accordance with the desired output states, the controlling step being performed by the interface module; and (C) maintaining the I/O status table, the maintaining step being performed by the interface module, the maintaining step including (1) acquiring the input status information pertaining to the input states of the first subset of the plurality of input devices, (2) storing the input status information pertaining to the input states of the first subset of the plurality of input devices in the I/O status table, (3) acquiring, from the plurality of additional interface modules by way of the communication network, the input status information pertaining to the input states of the second subset of the plurality of input devices, and (4) storing the input status information pertaining to the input states of the second subset of the plurality of input devices.

40. A method according to claim 39, wherein each of the plurality of additional interface modules broadcasts I/O status information, and wherein the acquiring step (C)(3) comprises receiving the broadcasts.

41. A method according to claim 40, wherein the broadcasts occur asynchronously.

42. A method according to claim 40, wherein each of the plurality of additional interface modules maintains respective additional I/O status tables, and wherein each of the plurality of additional interface modules receives the broadcasts and stores I/O status information received in the broadcasts to maintain the respective additional I/O status tables.

43. A method according to claim 42, wherein the I/O status table and the respective additional I/O status tables store substantially the same I/O status information.

44. A vehicle comprising:

(A) first and second drive wheels;

(B) a plurality of input devices;

(C) a plurality of output devices, the plurality of output devices including first and second motor drive systems, the first and second motor drive systems including first and second electric motors, the first and second electric motors being respectively coupled to the first and second drive wheels and being capable of applying torque to the first and second drive wheels to drive motion of the vehicle;

(D) a communication network;

(E) a plurality of microprocessor-based interface modules, the plurality of interface modules being interconnected to each other by way of the communication network, each of the plurality of interface modules being coupled to respective ones of the plurality of input devices and the plurality of output devices by way of respective communication links, the plurality of interface modules cooperating to control the respective ones of the plurality of output devices by processing the input status information from the plurality of input devices to determine output states of the respective ones of the plurality of output devices.

45. A vehicle comprising:

(A) first and second drive wheels;

(B) a plurality of input devices;

(C) a plurality of output devices, the plurality of output devices including first and second motor drive systems, the first and second motor drive systems including first and second electric motors, the first and second electric motors being respectively coupled to the first and second drive wheels and being capable of applying torque to the first and second drive wheels to drive motion of the vehicle;

(D) a communication network;

(E) a plurality of microprocessor-based interface modules, the plurality of interface modules being interconnected to each other by way of the communication network, each of the plurality of interface modules being coupled to respective ones of the plurality of input devices and the plurality of output devices by way of respective communication links;

wherein each of the plurality of interface modules collects input status information from the respective ones of the plurality of input devices and broadcasts the input status information over the communication network to each of the remaining ones of the plurality of interface modules, each of the remaining ones of the plurality of interface modules receiving the input status information and locally storing the input status information.

46. The vehicle of claim 45, wherein each of the plurality of interface modules control the respective ones of the plurality of output devices based on the locally stored input status information.

47. The vehicle of claim 45, wherein each of the plurality of interface modules process the input status information to determine output states of the respective ones of the plurality of output devices.

48. An electric traction vehicle comprising:

a vehicle platform;

a communication network;

a power source mounted on the vehicle platform;

a plurality of drive wheels rotatably mounted on the vehicle platform;

a plurality of electric motors coupled to respective ones of the plurality of drive wheels;

a plurality of microprocessor-based interface modules coupled to each other by way of the communication network, the plurality of microprocessor-based interface modules also being coupled to the plurality of electric motors and being configured to control the plurality of electric motors; and an electrical connector to allow an electrical power-consuming device off-board the vehicle to be connected to the vehicle and draw AC power from the vehicle.

49. The electric vehicle of claim 48, wherein the vehicle is capable of providing at least 50 kilowatts of AC power to the off-board power-consuming device.

50. The electric vehicle of claim 48, wherein the vehicle is capable of providing at least 200 kilowatts of AC power to the off-board power-consuming device.

51. An electric traction vehicle comprising:

a vehicle platform;

a communication network;

a power source mounted on the vehicle platform;

a plurality of auxiliary drive modules, each of the plurality of auxiliary drive modules comprising a microprocessor-based interface module, an electric motor, and a drive wheel, the auxiliary drive modules being capable of being added to and removed from the vehicle as a unit to achieve a corresponding increase or decrease in the drive capacity of the vehicle;

wherein the microprocessor-based interface modules are communicatively coupled together by way of the communication network when the auxiliary drive modules are coupled to the vehicle.

52. An electric traction vehicle comprising:

a vehicle platform;

a communication network;

an electrical power storage device;

a plurality of drive wheels rotatably mounted on the vehicle platform;

a plurality of electric motors coupled to respective ones of the plurality of drive wheels, power being provided to the electric motors from the electrical power storage device; and a plurality of microprocessor-based interface modules coupled to each other by way of the communication network, the plurality of microprocessor-based interface modules also being coupled to the plurality of electric motors and being configured to control the plurality of electric motors;

wherein one of the interface modules is used to selectively discharge the electrical power storage device in response to an operator input.

53. The electricvehicle of claim 52, wherein the electrical energy storage device comprises a plurality of capacitors.

54. The electric vehicle of claim 52, wherein the electrical energy storage device provides power to the electric motors by way of an AC bus assembly.

* * * * *

UNITED STATES PATENT AND TRADEMARK OFFICE
CERTIFICATE OF CORRECTION

PATENT NO. : 6,885,920 B2
DATED : April 26, 2005
INVENTOR(S) : Christopher K. Yakes et al.

It is certified that error appears in the above-identified patent and that said Letters Patent is hereby corrected as shown below:

<u>Column 96,</u>
Line 48, please replace "electricvehicle" with -- electric vehicle --.

Signed and Sealed this

Twelfth Day of July, 2005

JON W. DUDAS
*Director of the United States Patent and Trademark Office*